United States Patent
Yamanaka et al.

(10) Patent No.: US 6,304,309 B1
(45) Date of Patent: Oct. 16, 2001

(54) LIQUID CRYSTAL DISPLAY DEVICE AND METHOD OF MANUFACTURING THE SAME

(75) Inventors: Yasuhiko Yamanaka, Hirakata; Naohide Wakita, Suita; Hiroshi Yamazoe, Katano; Takeshi Karasawa, Suita; Mariko Kawaguri, Moriguchi, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/423,543

(22) PCT Filed: Mar. 19, 1999

(86) PCT No.: PCT/JP99/01432

§ 371 Date: Nov. 12, 1999

§ 102(e) Date: Nov. 12, 1999

(87) PCT Pub. No.: WO99/47969

PCT Pub. Date: Sep. 23, 1999

(30) Foreign Application Priority Data

| Mar. 19, 1998 | (JP) | 10/070069 |
| Mar. 20, 1998 | (JP) | 10/138317 |
| May 28, 1998 | (JP) | 10/147449 |
| Mar. 16, 1999 | (JP) | 11/069732 |
| Mar. 17, 1999 | (JP) | 11/071369 |

(51) Int. Cl.⁷ .......... G02F 1/1339; G02F 1/133; G02F 1/1333
(52) U.S. Cl. .......... 349/156; 349/73; 349/84; 349/86; 349/153; 349/155; 349/190
(58) Field of Search .......... 349/73, 74, 79, 349/84, 86, 108, 155, 156, 153, 190

(56) References Cited

U.S. PATENT DOCUMENTS

| 4,241,339 | * 12/1980 | Ushiyama | 340/702 |
| 5,386,307 | * 1/1995 | Jang | 359/53 |
| 5,625,474 | 4/1997 | Aomori et al. | 349/79 |
| 5,712,695 | * 1/1998 | Tanaka et al. | 349/79 |
| 5,724,109 | * 3/1998 | Nakamura et al. | 349/79 |
| 5,739,890 | 4/1998 | Uda et al. | 349/156 |
| 5,986,729 | * 11/1999 | Yamanaka et al. | 349/79 |

FOREIGN PATENT DOCUMENTS

| 61-238024 | 10/1986 | (JP) . |
| 03238424 A | 10/1991 | (JP) . |
| 04056920 A | 2/1992 | (JP) . |

(List continued on next page.)

*Primary Examiner*—William I. Sikes
*Assistant Examiner*—Tarifur R. Chowdhury
(74) *Attorney, Agent, or Firm*—Parkhurst & Wendel, L.L.P.

(57) ABSTRACT

In a liquid crystal display device in which a plurality of liquid crystal layers are stacked on a substrate, a method for bonding a film for sealing liquid crystal to supporting members is improved and the fabrication cost is thereby reduced, in order to provide a reflective type liquid crystal display device that achieves a bright display image and causes no parallax problem, and to provide a reducing method of the device. The liquid crystal display device comprises a substrate, a resin film, a multiplicity of columnar supporting members, an adhesive layer, and a liquid crystal layer. The substrate comprises a pixel electrode and a driving element connected to the pixel electrode, both formed on the upper surface of the substrate. The resin film comprises a common electrode provided on the upper surface of the film, and is disposed upwardly with respect to the substrate. The supporting members are provided on the substrate so as to support the resin film. The adhesive layer is provided between each of the supporting members and the resin film so as to bond the resin film to each of the supporting members. The liquid crystal layer is produced by filling liquid crystal between the substrate and the resin film. The adhesive layer is composed of a thermoplastic material, and characterized in that a bonding state of the resin film and the supporting members is realized by making the adhesive layer have a thermoplastic characteristic.

57 Claims, 83 Drawing Sheets

FOREIGN PATENT DOCUMENTS

| | | |
|---|---|---|
| 04243266 A | 8/1992 | (JP) . |
| 05034730 A | 2/1993 | (JP) . |
| 05057831 A | 3/1993 | (JP) . |
| 06331970 A | 12/1994 | (JP) . |
| 06337643 A | 12/1994 | (JP) . |
| 08146456 A | 6/1996 | (JP) . |
| 09090327 A | 4/1997 | (JP) . |
| 09160005 A | 6/1997 | (JP) . |
| 09258256 A | 10/1997 | (JP) . |
| 10054996 A | 2/1998 | (JP) . |
| 10062789 A | 3/1998 | (JP) . |
| 10123984 A | 5/1998 | (JP) . |
| 10213790 A | 8/1998 | (JP) . |
| 10260427 A | 9/1998 | (JP) . |
| 11030781 A | 2/1999 | (JP) . |

* cited by examiner

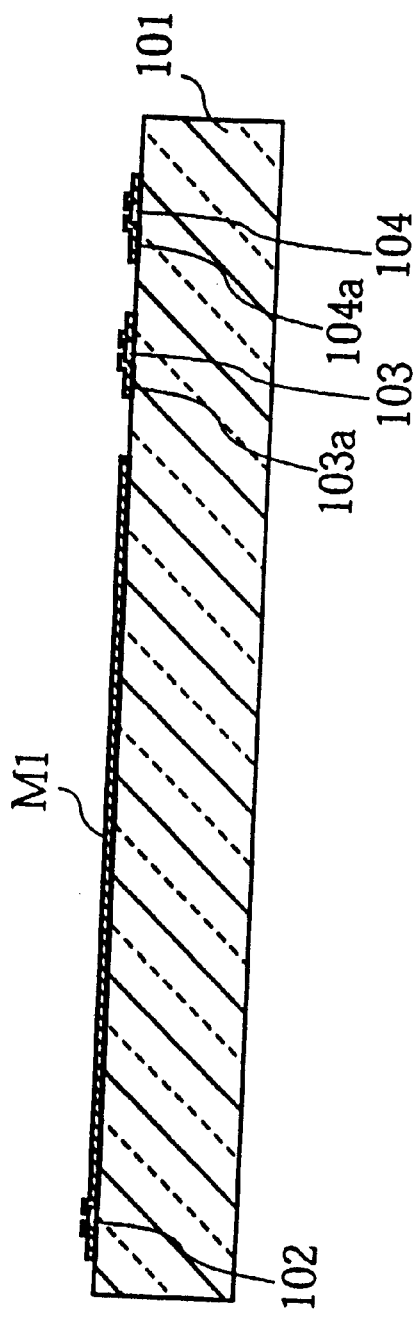
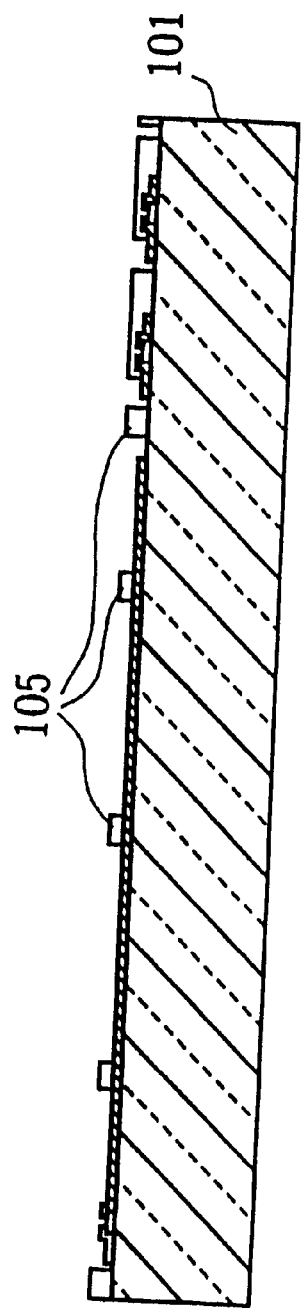
FIG. 6(a)
FIG. 6(b)

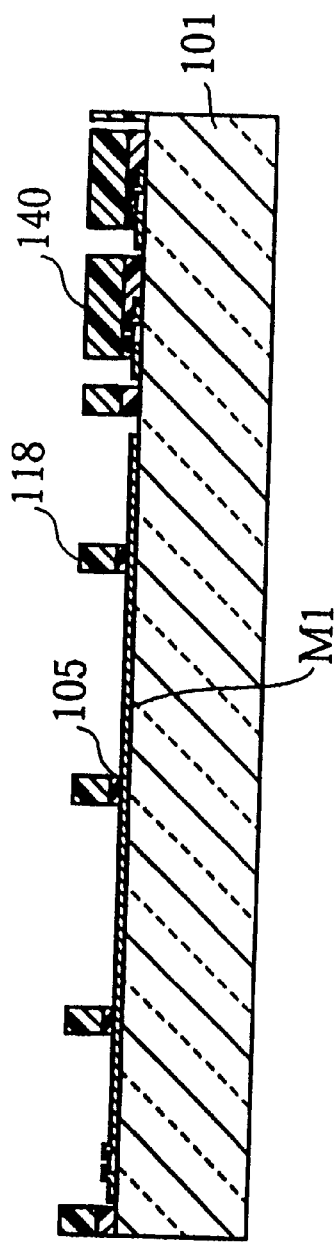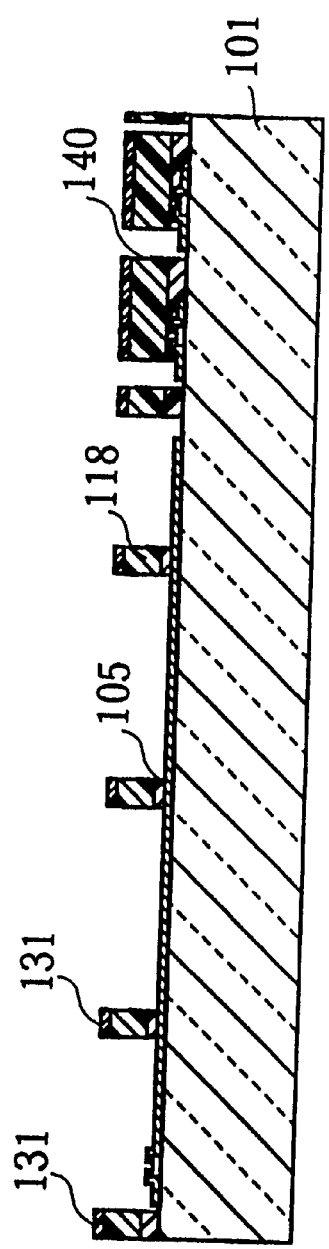
FIG. 7(a)
FIG. 7(b)

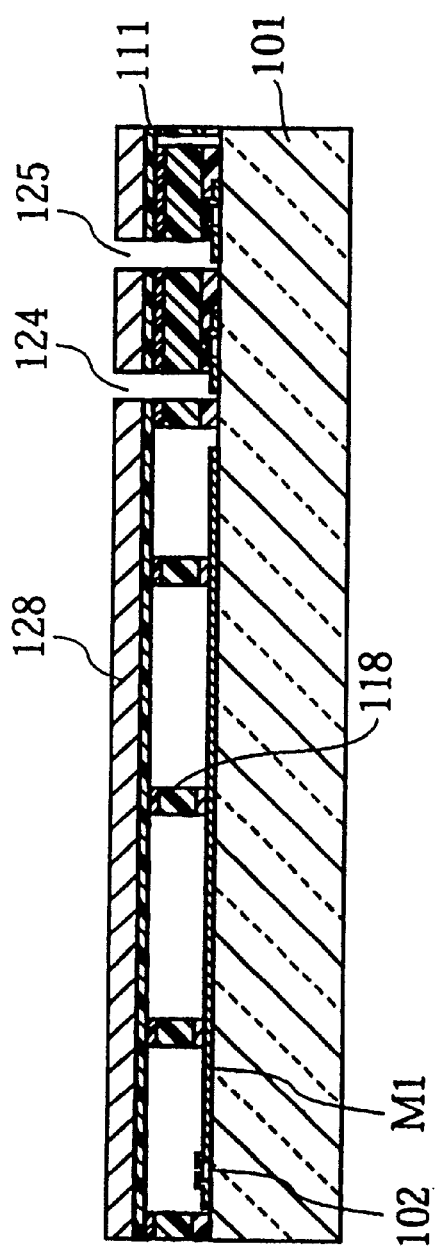
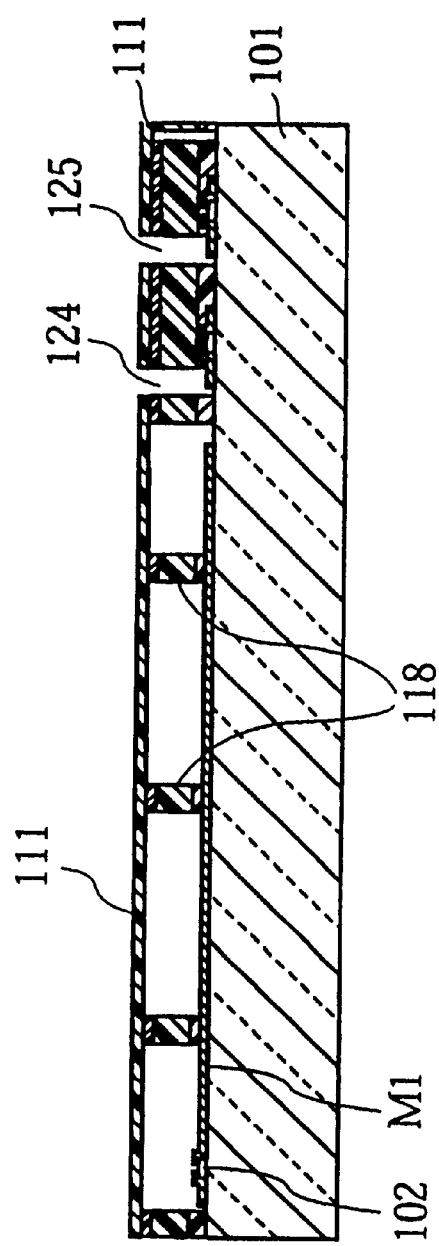
FIG. 10(a)
FIG. 10(b)

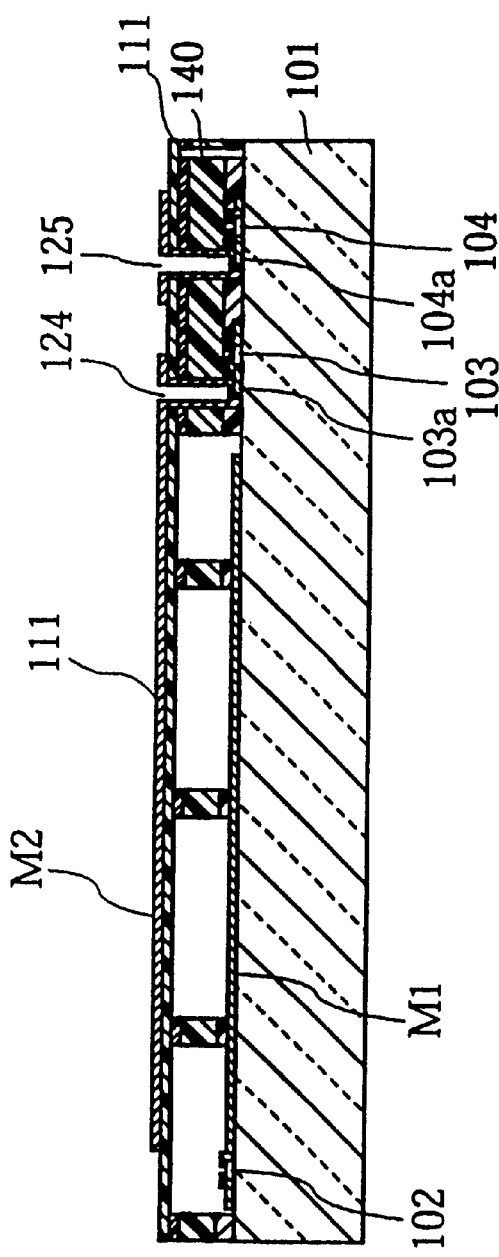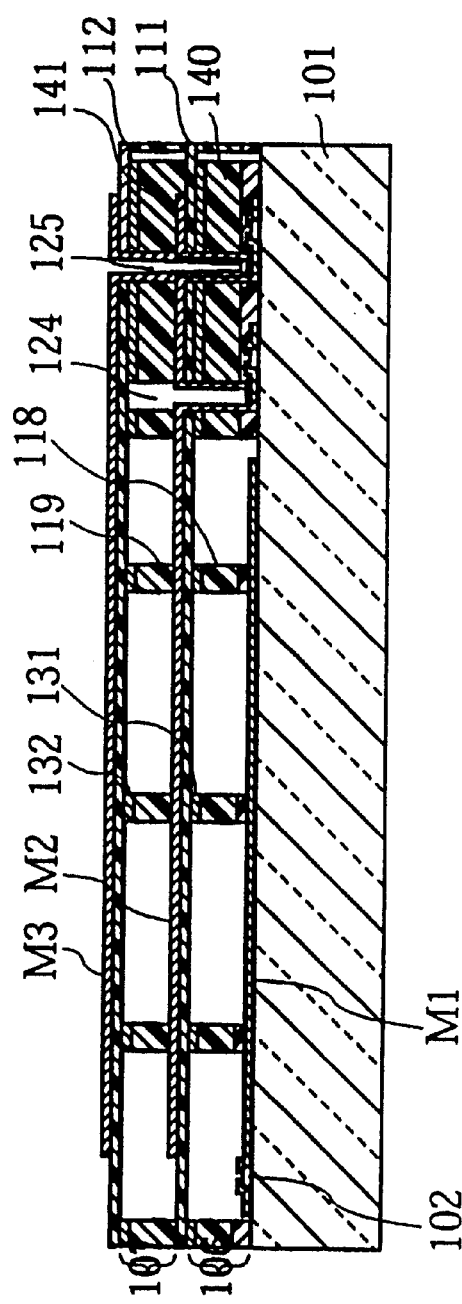
FIG. 11(a)
FIG. 11(b)

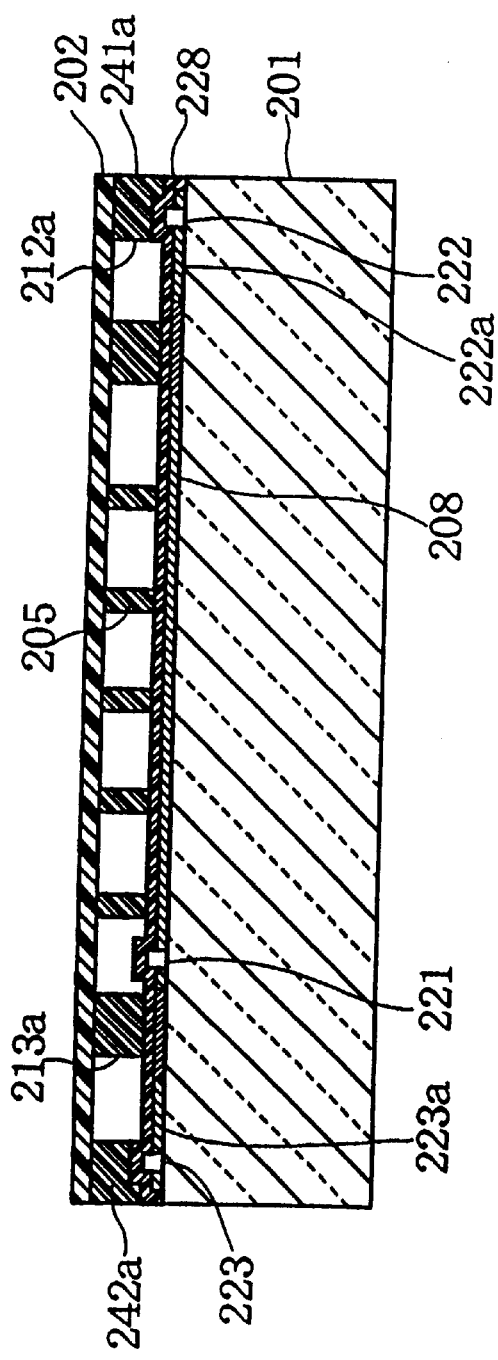
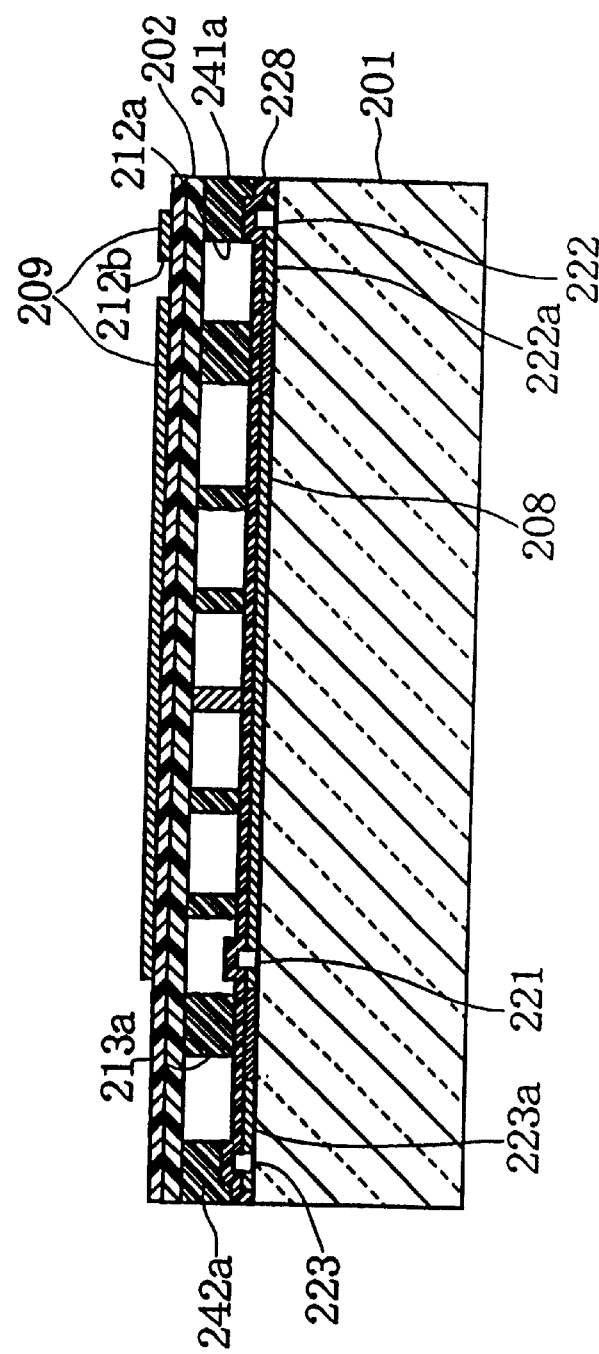
FIG. 24(a)
FIG. 24(b)

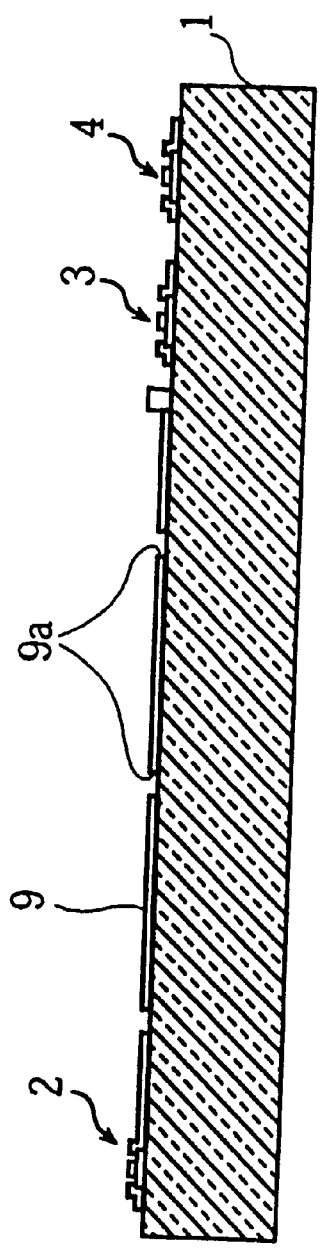
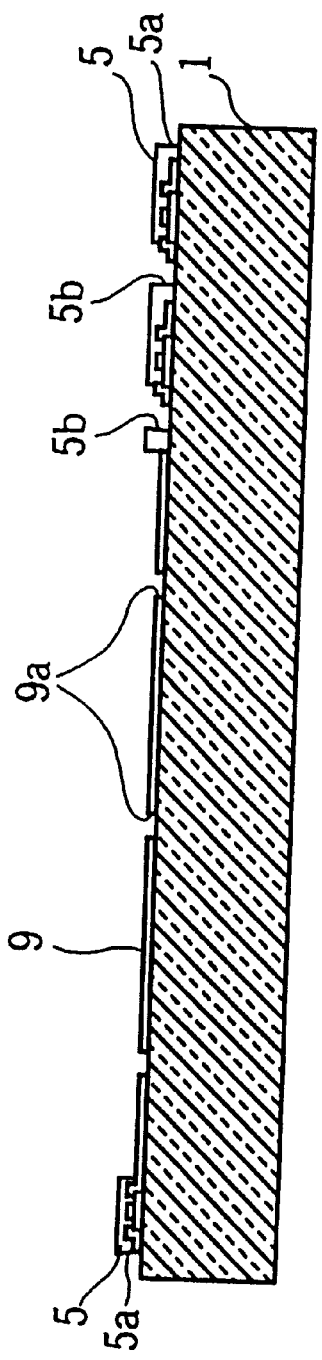
FIG. 36(a)
FIG. 36(b)

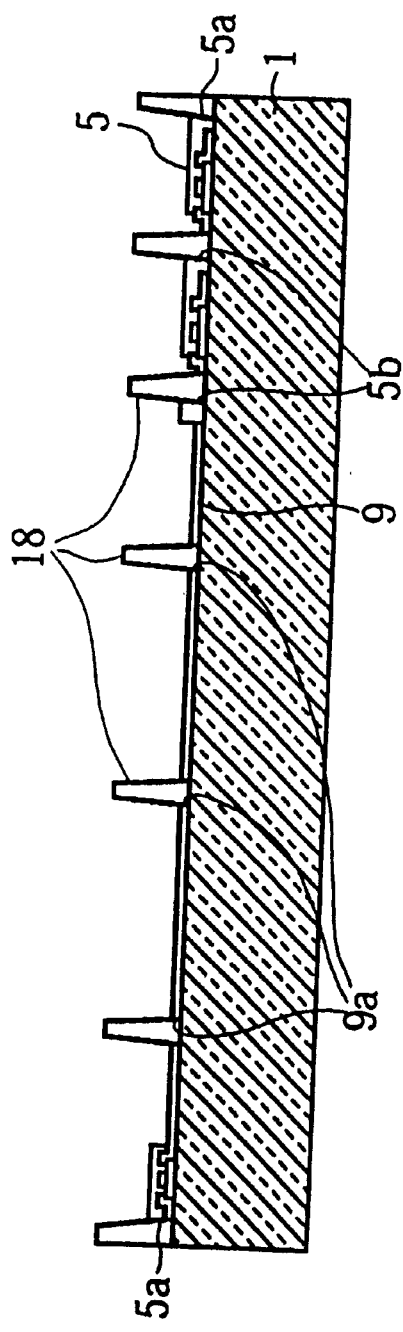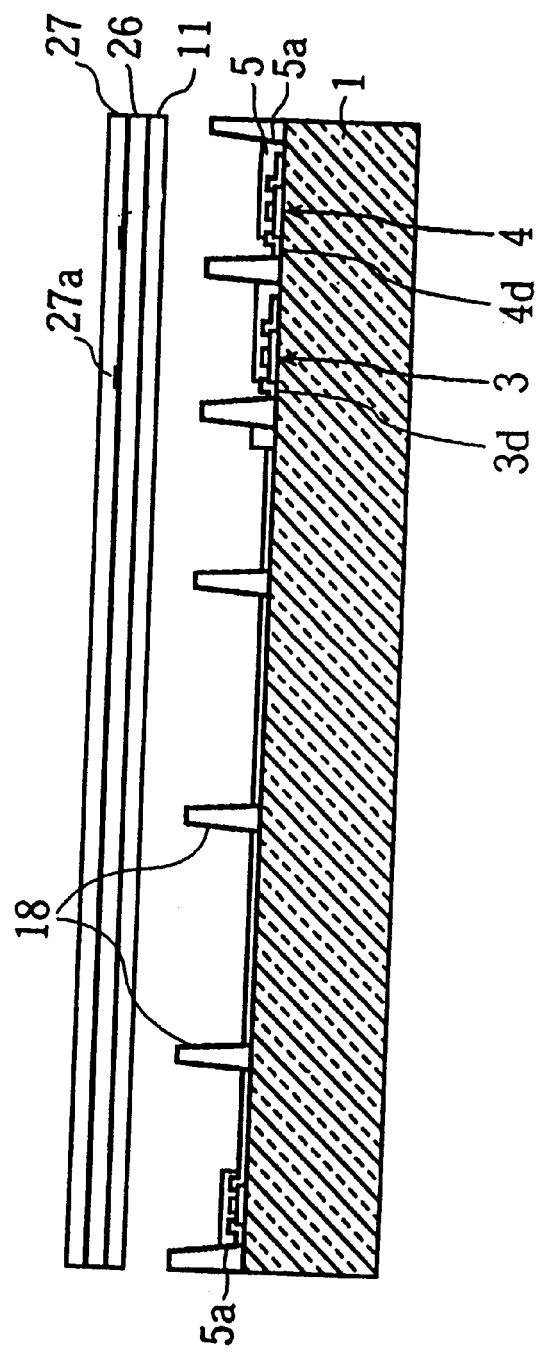

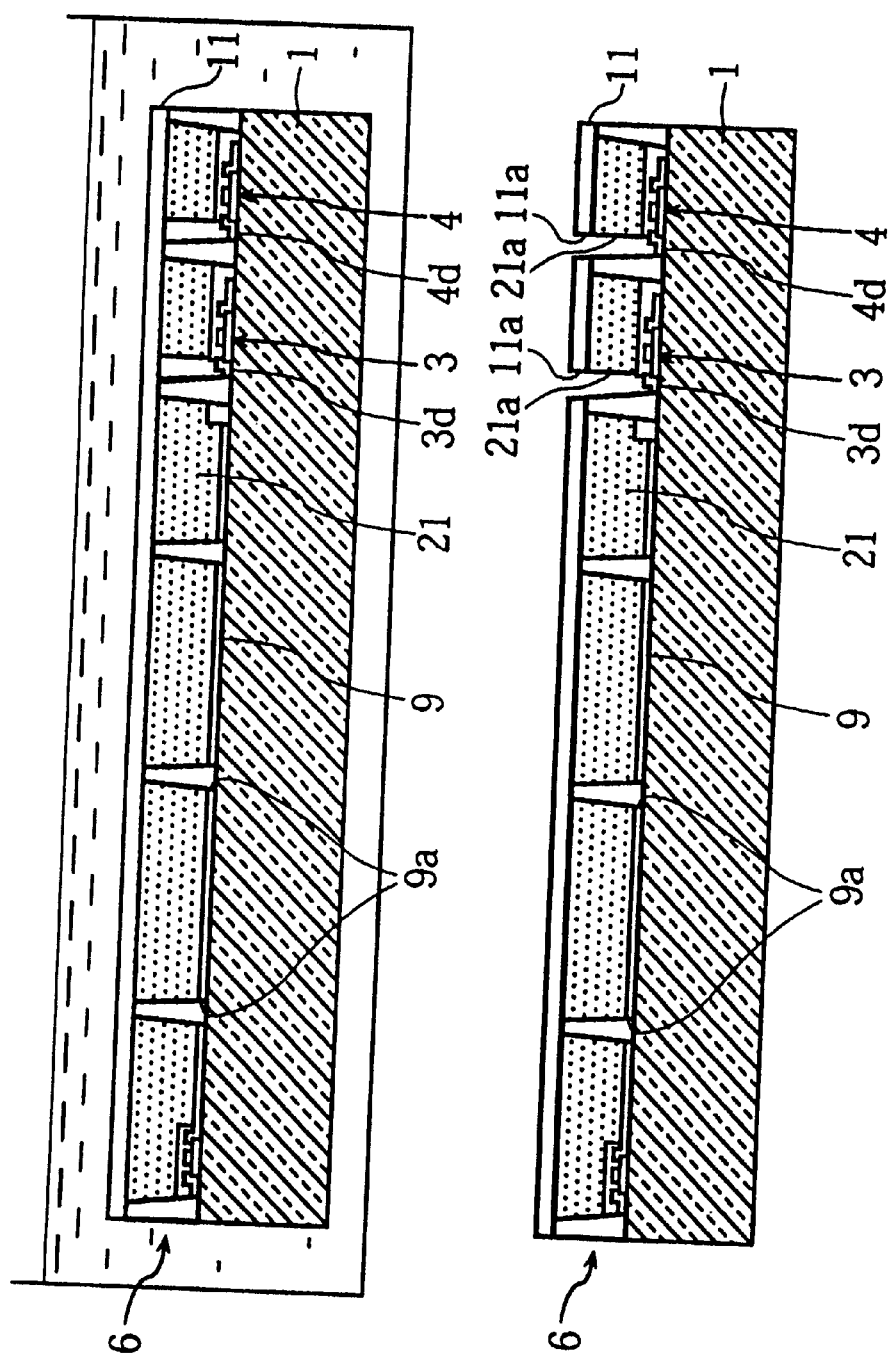

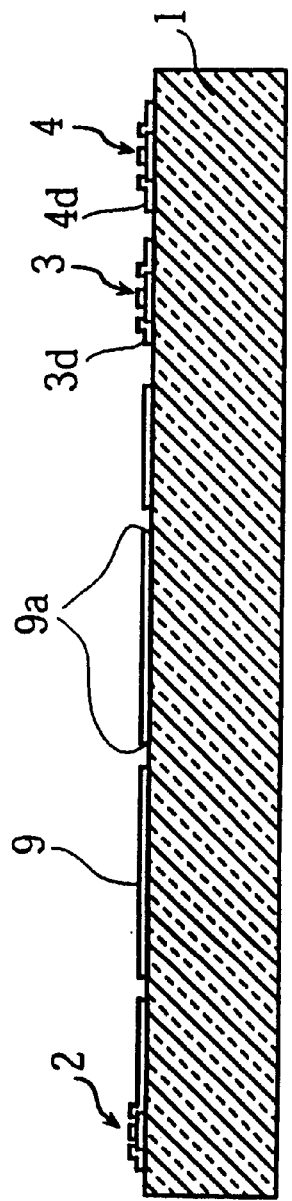
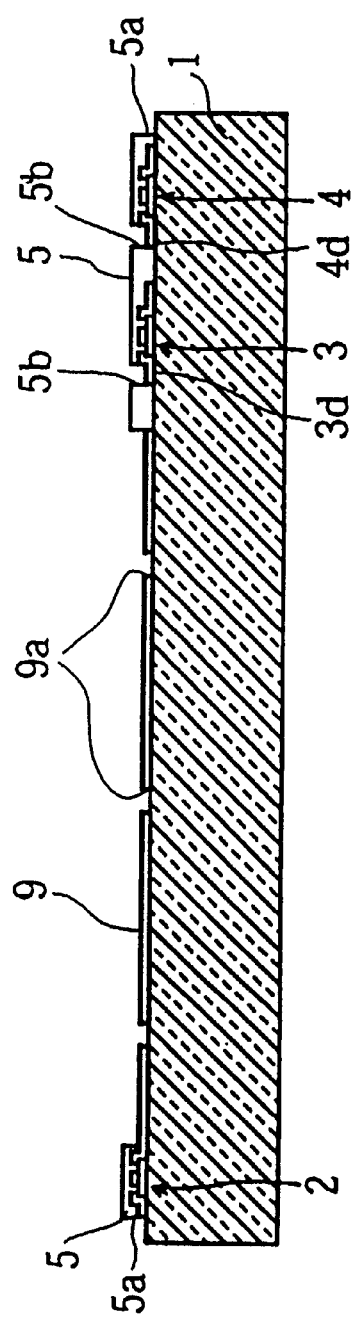
FIG. 46(a)
FIG. 46(b)

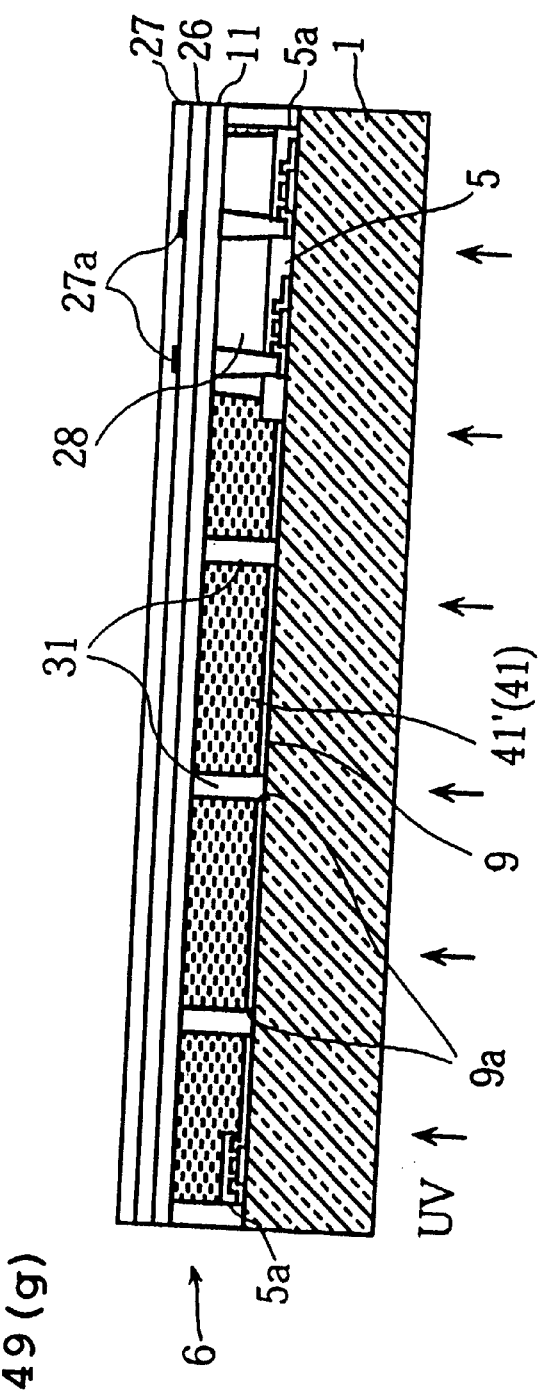
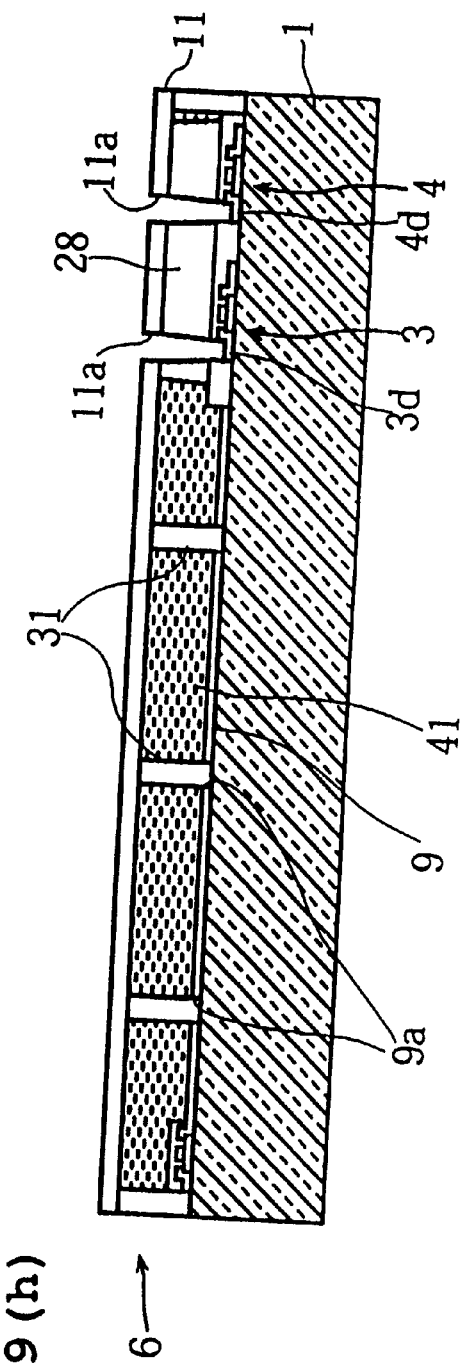
FIG. 49(g)
FIG. 49(h)

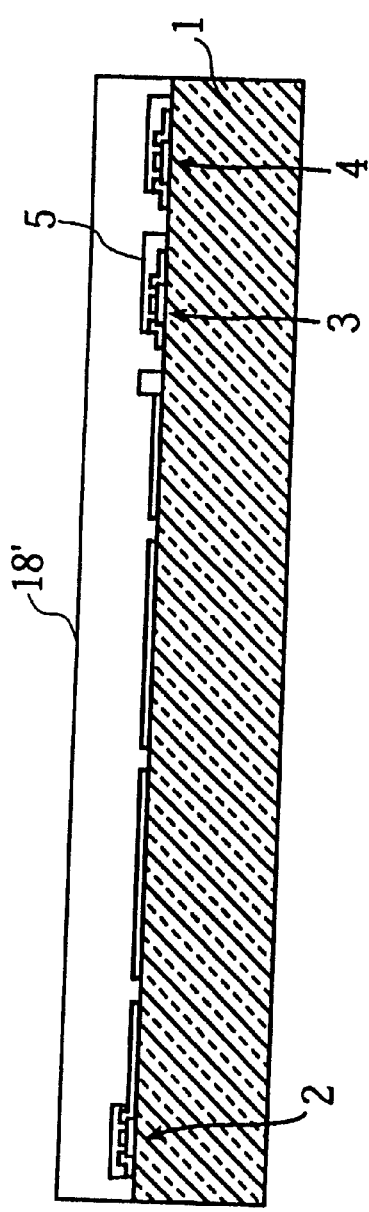
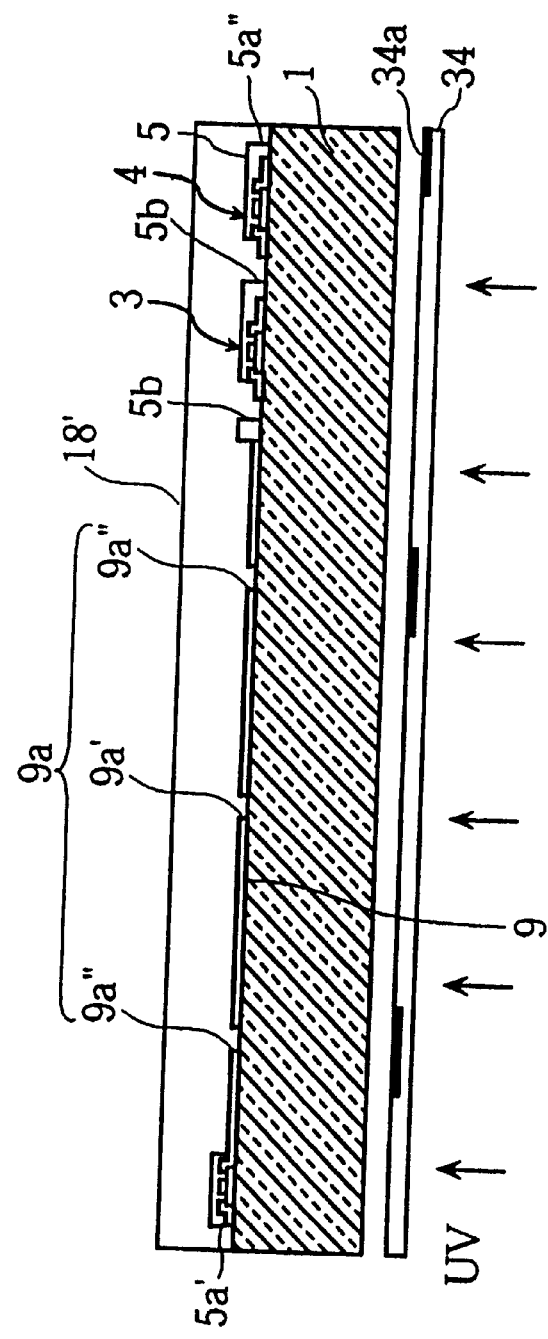
FIG. 53 (c)
FIG. 53 (d)

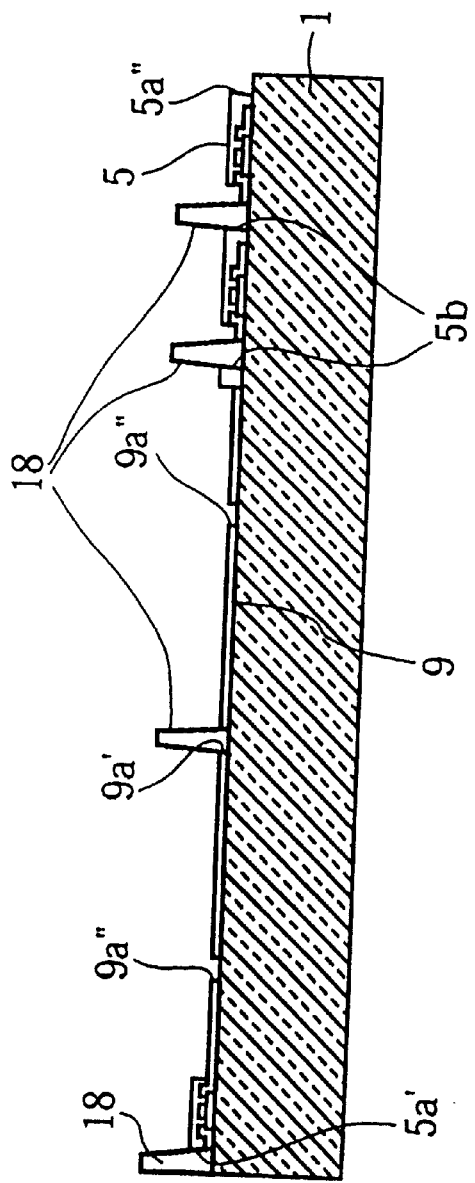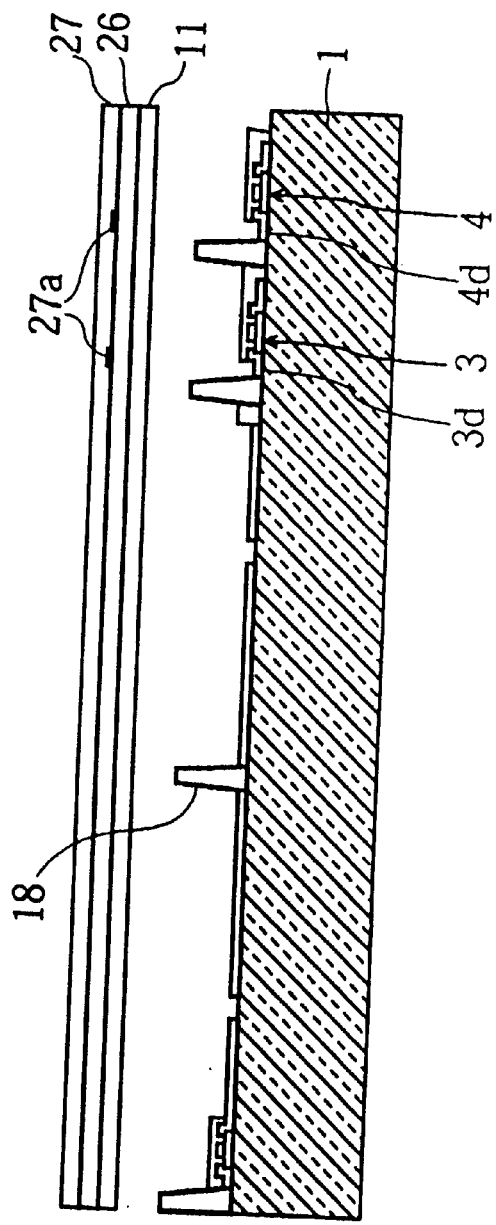
FIG. 54(e)
FIG. 54(f)

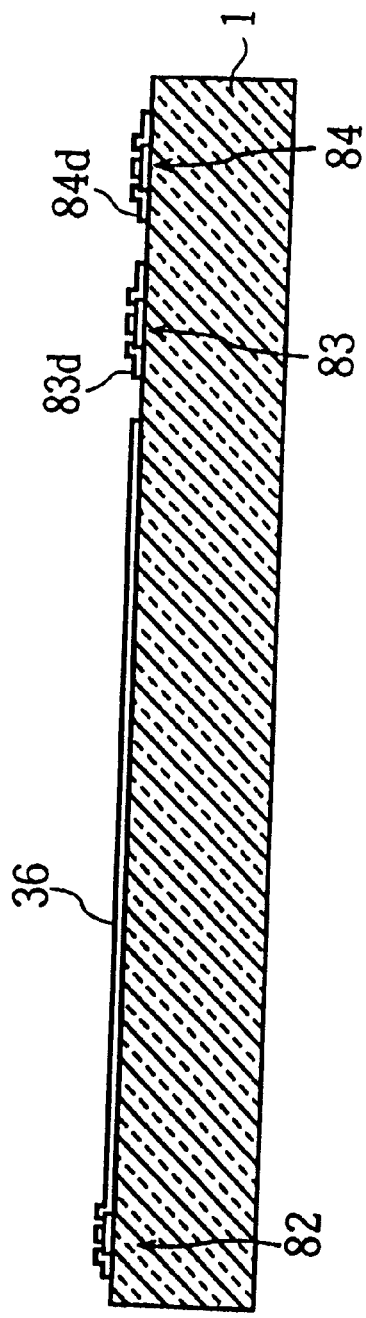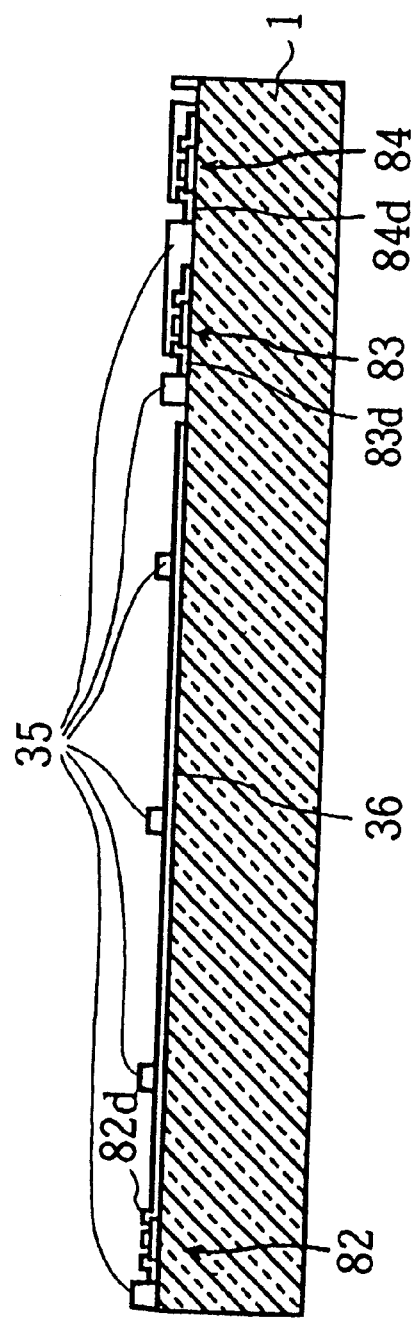
FIG. 60(a)
FIG. 60(b)

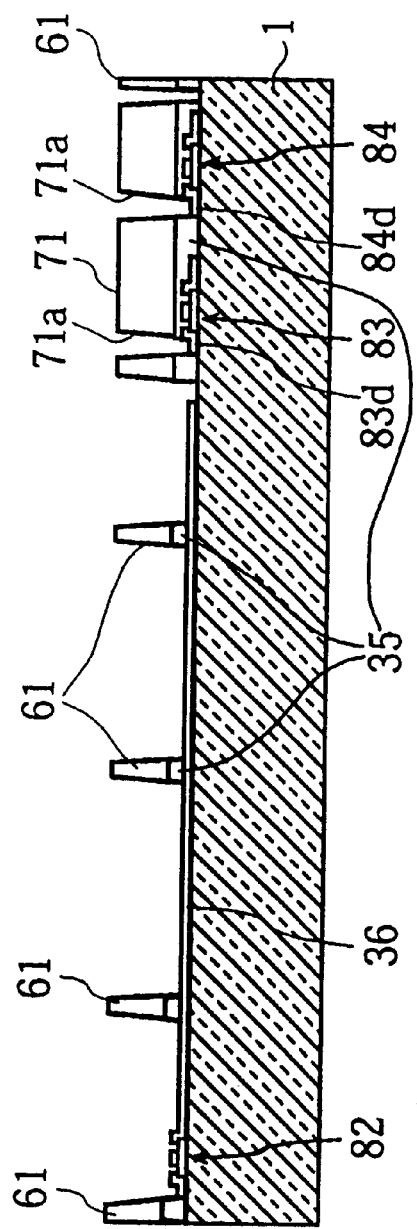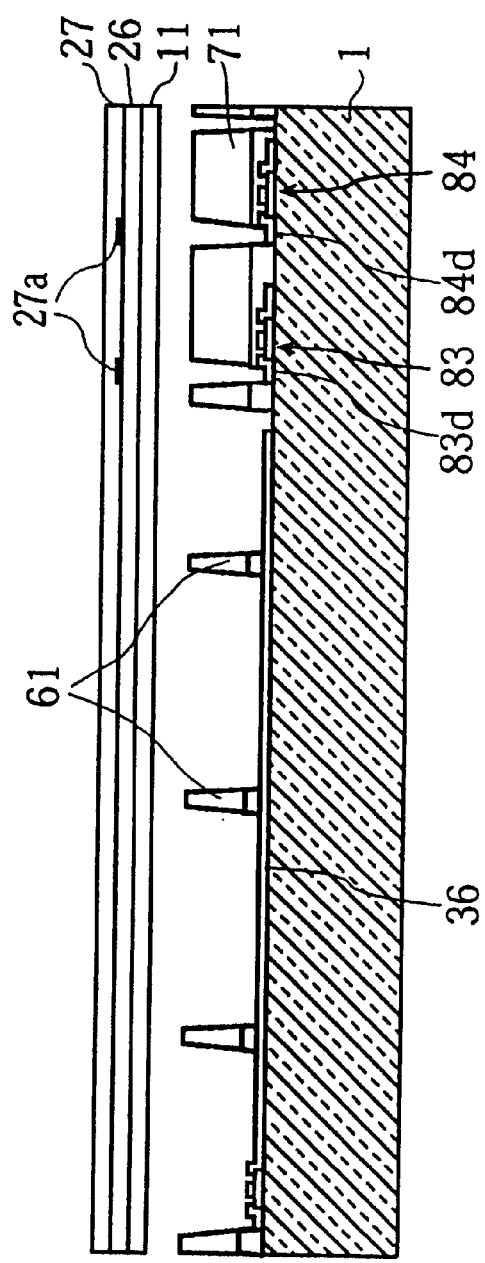
FIG. 62(e)
FIG. 62(f)

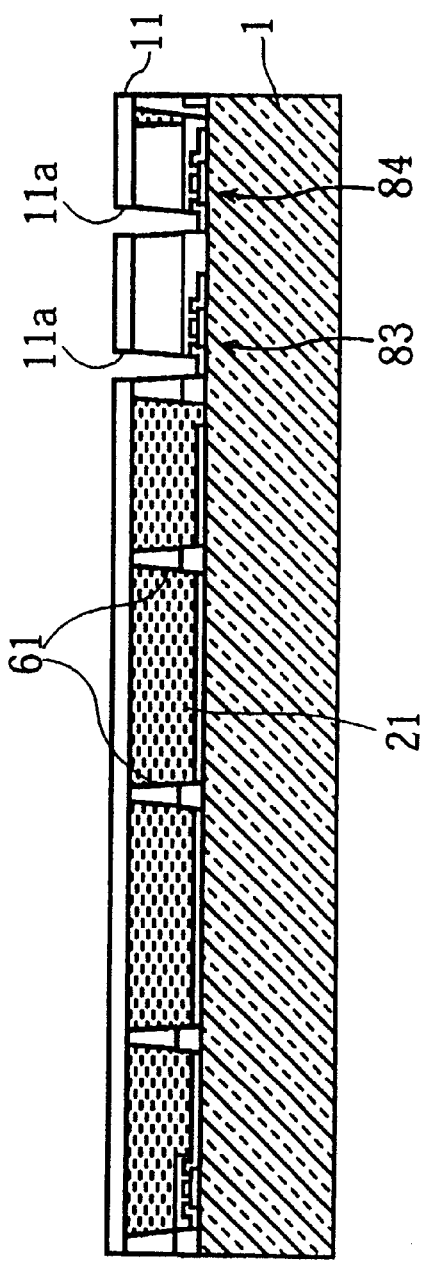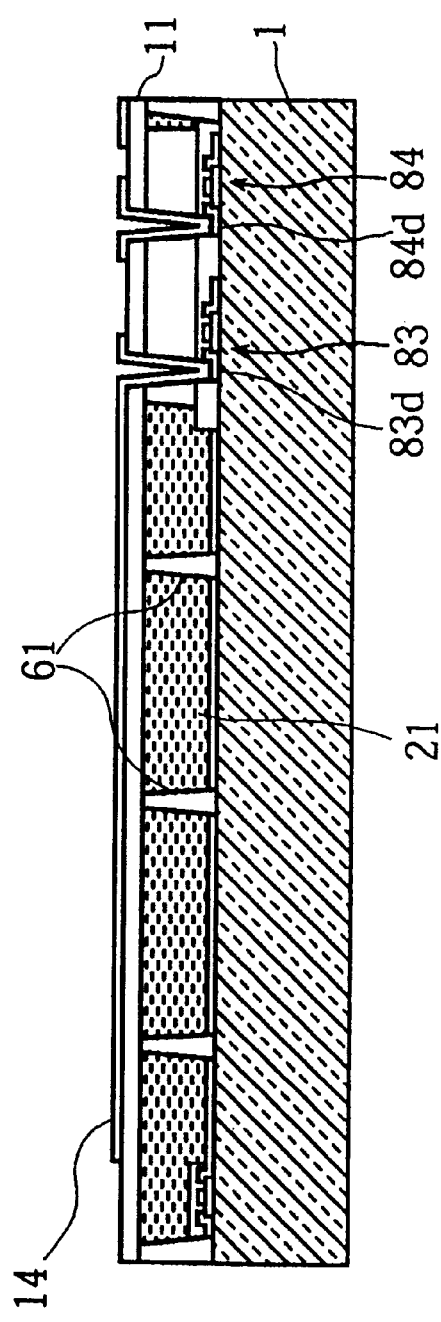

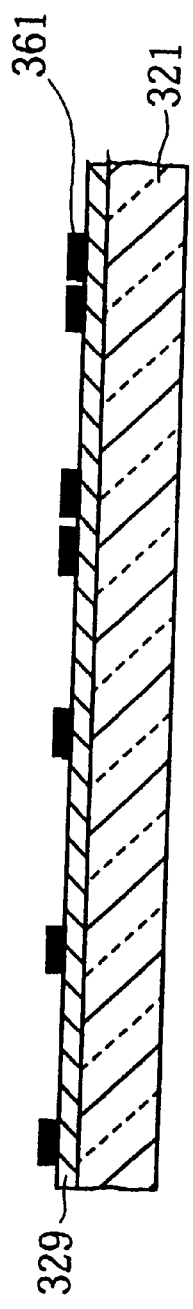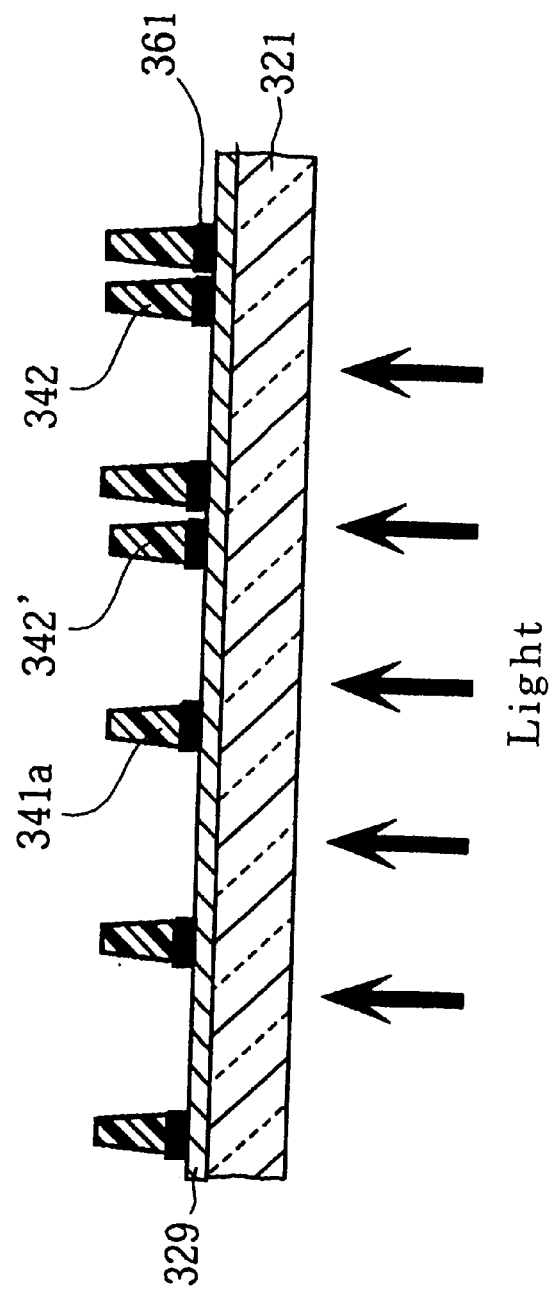
FIG. 71(a)
FIG. 71(b)

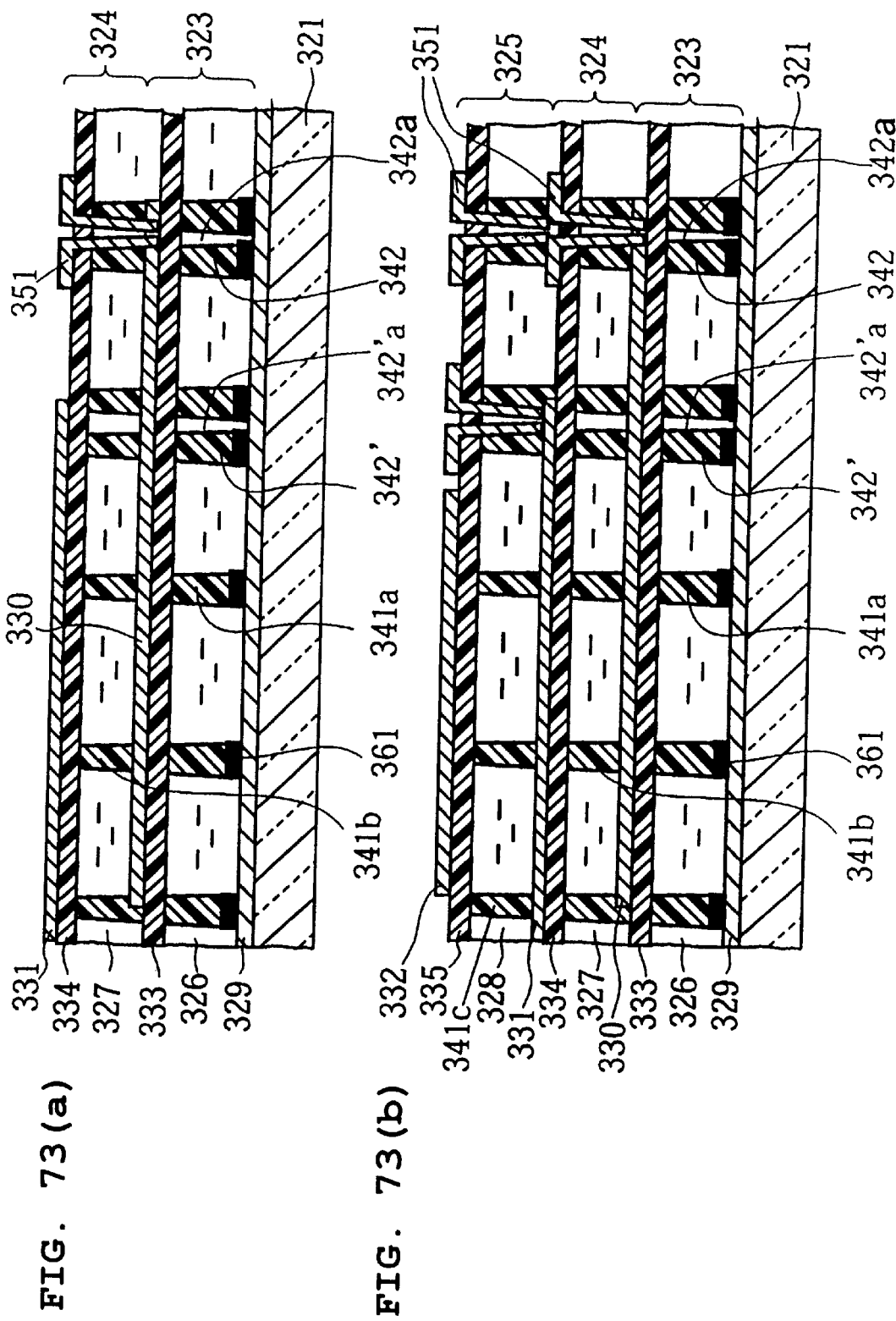

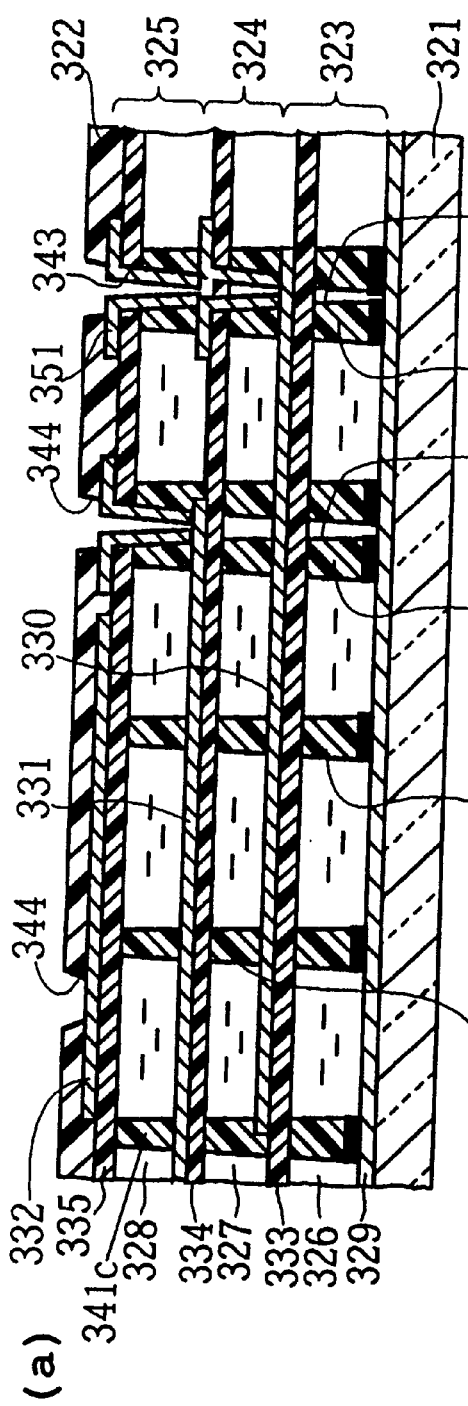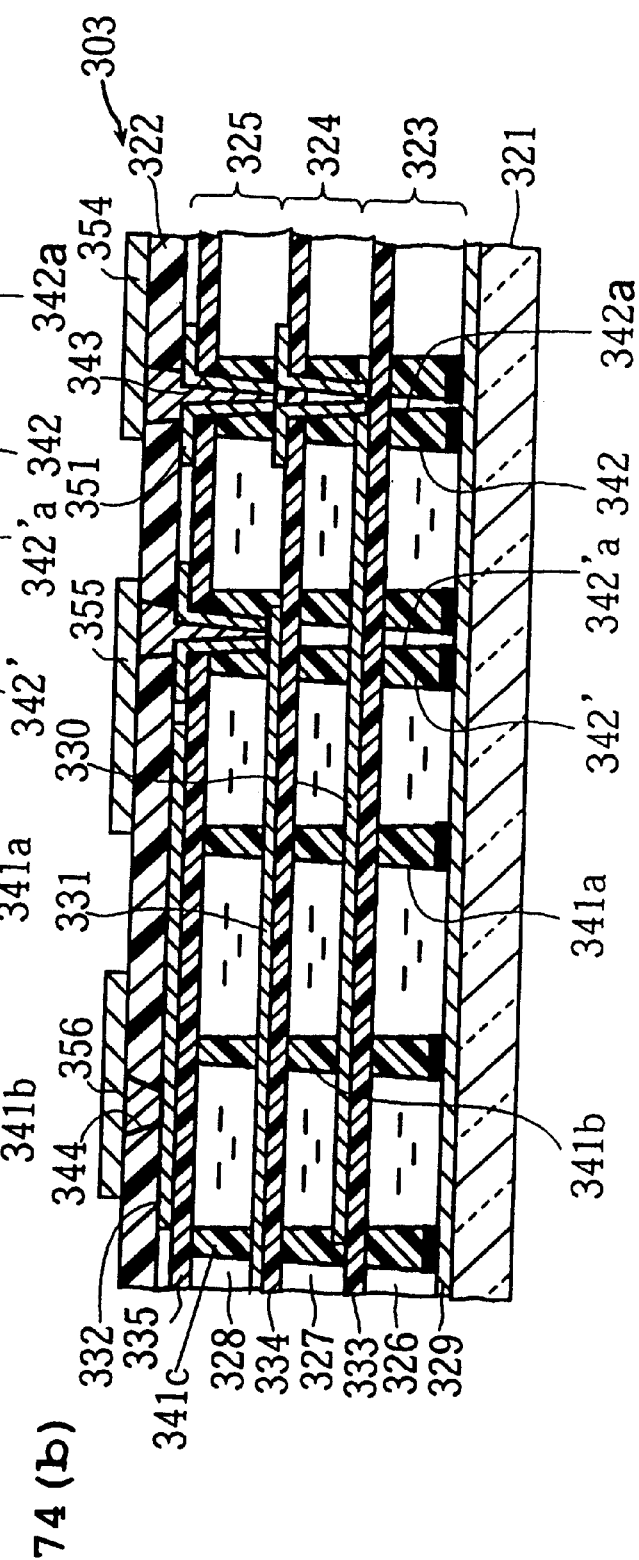
FIG. 74(a)
FIG. 74(b)

LIQUID CRYSTAL DISPLAY DEVICE AND METHOD OF MANUFACTURING THE SAME

TECHNICAL FIELD

The present invention relates to a liquid crystal display device and a method for fabricating the same. More specifically, the present invention relates to a liquid crystal display device which has a plurality of liquid crystal layers stacked on a substrate and provides bright color images even when it is a reflective type, and to a method for fabricating the same.

BACKGROUND OF THE INVENTION

First Prior Art

Widely used conventional liquid crystal display devices display images by combining twisted nematic liquid crystal and a polarizing plate so as to control penetrating light for each pixel. Conventional liquid crystal display devices for displaying color images have micro color filters corresponding to adjacent three pixels and penetrating red, green, and blue lights by the additive process.

However, in such a conventional liquid crystal display device a large amount of light absorption in the polarizing plate and the micro color filters causes the transmissivity in the entire liquid crystal display device to be about 10% or less, making it difficult to provide bright display images. In particular, in a reflective type liquid crystal display device which utilizes external light, the display is likely to be so dark as to make the colors unrecognizable.

Japanese Laid-open Patent Applications No. 61-238024 and No. 3-238424 show liquid crystal display devices which display bright color images even when they are used as reflective type because of a guest host mode for controlling the absorption and penetration of light for each color by using dichroic dyes. These liquid crystal display devices comprise a plurality of stacked panels each having a liquid crystal layer containing a dichroic dye different from each other. To be more specific, the three liquid crystal panels each comprise liquid crystal containing dichroic dyes of cyan, magenta, or yellow and sealed into between a pair of glass substrates. When all the panels absorb light, images are displayed in black; when all the panels penetrate light, images are displayed in white; and when one or two panels absorb light, images are displayed in colors. Not having a color filter or a polarizing plate for absorbing light, the display device with the guest host mode provides bright and clear color display and is suitable for a reflective type liquid crystal display device.

However, the liquid crystal display device comprising a plurality of stacked panels each having a pair of glass substrates has the following drawback. When the pixels are small, the thickness of the glass substrates composing each panel becomes relatively large as compared with the size of the pixels, and as a result, the parallax becomes so influential as to cause unevenness in color when display images are seen in a diagonal direction.

In order to solve the unevenness in color due to the parallax, a so-called polymer diffusion type liquid crystal display device has been proposed as in Japanese Laid-open Patent Application No. 6-337643. FIG. 79 shows the polymer diffusion type liquid crystal display device, which comprises a substrate 1291 and liquid crystal layers 1295–1297 stacked thereonto by solidifying a resist material or polymeric material 1298 in which a guest host liquid crystal 1299 is dispersedly held. The display device further comprises driving electrodes 1292–1294 which correspond to the liquid crystal layers 1295–1297, respectively and are connected with corresponding driving elements formed on the substrate 1291. Such a structure requiring no glass substrate between adjacent ones of the liquid crystal layers 1295–1297 realizes a liquid crystal display device with a guest host mode which is freed of unevenness in color resulting from parallax.

However, in the polymer diffusion type liquid crystal display device, the guest host liquid crystal 1299 is dispersedly held in the resist material or polymeric material 1298, so that the resist material or polymeric material 1298 makes up a large proportion of the liquid crystal layers 1295–1297 (the guest host liquid crystal 1299 makes up a small proportion of the liquid crystal layers 1295–1297). This causes a problem that a substantial open area ratio becomes small, making it difficult to have a high contrast ratio.

Prior to the liquid crystal display device of the present invention, the inventors of the present invention have proposed a liquid crystal display device in Japanese Laid-open Patent Application No. 9-127057 which is shown in FIG. 80. The liquid crystal display device comprises a substrate 1101, film-like sealing plates 1113–1115 stacked on the substrate 1101 while being supported by supporting members (spacers) 1108–1110, and liquid crystals 1125–1127 sealed into between the substrate 1101 and the sealing plate 1113, between the sealing plates 1113–1114, and between the sealing plates 1114–1115, respectively. The use of the film-like sealing plates 1113–1115 supported by the supporting members 1108–1110 solves the unevenness in color due to parallax which is caused when glass substrates are used. Furthermore, the polymeric material which is used to hold liquid crystal in the above-mentioned polymer diffusion type liquid crystal display device is not required, so that the liquid crystal makes up a large proportion of the liquid crystal layers 1125–1127 disposed between adjacent ones of the sealing plates 1113–1115. This makes it possible to increase a substantial open area ratio, thereby increasing the contrast ratio.

The supporting members 1108–1110 can be formed by applying a photosensitive resin onto each of the substrate 1101 and the sealing plates 1113 and 1114 and polymerizing and hardening parts of the photosensitive resin by mask exposure, where the supporting members 1108–1110 are formed, and then eliminating the remaining part of the photosensitive resin by development.

However, in the liquid crystal display device comprising the stacked film-like sealing plates 1113–1115, each of the supporting members 1108–1110 must be formed exactly in the same position as each other in order to securely support the sealing plates 1113–1115. For example, when the supporting members 1108 are formed in different positions from the supporting members 1109 as shown in FIG. 81(*a*) due to low precision in positioning, these sealing plates are deformed as shown in FIG. 81(*b*) by the pressure of bonding the sealing plate 1114 to the substrate 1101. When the positional deviation between the supporting members 1108 and 1109 is large, the supporting member 1109 of a second display layer 1122 encroaches on a first display layer 1117 as shown in FIG. 81(*c*) so as to destroy the first and second display layers 1117 and 1118. In order to avoid this problem, the formation of the supporting members 1108–1110 by mask exposure requires mask alignment of high precision.

Since the supporting members 1108 and 1109 are in the region where the light transmissivity is not controlled, it is preferable to make the area for the supporting members 1108–1110 in pixels as small as possible in order to have a larger open area ratio. This requires higher precision in mask alignment. To be more specific, in the case where the supporting members 1109 are square pillars of 7 μm×7 μm, the positional deviation of 3 μm or more between the supporting members 1108 and 1109 damages the first display layer 1117 and other components as described above. Therefore, mask alignment must be performed so as to make the positional deviation less than 3 μm.

As a result, the device has a problem that the provision of a precision masking process leads to an increase in the production cost.

Second Prior Art

The inventors of the present invention previously filed Japanese Laid-open Patent Application No. 9-127057, which is about a liquid crystal display device successfully overcoming the problem of the liquid crystal display device shown in FIG. 79. The invention according to the application is the foundation of the present invention and comprises a liquid crystal layer filled with liquid crystal and disposed between a substrate and a sealing film, and supporting members for supporting the sealing film. The liquid crystal display device makes it possible that liquid crystal makes up a larger proportion of the liquid crystal layer and the effective open area ratio is increased as compared with conventional devices, so as to improve the contrast ratio.

Although the invention of the application (Japanese Laid-open Patent Application No. 9-127057) has overcome the problems of the conventional device shown in FIG. 79, it has new problems described below. In order to solve the new problems, the inventors of the present invention have achieved the present invention after conducting research and development based on the invention of the application (Japanese Laid-open Patent Application No. 9-127057). Thus, the present invention has overcome the problems of the conventional device shown in FIG. 79 and further solved the new problems of the invention on which the present invention is based.

The structure and problems of the invention on which the present invention is based will be described. In the invention, the sealing film is formed onto the supporting members by either method (1) or method (2).

(1) The sealing film is formed on the surface of a plate-like member and transferred onto the supporting members formed on the substrate. After this, the plate-like member is removed.

(2) A solid film having volatility is formed onto the substrate having the supporting members thereon, and the sealing film is stacked onto the solid film. After this, the solid film is vaporized so as to form a gap between the substrate and the sealing film.

In method (1), when the removal of the sealing film is not smooth, the transfer becomes unsuccessful, which leads to a decrease in the yield. The cause of this is that when the adhesion between the supporting members and the transferred film is locally small as compared with the force to remove the transferred film from the plate-like member, the sealing film cannot be successfully transferred. In a pixel part, it is preferable to make the area for the supporting members as small as possible in order to increase the open area ratio; however, when the area for the supporting members is small, the bonding area between the supporting members and the transferred film also becomes small, so that the small bonding area is exclusively subjected to a pressure for removing the film, which makes both the transfer and the removal unsuccessful.

In method (2), when the solid film is formed on the substrate having the supporting members thereon, the solid film sometimes thinly covers the supporting members, thereby blocking the bonding between the supporting members and the sealing film and making the sealing film unstable. This leads to a decrease in the yield.

In these two cases, increasing the area for the supporting members in the pixel plane may facilitate the bonding between the supporting members and the sealing film; however, it is accompanied by a decreases in the open area ratio, and as a result, the brightness and contrast ratio of the liquid crystal display device is lowered so as to deteriorate the display quality. Therefore, the area for the supporting members in pixels is preferably 10% or less of the pixel area. In that case, however, the sealing film bonds only to the small area on the supporting members, leaving the remaining part unstable, so that insufficient bonding between the supporting members and the sealing film may lead to a decrease in a yield.

The process of forming a gap between the substrate and the sealing film by bonding the sealing film to the supporting members arranged on the substrate involves a difficult bonding of the sealing film to the limited area on the supporting members.

In view of the problems hereinbefore, the inventors of the present invention have found that the problems of the invention on which the present invention is based can be solved by using a resin film as the sealing film and bonding the resin film directly to the supporting members.

One method of bonding the resin film to the substrate is heat sealing. In heat sealing, the substrate and the resin film stacked thereonto is passed between a pair of rollers of a so-called laminator. The thermoplastic resin film is bonded to the substrate because at least one of the rollers is heated. This is an effective way to bond the resin film to the substrate without any gap therebetween. When the resin film is bonded to the supporting members as the sealing film by this method, either the resin film or the supporting members must be thermoplastic. However, when the rollers are heated to a temperature at which the resin film exerts the thermoplastic characteristics, the resin film is softened and deformed along the shape of the substrate and the supporting members, failing to be bonded exclusively on the supporting members. On the other hand, when the rollers are heated to a temperature at which the supporting members exert the thermoplastic characteristics, the supporting members are softened and crushed by the laminator. When either the resin film or the supporting members are made thermoplastic like this, a gap between the resin film and the substrate for sealing liquid crystal thereinto cannot be formed or becomes extremely narrow.

Third Prior Art

Liquid crystal display devices are widely used as portable information terminal displays because of their being thin and light in weight. Since a liquid crystal panel itself is a light-receptive device (a non light-emitting device), liquid crystal display devices with a liquid crystal panel are generally classified into reflective type liquid crystal display devices and permeable type liquid crystal display devices. The reflective type liquid crystal display devices are provided with a reflective plate on the back surface of the liquid crystal panel so as to reflect external light, whereas the permeable type liquid crystal display devices are provided with a back light on the back surface of the liquid crystal panel so as to project the light from the back light.

As well known, liquid crystal can be driven with a low voltage of several volts, and the reflective type liquid crystal display devices, which conduct image display by using external light instead of a back light consume extremely low electric power.

When images are displayed in color on a normal reflective type liquid crystal panel, micro color filters of red, green, and blue are provided on three adjacent pixels so as to perform the additive process. However, the color filters have a low light permittivity and requires a polarizing plate, and as a result, a reflective type liquid crystal display device has a drawback of being incapable of displaying images in bright colors.

In order to realize bright color display without using a polarizing plate or color filters, the inventors of the present invention proposed reflective type color liquid crystal display devices including the one disclosed in Japanese Laid-open Patent Application No. 6-286324. These reflective type color liquid crystal display devices comprise three guest host liquid crystal layers of cyan, magenta, and yellow based on the principle of a so-called subtractive process.

The reflective type color liquid crystal display devices will be described as follows.

As shown in FIG. 83 a reflective type color liquid crystal display device comprises three liquid crystal layers 1303–1305 filled with guest host liquid crystals of cyan, magenta, and yellow, respectively, and disposed between a bottom substrate 1301 and a top substrate 1302.

Thin film transistors (hereinafter referred to as TFT devices) 1306–1308 and a first pixel electrode 1309 which also serves as a reflective film are formed on the bottom substrate 1301. A first photosensitive polyimide 1310 and a first insulator film 1311 supported by the first photosensitive polyimide 1310 are formed further thereon. A second pixel electrode 1312 and a second photosensitive polyimide 1314 are formed on the first insulator film 1311. The second pixel electrode 1312 is connected with the TFT device 1307 via an opening portion 1313.

A third insulator film 1315 is further provided on the second photosensitive polyimide 1314 and supported thereby. A third pixel electrode 1316 and a third photosensitive polyimide 1317 are provided on the third insulator film 1315. The third pixel electrode 1316 is connected with the TFT device 1308 via an opening portion 1318. A common electrode 1319 is provided on the third photosensitive polyimide 1317. The first liquid crystal layer 1303 is supplied with a voltage by the first and second pixel electrodes 1309 and 1312, the second liquid crystal layer 1304 is supplied with a voltage by the second and third pixel electrodes 1312 and 1316, and the third liquid crystal layer 1305 is supplied with a voltage by the third pixel electrode 1316 and the common electrode 1319.

However, the reflective type color liquid crystal display device leaves room for improvement concerning the following. In general, the yield is likely to decrease along with the procession of the process of stacking the liquid crystal sequentially on the TFT array substrate. When there is a detect found in the liquid crystal layers, the expensive TFT array substrate must be abandoned together with these layers, so that the cost is increased.

In the case where simple matrix liquid crystal such as TN (Twisted Nematic) or STN (Super Twisted Nematic) is used, the formation pattern of the pixel electrodes provided on the substrate is different depending to the type of device, so that an etching process must be changed depending on the formation pattern of the pixel electrodes. As a result, the formation process of the pixel electrodes is complicated and the production cost of the liquid crystal panels is boosted, thereby preventing the reduction of the production cost. Especially in the case of plastic liquid crystal panels, the plastic substrate itself is more expensive and inferior in heat resistance to a glass substrate, which makes it difficult to form and process transparent electrodes, thereby further increasing the cost.

SUMMARY OF THE INVENTION

In view of the current state of the art, the present invention has an object of providing a liquid crystal display device whose production cost is reduced by not requiring a mask alignment process in forming supporting members, and whose contrast ratio is increased by reducing the area for the supporting members, and further providing a method for fabricating the liquid crystal display device.

The present invention has another object of providing a liquid crystal display device which can be used as a reflective type liquid crystal display device for its bright display and a high contrast ratio, suffers no unevenness in color resulting from parallax, and has an improved fabrication yield, and further providing a method for fabricating the liquid crystal display device.

The present invention has further another object of providing a liquid crystal display device which has a simplified contact hole formation process and secures the connection between the electrodes and the conductive members.

The present invention has further another object of providing a liquid crystal display device which prevents or reduces the occurrence of wrinkles of the resin films when the electrodes are formed thereon by spattering.

The present invention has further another object of providing a liquid crystal display device which offers an improved yield and a reduced fabrication cost, and further providing a method for fabricating the liquid crystal display device.

In order to achieve the objects, the liquid crystal display device of claim 1 comprises: a substrate having a pixel electrode and a driving element connected to the pixel electrode on a surface of the substrate; a resin film being disposed above the substrate and having a common electrode on a surface of the resin film; a plurality of supporting members each being columnar and standing on the substrate so as to support the resin film; an adhesive layer being disposed between the resin film and the plurality of supporting members so as to bond the resin film to the plurality of supporting members, the adhesive layer being made of a thermoplastic material and exerting thermoplastic characteristics so as to bond the resin film to the plurality of supporting members; and a liquid crystal layer being composed of liquid crystal and being disposed between the substrate and the resin film.

Since the liquid crystal layer is formed by making a gap between the substrate and the resin film and then sealing liquid crystal thereinto, the liquid crystal makes up a large proportion of the liquid crystal display device. As a result, the substantial open area ratio is increased, thereby realizing a high contrast ratio and bright display.

Since the resin film is bonded to the supporting members by making the adhesive layer exert thermoplastic characteristics, it is prevented that the gap for sealing the liquid crystal thereinto is narrowed by the deformation of the resin film along the supporting members, so that the gap has a fixed distance between the substrate and the resin film. Because the thickness of the liquid crystal layer is thus fixed, the display performance is improved.

The liquid crystal display device of claim 2 comprises: a substrate being transparent and having a pixel electrode and a driving element connected to the pixel electrode on a surface of the substrate; a plurality of resin films being stacked above the substrate, an uppermost resin film of the plurality of resin films having a common electrode on a surface thereof, and remaining ones of the plurality of resin films each having a pixel electrode on a surface thereof; a plurality of liquid crystal layers each being formed by arranging a plurality of supporting members each being columnar in each gap between the substrate and a lowermost resin film of the plurality of resin films and between adjacent ones of the plurality of resin films, and by sealing liquid crystal into the each gap; the substrate having more driving elements on the surface thereof, the more driving elements being electrically connected to a corresponding one of the pixel electrodes formed on the remaining ones of the plurality of resin films via cubic interconnection provided in relation to each of the pixel electrodes formed on the remaining ones of the plurality of resin films; a plurality of adhesive layers each being disposed between each of the plurality of supporting members and each of the plurality,of resin films, the plurality of adhesive layers being made of a thermoplastic material and exerting thermoplastic characteristics so as to bond each of the plurality of resin films to each of the plurality of supporting members; and the supporting members between adjacent ones of the plurality of resin films being arranged substantially in same positions as the supporting members between the substrate and the lowermost resin film with respect to a plane parallel to the substrate.

The liquid crystal display device has a multi-layered structure comprising a plurality of resin films which have the same function as the resin film of claim 1. Since the supporting members formed between adjacent resin films are arranged in the same position as those formed between the substrate and the lowermost resin film with respect to the plane parallel to the substrate, these supporting members are arranged in straight lines in the direction vertical to the substrate. As a result, the support of each resin film is secured, which prevents the positional deviation between the supporting members formed on a layer and those on another layer, which would cause the deformation of the supporting members or the destroy of the liquid crystal layers.

In the liquid crystal display device of claims 1 and 2, the plurality of resin films can be made of either a material having no thermoplasticity or a material having thermoplasticity and exerting thermoplastic characteristics at a higher temperature than the plurality of adhesive layers; and the plurality of supporting members can be made of either a material having no thermoplasticity, a material having thermoplasticity and exerting thermoplastic characteristics at a higher temperature than the plurality of adhesive layers, or a material being hardened before the plurality of resin films are bonded to the plurality of supporting members.

A combination of these resin films and the substrate makes it possible to bond these resin films to the substrate without any of them being deformed.

In the liquid crystal display device of claim 2, three liquid crystal layers and three resin films can be stacked, and the liquid crystals composing the three liquid crystal layers can be guest host liquid crystals each containing a dichroic dye, each dichroic dye having a different color from remaining dichroic dyes.

The above structure realizes a liquid crystal display device with full-color display.

In the liquid crystal display device of claims and 2, the substrate can be a transparent substrate; and the plurality of supporting members and the plurality of adhesive layers can be a positive type photo resist formed by disposing a light shielding film over spots on the substrate where the plurality of supporting members are arranged and by conducting photolithography using the light shielding film as a photo mask.

The high precision in positioning the supporting members realizes a decrease in the area for the supporting members and an increase in the contrast ratio.

In the multi-layered structure, the positional deviation between the supporting members on each layer is minimized.

In the liquid crystal display device of claims 1 and 2, the substrate can be a transparent substrate; and the plurality of supporting members and the plurality of adhesive layers can be a negative type photo resist formed by disposing a light shielding film on the substrate excluding spots where the plurality of supporting members are arranged and by conducting photolithography using the light shielding film as a photo mask.

In the above structure, too, the precision in positioning the supporting members is improved.

In the liquid crystal display device of claims 1 and 2, the distance between adjacent ones of the plurality of supporting members arranged in a pixel region, of the plurality of supporting members can be in a range of 15 to 100 $\mu$m.

The distance between adjacent supporting members is limited because of the following reason. When the distance is too large, it makes each resin film sag between adjacent supporting members and fails to maintain the gaps, thereby causing unevenness in color or a decrease in the contrast ratio. When the distance is too small, on the other hand, the open area ratio is decreased by too many supporting members.

In the liquid crystal display device of claims 1 and 2, the thickness of the plurality of resin films can be in a range of 0.5 to 10 $\mu$m.

The thickness of the resin films is limited because of the following reason. When the average thickness of the resin films is smaller than 0.5 $\mu$m, the resin films are likely to wrinkle, whereas when it is larger than 10 $\mu$m, the voltage drop in the resin films becomes too large as compared with the voltage supplied to the liquid crystal layers.

In the liquid crystal display device of claims 1 and 2, the resistivity of the plurality of resin films can be $10^{10}$ $\Omega \cdot$cm or below.

The resistivity of each resin film is limited because when it is larger than $10^{10}\Omega \cdot$cm, the voltage drop in each resin film becomes too large as compared with the voltage supplied to the liquid crystal layers.

In the liquid crystal display device of claims 2 and 5, the plurality of resin films can have optical anisotropy and are so arranged as to make all slow axes of the plurality of resin films be in a same direction.

The above structure reduces the light attenuation due to the optical anisotropy of the resin films, thereby realizing bright display.

In the liquid crystal display device of claims 1 and 2, the plurality of resin films can have breathability, and the common electrode can be made of a metallic material having reflection characteristics and also serves as a shading film for preventing oxygen or moisture in open air from permeating through the uppermost resin film.

The structure prevents a decrease in display performance resulting from the permeation of oxygen or water in open air into the liquid crystal layers when the resin films have breathability.

In the liquid crystal display device of claims 1 and 2, the plurality of resin films can have breathability, and a shading film can be provided on the common electrode so as to prevent oxygen or moisture in open air from permeating through the uppermost resin film.

The structure also prevents a decrease in display performance resulting from the permeation of oxygen or water in open air into the liquid crystal layers when the resin films have breathability.

In the liquid crystal display device of claims 20 and 21, the common electrode can be a transparent electrode, and the shading film can be made of a metallic material having reflection characteristics and also serve as a reflective plate.

The structure does not require a separate reflective plate and prevents a decrease in display performance resulting from the permeation of oxygen and the other substances.

In the liquid crystal display device of claims 1 and 2, the common electrode can be a transparent electrode; a resin layer can be formed on the common electrode, the resin layer being transparent and having a multiplicity of fine convex and concave portions on a surface thereof; and a reflective film having a shape of a multiplicity of fine convex and concave portions can be formed correspondingly on the multiplicity of fine convex and concave portions on the surface of the resin layer.

The structure makes the reflective film have diffusive light reflection characteristics, thereby preventing a decrease in display performance due to the reflection of the light source, as compared with a reflective film having specular reflection.

The liquid crystal display device of claim 26 comprises: a substrate having a pixel electrode and a driving element connected to the pixel electrode on a surface of the substrate; a resin film being disposed above the substrate; a plurality of supporting members each being columnar and standing on the substrate so as to support the resin film; an adhesive layer being disposed between the resin film and th e plurality of supporting members so as to bond the resin film to the plurality of supporting members, the adhesive layer being made of a thermoplastic material and exerting thermoplastic characteristics so as to bond the resin film to the plurality of supporting members; a liquid crystal layer being composed of liquid crystal and being disposed between the substrate and the resin film; a resin layer being formed on a surface of the resin film, the resin layer being transparent and having a multiplicity of fine convex and concave portions on a surface thereof; an d a reflective film having a shape of a multiplicity of fine convex and concave portions and being formed correspondingly on the multiplicity of fine convex and concave portions on the surface of the resin layer, the reflective film also serving as a common electrode.

In addition to t he effects of preventing a decrease in display performance, no separate reflective film is required, which reduces the thickness of the liquid crystal display device and the number of components.

The liquid crystal display device of claim 27 comprises: a substrate having a pixel electrode and a driving element connected to the pixel electrode on a surface of the substrate; a plurality of resin films being stacked above the substrate, the plurality of resin films each having a pixel electrode on a surface thereof except an uppermost resin film of the plurality of resin films; a plurality of liquid crystal layers each being formed by arranging a plurality of supporting members each being columnar in each gap between the substrate and a lowermost resin film of the plurality of resin films and between adjacent ones of the plurality of resin films, and by sealing liquid crystal into the each gap; the substrate having more driving elements on the surface thereof, the more driving elements being electrically connected to a corresponding one of the pixel electrodes formed on the plurality of resin films except the uppermost resin film via cubic interconnection provided in relation to each of the pixel electrodes formed on the plurality of resin films except the uppermost resin film; a plurality of adhesive layers each being disposed between each of the plurality of supporting members and each of the plurality of resin films, the plurality of adhesive layers being made of a thermoplastic material and exerting thermoplastic characteristics so as to bond each of the plurality of resin films to each of the plurality of supporting members; the supporting members between adjacent ones of the plurality of resin films being arranged substantially in same positions as the supporting members between the substrate and the lowermost resin film with respect to a plane parallel to the substrate; a resin layer being formed on a surface of the uppermost resin film, the resin layer being transparent and having a multiplicity of fine convex and concave portions on a surface thereof; and a reflective film having a shape of a multiplicity of fine convex and concave portions and being formed correspondingly on the multiplicity of fine convex and concave portions on the surface of the resin layer, the reflective film also serving as a common electrode.

In addition to the effects of preventing a decrease in display performance, no separate reflective film is required, which reduces the thickness of the liquid crystal display device and the number of components.

The method for fabricating a liquid crystal display device of claim 28 comprises the steps of: arranging a plurality of supporting members each being columnar onto a substrate, the substrate being transparent and having a pixel electrode and a driving element connected with the pixel electrode thereon; forming an adhesive layer onto the plurality of supporting members; bonding a resin film to the plurality of supporting members by disposing the resin film onto the adhesive layer formed on the plurality of supporting members and applying heat to the resin film while maintaining a gap between the substrate and the resin film; forming a common electrode onto a surface of the resin film; and sealing liquid crystal into the gap between the substrate and the resin film.

The structure enables the extremely thin resin film to be easily bonded onto the supporting members. Since the liquid crystal layer is formed between the substrate and the resin film by sealing liquid crystal thereinto, the liquid crystal makes up a larger proportion of the liquid crystal display device. As a result, the substantial open area ratio is increased so as to realize a high contrast ratio and bright display.

Furthermore, a decrease in the fabrication yield which might be caused in the invention on which the present invention is based can be prevented by the use of the resin film as a sealing film and the bonding of the resin film to the supporting members with the adhesive layer therebetween.

The method for fabricating a liquid crystal display device of claim 29 comprises the steps of: arranging a plurality of first supporting members on a substrate, the substrate being transparent and having a pixel electrode and a driving element connected to the pixel electrode thereon; forming a first adhesive layer onto the plurality first of supporting members; bonding a first resin film to the plurality of first supporting members by disposing the first resin film onto the first adhesive layer formed on the plurality of first supporting members and applying heat to the first resin film while maintaining a gap between the substrate and the first resin film; forming a first opening portion in the first resin film; forming a first pixel electrode on the first resin film and electrically connecting the first pixel electrode to a corresponding driving element on the substrate via the first opening portion; stacking one other resin film or more resin films by first stacking a second resin film while maintaining a gap between the first resin film and the second resin film by arranging a plurality of second supporting members on the first resin film bonded to the plurality of first supporting members; forming a second adhesive layer onto the plurality of second supporting members; bonding the second resin film to the plurality of second supporting members; forming a second opening portion in the second resin film; and forming a second pixel electrode on the second resin film and electrically connecting the second pixel electrode to a corresponding driving element formed on the substrate via the second opening portion; forming a plurality of uppermost supporting members on a resin film last stacked in a previous stacking step and disposing an uppermost adhesive layer onto the plurality of uppermost supporting members so as to bond an uppermost resin film to the plurality of uppermost supporting members; forming a common electrode on a surface of the uppermost resin film; and sealing liquid crystal into the gap between the substrate and the first resin film and the gap between adjacent resin films.

According to the structure, a liquid crystal display device having a multi-layered structure which has the same function as the display device of claim 28 is fabricated.

In the method for fabricating a liquid crystal display device of claim 29, each opening portion can be formed by reactive ion etching.

As a result, it is secured to form each opening portion in the resin films.

In the method for fabricating a liquid crystal display device of claims 28 and 29, the step of bonding the first resin to the plurality of first supporting members and the step of stacking one other resin film or more resin films each can comprise the sub step of pressing each resin film with a heated roller.

The use of the heated roller secures the bonding of the reins films onto the supporting members within a short time.

In the method for fabricating a liquid crystal display device of claim 32, each adhesive layer can be made of a material which exerts thermoplastic characteristics at a lower temperature than each resin film exerting thermoplastic characteristics, and the heated roller can heat the each resin film to a temperature lower than the each resin film exerting thermoplastic characteristics and higher than the each adhesive layer exerting thermoplastic characteristics.

According to the structure, the heated roller plasticizes each adhesive layer and each resin film is bonded to the supporting members via the adhesive layer. Since the supporting members and the resin films do not plasticize, the deformation of the resin films along the supporting members and the destroy of the supporting members are prevented. As a result, the resin films are easily bonded onto the supporting members while the gaps corresponding to the height of the supporting members are maintained.

In the method for fabricating a liquid crystal display device of claim 32, at least a surface of the heated roller can be made of a rigid material.

According to the structure, the resin films are smoothly bonded onto the supporting members without being encroached by the supporting members. As a result, each liquid crystal layer has even thickness, so that unevenness and defects in display are prevented.

In the method for fabricating a liquid crystal display device of claim 28, the step of arranging the plurality of supporting members onto the substrate can comprise: forming a light shielding film over spots on a surface of the substrate where the plurality of supporting members are arranged; applying a first positive type resist onto the surface of the substrate; exposing the first positive type resist from a rear surface of the substrate using the light shielding film as a photo mask; and developing the first positive type resist with a first developing solution and hardening the first positive type resist; and the step of forming the adhesive layer onto the plurality of supporting members comprises: applying a second positive type resist onto the surface of the substrate having the plurality of supporting members thereon; exposing the second positive type resist from the rear surface of the substrate using the light shielding film as the photo mask; and developing the second positive type resist with a second developing solution.

Since the structure requires no mask alignment between the adhesive layer and the supporting members, the fabrication of the liquid crystal display device is simplified.

In the method for fabricating a liquid crystal display device of claims 28 and 29, the step of forming an adhesive layer and the step of bonding the first resin film to the plurality of first supporting members comprise: preparing the first resin film applied with an adhesive layer; and arranging the first resin film onto the plurality of first supporting members with heating so that the surface applied with the adhesive layer faces the plurality of first supporting members; and the step of stacking one other resin film or more resin films comprises: preparing the second resin film applied with an other adhesive layer; and arranging the second resin film onto the plurality of second supporting members with heating so that the surface applied with the other adhesive layer faces the plurality of second supporting members.

Since the structure does not require the step of forming the adhesive layer onto the supporting members, the fabrication of the liquid crystal display device is simplified.

In the method for fabricating a liquid crystal display device of claims 28 and 29, in the step of arranging the plurality of supporting members on the substrate, supporting members arranged in a pixel region can be formed to have more width than height.

The structure prevents the supporting members from being crushed by the roller when the supporting members with the resin film stacked thereon passes through the laminator. As a result, the fabrication yield is increased.

In the method for fabricating a liquid crystal display device of claims 28 and 29, the thickness of each resin film can be in a range of 0.5 to 10 $\mu$m.

The thickness of each resin film is limited because of the following reason. When the average thickness of the resin films is smaller than 0.5 $\mu$m, the resin films are likely to wrinkle, whereas when it is larger than 10 $\mu$m, the voltage drop in the resin films becomes too large as compared with the voltage supplied to the liquid crystal layers.

In the method for fabricating a liquid crystal display device of claims 28 and 29, the main component of each resin film can be a polyester resin.

The resin films have enough strength not to be broken during the fabrication of the liquid crystal display device, so that the fabrication yield is increased. Since the polyester resin is transparent having a small light attenuation in a visible wavelength range, it provides bright display as a liquid crystal display device.

In the method for fabricating a liquid crystal display device of claim 28, in the step of bonding the resin film to the plurality of supporting members, a venthole can be formed in order to ventilate the gap between the substrate and the resin film.

According to the structure, in the process involving heating or vacuum evacuation, the ventilation through the venthole prevents the resin film from being broken by the expansion of the air in the gap between the substrate and the resin film. As a result, a decrease in the yield is restricted.

In the method for fabricating a liquid crystal display device of claim 29, in the step of bonding the first resin film to the plurality of first supporting members, a first venthole can be formed in order to ventilate the gap between the substrate and the first resin film; and in the step of stacking one other resin film or more resin films, a second venthole can be formed in order to ventilate the gap between the first resin film and the second resin film.

According to the structure, in the process involving heating or vacuum evacuation, the ventilation through the venthole prevents the resin films from being broken by the expansion of the air in the gaps between the substrate and the lowermost resin film and between adjacent resin films. As a result, a decrease in the yield is restricted.

In the method for fabricating a liquid crystal display device of claim 46, the venthole can be formed by leaving a part of the substrate without being bonded to the resin film, the part being in a vicinity of a display portion on the substrate.

The structure facilitates the formation of the venthole, thereby simplifying the fabrication processes of the liquid crystal display device.

In the method for fabricating a liquid crystal display device of claim 47, the second venthole can be formed by leaving a part of the first resin film without being bonded to the second resin film, the part being in a vicinity of a display portion on the substrate.

The structure facilitates the formation of the venthole, thereby simplifying the fabrication processes of the liquid crystal display device.

In the method for fabricating a liquid crystal display device of claim 49, the internal wall of the venthole can be subjected to a treatment for decreasing a surface tension.

When the process of heating or vacuum evacuating and the process of soaking in the solution are alternately performed, the opening and closing of the ventholes do not need to be repeated, which simplifies the fabrication processes of the liquid crystal display device.

In the method for fabricating a liquid crystal display device of claim 46, the venthole can be formed by bonding the resin film to the substrate in a vicinity of a display portion on the substrate so as to once seal the gap, and forming a through hole in a region outside a display portion of the resin film.

The structure facilitates the formation of the venthole, thereby simplifying the fabrication processes of the liquid crystal display device.

In the method for fabricating a liquid crystal display device of claim 47, the first venthole and the second venthole can be formed by bonding the first resin film to the substrate and bonding the second resin film to the first resin film in a vicinity of a display portion on the substrate so as to once seal the gap between the substrate and the first resin film and the gap between the first resin film and the second resin film, and forming a through hole in a region outside a display portion of all resin films stacked.

The structure facilitates the formation of the ventholes, thereby simplifying the fabrication processes of the liquid crystal display device.

The method for fabricating a liquid crystal display device of claims 46 and 47 further comprises the step of closing the ventholes.

In the process involving soaking in the solution, the solution is prevented from permeating through the ventholes, which increases the yield.

The method for fabricating a liquid crystal display device of claim 56 comprises the steps of: arranging a plurality of supporting members each being columnar onto a substrate, the substrate being transparent and having a pixel electrode and a driving element connected with the pixel electrode thereon; forming an adhesive layer onto the plurality of supporting members; bonding a resin film to the plurality of supporting members by disposing the resin film onto the adhesive layer formed on the plurality of supporting members and applying heat to the resin film while maintaining a gap between the substrate and the resin film; forming a resin layer whose surface has a multiplicity of fine convex and concave portions by applying a photo resist onto a surface of the resin film, subjecting the surface of the resin film to mask exposure, developing, and baking; forming a reflective film also serving as a common electrode onto the surface of the resin layer; and sealing liquid crystal into the gap between the substrate and the resin film.

The structure enables the reflective film having diffusion to be easily formed on the resin layer.

The method for fabricating a liquid crystal display device of claim 57 comprises the steps of: arranging a plurality of first supporting members each being columnar on a substrate, the substrate being transparent and having a pixel electrode and a driving element connected to the pixel electrode thereon; forming a first adhesive layer onto the plurality of first supporting members; bonding a first resin film to the plurality of first supporting members by disposing the first resin film onto the first adhesive layer formed on the plurality of first supporting members and applying heat to the first resin film while maintaining a gap between the substrate and the first resin film; forming a first opening portion in the first resin film; forming a first pixel electrode on the first resin film and electrically connecting the first pixel electrode to a corresponding driving element on the substrate via the first opening portion; stacking one other resin film or more resin films by first stacking a second resin film while maintaining a gap between the first resin film and the second resin film by arranging a plurality of second supporting members on the first resin film bonded to the plurality of first supporting members; forming a second adhesive layer onto the plurality of second supporting members; bonding the second resin film to the plurality of second supporting members; forming a second opening portion in the second resin film; and forming a second pixel electrode on the second resin film and electrically connecting the second pixel electrode to a corresponding driving element formed on the substrate via the second opening portion; forming a plurality of uppermost supporting members on a resin film last stacked in a previous stacking step and disposing an uppermost adhesive layer onto the plurality of uppermost supporting members so as to bond an uppermost resin film to the plurality of uppermost supporting members; forming a resin layer whose surface has a multiplicity of fine convex and concave portions by applying a photo resist onto a surface of the uppermost resin film, subjecting the surface of the uppermost resin film to mask exposure, developing, and baking; forming a reflective film also serving as a common electrode onto the surface of the resin layer; and sealing liquid crystal into the gap between the substrate and the first resin film and the gap between adjacent resin films.

The structure enables the reflective film having diffusion to be easily formed above the liquid crystal layer.

In another embodiment, a plurality of resin films being stacked, the plurality of resin films including at least two resin films having electrodes thereon; liquid crystal layers each arranged between adjacent ones of the plurality of resin films stacked; a contact hole being formed so as to penetrate all of the plurality of resin films; at least part of each of predetermined electrodes of the electrodes being projected and exposed inside the contact hole; and the part of each of predetermined electrodes being in contact with a conductive member formed on an internal surface of the contact hole so as to connect the predetermined electrodes electrically.

Since the contact hole is formed so as to penetrate all the resin films stacked, any electrodes on the resin films can be connected with each other. The conductive member and the electrodes have a large contact area because the conductive member is in contact with the exposed parts of the electrodes. Consequently, the connection between the conductive member and the electrodes is secured, making it possible to realize a liquid crystal display device with reliable electric connection.

In the liquid crystal display, the plurality of resin films can at least include a first resin film and a second resin film arranged above the first resin film; the contact hole can have a larger size in the second resin film than in the first resin film; and the electrode on the first resin film can be projected and exposed inside the contact hole.

The internal surface of the contact hole is formed to have some steps and the electrode on the first resin film has a surface with steps. As a result, the connection between the electrode and the conductive member is secured.

In another embodiment, a plurality of resin films being stacked and having electrodes thereon, and liquid crystal layers each being arranged between adjacent ones of the plurality of resin films, wherein a plurality of contact holes being formed so as to penetrate all of the plurality of resin films; and predetermined electrodes of the electrodes being electrically connected via each conductive member formed on an internal surface of each of the plurality of contact holes.

Since some electrodes are connected in each contact hole, desired electrodes can be connected with each other. This structure is effective when complicated cubic interconnection is required.

In the liquid crystal display device, part of each of the predetermined electrodes can be exposed inside the plurality of contact holes so as to be connected with the each conductive member.

The conductive members and the electrodes have a large contact area because the conductive members are in contact with the exposed parts of the electrodes. Consequently, the connection between the conductive members and the electrodes is secured.

In the liquid crystal display device, the part of each of the predetermined electrodes can be projected and exposed inside the plurality of contact holes.

Since part of each electrode is projected and exposed inside the contact holes, the conductive members and the electrodes have a larger contact area. Consequently, the connection between the conductive members and the electrodes is secured.

In the liquid crystal display device, a substrate at least having a first driving element and a second driving element thereon; at least a first resin film having a first electrode thereon and a second resin film having a second electrode thereon, the second resin film being stacked on the first resin film; and liquid crystal layers each arranged between the substrate and the first resin film and between the first resin film and the second resin film; at least a first contact hole and a second contact hole each penetrating at least the first resin film and the second resin film when the first resin film and the second resin film are stacked on the substrate; a first conductive member being formed on an internal surface of the first contact hole in order to electrically connect the first driving element and the first electrode; and a second conductive member being formed on an internal surface of the second contact hole in order to electrically connect the second driving element and the second electrode.

The electric connection between the driving elements and the electrodes makes it possible to control the voltage supply to the electrodes by the driving elements.

In the liquid crystal display device, part of each of the first electrode and the second electrode can be exposed inside the first contact hole and the second contact hole so as to be connected with the first conductive member and the second conductive member.

The structure secures the connection between the first and second conductive members and the first and second electrodes.

In the liquid crystal display device, the part of each of the first electrode and the second electrode can be projected and exposed inside the first contact hole and the second contact hole.

Since part of each of the first and second electrodes is projected and exposed inside the contact holes, the conductive members and these electrodes have a larger contact area. As a result, the connection between the conductive members and the first and second electrodes is secured.

In the liquid crystal display device, the first contact hole and the second contact hole can have a larger size in the second resin film than in the first resin film.

The internal surface of each contact hole is formed to have steps and the electrode on the first resin film has a surface with steps. As a result, the connection between the electrodes and the conductive members is secured.

In the liquid crystal display device, a substrate having a pixel electrode and a pixel switching element connected to the pixel electrode thereon; a plurality of resin films being stacked on the substrate, an uppermost resin film of the plurality of resin films having a common electrode thereon and remaining ones of the plurality of resin films having pixel electrodes thereon; a plurality of liquid crystal layers each being arranged between the substrate and a lowermost resin film of the plurality of resin films and between adjacent ones of the plurality of resin films; a plurality of driving elements being arranged on the substrate and a corresponding one of the pixel electrodes arranged on the remaining ones of the plurality of resin films; a plurality of cubic interconnection pads each being arranged between the substrate and the lowermost resin film and between adjacent ones of the plurality of resin films; a plurality of contact holes each penetrating all of the plurality of cubic interconnection pads and all of the plurality of resin films and corresponding to one of the pixel electrodes; and a plurality of conductive members each being formed on an internal surface of a corresponding one of the plurality of contact holes so as to electrically connect each of the plurality of driving elements to a corresponding one of the pixel electrodes.

The structure makes it possible to control the voltage supply to each pixel electrode by the driving elements on the substrate, thereby obtaining a liquid crystal display device having a multi-layered structure with resin films.

In the liquid crystal display device, part of each of the pixel electrodes can be exposed inside a corresponding one of the plurality of contact holes so as to be connected with a corresponding one of the plurality of conductive members.

The conductive members and the pixel electrodes have a large contact area because the conductive members are in contact with the exposed parts of the electrodes. Consequently, the connection between the conductive members and the electrodes is secured, making it possible to realize a liquid crystal display device with reliable electric connection.

In the liquid crystal display device, the part of each of the pixel electrodes can be projected and exposed inside the corresponding one of the plurality of contact holes.

Since part of each pixel electrode is projected and exposed inside a corresponding contact hole, the conductive members and the pixel electrodes have a larger contact area. As a result, the connection between the pixel electrode and the conductive members is secured.

In the liquid crystal display device, the plurality of contact holes can have a larger size in upper resin films than in lower resin films of the plurality of resin films.

The internal surface of each contact hole is formed to have steps and the electrodes on lower resin films each have a surface with steps. As a result, the connection between the electrodes and the conductive members is secured.

In the liquid crystal display device, the electrodes can be made of a material resistant to dry etching, and the contact holes can be formed by a dry etching treatment.

By the dry etching treatment, the electrodes are projected and exposed inside the contact holes.

The method for fabricating a liquid crystal display device comprises the steps of: stacking a plurality of resin films having electrodes thereon; forming a plurality of contact holes each penetrating all of the plurality of resin films; and filling the plurality of contact holes with a conductive member so as to electrically connect predetermined ones of the electrodes each other via the conductive member.

The structure makes desired electrodes be connected with each other by performing the contact hole formation process only once, thereby simplifying the process as compared with the conventional methods.

The method for fabricating a liquid crystal display device comprises the steps of: stacking a first resin film having a first electrode thereon and a second resin film having a second electrode thereon in that order onto a substrate having at least a first driving element and a second driving element;

forming a first contact hole and a second contact hole each penetrating at least the first resin film and the second resin film; and filling the first contact hole with a first conductive member and filling the second contact hole with a second conductive member so as to connect the first driving element and the first electrode via the first conductive member and to connect the second driving element and the second electrode via the second conductive member.

The structure makes desired electrodes be connected with the driving elements by performing the contact hole formation process only once, thereby simplifying the process as compared with the conventional methods.

The method for fabricating a liquid crystal display device comprises a plurality of resin films being stacked and having electrodes made from a material resistant to dry etching thereon; and a contact hole penetrating the plurality of resin films so as to electrically connect predetermined electrodes of the electrodes, the method comprising the steps of: forming only the predetermined electrodes onto corresponding ones of the plurality of resin films, and removing part of each of the predetermined electrodes where the contact hole is formed in a manner that the part removed is larger in upper ones of the plurality of resin films; and forming the contact hole by dry etching.

The electrodes have resistance to dry etching and the resin films do not, so that only the resin films are removed by the dry etching. Only the predetermined electrodes in the region to form the contact hole are removed largely in upper electrodes. As a result, when the contact hole is formed, only the predetermined electrodes are projected and exposed inside the contact hole. Consequently, the connection between the predetermined electrodes and the conductive members is secured, which improves the reliability of the connection between the predetermined electrodes.

The liquid crystal display device comprises: a resin film; a wrinkle reduction layer being formed on the resin film and having a shock resistance to spattering; and an electrode being made of an inorganic material and formed on the wrinkle reduction layer by spattering.

The structure makes it possible to prevent the resin film from wrinkling when the electrode made of an inorganic material such as ITO is formed thereon by spattering.

In the liquid crystal display device, the thickness of the resin film can be less than 10 $\mu$m.

The thickness of the resin film is limited because of the following reason. When the thickness is smaller than 10 $\mu$m, the resin film is likely to wrinkle unless the wrinkle reduction layer is provided because its shock resistance is too small.

In the liquid crystal display device, the wrinkle reduction layer can be made of either an organic resin containing silica particles or an acrylic resin.

The organic resin containing silica particles and the acrylic resin securely prevent the resin film from wrinkling because they have large shock resistance to spattering.

In the liquid crystal display device, the resin film can be arranged on a substrate with a spacer therebetween so as to keep a gap between the resin film and the substrate, the gap being filled with liquid crystal.

According to the structure, a liquid crystal display device with a wrinkle-free resin film is realized. As a result, the display characteristics are improved, with no unnecessary diffusion caused by a wrinkled resin film.

The liquid crystal display device comprises: a substrate being made of a transparent material and having a reflective film thereon; a sealing plate being formed so as to face the reflective film formed on the substrate; a liquid crystal layer being disposed between the substrate and the sealing plate; an opening portion formed on the reflective film; and a supporting member supporting the sealing plate and being arranged in a position between the substrate and the sealing plate, the position corresponding to the opening portion of the reflective film, and the supporting member being formed by exposing a photosensitive resin via the opening portion.

The high precision in positioning the supporting member makes it possible to reduce the area for the supporting member, thereby increasing the contrast ratio.

In the liquid crystal display device, the photosensitive resin can be a negative type resist.

The supporting member is easily obtained by exposing the photosensitive resin through the opening portion.

In the liquid crystal display device, the liquid crystal layer can comprise a polymer and liquid crystal which is dispersedly held in the polymer.

This structure realizes a liquid crystal display device in which the sealing plate is securely fixed onto the supporting member by the polymer in the liquid crystal layer.

In the liquid crystal display device, the photosensitive resin can be a photosensitive polymer precursor contained in a mixture solution comprising liquid crystal for composing the liquid crystal layer and the photosensitive polymer precursor.

The liquid crystal layer is made from the liquid crystal which is left unconsumed for the formation of the supporting member by the exposure of the mixture solution, so that the obtained liquid crystal display device has a large substantial open area ratio and a high contrast ratio.

In the liquid crystal display device, a plurality of liquid crystal layers and a plurality of sealing plates can be arranged alternately on the substrate, and a plurality of supporting members for supporting the plurality of sealing plates can be each arranged in each position between adjacent ones of the plurality of sealing plates, the each position corresponding to the opening portion of the reflective film, the plurality of supporting members being formed by exposing the photosensitive resin via the opening portion.

As a result, a liquid crystal display device which can display color images is achieved.

In the liquid crystal display device, three liquid crystal layers and three sealing plates can be arranged alternately, and the three liquid crystal layers each can have guest host liquid crystal containing liquid crystal and a dichroic dye having a color of cyan, magenta, or yellow, each dichroic dye having a different color from remaining dichroic dyes.

As a result, a liquid crystal display device which can display full-color images is achieved.

The method for fabricating a liquid crystal display device comprises the steps of: forming a reflective film having an opening portion onto a transparent substrate; forming a photosensitive resin layer onto the substrate having the reflective film thereon; exposing the photosensitive resin layer from the substrate side via the opening portion of the reflective film so as to be hardened; forming a supporting member by removing part of the photosensitive resin layer by developing, the part being prevented from being exposed due to shielding of the reflective film; bonding a sealing plate to the supporting member; and forming a liquid crystal layer between the substrate and the sealing plate by sealing liquid crystal thereinto.

The supporting member is securely formed in the position of the opening portion so as to increase its positional precision, so that the area for the supporting member can be reduced without damaging the liquid crystal layer by the positional deviation of the supporting member. As a result, a liquid crystal display device with a high contrast ratio is obtained. Furthermore, mask alignment becomes unnecessary because no mask is used, so that the fabrication cost is reduced.

In the method for fabricating a liquid crystal display device, the photosensitive resin layer can be made from a negative type resist.

Since the structure allows the supporting member to be made of a common material, it can be formed easily and at a lower cost.

In the method for fabricating a liquid crystal display device, the step of forming the liquid crystal layer can comprise the sub steps of: sealing a mixture solution into between the substrate and the sealing plate, the mixture solution containing liquid crystal and a photosensitive polymer precursor; and exposing the mixture solution from the sealing plate side so as to harden the polymer precursor contained in the mixture solution, thereby forming the liquid crystal layer comprising polymer and the liquid crystal dispersedly held in the polymer, and also fixing the sealing plate onto the substrate.

As a result, the sealing plate is easily and securely fixed to the substrate by using the polymer hardened by exposure.

In the method for fabricating a liquid crystal display device, the step of bonding the sealing plate to the supporting member can comprise the sub steps of: applying an adhesive agent onto at least one of the supporting member and the sealing plate; and fixing the sealing plate onto the substrate.

In the method for fabricating a liquid crystal display device, at least one of the sealing plate and the supporting member can be made of a material plasticized by at least one of heat and pressure; and the step of fixing the sealing plate onto the substrate can be conducted by applying at least one of heat and pressure while the sealing plate is being in close contact with the supporting member.

The sealing plate is easily and securely fixed to the substrate without using the mixture solution containing liquid crystal and the photosensitive polymer precursor. As a result, the area for the liquid crystal in the liquid crystal layer is increased in order to increase the substantial open area ratio, which realizes a liquid crystal display device having a higher contrast ratio.

In the method for fabricating a liquid crystal display device, at least one other liquid crystal layer can be formed by conducting the steps of: forming a second photosensitive resin layer onto the sealing plate; exposing the second photosensitive resin layer via the opening portion of the reflective film and the supporting member from the substrate side so as to be hardened; forming a second supporting member by removing part of the second photosensitive resin layer by developing, the part being prevented from being exposed by shielding of the reflective film; bonding a second sealing plate to the second supporting member; and forming a second liquid crystal layer between the sealing plate and the second sealing plate by sealing liquid crystal thereinto.

As a result, a liquid crystal display device which can display color images is achieved.

The method for fabricating a liquid crystal display device comprises the steps of: forming a reflective film having an opening portion onto a transparent substrate; arranging a supplemental supporting member in a predetermined region on the substrate, the predetermined region is outside the opening portion of the reflective film; bonding a sealing plate to the supplemental supporting member; sealing a mixture solution into between the substrate and the sealing plate, the mixture solution containing liquid crystal and a photosensitive polymer precursor; and forming a supporting member by exposing the mixture solution from the substrate side via the opening portion and precipitating the polymer precursor contained in the mixture solution in a position corresponding to the opening portion so as to harden the polymer precursor, and also making a liquid crystal layer from the liquid crystal contained in the mixture solution left unused for formation of the supporting member.

The supporting member is securely formed in the position of the opening portion so as to increase its positional precision, so that the area for the supporting member can be reduced without damaging the liquid crystal layer by the positional deviation of the supporting member. Furthermore, the liquid crystal layer is made from the liquid crystal which is left unconsumed for the formation of the supporting member by the exposure of the mixture solution, so that the obtained liquid crystal display device has a large substantial open area ratio and a high contrast ratio. In addition, mask alignment becomes unnecessary because no mask is used, so that the fabrication cost is reduced.

In the method for fabricating a liquid crystal display device, the step of arranging the supplementary supporting member can comprise the sub steps of: forming a negative type resist layer onto the substrate having the reflective film thereon; exposing the negative type resist layer via a predetermined mask pattern from an opposite side of the substrate so as to be hardened; and removing part of the negative type resist layer by developing, the part being prevented form being exposed by shielding of the mask pattern.

Since the structure allows the supplemental supporting member to be made of a common material, it can be formed easily and at a lower cost.

In the method for fabricating a liquid crystal display device, at least one other liquid crystal layer can be formed by conducting the steps of: forming a second supplemental supporting member in a position corresponding to the supplemental supporting member formed on the sealing plate; bonding a second sealing plate onto the second supplemental supporting member; sealing a second mixture solution into between the sealing plate and the second sealing plate, the second mixture solution containing liquid crystal and a photosensitive polymer precursor; and forming a second supporting member by exposing the second mixture solution from the substrate side via the opening portion and the supporting member and precipitating the polymer precursor contained in the second mixture solution in a position corresponding to the opening portion so as to be hardened, and also making a second liquid crystal layer from the liquid crystal contained in the second mixture solution left unused for formation of the second supporting member.

As a result, a liquid crystal display device which can display color images is achieved.

The method for fabricating a liquid crystal display device comprises the steps of: forming a reflective film having an opening portion onto a substrate, the opening portion comprising a first opening portion and a second opening portion; forming a photosensitive resin layer onto the substrate having the reflective film thereon; covering the second opening portion with a first masking member from the substrate side, and exposing the photosensitive resin layer via the first opening portion from the substrate side so as to be hardened; forming a first-part supporting member of a supporting member by removing part of the photosensitive resin layer by developing, the part being prevented from being exposed by shielding of the reflective film and the first masking member; bonding a sealing plate to the first-part supporting member; sealing a mixture solution into between the substrate and the sealing plate, the mixture solution containing liquid crystal and a photosensitive polymer precursor; and forming a second-part supporting member of the supporting member by covering the first opening portion with a second masking member, exposing the mixture solution from the substrate side via the second opening portion, and precipitating the polymer precursor contained in the mixture solution in a position corresponding to the second opening portion so as to be hardened, and also making a liquid crystal layer from the liquid crystal contained in the mixture solution left unused for formation of the second-part supporting member.

The first-part supporting member makes the gap between the substrate and the sealing plate have uniform thickness so as to keep the balance of the display colors of the liquid crystal display device. Furthermore, the liquid crystal layer is made from the liquid crystal which is left unconsumed for the formation of the supporting member by the exposure of the mixture solution, so that the obtained liquid crystal display device has a large substantial open area ratio and a high contrast ratio.

In the method for fabricating a liquid crystal display device, at least one other liquid crystal layer can be formed by conducting the steps of: forming a second photosensitive resin layer onto the sealing plate; covering the second opening portion with the first masking member from the substrate side, and exposing the second photosensitive resin layer via the first opening portion and the first-part supporting member from the substrate side so as to be hardened; forming an additional first-part supporting member by removing part of the second photosensitive resin layer by developing, the part being prevented form being exposed by shielding of the reflective film and the first masking member; bonding a second sealing plate to the additional first-part supporting member; sealing a second mixture solution into between the sealing plate and the second sealing plate, the second mixture solution containing a liquid crystal and a photosensitive polymer precursor; and forming an additional second-part supporting member by covering the first opening portion with the second masking member from the substrate side, exposing the second mixture solution from the substrate side via the second opening portion and the second-part supporting member, and precipitating a polymer precursor contained in the second mixture solution in a position corresponding to the second opening portion so as to be hardened, and also making a second liquid crystal layer from the liquid crystal contained in the second mixture solution left unused for formation of the additional second-part supporting member.

As a result, a liquid crystal display device which can display color images is achieved.

The liquid crystal display device comprises: a substrate made of a transparent material; a sealing plate arranged so as to face the substrate; a liquid crystal layer disposed between the substrate and the sealing plate; a light shielding film is formed on a predetermined region of the substrate; and a supporting member supporting the sealing plate and being arranged in a position between the substrate and the sealing plate where the light shielding film is formed, the supporting member being formed by exposing part of a photosensitive resin where the light shielding film is not formed.

Since the supporting member has high positional precision, the area for the supporting member can be reduced so as to increase the contrast ratio.

In the liquid crystal display device, the photosensitive resin can be a positive type resist, and the light shielding film can be made of a black resist.

The supporting member can be easily obtained by exposing the part of the photosensitive resin where the light shielding film is not formed.

In the liquid crystal display device, the liquid crystal layer can comprise a polymer and liquid crystal which is dispersedly held in the polymer.

In the obtained liquid crystal display device, the sealing plate is securely fixed onto the supporting member by the polymer contained in the liquid crystal layer.

In the liquid crystal display device, a plurality of liquid crystal layers and a plurality of sealing plates can be arranged alternately on the substrate, and a plurality of supporting members for supporting the plurality of sealing plates can be each arranged in each position between adjacent ones of the plurality of sealing plates, where the light shielding film is formed, the plurality of supporting members being formed by exposing the photosensitive resin via the part where the light shielding film is not formed.

As a result, a liquid crystal display device which can display color images is achieved.

The method for fabricating a liquid crystal display device comprises the steps of: forming a light shielding film in a predetermined region on a substrate; forming a photosensitive resin layer onto the substrate having the light shielding film thereon; exposing part of the photosensitive resin layer from the substrate side, the part corresponding to a region on the substrate where the light shielding film is not formed; removing an exposed part of the photosensitive resin layer by developing, thereby forming a supporting member in a position corresponding to the predetermined region where the light shielding film is formed; bonding a sealing plate to the supporting member; and forming a liquid crystal layer between the substrate and the sealing plate by sealing liquid crystal thereinto.

The supporting member is securely formed in the position corresponding to the opening portion so as to increase its positional precision, so that the area for the supporting member can be reduced without damaging the liquid crystal layer by the positional deviation of the supporting member. As a result, the obtained liquid crystal display device has a high contrast ratio. In addition, mask alignment becomes unnecessary because no mask is used, so that the fabrication cost is reduced.

In the method for fabricating a liquid crystal display device, the photosensitive resin layer can be made of a positive type resist.

Since the structure allows the supporting member to be made of a common material, it can be formed easily and at a lower cost.

In the method for fabricating a liquid crystal display device, the step of forming the liquid crystal layer can comprise the sub steps of: sealing a mixture solution into between the substrate and the sealing plate, the mixture solution containing liquid crystal and a photosensitive polymer precursor; and exposing the mixture solution from the sealing plate side so as to harden the polymer precursor contained in the mixture solution, thereby forming the liquid crystal layer comprising polymer and liquid crystal dispersedly held in the polymer, and also fixing the sealing plate onto the substrate.

As a result, the sealing plate is easily and securely fixed to the substrate by using the polymer hardened by exposure.

In the method for fabricating a liquid crystal display device, at least one other liquid crystal layer can be formed by conducting the steps of: forming a second photosensitive resin layer onto the sealing plate; exposing part of the second photosensitive resin layer, the part corresponding to the region of the substrate where the light shielding film is not formed; removing an exposed part of the second photosensitive resin layer, thereby forming a second supporting member in a position corresponding to the predetermined region where the light shielding film is formed; bonding a second sealing plate to the second supporting member; and forming a second liquid crystal layer between the sealing plate and the second sealing plate by sealing liquid crystal thereinto.

As a result, a liquid crystal display device which can display color images is achieved.

The liquid crystal display comprises: a display layer being composed of a substrate having a common electrode on an internal surface thereof, a sealing plate supported by a supporting member arranged on the common electrode, a liquid crystal layer formed between the substrate and the sealing plate by sealing liquid crystal thereinto, and a pixel electrode disposed on a surface of the sealing plate, the surface being opposite the liquid crystal layer; an array substrate having a non-linear element for driving the liquid crystal layer and an output electrode being electrically connected with the non-linear element and supplying the pixel electrode with a driving voltage for driving the liquid crystal layer, the array substrate being disposed so as to face the substrate; a connection means having a function of electrical connection and a function of fixed connection, the connection means electrically connecting the pixel electrode and the driving electrode, and fixedly connecting the display layer and the array substrate.

According to the liquid crystal display device, the display layer comprising the liquid crystal layer is fixedly connected to the array substrate having a non-linear element by the connection means, unlike the conventional liquid crystal display device in which liquid crystal layers are formed on an array substrate comprising a non-linear element. Since the display layer and the array substrate are independent of each other, even when a display defect is detected in the liquid crystal layer or other components, the array substrate having the non-linear element does not have to be abandoned. As a result, a liquid crystal display device with an improved yield is realized at a low cost.

Furthermore, in the liquid crystal display device, the connection means electrically connects the pixel electrode on the display layer to the driving electrode which is connected to the non-linear element. Since the two-dimensional relative position of the pixel electrode and the driving electrode may be within a range of their being connected by the connection means, the positional precision does not have to be so high. The fixed connection between the array substrate and the display layer by the connection means is performed by bonding, heat depositing, pressing, or the like.

In the liquid crystal display device, the connection means can be made of an anisotropic conductive adhesive material.

The use of the anisotropic conductive adhesive as the connection means enables the pixel electrode on the display layer to be electrically connected with the driving electrode on the array substrate, and prevents the anisotropic conductive adhesive from short circuiting because it is conductive only in the thickness direction.

The liquid crystal display device comprises:

a display layer being composed of a liquid crystal layer formed between a substrate and a sealing plate by sealing liquid crystal thereinto, the sealing plate being supported by a supporting member arranged between the substrate and the sealing plate; and an array substrate having a non-linear element for supplying the liquid crystal layer with an electric field so as to light-control drive the liquid crystal layer, the array substrate being disposed so as to face the substrate, wherein the display layer comprises at least two liquid crystal layers; a first liquid crystal layer being formed between a common electrode formed on an internal surface of the substrate and a first sealing plate by sealing liquid crystal thereinto, the first sealing plate being supported by a first supporting member arranged on the common electrode and having a first pixel electrode on a surface thereof opposite the common electrode; and a second liquid crystal layer being formed between the first sealing plate and a second sealing plate by sealing liquid crystal thereinto, the second sealing plate being supported by a second supporting member arranged on the first sealing plate and having a second pixel electrode formed on a surface thereof opposite the first pixel electrode; the array substrate comprises at least two driving electrodes and at least two non-linear elements; a first driving electrode for supplying the first pixel electrode with a driving voltage for driving the first liquid crystal layer; a first non-linear element electrically connected with the first driving electrode; a second driving electrode for supplying the second pixel electrode with a driving voltage for driving the second liquid crystal layer; and a second non-linear element electrically connected with the second driving electrode; wherein the liquid crystal display device further comprises a first connection means and a second connection means each having a function of electric connection and a function of fixed connection; a first connection terminal is electrically connected with the first driving electrode via the first connection means; a second connection terminal is electrically connected with the second driving electrode via the second connection means; and the display layer and the array substrate are fixedly connected via the first connection means and the second connection means.

As a result, a liquid crystal display device which can display color images is achieved. The fixed connection between the array substrate and the display layer by the first and second connection means is performed by bonding, heat depositing, pressing, or the like.

The liquid crystal display device comprises:

a display layer being composed of a liquid crystal layer formed between a substrate and a sealing plate by sealing liquid crystal thereinto, the sealing plate being supported by a supporting member arranged between the substrate and the sealing plate; and an array substrate having a non-linear element for supplying the liquid crystal layer with an electric field so as to light-control drive the liquid crystal layer, the array substrate being disposed so as to face the substrate, wherein the display layer comprises: a first liquid crystal layer being formed between a common electrode formed on an internal surface of the substrate and a first sealing plate by sealing liquid crystal thereinto, the first sealing plate being supported by a first supporting member arranged on the substrate and having a first pixel electrode on a surface thereof opposite the common electrode; a second liquid crystal layer being formed between the first sealing plate and a second sealing plate by sealing liquid crystal thereinto, the second sealing plate being supported by a second supporting member arranged on the first sealing plate and having a second pixel electrode formed on a surface thereof opposite the first pixel electrode; and a third liquid crystal layer being formed between the second sealing plate and a third sealing plate by sealing liquid crystal thereinto, the third sealing plate being supported by a third supporting member arranged on the second sealing plate and having a third pixel electrode formed on a surface thereof opposite the second pixel electrode; the first pixel electrode is electrically connected with a first connection terminal; the second pixel electrode is electrically connected with a second connection terminal; and the third pixel electrode is electrically connected with a third connection terminal; the array substrate comprises: a first driving electrode for supplying the first pixel electrode with a driving voltage for driving the first liquid crystal layer; a first non-linear element electrically connected with the first driving electrode; a second driving electrode for supplying the second pixel electrode with a driving voltage for driving the second liquid crystal layer; a second non-linear element electrically connected with the second driving electrode; a third driving electrode for supplying the third pixel electrode with a driving voltage for driving the third liquid crystal layer; and a third non-linear element electrically connected with the third driving electrode; the liquid crystal display device further comprising a first connection means, a second connection means, and a third connection means each having a function of electrical connection and a function of fixed connection, wherein the first connection terminal and the first driving electrode are electrically connected via the first connection means; the second connection terminal and the second driving electrode are electrically connected via the second connection means; the third connection terminal and the third driving electrode are electrically connected via the third connection means; and the display layer and the array substrate are fixedly connected via the first connection means, the second connection means, and the third connection means.

In the liquid crystal display device, the liquid crystal composing the first liquid crystal layer, the second crystal layer, and the third liquid crystal layer is guest host liquid crystal containing liquid crystal and a dichroic dye having a color of cyan, magenta, or yellow, each dichroic dye having a different color from remaining dichroic dyes.

As a result, a liquid crystal display device which can display color images is achieved. The fixed connection between the array substrate and the display layer by the first-third connection means is performed by bonding, heat depositing, pressing, or the like.

The liquid crystal display device comprises: a display layer composed of a liquid crystal layer formed between a substrate and a sealing plate by sealing liquid crystal thereinto, the substrate having a common electrode on an internal surface thereof and the sealing plate being supported by a supporting member arranged on the common electrode; and an array substrate having a driving circuit for driving the liquid crystal layer and a plurality of pixel electrodes arranged at predetermined intervals and electrically connected to the driving circuit, the array substrate being disposed so as to face the substrate; and a connection means for connecting the display layer with the array substrate.

Since the array substrate has the pixel electrodes thereon and the display layer has the common electrode and the liquid crystal layer, different display patterns can be achieved only by changing the formation pattern of the pixel electrodes. Thus, the display layer can be applied to various array substrates having different display patterns depending on the uses. The general versatility of the display layer also realizes a cost reduction.

In bonding the display layer to the driving substrate, their relative position in a plane can be arbitrary. Since alignment is unnecessary, assembly is simplified.

In the liquid crystal display device, the sealing plate can be made of a polymer resin whose thickness is in a range of 0.5 to 10 μm inclusive.

By making the thickness of the sealing plate 0.5 μm or larger, the liquid crystal layer is prevented from having concave and convex portions, and the gap of the liquid crystal layer has a uniform thickness. By making the thickness of the sealing plate 10 μm or below, it becomes unnecessary to provide the pixel electrodes on a side of the sealing plate opposite to the sealing surface. As a result, the liquid crystal layer can be driven with a low voltage.

In the liquid crystal display device, the substrate and the array substrate can be made of a polymer resin.

The obtained liquid crystal display device is thin and light in weight and defies bending and other deformation.

The liquid crystal display device comprises: a display layer comprising a liquid crystal layer and a plurality of pixel electrodes, the liquid crystal layer being formed between a substrate and a sealing plate by sealing liquid crystal thereinto, the substrate having a common electrode on an internal surface thereof and the sealing plate being supported by a supporting member arranged on the common electrode, and the plurality of pixel electrodes being arranged at regular intervals on a surface of the sealing plate, the surface being opposite the supporting member; a plurality of array substrates having a plurality of non-linear elements for driving the liquid crystal layer; and a connection means for connecting the display layer with the plurality of array substrates so as to electrically connect the plurality of pixel electrodes and the plurality of non-linear elements.

In the conventional multi-screen LCD, the pitch of the pixel electrode becomes uneven at the joints of panels, so that the joints are noticeable in the display screen. However, in the above structure, the plurality of pixel electrodes are arranged at regular intervals on a surface of the sealing plate adjacent to the array substrates, so that the joints between the array substrates do not appear on the display screen. As a result, a multi-screen liquid crystal display device with unnoticeable panel joints is realized.

In the liquid crystal display device, the plurality of array substrates can be arranged in a same plane; and the display layer can face the plurality of array substrates within a range of each of the plurality of pixel electrodes being electrically connected to a corresponding one of the plurality of non-linear elements via the connection means.

The structure makes it unnecessary to arrange the array substrates so precisely as to make the joints between adjacent panels unnoticeable in bonding the display layer to the plurality of array substrates. In other words, the two-dimensional relative position of the display layer and the array substrates may be within a range that the pixel electrodes and the non-linear elements are electrically connected by the connection means. As a result, requirements for the positional precision can be derogated.

Furthermore, it is unnecessary to increase the pixel pitch in order to make the panel joints unnoticeable because of the above-mentioned reasons. As a result, a multi-screen liquid crystal display device which displays high precision images is realized.

In the liquid crystal display device, an optical color filter layer can be disposed between the substrate and the common electrode.

As a result, a liquid crystal display device which can display color images is achieved.

The method for fabricating a liquid crystal display device comprises a display layer composed of a substrate, a sealing plate, and a liquid crystal layer disposed therebetween, and an array substrate having a driving element for driving the liquid crystal layer, the method comprising the steps of: forming the display layer comprising the sub steps of: forming a common electrode on an internal surface of the substrate; forming a supporting member onto the common electrode; forming the sealing plate so as to be supported by the supporting member; forming the liquid crystal layer by sealing liquid crystal into between the substrate and the sealing plate; and forming a pixel electrode on a surface of the sealing plate, the surface being opposite the liquid crystal layer; providing the array substrate with the driving element and a driving electrode; and electrically connecting the pixel electrode and the driving electrode via a connection means.

Even when a display defect is detected in the liquid crystal layer or other components, the array substrate having the non-linear element does not have to be abandoned. As a result, the fabrication cost is decreased and the yield is increased.

As the seventh step, the substrate and the array substrate are bonded to each other so that the pixel electrodes and the driving electrodes can be electrically connected via the connection means. Since the two-dimensional relative position of the pixel electrode and the driving electrode may be within a range that their being electrically connected by the connection means, the requirements for the positional precision can be derogated.

In the method for fabricating a liquid crystal display device, at least one other liquid crystal layer can be formed by conducting the steps of: forming a second supporting member onto the pixel electrode; forming a second sealing plate so as to be supported by the second supporting member; forming a second liquid crystal layer by sealing liquid crystal into between the sealing plate and the second sealing plate; and forming a second pixel electrode on a surface of the second sealing plate, the surface being opposite the second liquid crystal layer.

The method enables the plurality of liquid crystal layers using very thin sealing plates to be easily stacked, so that a liquid crystal display device which can display color images is achieved.

The method for fabricating a liquid crystal display device comprises: a first step of forming a common electrode on an internal surface of a substrate; a second step of forming a supporting member on the common electrode; a third step of forming a sealing plate so as to be supported by the supporting member; a fourth step of forming a liquid crystal layer by sealing liquid crystal into between the substrate and the sealing plate; a fifth step of forming a pixel electrode on a surface of the sealing plate, the surface being opposite the liquid crystal layer; a sixth step of examining display conditions by supplying a voltage to the common electrode and the pixel electrode; a seventh step of providing an array substrate with a non-linear element for driving the liquid crystal layer and a driving electrode; and an eighth step of electrically connecting the pixel electrode and the driving electrode only when a display layer is in excellent display conditions, based on results of an examination conducted in the sixth step.

Since the display conditions of the display layer is examined before the display layer and the array substrate are connected via the connection means, even when a display defect is detected, the array substrate having the non-linear element does not have to be abandoned. As a result, the fabrication cost is decreased and the yield is increased.

The method for fabricating a liquid crystal display device comprises: a first step of forming a common electrode on a surface of a substrate; a second step of forming a supporting member on the common electrode; a third step of forming a sealing plate so as to be supported by the supporting member; a fourth step of forming a liquid crystal layer by sealing liquid crystal into between the substrate and the sealing plate; a fifth step of forming a pixel electrode on an array substrate so as to face the common electrode; a sixth step of providing the array substrate with a driving circuit for driving the liquid crystal layer; and a seventh step of bonding the array substrate to the substrate with an adhesive material.

Since the array substrate has the pixel electrode thereon and the display layer has the common electrode and the liquid crystal layer, it is unnecessary to form the display layer in accordance with the pattern form of the driving electrode in the driving substrate. Thus, the display layer can be applied to various array substrates having different display patterns depending on the uses, which realizes a decrease in the fabrication cost. In bonding the display layer to the substrate, their relative position in a plane can be arbitrary. Thus alignment is unnecessary, so that assembly is simplified.

The method for fabricating a liquid crystal display device comprises: a first step of forming a common electrode on a substrate; a second step of forming a supporting member on the common electrode; a third step of forming a sealing plate so as to be supported by the supporting member; a fourth step of arranging a plurality of pixel electrodes at regular intervals on a surface of the sealing plate, the surface being opposite the supporting member; a fifth step of forming a liquid crystal layer by sealing liquid crystal into between the substrate and the sealing plate; a sixth step of providing an array substrate with a plurality of non-linear elements for driving the liquid crystal layer; a seventh step of dividing the array substrate into at least two; and an eighth step of electrically connecting each of the plurality of pixel electrodes to a corresponding one of the plurality of non-linear elements via a connection means.

Unlike the conventional liquid crystal display device in which the pixel electrodes are formed on the display layer side, the plurality of pixel electrodes are arranged at regular intervals on a surface of the display layer opposite to the sealing surface of the sealing plate. Therefore, it is unnecessary to arrange the panels so precisely as to make the deviation between the measures set before dividing the substrate and the measures obtained after the substrate is actually divided in order to make the joints unnoticeable. In other words, since the two-dimensional relative position of the display layer and the array substrate may be within a range that the pixel electrodes and the non-linear elements are electrically connected, the requirements for the positional precision can be derogated. Furthermore, it is unnecessary to increase the pixel pitch in order to make the panel joints unnoticeable, so that images of high precision are displayed. As a result, a multi-screen liquid crystal display device with unnoticeable panel joins is realized.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings:

FIGS. 6(a) and 6(b) are illustrations showing fabrication processes of the liquid crystal display device of Embodiment FIGS. 7(a) and 7(b) are illustrations showing fabrication processes of the liquid crystal display device of Embodiment 1-1.

FIGS. 10(a) and 10(b) are illustrations showing fabrication processes of the liquid crystal display device of Embodiment 1-1.

FIGS. 11(a) and 11(b) are illustrations showing fabrication processes of the liquid crystal display device of Embodiment 1-1.

FIGS. 24(a) and 24(b) are illustrations showing fabrication processes of the liquid crystal display device of Embodiment 2-1.

FIGS. 36(a) and 36(b) are illustrations showing fabrication processes of the liquid crystal display device of Embodiment 3-1 of the present invention.

FIGS. 38(e) and 38(f) are illustrations showing fabrication processes of the liquid crystal display device of Embodiment 3-1.

FIGS. 40(i) and 40(j) are illustrations showing fabrication processes of the liquid crystal display device of Embodiment 3-1.

FIGS. 46(a) and 46(b) are illustrations showing fabrication processes of the liquid crystal display device of Embodiment 3-2.

FIGS. 49(g) and 49(h) are illustrations showing fabrication processes of the liquid crystal display device of Embodiment 3-2.

FIGS. 53(c) and 53(d) are illustrations showing fabrication processes of the liquid crystal display device of Embodiment 3-3.

FIGS. 54(e) and 54(f) are illustrations showing fabrication processes of the liquid crystal display device of Embodiment 3-3.

FIGS. 60(a) and 60(b) are illustrations showing fabrication processes of the liquid crystal display device of Embodiment 3-4.

FIGS. 62(e) and 62(f) are illustrations showing fabrication processes of the liquid crystal display device of Embodiment 3-4.

FIGS. 64(i) and 64(j) are illustrations showing fabrication processes of the liquid crystal display device of Embodiment 3-4.

FIGS. 71(a) and 71(b) are illustrations showing fabrication processes of the liquid crystal display device of Embodiment 4-1.

FIGS. 73(*a*) and 73(*b*) are illustrations showing fabrication processes of the liquid crystal display device of Embodiment 4-1.

FIGS. 74(*a*) and 74(*b*) are illustrations showing fabrication processes of the liquid crystal display device of Embodiment 4-1.

DETAILED DESCRIPTION OF THE INVENTION

Embodiment 1

A first embodiment of the present invention will be described as follows based on the drawings.

The first embodiment is featured by using a commercially available resin film as a sealing plane and bonding the resin film onto supporting members. This feature secures the fixing of the resin film onto the supporting members.

Embodiment 1-1

Figure 1:
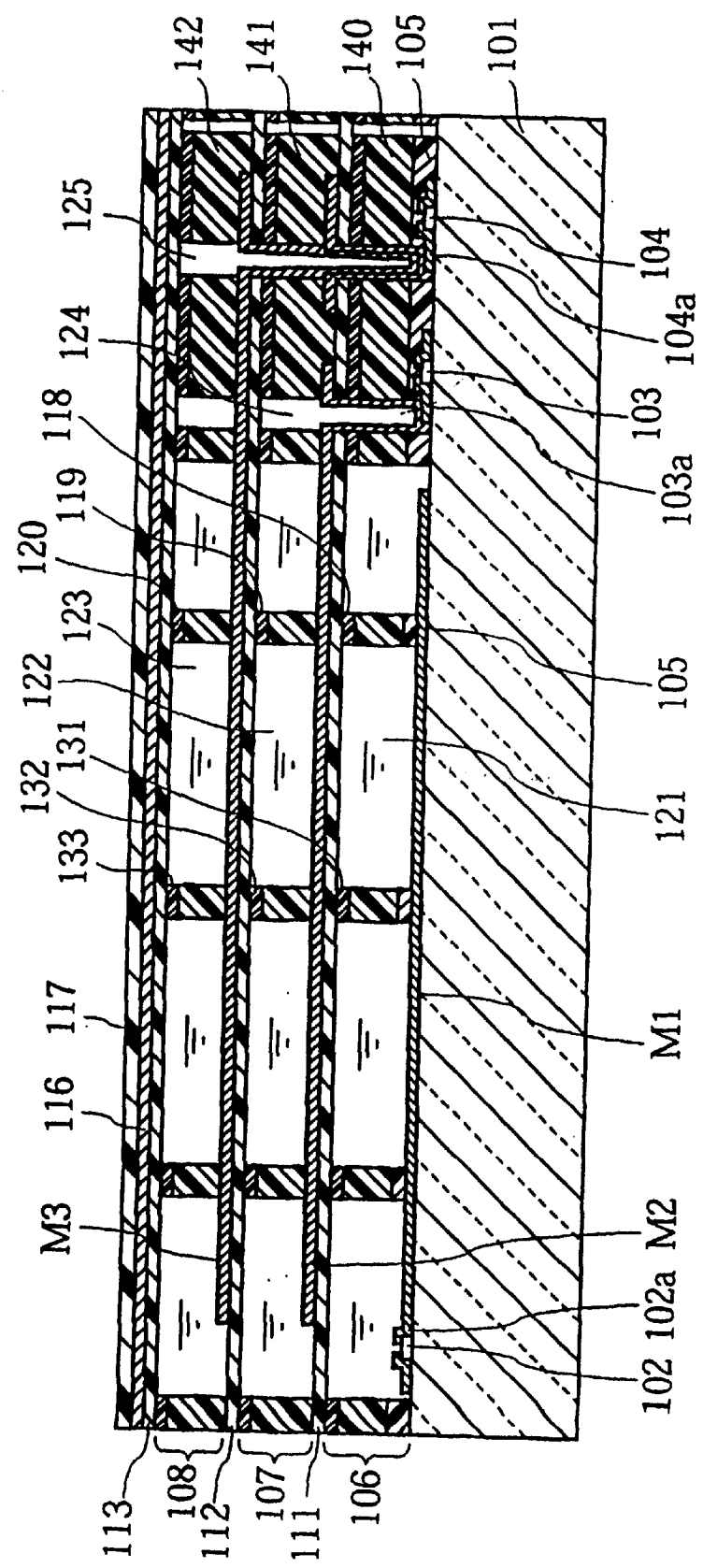
FIG. 1 is a cross sectional view of one pixel in the center of the liquid crystal display device of Embodiment 1-1 of the present invention.
Figure 2:
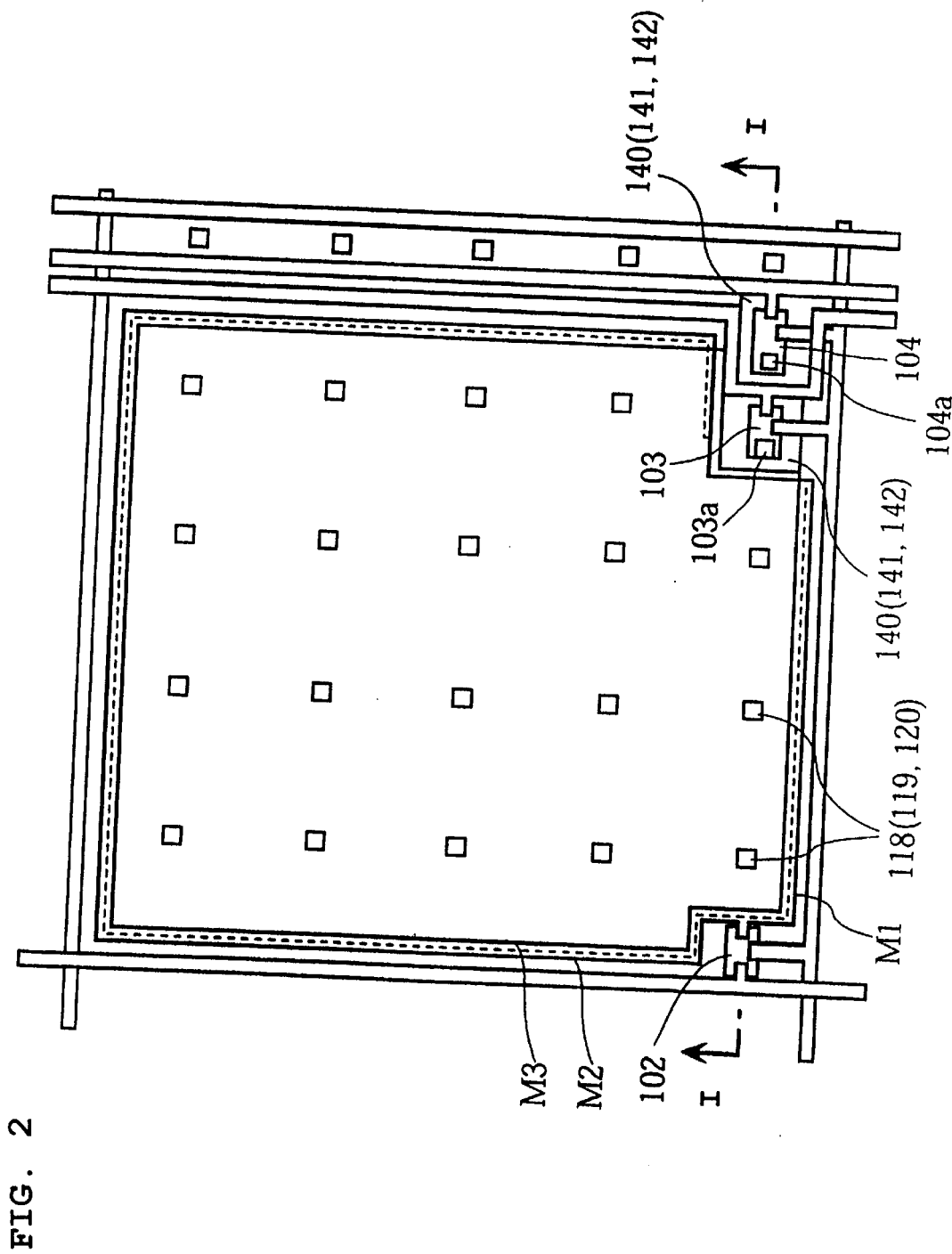
FIG. 2 is a plane view of one pixel in the center of the liquid crystal display device of Embodiment 1-1.
Figure 3:
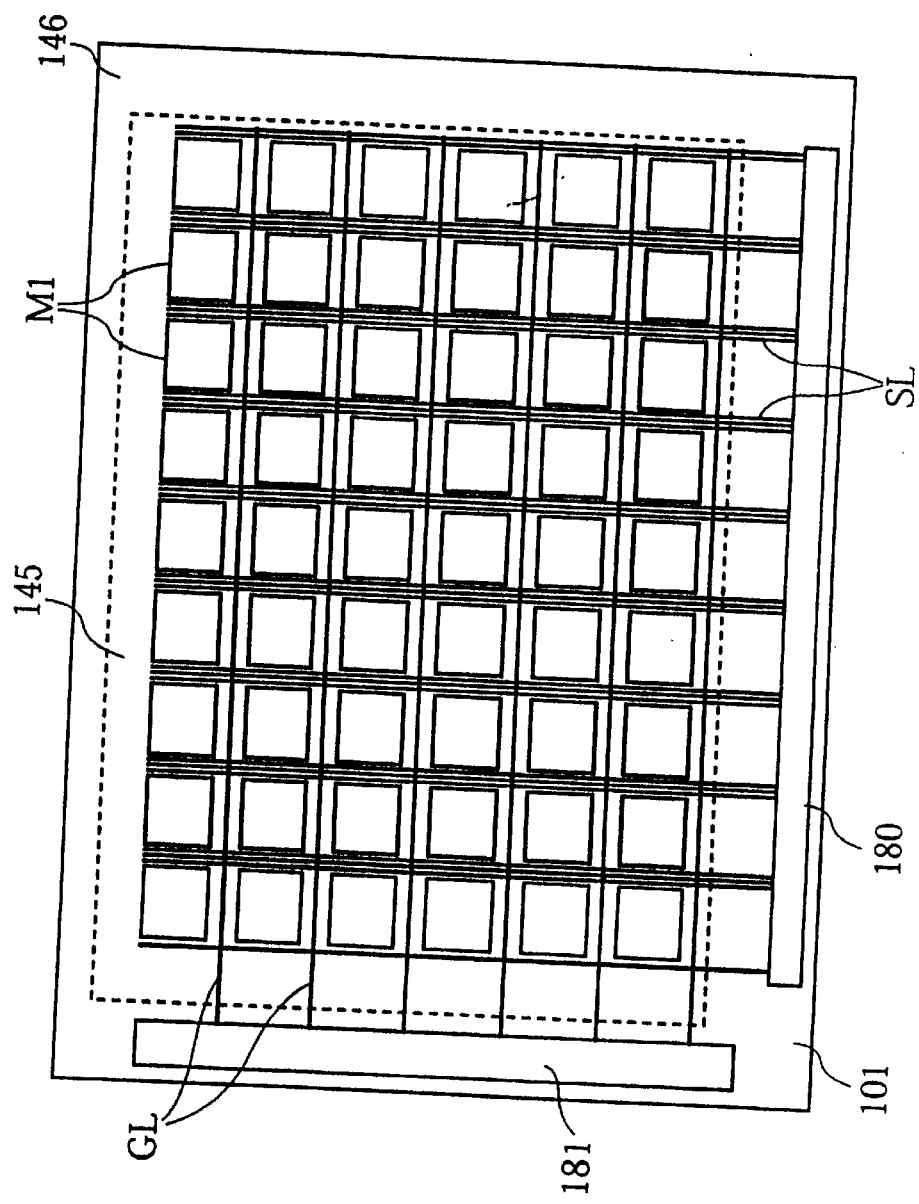
FIG. 3 is the entire structure of the liquid crystal display device of Embodiment 1-1.
Figure 4:
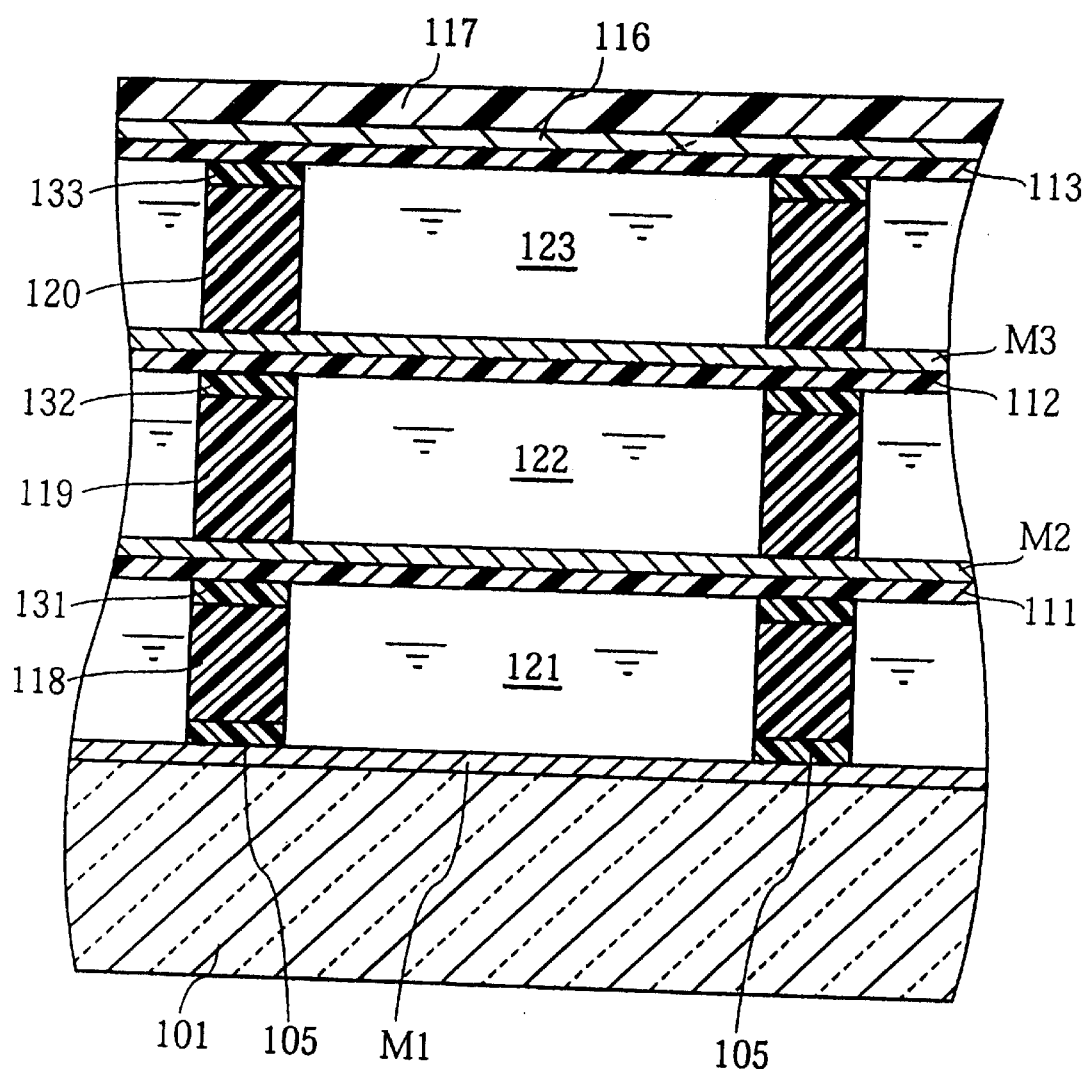
FIG. 4 is a partly magnified cross sectional view of FIG. 1.
Figure 5:
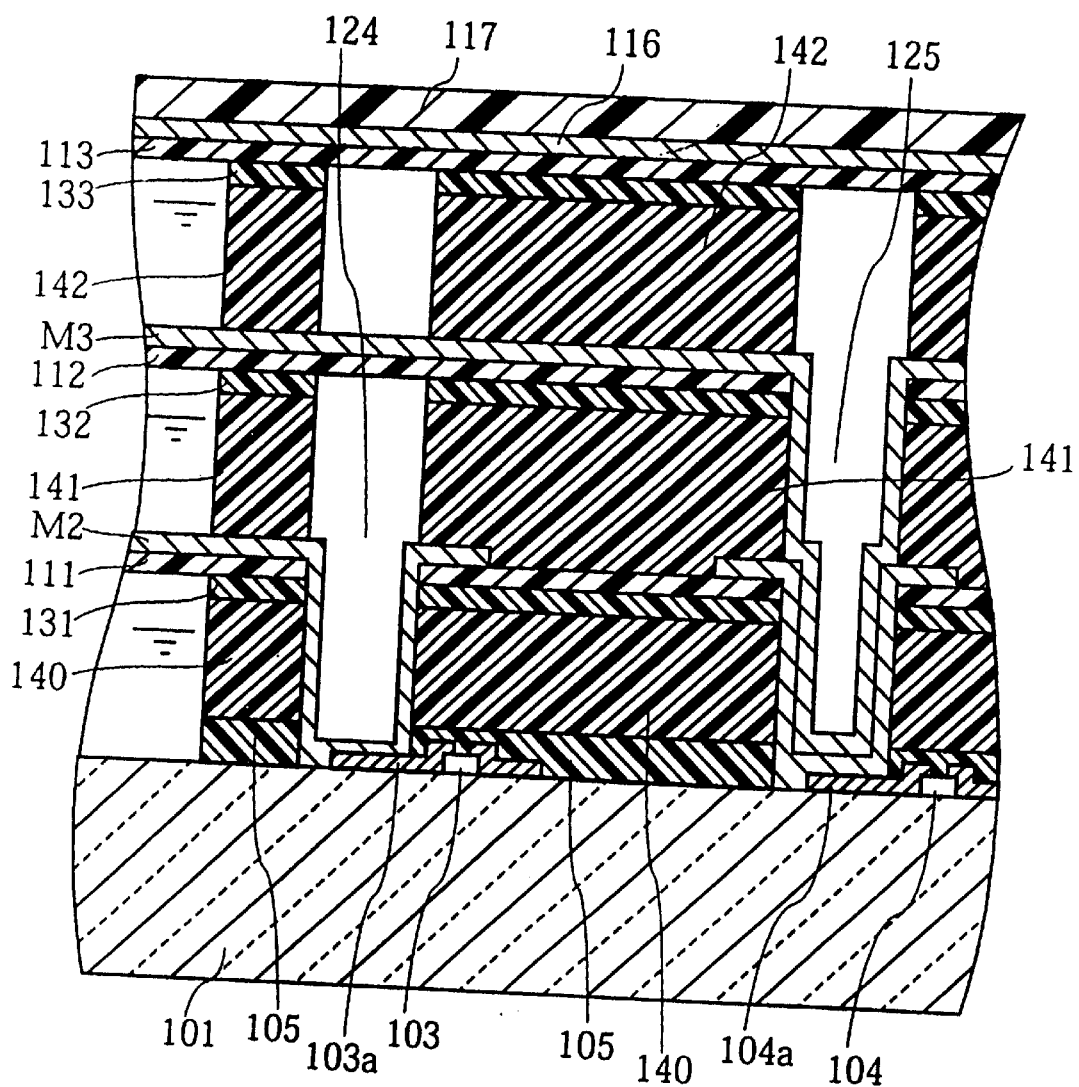
FIG. 5 is a partly magnified cross sectional view of FIG. 1.

Embodiment 1-1 of the present invention will be described based on FIGS. 1–13. FIG. 1 is a cross sectional view of one pixel in the center of the liquid crystal display device of the present invention, FIG. 2 is a plane view of the pixel, FIG. 3 is the entire structure of the liquid crystal display device, FIGS. 4 and 5 are partly magnified cross sectional views of FIG. 1, and FIGS. 6(*a*) and 6(*b*) through 13 are illustrations showing the fabrication processes of the liquid crystal display device. FIG. 1 is a cross section taken along the line indicated with the arrows I—I of FIG. 2. FIGS. 1–13 are simplified illustrations not showing all the components of the liquid crystal display device, and are different from the actual device in the reduced scales and the number of some components.

The liquid crystal display device, as shown in FIG. 1, comprises three liquid crystal layers 106, 107, and 108 filled with guest host liquid crystals 121, 122, and 123 of cyan, magenta, and yellow, respectively, which are arranged in that order on a substrate 101. The substrate 101, which is made of borosilicate glass, is provided with thin film transistors (hereinafter TFT devices) 102, 103, and 104 made of amorphous silicon as driving elements thereon. As shown in FIG. 3, the substrate 101 is further provided with a first pixel electrode M1 arranged in the form of matrix in a pixel display region 145, source lines SL, gate lines GL, a driving circuit 180 arranged in a peripheral part 146 of the pixel display region 145 so as to supply a driving voltage to the source lines SL, and a driving circuit 181 arranged in the peripheral part 146 so as to supply a driving voltage to the gate lines GL.

The TFT devices 103 and 104 respectively have drain terminals 103*a* and 104*a* which are transparent conductive films made of an indium-tin oxide (ITO), whereas the TFT device 102 has a drain terminal 102*a* electrically connected with the first pixel electrode M1 which is a transparent conductive film. Light shielding films 105 each being a square of 5 μm×5 μm are scattered in the pixel part on the substrate 101. The light shielding films 105 has a 30 μm pitch. Supporting members 118 are formed on the light shielding films 105 as shown in FIG. 4. As shown in FIG. 5 the TFT devices 103 and 104 are provided with the light shielding films 105 on which cubic interconnection pads 140 are formed. The cubic interconnection pads 140 also serve as supporting members. The light shielding films 105 are composed of a resist containing black carbon particles. The supporting members 118 and the cubic interconnection pads 140 are composed of 5 μm-high positive type resist. A resin film 111 is bonded onto the supporting members 118 and the cubic interconnection pads 140 with an adhesive layer 131 made from a positive type resist provided therebetween. The resin film 111 is 1.2 μm thick and contains polyethylene terephthalate (PET) as a main component which is a kind of polyester resin. The resin film 111 is supported by the supporting members 118 so as to form a gap of 5 μm to seal liquid crystal thereinto between the resin film 111 and the substrate 101. The gap is filled with a guest host liquid crystal 121 containing a dichroic dye of cyan dissolved in a fluoric nematic liquid crystal, so as to form the first liquid crystal layer 106.

Above the drain terminals 103*a* and 104*a* of the TFT devices 103 and 104, the cubic interconnection pads 140 and the resin film 111 are provided with opening portions 124 and 125, respectively. The second pixel electrode M2, which is an ITO transparent conductive film is formed in the pixel part on the resin film 111. As shown in FIG. 5 an end of the second pixel electrode M2 extends as far as the drain terminal 103*a* of the TFT device 103 along the opening portion 124, so as to electrically connect the second pixel electrode M2 and the terminal 103*a*. This connection of the second pixel electrode M2 on the resin film 111 with the terminal 103*a* of the TFT device 103 on the substrate 101 via the opening portion 124 makes it possible to control the potential of the second pixel electrode M2 on the resin film 111 with the TFT device 103 on the substrate 101.

Above the first liquid crystal layer 106, the second liquid crystal layer 107, a resin film 112, the third liquid crystal layer 108, and a resin film 113 are stacked in that order. As a result, the three liquid crystal layers 106, 107, and 108 and the three resin films 111, 112, and 113 are stacked alternately on the substrate 101. The second and third liquid crystal layers 107 and 108 have basically the same structure as the first liquid crystal layer 106. For the second liquid crystal layer 107 comprises supporting members 119, cubic interconnection pads 141, and an adhesive layer 132 whereas the third liquid crystal layer 109 comprises supporting members 120, cubic interconnection pads 142 and an adhesive layer 133. The supporting members 118–120 are made of the same material and have the same form. The supporting members 119 and 120 are positioned on an extension line of the supporting members 118. As described in Japanese Laid-open Patent Application No. 10-70069 earlier filed by the inventors of the present invention, the structure enables the supporting members to firmly support the resin films, so as to prevent the deformation of the supporting members or the damage of the liquid crystal layers due to the misalignment of the supporting members.

The cubic interconnection pads 141 are positioned right above the cubic interconnection pads 140, and the cubic interconnection pads 142 are positioned right above the cubic interconnection pads 141. The resin films 112 and 113 are made of the same material and have the same thickness as the resin film 111.

The liquid crystal 122 composing the second liquid crystal layer 107 is a guest host liquid crystal having a dichroic dye of magenta, and the liquid crystal 123 composing the third liquid crystal layer 108 is a guest host liquid crystal having a dichroic dye of yellow. In the other respects, the second and third liquid crystal layers 107 and 108 are equal to the first liquid crystal layer 106.

An opening portion 125 is formed in the cubic interconnection pads 141 and the resin film 112 provided above the drain terminal 104a of the TFT device 104. A third pixel electrode M3, which is a transparent conductive film is formed in the pixel part on the resin film 112. As shown in FIG. 5 the third pixel electrode M3 is electrically connected with the drain terminal 104a of the TFT device 104 via the opening portion 125. Similar to the second pixel electrode M2, the structure enables the potential of the third pixel electrode M3 on the resin film 111 to be controlled by the TFT device 104 on the substrate 101.

A common electrode 116, which is made of aluminum and also serves as a reflective film is formed on the resin film 113 above the third liquid crystal layer 108. The common electrode 116 is covered with a protection film 117 for protecting the liquid crystal layers from external pressure or the like. The protection film 117 is an acrylic resin. The liquid crystal layers 121, 122, and 123 each have a dichroic dye of cyan, magenta, and yellow whose concentrations are adjusted by taking color balance into consideration.

The liquid crystal display device of the present embodiment has an open area ratio of 97% or higher in the pixel part (the ratio of the area of pixels excluding the area for the supporting members to the entire area of the pixels), which is enough to provide bright display.

The operation of the liquid crystal display device of the present embodiment will be described as follows. The liquid crystal display device of the present embodiment is a reflective type color liquid crystal display which achieves color display by the reflection of external light without a back light. The light which is incident upon the substrate 101 from the side opposite to the liquid crystal layers goes through the liquid crystal layers 106, 107, and 108 in that order to be reflected by the common electrode 116 which also serves as the reflective film, and goes back through the liquid crystal layers 108, 107, and 106 in that order, thereby providing a display to the observer who is watching the display from the opposite side of the substrate 101. The liquid crystal layers 106, 107, and 108 are each filled with a guest host liquid crystal containing a dichroic dye of cyan, magenta, and yellow, respectively. When no voltage is supplied to the pixel electrodes, each color light of the incident light is absorbed in a corresponding one of the liquid crystal layers, whereas when a voltage is supplied, the incident light permeates these liquid crystal layers. To control the voltage supplied to the liquid crystal layers in this manner enables the absorption and permeation of light to be controlled, thereby achieving a full-color display.

A specific method for driving the liquid crystal display device of the present embodiment will be described as follows. The third pixel electrode M3 is supplied with voltage V3 in accordance with the image signal for the third liquid crystal layer 108 by using the potential of the common electrode 116 as a reference potential. The second pixel electrode M2 is supplied with voltage V2 in accordance with the image signal for the second liquid crystal layer 107 by using the potential of the third pixel electrode M3 as a reference potential. The first pixel electrode M1 is supplied with voltage V1 in accordance with the image signal for the first liquid crystal layer 106 by using the potential of the second pixel electrode M2 as a reference potential. In other words, when the potential of the common electrode 116 is used as a reference potential, the pixel electrodes M3, M2, and M1 are supplied with voltages of V3, V3+V2, and V3+V2+V1, respectively. Consequently, each of the guest host liquid crystals 123, 122, and 121 can be supplied with a voltage separately.

When alternating driving is conducted in order to prevent deterioration of the guest host liquid crystals 123, 122, and 121, voltages of (±V3), (±V3)+(±V2), and (±V3)+(±V2)+(±V1) where V1, V2, and V3 are positive can be supplied. In order to reduce the output voltage of the driving circuit or the like by decreasing the absolute value of the supply voltage, voltages of (±V3), (±V3)−(±V2), and (±V3)−(±V2)+(±V1) can be supplied by reversing the polarities of the supply voltages of adjacent ones of the third-first liquid crystal layers 108, 107, and 106.

Since color image display is performed by the subtractive process, when the image signal is given by image data of RGB (red, green, blue), they are converted to image data of CMY (cyan, magenta, yellow) through complement calculation, and voltages corresponding to these image data can be supplied. To be more specific, in the case of eight-color display, when the given RGB data is (1, 0, 0), a voltage corresponding to its complement (0, 1, 1) can be supplied.

In the liquid crystal display device of the present embodiment, the resin films and the cubic interconnection pads are provided with opening portions via which the pixel electrodes on the resin films are electrically connected with the terminals of the TFT devices on the substrate. This structure enables the voltage supplied to each pixel electrode to be controlled by a TFT device on the substrate 101, which makes it unnecessary to arrange glass substrates each having a TFT device between adjacent liquid crystal layers. As a result, a reflective type color liquid crystal display device with bright display and no parallax problem can be achieved. Although TFT devices are used as pixel switching elements in the present embodiment, thin film diodes or the like can be used instead.

In the present embodiment, the resin films 111, 112, and 113 are 1.2 μm thick. The resin films are preferably thinner in order to make a voltage drop small and to reduce the supply voltage. However, when the resin films are thinner than 0.5 μm, they become hard to handle because they are likely to wrinkle or break, so as to decrease the yield. Consequently, it is appropriate that the resin films have a thickness of 0.5 μm or larger. On the other hand, when the thickness is larger than 10 μm, the resin films have a voltage drop which is larger than twice the voltage supplied to the liquid crystal layers, so that the voltage required to operate the liquid crystal layers becomes very large. Consequently, the resin films are preferably 10 μm or thinner. As a result, the thickness of the resin films is best set in the range of 0.5 to 10 μm.

It is preferable to make the resistivity of the resin films smaller because it can reduce the voltage drop in the resin films. Liquid crystal has different relative permittivity depending on the direction of the alignment. In the case of general liquid crystal whose dielectric anisotropy is positive, when a voltage is supplied between electrodes, molecules are aligned in the direction vertical to the electrodes, thereby increasing the relative permittivity. In particular, in a liquid crystal material with a small operational voltage, the relative permittivity becomes $\epsilon\perp=4$ or so and $\epsilon//=11$ or so, showing the tendency of increasing the difference. Since the polyester resin composing the resin films has a relative permittivity of about 3, it might be caused that when the relative permittivity of the liquid crystal is increased by the supply of a voltage, more voltage is supplied to the resin films having a smaller permittivity than the liquid crystal, which decreases the voltage to be supplied to the liquid crystal. Thus, the voltage drop in the resin films particularly during the supply of a voltage can be reduced by decreasing the resistivity of the resin films. A polyester resin which is the material for the resin films generally has resistivity in the range of $10^{14}$ to $10^{16}$. When the resistivity is decreased to around $10^{12}$, the partial pressure ratio of the resin films changes little, showing minor effects of reducing the resistivity, whereas the resistivity is around $10^{10}$ or below, the partial pressure ratio of the resin films becomes small. By setting the resistivity at $10^{10}$ or below, the voltage drop in the resin films can be reduced to about half the voltage supplied between the electrodes when the resin films have a thickness of 0.5 to 10 $\mu$m. Therefore, the resistivity of the resin films is preferably $10^{10}$ or below.

In order to reduce the resistivity, the resin films can be mixed with or doped with a material, namely, a zirconium oxide or an organic conductive member which slightly increases the conductivity.

In the present embodiment, the use of PET (polyethylene terephthalate), which is a kind of polyester as the material for the resin films 111, 112, and 113 can provide the resin films with enough strength even when their thickness is in the range of 0.5 to 10 $\mu$m. In the process of bonding the resin films to the substrate, which will be described below, the resin films are unlikely to be broken by the pressure of the rollers while passing the laminator, which improves the fabrication yield. Since PET is unlikely to plasticize at the heating temperature (150° C.) in the bonding process, it never happens that the resin films deform along the supporting members and narrow the gap to seal liquid crystal thereinto as in the prior art. As a result, it is realized that the resin films are bonded to the substrate smoothly. Since the polyester resin is transparent and causes a minor light attenuation in the visible light wavelength range, bright display is realized. Besides PET used in the present embodiment, polyethylene naphthalate (PEN) and other polyester resins can be used.

In the present embodiment each of the supporting members arranged in the pixel part has a square cross section. The smaller the area occupied by the supporting members in the pixel part, the higher the open area ratio of the liquid crystal display device becomes, and as a result, bright display is realized. Therefore, from the view point of display, it is preferable that the width of the supporting members, that is, the length of each side of the square cross section is as small as possible, and the distance between adjacent supporting members is as long as possible. However, the supporting members with a small width are easily crushed and broken in the process of bonding the resin films onto the substrate, making it impossible to seal liquid crystal into the gaps between adjacent liquid crystal layers. This inconvenience leads to a decrease in the fabrication yield. When the positive-type resist of the supporting members is sufficiently hardened, their width can be made larger than their height so as to prevent the supporting members from breaking. Since the supporting members have a height of 5 $\mu$m in the present embodiment, their width should be larger than 5 $\mu$m in order to prevent the breakage of the supporting members and to reduce a decrease in the yield.

In the present embodiment, the distance between adjacent supporting members arranged in the pixel part is set at 25 $\mu$m (the supporting members has a side of 5 $\mu$m long and a pitch of 30 $\mu$m). A large distance between adjacent supporting members would cause the resin films to sag therebetween, making it impossible to keep the gap between the substrate and the resin film or the gaps between adjacent resin films. This results in unevenness in color or a decrease in the contrast ratio. On the other hand, when the distance between adjacent supporting members is set at 100 $\mu$m or less, the resin films sag less, thereby making each gap have even thickness. Consequently, each liquid crystal layer has even thickness and the unevenness in color or a decrease in the contrast ratio due to insufficient thickness of the gaps can be prevented.

In the present embodiment, the resin films 111–113 have the optical anisotropy or the slow axes in the same direction. The optical anisotropy of the resin films appears in the direction of the slow axes, that is, in the direction to stretch the resin films in their production process. If the slow axes of the resin films stacked on the substrate were in different directions from each other, the resin films might absorb light so as to decrease the brightness of the liquid crystal display device. Therefore, the slow axes of the resin films are made to have the same direction so as to realize a bright display without light attenuation resulting from the optical anisotropy of the resin films.

The method for fabricating the above-mentioned liquid crystal display device will be described as follows with reference to FIGS. 6–13. The following processes will be conducted in a yellow room, which is irradiated by light having a long wavelength not to expose a photosensitive material such as a positive-type resist.

(1) First, as shown in FIG. 6(a) an ITO transparent conductive film is formed by spattering onto the substrate 101 provided with the TFT devices 102, 103, and 104. The drain terminals 103a and 104a of the TFT devices 103 and 104 and the first pixel electrode M1 are patterned by photolithography and etching. At the same time, the source lines and the gate lines in the vicinity of the pixel part are made from the transparent conductive film.

Then, a process of forming a light shielding film 105 is conducted. A negative-type resist containing carbon is applied onto the substrate 101 and a mask exposure and developing are conducted in such a manner that the resist is left only on the spots where the supporting members 118 and the cubic interconnection pads 140 are provided, so as to arrange the light shielding film 105 as shown in FIG. 6(b). The light shielding film 105 can be formed by applying photolithography and etching to a metallic thin film such as aluminum.

(2) A process of forming the supporting members 118 is conducted. A first positive-type resist is applied by spin coating onto the substrate 101 provided with the light shielding film 105 thereon, and the substrate 101 applied with the resist is pre-baked. An ultraviolet ray is irradiated from the substrate 101 side, so as to expose the area on the surface of the substrate 101 excluding the spots where the supporting members 118 and the cubic interconnection pads 140 are formed, by using the light shielding film 105 as a photo mask. After the exposure, the exposed area of the positive-type resist is developed with a developing solution and post-baked to be hardened. As a result, the supporting members 118 and the cubic interconnection pads 140 are formed onto the light shielding film 105 as shown in FIG. 7(a).

(3) A process of forming an adhesive layer onto the supporting members 118 is conducted. As shown in FIG. 7(a) a second positive-type resist which is to be an adhesive layer 131 is applied by spin coat onto the substrate 101 having the supporting members 118 thereon, and the substrate 101 applied with the resist is pre-baked. In the same manner as in the process (2), an ultraviolet ray is irradiated from the substrate 101 side to expose the resist using the light shielding film 105 as a photo mask, and the second positive-type resist is developed with a developing solution. As a result, as shown in FIG. 7(b) an about 1 μm-thick adhesive layer 131 is formed on the supporting members 118 and the cubic interconnection pads 140.

As in the processes (2) and (3), the adhesive layer 131 can be formed exclusively onto the supporting members 118 and the cubic interconnection pads 140 by the exposure from the rear surface of the substrate 101 with the light shielding film 105 as a photo mask. In the case where the adhesive layer is formed exclusively onto the supporting members by conducting an ordinary mask exposure, it would be necessary to provide an additional process of mask alignment between the adhesive layer and the supporting members on the substrate. However, on the supporting members whose cross sections have such short sides as in the present invention, positional deviation of only several μm would cause the adhesive area on the supporting members to be too small, leading to a decrease in the yield. To avoid this, the mask alignment would require extremely high precision. In contrast, the exposure from the rear surface of the substrate using the light shielding film as a photo mask enables the adhesive layer 131 to be formed onto the supporting members 118 easily and precisely without causing no such inconvenience.

The second positive-type resist used for the adhesive layer 131 is made of such a material as is hardened after exerting thermoplasticity in the heating process (post-baking process) which follows the developing. In the present embodiment, the second positive type resist is post-baked at 150° C. at which the adhesive layers 131, 132, and 133 exert their thermoplastic characteristics, which is lower than the temperature for the resin films 111, 112, and 113 to exert their thermoplastic characteristics. The supporting members 118–120, which are already hardened at this moment, do not exert the thermoplastic characteristics when hardened again. As a result, in the bonding process which will be described below, the resin films 111, 112, and 113 can be bonded onto the supporting members 118,119, and 120, respectively, by making only the adhesive layers 131, 132, and 133 exert the thermoplastic characteristics. Furthermore, smooth bonding of the resin films 111–113 onto the supporting members 118–120 can be obtained without causing the above-mentioned conventional problem that the gaps between the substrate and the resin films are narrowed by the sag of the resin films.

The resin films and the supporting members to be used in the present invention are not limited to those described above. The resin films can be a material either not having thermoplastic characteristics or exerting its thermoplastic characteristics at a higher temperature than the adhesive layers. The supporting members can be a material not having thermoplastic characteristics, exerting the thermoplastic characteristics at a higher temperature than the adhesive layers, or being subjected to a hardening treatment before the bonding process. Combinations of the resin films and the supporting members and the use of the adhesive layers having thermoplastic characteristics realize successful bonding of the resin films onto the supporting members without causing the deformation of the resin films along the supporting members or the breakage of the supporting members.

In an ordinary liquid crystal display device, a sealing material is applied around the display region in order to seal a gap so that the leakage of liquid crystal from the gap is prevented. In the present invention, on the other hand, instead of applying the sealing material, the adhesive layer 131 is formed not only on the supporting members 118 but also on the display region periphery 146 (outside the broken line 144 in FIG. 12) on the substrate 101 where the supporting members 118 are not formed. This makes it possible for the substrate 101 and the resin film 111 to be tightly bonded to each other in the display region periphery 146 in the bonding process. During the exposure in the process (3), a photo mask is arranged on the substrate side so as to shield the display region periphery 146 so that the adhesive layer 131 formed in the display region periphery 146 is left after the developing. This process makes it unnecessary to provide an additional process of applying a sealing material, thereby simplifying the entire fabrication processes.

Figure 12:
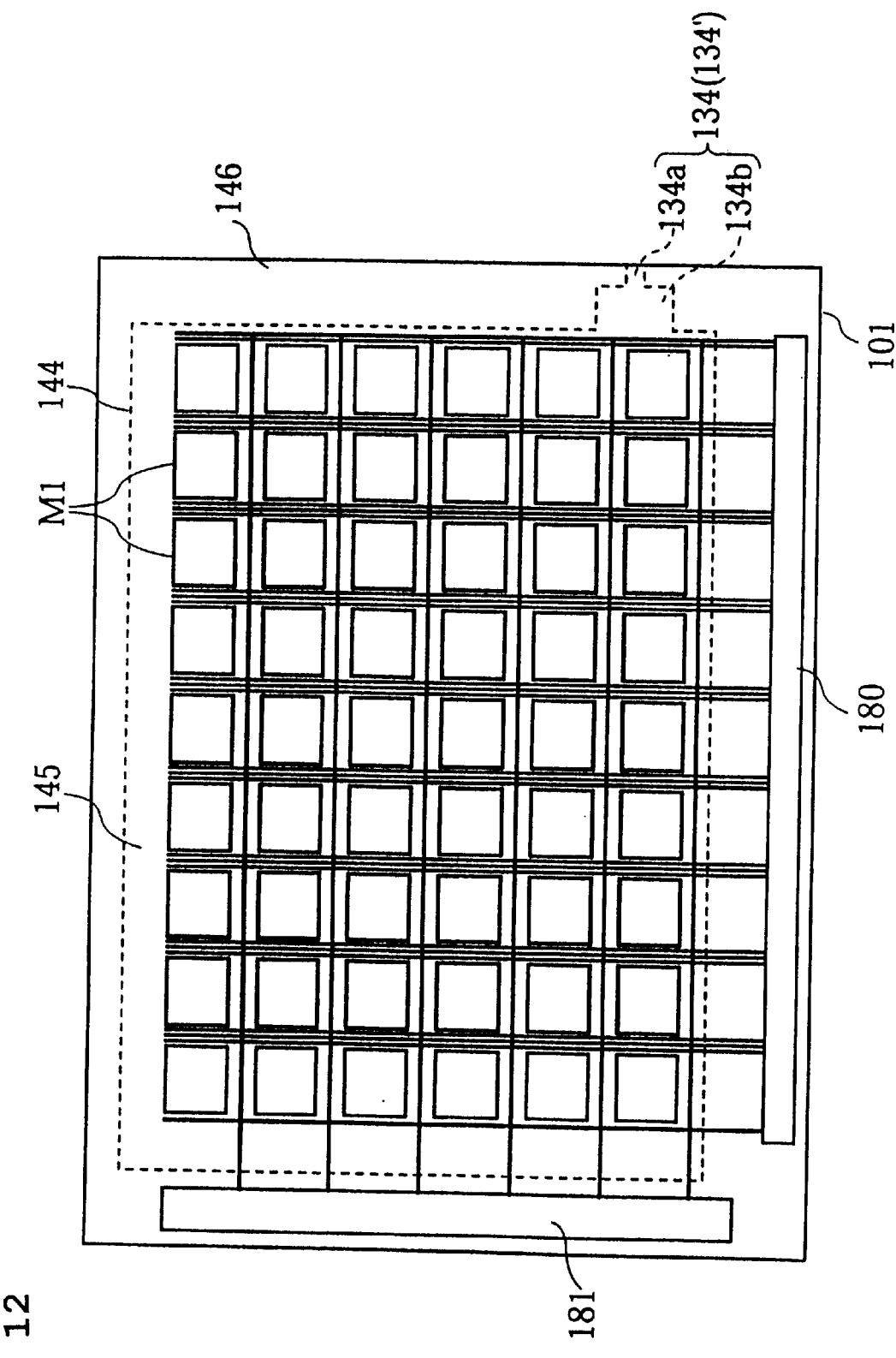
FIG. 12 is an illustration showing a fabrication process of the liquid crystal display device of Embodiment 1-1.
Figure 14:
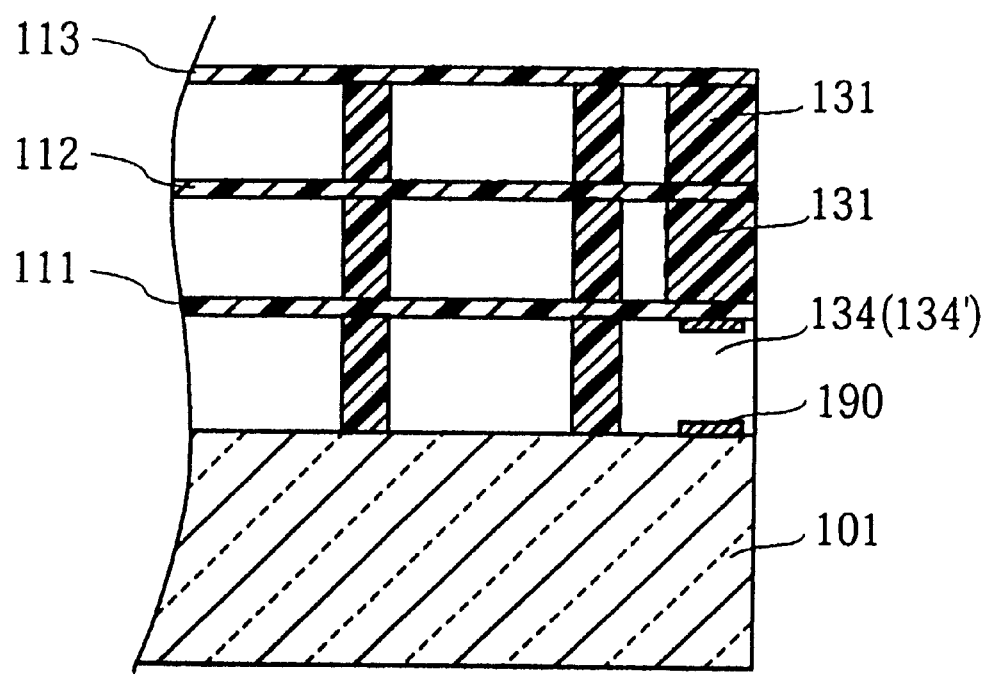
FIG. 14 is a cross sectional view of the vicinity of the venthole 134.

When the adhesive layer 131 is thus formed throughout the circumference of the display region periphery 146, it may be caused that the air sealed in the gap between the substrate 101 and the resin film 111 expands so as to break the resin film 111 or the bonding between the supporting members 118 and the resin film 111 breaks in the process involving heating or vacuum evacuation after the bonding process. To avoid this, it is necessary to provide a venthole for ventilating the gap. In the present embodiment, in order to provide such a venthole, in the process (3) of forming the adhesive layer, the exposure is conducted by using a photo mask which does not shield a part of the display region periphery 146 so as to provide the display region periphery 146 with a portion 134' (refer to FIGS. 12 and 14) where the adhesive layer 131 is not formed. The portion 134' in which the substrate 101 and the resin film 111 are not bonded in the following bonding process becomes a venthole 134. As shown in FIG. 12, the venthole 134 consists of a first passage 134a leading outside and a second passage 134b connected to the first passage 134a and having a larger cross section than the first passage 134a. This structure not only prevents the breakage of the resin film 111 but also makes the process of forming the venthole 134 be included in the process of forming the adhesive layer 131, which simplifies the formation of the venthole 134.

Figure 8:
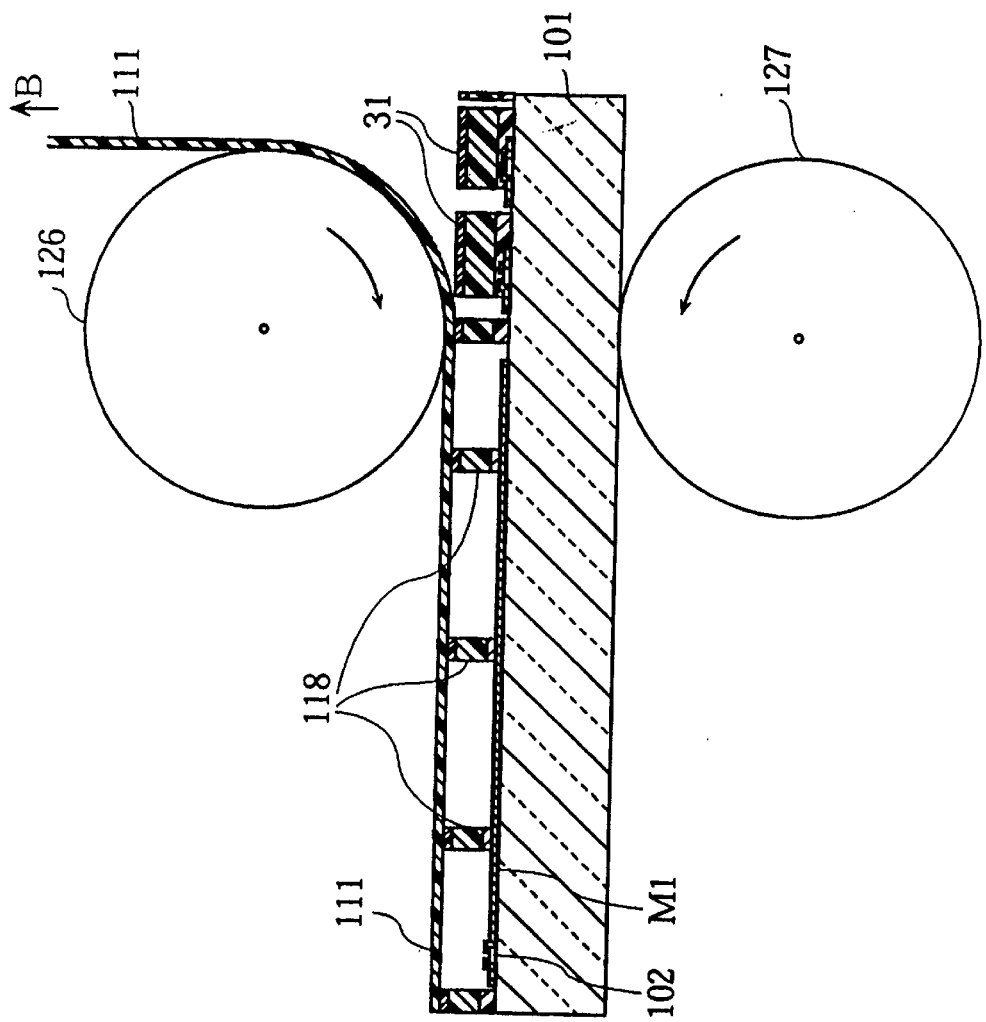
FIG. 8 is an illustration showing a fabrication process of the liquid crystal display device of Embodiment 1-1.
Figure 9A:
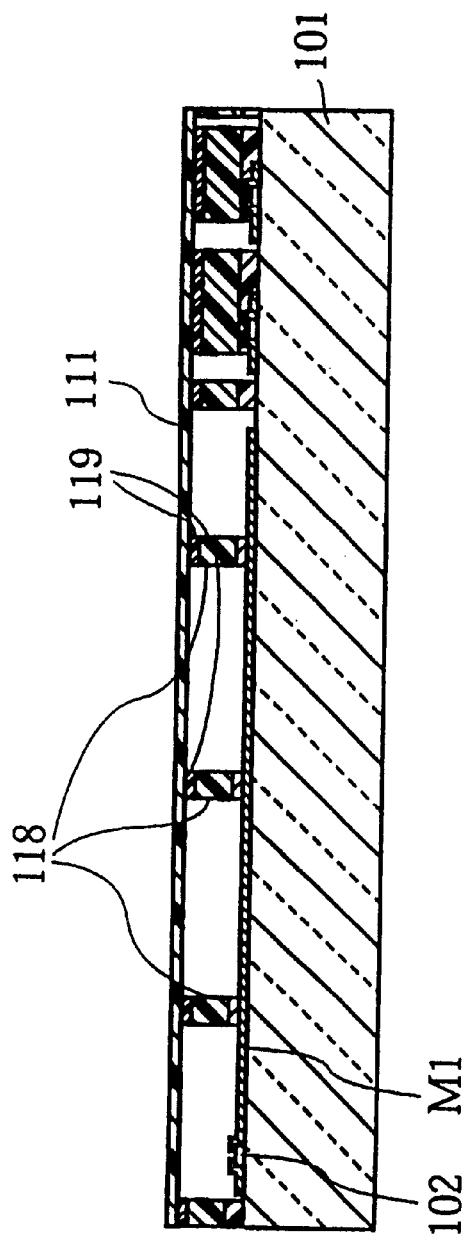
FIGS. 9(a) and 9(b) are illustrations showing fabrication processes of the liquid crystal display device of Embodiment 1-1.

(4) The process of bonding the resin film 111 to the substrate 101 provided with the supporting members 118 thereon is conducted as shown in FIG. 8. In FIG. 8 the resin film 111 whose main component is PET is stacked on the surface of the substrate 101 where the supporting members 118 and the adhesive layer 131 are provided, and is passed between the rollers 126, 127 of the laminator. The surface of at least one of the rollers 126 and 127, and preferably the surface of the roller 126 which is in contact with the resin film 111 is set at 150° C. at which the adhesive layer 131 exerts its thermoplastic characteristics. The rollers 126 and 127 sandwich the substrate 101 so as to provide it with a uniform pressure of 10 MPa, rotating at the rate of 10 mm/sec. As the result of bonding the resin film 111 to the substrate 101 having the supporting members 118 an the adhesive layer 131 thereon and passing them between the rollers 126 and 127 of the laminator, the adhesive layer 131 is thermal-joined to the resin film 111 so as to bond the resin film 111 to the supporting members 118. Since the temperature of the rollers is not so high as to plasticize the supporting members 118 or the resin film 111, the resin film 111 can be smoothly bonded without the deformation of the resin film 111 along the supporting members 118 or the breakage of the supporting members 118 while the gap corresponding to the height of the supporting members 118 is maintained as shown in FIG. 9(a). The substrate 101 having the resin film 111 thereon is baked to harden the adhesive layer 131, thereby firmly bonding the supporting members 118 to the resin film 111. The baking temperature must be at least higher than the temperature to harden the adhesive layer 131. When the baking temperature is set at a temperature to cause the resin film 111 to heat-shrink slightly, the resin film 111 sags less between supporting members. In the case of the PET resin film having a thickness of 1.2 $\mu$m used in the present embodiment, the appropriate baking temperatures are 200 to 220° C.

Through these processes, the resin film 1111 can be firmly bonded onto the supporting members 118 while the gap between the substrate 101 and the resin film 111 is maintained, so as to increase the fabrication yield. Furthermore, the processes of removing the resin film and vaporizing the solid film in the prior art become unnecessary, so that the application of the resin film can be facilitated and simplified.

In the bonding process (4), if the resin film 111 folds or wrinkles while the substrate 101 and the resin film 111 are passing between the rollers 126 and 127, the resin film 111 cannot be smoothly bonded to the substrate 101, causing unevenness or defects in display. The resin film 111 of the present invention wrinkles particularly easily because it is thin, which results in a decrease in the yield. To solve this problem, the resin film 111 is evenly stretched in the direction of arrow B shown in FIG. 8, while it is passing between the rollers 126 and 127. Consequently, the resin film 111 is applied in a smooth state onto the substrate 101.

The rollers of the laminator are usually made of an elastic material such as rubber; however, when the roller 126 positioned closer to the resin film is made of an elastic material, the supporting members 118 may encroach into the roller 126 by the pressure of the roller 126 in the process (4) of passing the substrate 101 and the resin film 111 together between the rollers, so as to cause the resin film 111 to curve towards the substrate 101 and the gap not to be maintained. To avoid this problem, the roller 126 is made of a stiff material such as stainless steel which is hard enough to make the encroaching strength smaller than the elastic deformation of the resin film 111. As a result, the resin film in a smooth state can be bonded to the supporting members without the deformation of the resin film 111 due to the encroach of the supporting members 118, thereby evening the thickness of the gap to seal the liquid crystal thereinto.

On the spot in the display region periphery 146 where the adhesive layer 131 is not provided in the process (4), the venthole 134 is formed as shown in FIG. 12 by applying the resin film 111. Consequently, inconveniences including the breakage of the resin film 111 caused in the process involving heating or vacuum evacuation can be prevented. However, it may cause a new problem that in the process of soaking the substrate in a resist developing solution in order to form the supporting members onto the resin film or in the process of soaking the substrate in an etching solution in order to pattern the transparent conductive film on the resin film, these solutions flow into the gap through the venthole 134. Since it is hard to get the flown solutions out of the narrow gap, some of the solutions remains in the gap and disturbs the sealing of liquid crystal into the gap.

Figure 15:
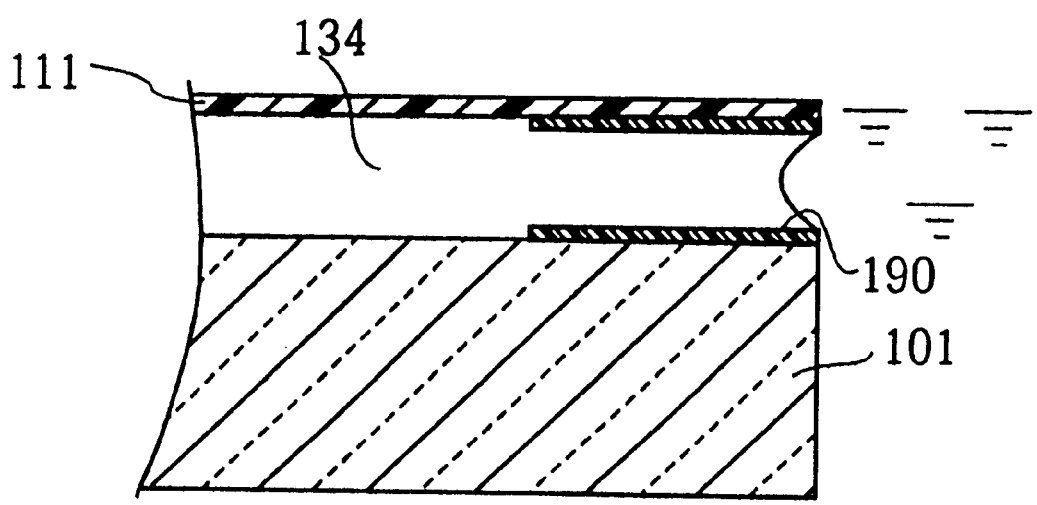
FIG. 15 is an illustration showing a state of preventing the permeation of the solution by applying a surface tension decreasing treatment to the venthole 134.

(5) In order to solve the problem, a process is conducted which decreases the surface tension of the gap between the substrate 101 and the resin film 111 in the vicinity of the first passage 134a of the venthole 134. As a treatment to decrease the surface tension, the surface of the substrate 101 or of the resin film 111 in the vicinity of the first passage 134a is coated with a fluoric coating agent 190 (refer to FIG. 14). Without such surface treatment, the contact angle of water on the PET surface is about 70 degrees, which allows solutions such as water to flow into the gap; however, the treatment can change the contact angle to 90 degrees or larger so as to prevent the flow of the solutions as shown in FIG. 15. This method also makes it unnecessary to open and close the venthole repeatedly when the process of heating or vacuum evacuation and the process of soaking the substrate in the solution are repeated, thereby simplifying the fabrication processes.

Figure 9B:
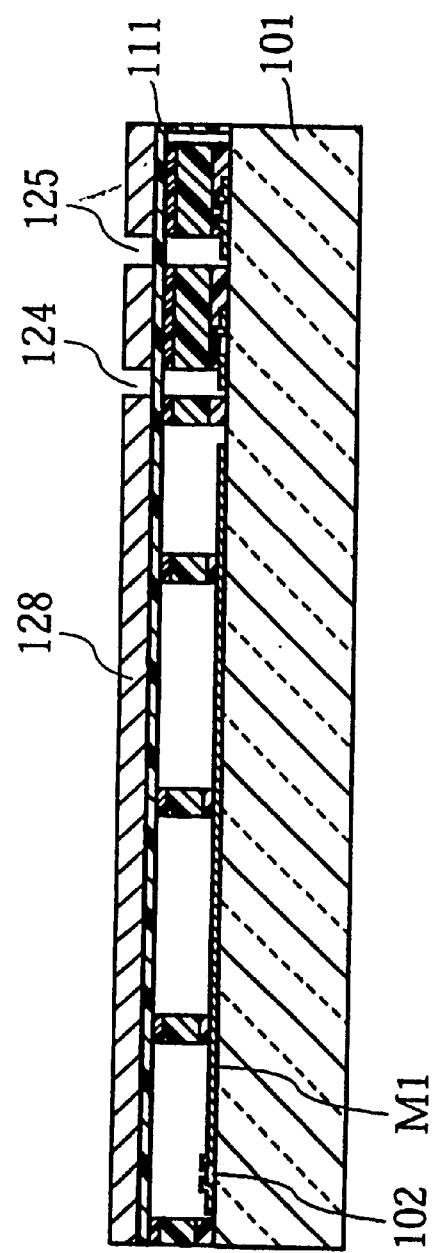

(6) A process of forming opening portions 124 and 125 in the resin film 111 bonded to the substrate 101 is conducted. The opening portions 124 and 125 are provided in order to electrically connect the pixel electrodes on the resin film and the drain terminals of the TFT devices on the substrate. A third positive-type resist 128 is applied by spin coating over the resin film 111 as shown in FIG. 9(a) and pre-baked. A mask exposure is conducted with a photo mask which makes light be irradiated exclusively upon the area where the opening portions 124 and 125 are formed, and then the exposed area is developed with a developing solution. As a result, a 3 $\mu$m-thick resist film 128 is formed on the resin film 111 except for the area where the opening portions 124 and 125 are formed as shown in FIG. 9(b). Then, the resin film 111 on the area for the opening portions is removed by an reactive ion etching (RIE) so that the opening portions 124 and 125 are formed as shown in FIG. 10(a). The RIE accelerates oxygen ions in one direction so as to make them collide with the surface of the resin film, thereby decomposing and vaporizing the resin molecules of the resin film. The resin film 111 having PET as its main component is decomposed and removed by the RIE at the rate of 0.3 $\mu$m/min. On the other hand, the resist film 128 mainly composed of an acrylic resin is decomposed and removed at the same rate of 0.3$\mu$/min. as the resin film. In this embodiment the resin film 111 on the area for the opening portions 124 and 125 is removed by the RIE treatment of 5 minutes, whereas the resist film 128 remains by a thickness of 1.5 $\mu$m so as to protect the resin film 111 formed on the area other than the opening portions 124 and 125. Later, the resist film 128 is removed so as to form the opening portions 124 and 125 in the resin film 111 as shown in FIG. 10(b). Thus, the RIE enables the opening portions to be formed in the resin film resistant to organic solvents such as PET or acid.

Besides the RIE, a plasma asher can be used in order to form opening portions in the resin film.

(7) A process of forming the pixel electrodes on to the resin film 111 is conducted as shown in FIG. 11(a). The second pixel electrode M2 is produced by spattering ITO so as to form an about 0.1 $\mu$m-thick transparent conductive film. At this moment, the opening portions 124 and 125 provided in the resin film 111 are also covered with ITO, so that the drain terminals 103a and 104a of the TFT devices 103 and 104 on the substrate 101 can be electrically connected with the second pixel electrode M2 on the resin film 111. Then, the pixel part and the opening portions are covered with the resist and the ITO covered on the other area is removed by etching. After this, the resist is removed to pattern the ITO into the form of the second pixel electrode M2. As a result, the potential of the second pixel electrode M2 can be controlled by the TFT device 103 on the substrate 101.

Figure 13:
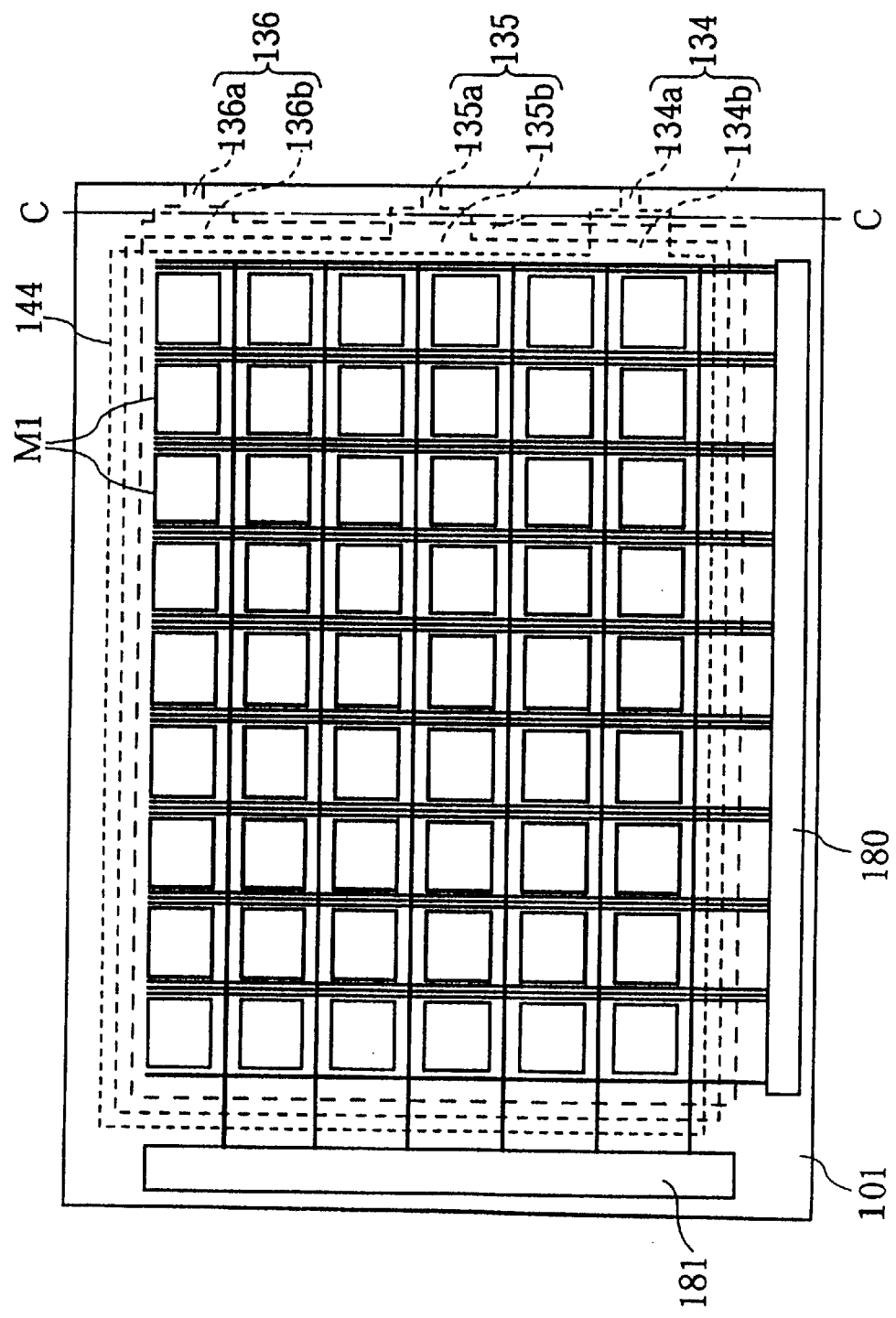
FIG. 13 is an illustration showing a fabrication process of the liquid crystal display device of Embodiment 1-1.
Figure 16:
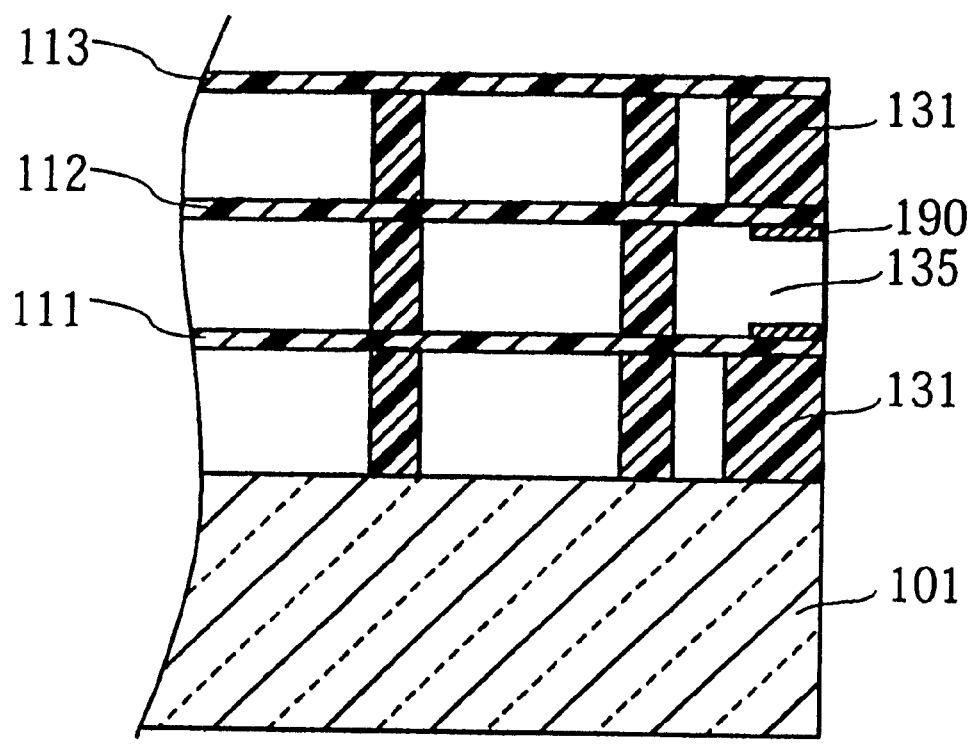
FIG. 16 is a cross sectional view of the vicinity of the venthole 135.

(8) The second liquid crystal layer 107 is produced. The layer 107 is produced by performing the above-mentioned processes (2)–(7) again. After forming the supporting members 119 onto the resin film 111 in the process (2), the adhesive layer 132 is formed onto the supporting members 119 in the process (3). In the same manner as the processes (2) and (3), light is irradiated from the substrate 101 side, using the light shielding film 105 formed in the process (1) as a photo mask. As a result, the supporting members 119 and the adhesive layer 132 of the second liquid crystal layer 107 are formed in the same positions as the supporting members 118 and the adhesive layer 131 of the first liquid crystal layer 106. Then, in the process (4) the resin film 112 is bonded to the supporting members 119 so as to form a gap between the resin films 111 and 112 to seal liquid crystal thereinto. At this moment, the slow axis of the resin film 112 is made equal to that of the resin film 111. In the process (5) the treatment is conducted to reduce the surface tension in the vicinity of the first passage 135a of the venthole 135 (refer to FIGS. 13 and 16) leading to the gap of the second liquid crystal layer 107. As shown in FIG. 13 the venthole 135 has the same structure as the venthole 134 and consists of a first passage 135a leading outside and a second passage 135b connected to the first passage 135a and having a larger cross section than the first passage 135a.

After the opening portion 125 is formed in the resin film 112 above the drain terminal 104a of the TFT device 104 on the substrate in the process (6), the third pixel electrode M3 is formed and connected to the drain terminal 104a in the process (7). Thus, as shown in FIG. 11(b) the gap for composing the second liquid crystal 107, the resin film 112, and the third pixel electrode M3 are formed.

Figure 17:
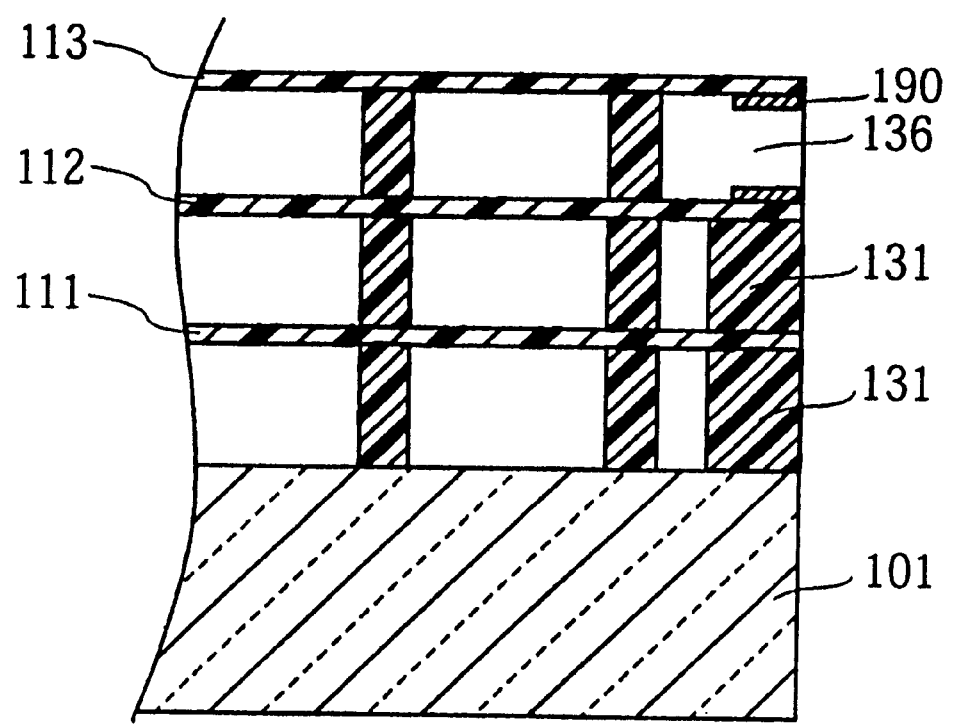
FIG. 17 is a cross sectional view of the vicinity of the venthole 136.

(9) The third liquid crystal layer 108 is formed. The layer 108 is formed by performing the processes (2)–(5) again. First, in the processes (2) and (3), the supporting members 120 and the adhesive layer 133 are formed in the same positions as the supporting members 119 of the second liquid crystal layer formed on the resin film 112. In the process (4), the resin film 113 is bonded to the supporting members 120 so as to form a gap between the resin films 112 and 113 to seal liquid crystal thereinto. The slow axis of the resin film 113 is made the same direction as those of the resin films 111 and 112. In the process (5) the treatment is conducted to reduce the surface tension in the vicinity of the first passage 136a of the venthole 136 (refer to FIGS. 13 and 17) leading to the gap of the third liquid crystal layer 108. As shown in FIG. 13 the venthole 136 has the same structure as the venthole 134 and consists of a first passage 136a leading outside and a second passage 136b connected to the first passage 136a and having a larger cross section than the first passage 136a. The ventholes 134–136 are formed in different positions as shown in FIG. 13.

(10) A process of forming the common electrode 116 onto the resin film 113 is conducted. The common electrode 116, which also serves as a reflective plate is formed as thick as 0.1 μm by aluminum deposition.

(11) A process of forming the protection film 117 made of an acrylic resin onto the resin film 113 provided with the common electrode 116 is conducted.

(12) A process of implanting liquid crystal in a vacuum is conducted. First, the substrate 101 and the resin films 111, 112, and 113 are divided along the line C—C shown in FIG. 13 so as to remove the first passages 134a, 135a, and 136a having increased surface tension, thereby making the second passages 134b, 135b, and 136b function as the inlets of the liquid crystal. Then, the structure comprising the substrate and the resin films stacked thereonto is put into a vacuum implanting device together with three liquid crystal holders each containing guest host liquid crystal in which a dichroic dye of cyan, magenta, or yellow is dissolved. After the vacuum evacuation, the second passages 134b, 135b, and 136b of the three liquid crystal layers are each made to be in contact with the surface of the liquid crystal of each liquid crystal holder so as to vacuum-implant the guest host liquid crystal corresponding to each color into the gaps of the three liquid crystal layers. After these gaps are all filled with the liquid crystals, the substrate is taken out of the vacuum implanting device, and the three second passages 134b, 135b, and 136b are sealed with an ultraviolet curing resin. Thus, the liquid crystals 121–123 are sealed into the gaps of the first-third liquid crystal layers 106–108.

As a result of these processes, the liquid crystal display device shown in FIG. 1 is completed. The extremely thin resin films are bonded onto the supporting members, and the liquid crystal layers are formed by sealing liquid crystals into the gaps between the substrate and the resin film and between adjacent resin films. This makes the liquid crystals makes up a larger proportion of the liquid crystal layers, so as to increase the substantial open area ratio, thereby realizing high contrast ratio and bright display. Furthermore, the small thickness of the resin films enables the liquid crystal display device to be driven at a low voltage, and not requiring glass substrates can realize bright display without parallax. Although the positive type photo resist is used as the supporting members and the adhesive layers in the present embodiment, a negative type photo resist may be used instead. In that case, instead of providing a light shielding film between the substrate and the supporting members, a reflective film is provided on the area where no supporting members are provided and used as a mask in forming the supporting members and the adhesive layers. Since the reflective film is formed on the substrate, the uppermost resin film has a transparent conductive film thereon as the common electrode.

Embodiment 1-2

In Embodiment 1-1 the adhesive layers are formed exclusively on the supporting members in the adhesive layer formation process. Instead of this process, it is possible to conduct a process of previously coating the resin film with an adhesive layer and use it as the adhesive layer. In that case, the adhesive layers can be formed while the resin films are being produced, making it unnecessary to conduct a process of forming adhesive layers onto the supporting members, thereby simplifying the fabrication processes. In the process of bonding the resin film to the substrate, the surface of the resin film having the adhesive layer thereon is in contact with the supporting members formed on the substrate. The adhesive layer can be provided on both surfaces of the resin film.

The adhesive layers on the resin films are produced by thinly coating a polyester resin film with a resin mainly composed of a polyethylene resin, a polyurethane resin, or the like exerting its thermoplastic characteristics at a lower temperature than the polyester resin. The thickness of the adhesive layers is made to be 1/5 to 1/10 of that of the resin films. Such thin adhesive layers can reduce a voltage decrease caused therein.

The thin adhesive layers are produced as follows. A resin film having a thickness of about several μm is coated with a resin which is to be an adhesive layer before it is rolled out to be thinner. This makes the resin film and the adhesive layer thinner at the same ratio as they are before being rolled out, so that the obtained adhesive layer can be extremely thin and even.

Embodiment 1-3

In Embodiment 1-1 the ventholes 134–136 are provided to ventilate the gaps between the substrate and the resin film and between adjacent resin films in the vicinity of the display part, and the surface tension is increased in the vicinity of the first passages 134a–136a of the ventholes in order to prevent the flow of solutions into the gaps through the ventholes. In the present embodiment, on the other hand, the flow of the solutions can be avoided by sealing the vicinity of the display part and closing the ventholes. In that case, since the air in the gaps may expand to break the resin films in the process involving heating or vacuum evacuation, a part of the sealed display part is penetrated to form ventholes before the process. The ventholes are closed after the process involving heating or vacuum evacuation and before the process of soaking the substrate in the solution. The ventholes, which are provided in the area other than the pixels in the vicinity of the display part, are each formed by making a hole of 50 μm in diameter in the resin films with a laser beam. The closing of the ventholes is done by pressing the ventholes with an iron head heated to around 200° C. so as to heat-joint the resin films.

Since the formation of the three liquid crystal layers requires to repeat the process of opening and closing the ventholes three times, the ventholes are formed in different positions each time. As a result, the liquid crystal display device similar to that of Embodiment 1 is obtained. The ventholes can be closed by using an adhesive tape. In that case, the process of opening and closing the ventholes is repeated by applying and removing the tape, so as to obtain the same effects as in Embodiment 1. The tape should be resistant to the solutions in which the substrate is soaked and preferably has comparatively weak adhesion.

Embodiment 1-4

In Embodiments 1-1 and 1-3, the ventilation of the gaps is realized by providing ventholes. In the present embodiment, on the other hand, instead of providing ventholes, the resin films 111–113 have breathability. These resin films allow air to go into and out of the gaps in the process involving heating or vacuum evacuation, which prevents inconvenience such as the breakage of the resin films due to the expansion of the air when the films have no breathability, or the flow of the solutions into the gaps in the process of soaking the substrate in the solutions. Also, a combination of the use of the breathable resin films and the formation of the ventholes improves the ventilation of the gaps and the effect of preventing the breakage of the resin films. In the case where resin films having breathability and water vapor permeability are used, oxygen or water in the air may go into the gaps through the resin films after the liquid crystal display device is completed. As a result, the retention ratio of the liquid crystal deteriorates thereby decreasing the display performance. However, the deposition of aluminum as the common electrode onto the uppermost resin film as in Embodiment 1-1 can block the permeation of oxygen or water as a shading film. The process of forming a shading film becomes unnecessary, thereby simplifying the fabrication processes. When the resin films are exposed in parts on the surface of the liquid crystal display device, it is necessary to provide a shading film having neither breathability nor water vapor permeability onto the uppermost resin film 113 so as to prevent a decrease in display performance.

Embodiment 1-5

In Embodiment 1-1, the reflective film 116 which also serves as the common electrode is formed onto the uppermost resin film 113 so as to provide a reflective plate. Since the reflective film formed on the even resin film has a specular surface, there is a problem that the light source is reflected in the reflective film and disturbs the view of the display, while when the display device is seen from an angle causing no reflection, the display becomes dark. In order to solve the problem, a liquid crystal display device has been proposed in Japanese Laid-open Patent Application No. 4-243226. The liquid crystal display device is provided with a reflective film which has diffusion due to fine concave and convex portions formed on its surface. The diffusion is obtained by providing a resin layer having fine concave and convex portions onto the substrate, and further providing a reflective film onto the resin layer. If such a reflective film having fine concave and convex portions is formed on the substrate in the structure of Embodiment 1-1, new problems may be caused such as (1) the concave and convex portions on the substrate surface prevents keeping the space between the reflective film and the resin film uniformly and (2) when a back side exposure is conducted to form the supporting members and the adhesive layers, the light is shielded by the reflective film, so that the supporting members and the adhesive layers cannot be formed in the same position by using a positive-type photo resist like in Embodiment 1-1.

Figure 18:
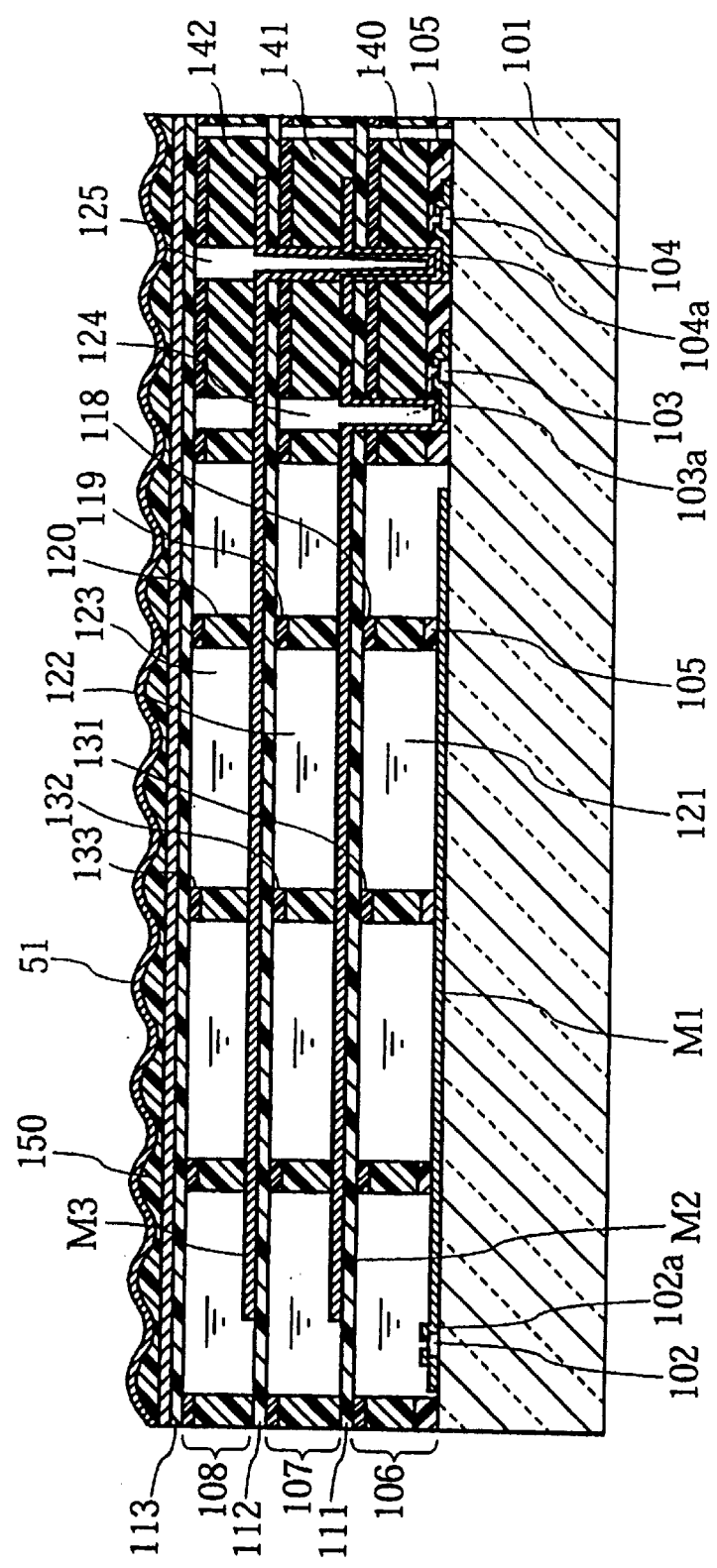
FIG. 18 is a cross sectional view of one pixel in the center of the liquid crystal display device of Embodiment 1-5 of the present invention.

In view of these problems, the present embodiment provides a resin layer 150 having a number of fine concave and convex portions on the uppermost liquid crystal layer or the uppermost resin film 113, and further provides a reflective film 151 on the resin layer 150 as shown in FIG. 18. The resin layer 150 is made of a transparent positive type photo resist and the reflective film 151 is formed by depositing aluminum. This structure enables the reflective film formed on the liquid crystal layer to have diffusion, so as to make the display clearer and to solve the problems. The present invention differs from the above-mentioned Japanese application in that the surface of the reflective film having concave and convex portions which faces the resin layer is used as a reflective surface, and the display becomes dark when the resin layer absorbs too much light. Therefore, the resin layer 150 must be made from a transparent material as mentioned above.

The present embodiment makes the reflective film also serve as the common electrode, so that when a voltage is supplied between the electrodes, the resin layer causes a voltage drop, thereby lowering a voltage supplied to the liquid crystal layers. In order to avoid this problem, a transparent common electrode may be arranged between the resin film 113 and the resin layer 150. In that case, light may be absorbed by the common electrode so as to darken the display.

Figure 19:
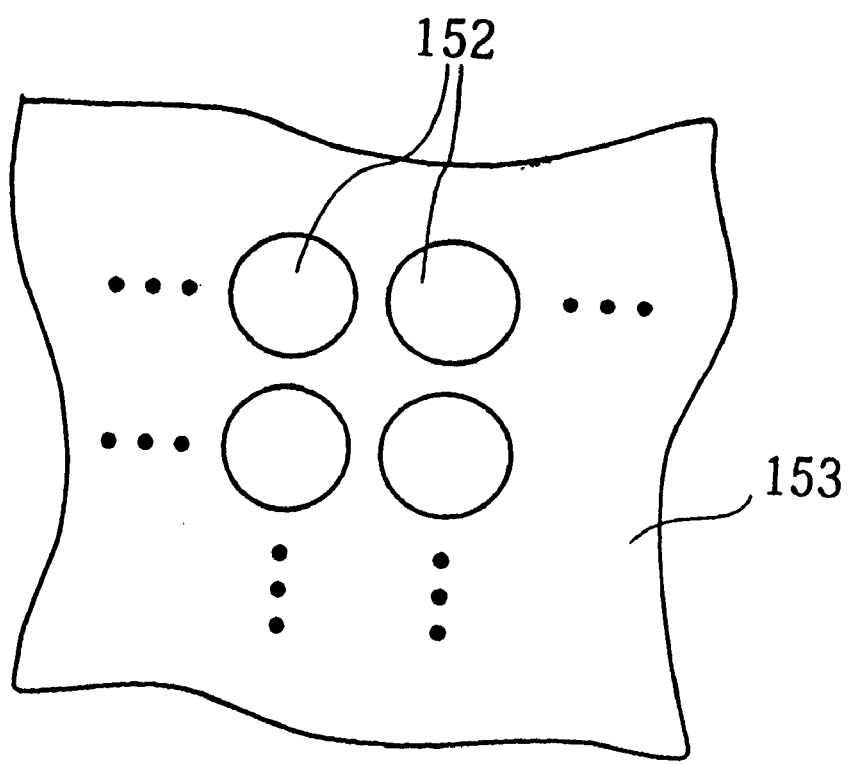
FIG. 19 is a partial plane view of the mask 153.
Figure 20:
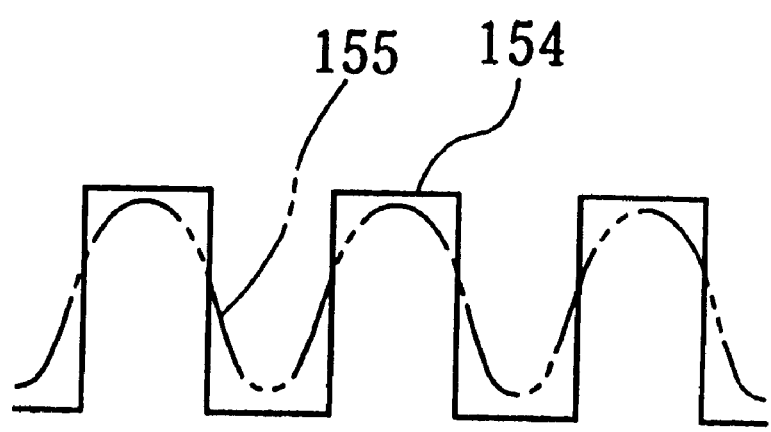
FIG. 20 is an illustration showing surface changes of the resin layer 150.

The fabrication processes of the present embodiment will be described as follows, focusing on the parts different from the embodiment 1-1. After conducting the processes (1)–(9) of Embodiment 1-1 in the same manner, the process (10) of forming a reflective film is performed as follows. A positive type photo resist is applied as thick as 1 μm onto the resin film 113. As shown in FIG. 19 a mask exposure and developing are conducted by using a photo mask 153 having a number of fine circular holes 152 and a patterning is conducted. After this, an entire surface exposure is conducted in order to make the resist transparent, and then the substrate is baked in an oven at 200° C. As the photo resist, a material causing heat drips during the baking is used so as to change the convex portions on the surface of the resin layer from those indicated by the full line 154 into the round forms indicated by the imaginary line 155, thereby making the concave and convex form milder. Then, a 0.1 μm-thick reflective film 151 is formed on the surface of the resin layer by aluminum deposition. Liquid crystal is implanted in the same manner as in the process (12) of Embodiment 1-1 so as to complete the liquid crystal display device shown in FIG. 18. A protection film may be provided onto the reflective film by conducting the process (11) of Embodiment 1-1 in the same manner.

Thus, the reflective film having diffusion can be formed onto the liquid crystal layer, so that a better display is obtained.

As described hereinbefore in the embodiments 1-1 through 1-5, a liquid crystal display device comprises gaps formed between the substrate and the resin film and between adjacent resin films so as to seal liquid crystal thereinto. The liquid crystal display device thus produced has bright display and a high contrast ratio, without unevenness in color resulting from the parallax caused when the liquid crystal layers are stacked. Furthermore, since resin films are used as the sealing films and the resin films are bonded onto the supporting members via the adhesive layers, the fabrication processes are simplified and the fabrication yield is improved.

Embodiment 2

The first embodiment requires a process of forming contact holes every time a resin film is stacked, in order to connect the electrode on each resin film and the connection terminals of the driving elements on the substrate. To be more specific, the liquid crystal display device having three liquid crystal layers stacked on the substrate requires twice conducting the process of forming contact holes. In view of this aspect, the present embodiment features a simplified process of forming contact holes. The specific structure will be described based on the following embodiments.

Embodiment 2-1

Figure 21:
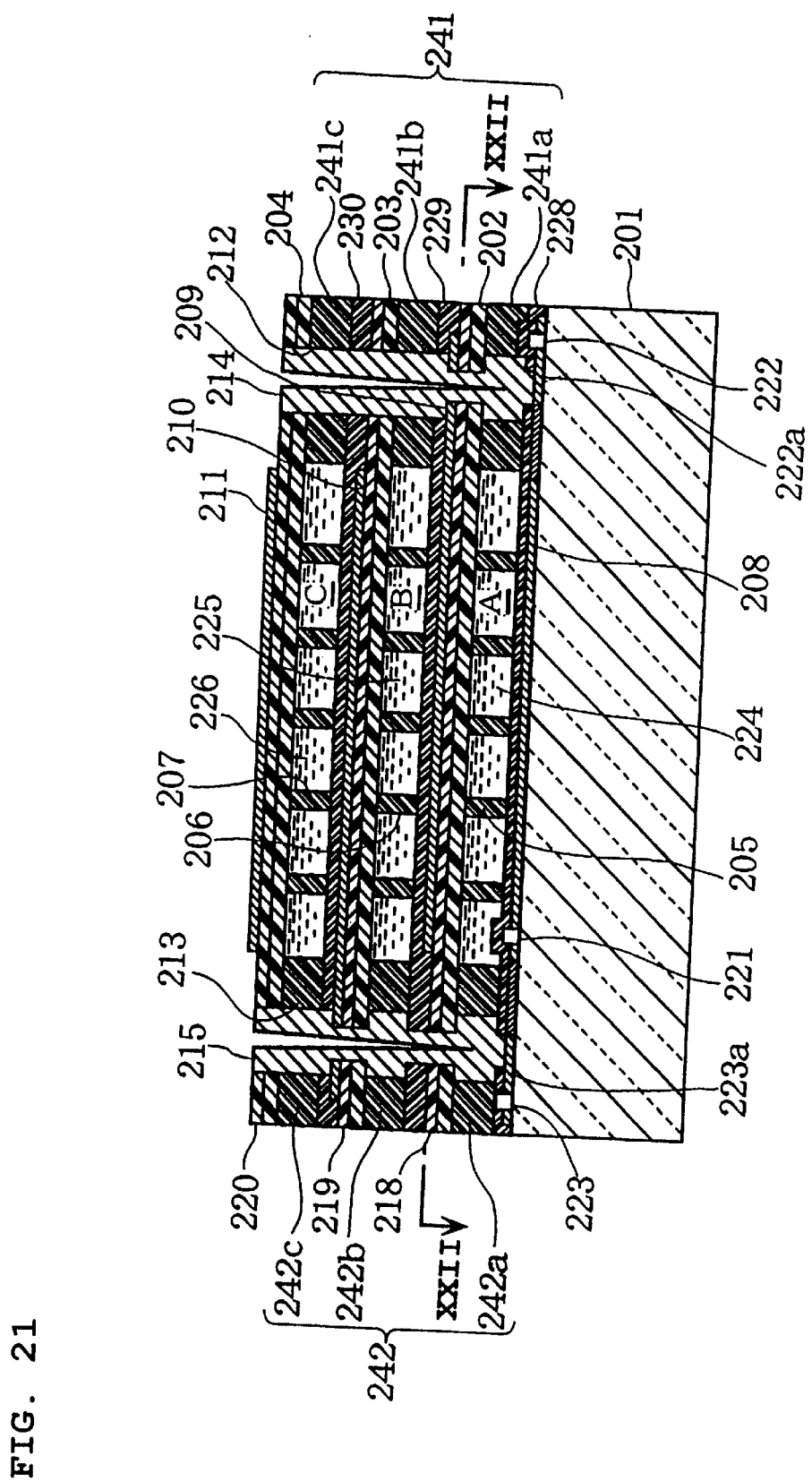
FIG. 21 is a cross sectional view of the main part of the liquid crystal display device of Embodiment 2-1 of the present invention.
Figure 22:
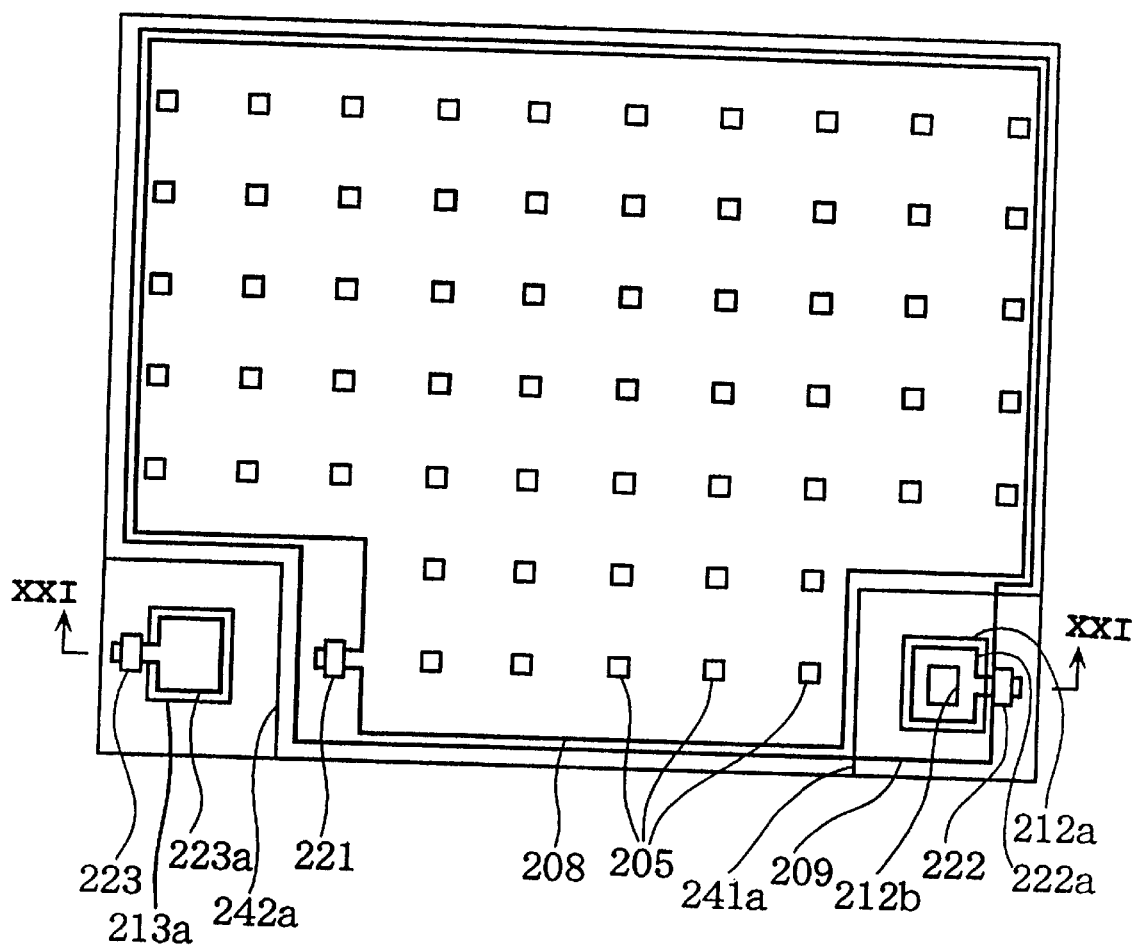
FIG. 22 is a cross sectional view taken along the line indicated with the arrows X—X of FIG. 21.

FIG. 21 is a cross sectional view of the main part of the liquid crystal display device of the present embodiment, and FIG. 22 is a plane view of the same taken along the line indicated with arrows XXII—XXII of FIG. 21, and FIG. 21 is a cross sectional view taken along the line XXI—XXI of FIG. 22. FIGS. 21 and 22 show one pixel part in the center of the liquid crystal display device.

The present embodiment is an embodiment of the present invention applied to a color liquid crystal display device. The color liquid crystal display device comprises three resin films stacked on a substrate and gaps which are formed between the substrate and the lowermost resin film and between adjacent resin films, and are each filled with a guest host liquid crystal containing a dichroic dye having a different color from the other dichroic dyes.

The specific structure of the liquid crystal display device will be described with reference to FIGS. 21 and 22.

Resin films 202, 203, and 204 are stacked in that order onto a substrate 201 in such a manner as to be supported by supporting members 205, 206, and 207, respectively, provided thereunder. Gaps A, B, and C with a height of 5 μm are formed between the substrate 201 and the resin film 202, between the resin films 202 and 203, and between the resin films 203 and 204, respectively. The gaps A, B, and C are filled with guest host liquid crystals 224, 225, and 226 containing a dichroic dye of cyan, magenta, and yellow, respectively. The resin films 202, 203, and 204 are 1 μm thick and mainly composed of polyethylene terephthalate (PET). Other resin films whose main component is not PET can be also used.

The supporting members 205, 206, and 207 are a positive type resist and each consist of a number of pillars whose cross section orthogonal to the axis is a square (10 μm×10 μm in the present embodiment). The supporting members 205, 206, and 207 are arranged so as to be distributed across the entire pixel part with a fixed pitch, and to maintain the gaps A, B, and C.

The substrate 201 is a transparent substrate made of glass or the like. The substrate 201 is provided with a pixel electrode 208 patterned in a fixed shape and TFT devices 221, 222, and 223 as driving elements thereon. Wrinkle reduction layers 218, 219, and 220 are provided on the resin films 202, 203, and 204, respectively. Pixel electrodes 209 and 210 patterned in a fixed shape are provided on the wrinkle reduction layers 218 and 219, whereas a common electrode 211 is provided on the wrinkle reduction layer 220. Alignment films 228, 229, and 230 made of polyimide are provided on the pixel electrodes 208, 209, and 210, respectively, in order to align the liquid crystals 224, 225, and 226.

The gaps A, B, and C are provided with two cubic interconnection pad strings 241 and 242 for each pixel. The cubic interconnection pad string 241 consists of three cubic interconnection pads 241a, 241b, and 241c arranged almost at the same position in the direction vertical to the substrate 201. The cubic interconnection pad string 242 consists of three cubic interconnection pads 242a, 242b, and 242c arranged almost at the same position in the direction vertical to the substrate 201. These cubic interconnection pads 241a–241c and 242a–242c are pillars each having a square cross section orthogonal to the axis, and are made from a positive type resist just like the supporting members 205, 206, and 207. A contact hole 212 is formed through the cubic interconnection pads 241a, 241b, and 241c and the resin films 202, 203, and 204. Another contact hole 213 is formed through the cubic interconnection pads 242a, 242b, and 242c and the resin films 202, 203, and 204. The contact terminal 222a of the TFT device 222 is exposed inside the contact hole 212, and the contact terminal 223a of the TFT device 223 is exposed inside the contact hole 213. The contact hole 212 has a function to connect the pixel electrode 209 and the TFT device 222, and the contact hole 213 has a function to connect the pixel electrode 210 and the TFT device 223. The part of the alignment film 229 that is exposed inside the contact hole 212 is removed in order to make a part of the pixel electrode 209 under the alignment film 229 be projected and exposed inside the contact hole 212. The part thus exposed inside the contact hole 212 of each of the connection terminal 222a and the pixel electrode 209 is in contact with a conductive member 214 so that the TFT device 222 and the pixel electrode 209 are electrically connected. In the same manner, the part of the alignment film 230 that is exposed inside the contact hole 213 is removed in order to make a part of the pixel electrode 210 under the alignment film 230 be projected and exposed inside the contact hole 213. The part thus exposed inside the contact hole 213 of each of the connection terminal 223a and the pixel electrode 210 is in contact with a conductive member 215 so that the TFT device 223 and the pixel electrode 210 are electrically connected. The connection terminal of the TFT device 221 is connected to the pixel electrode 208 on the substrate 201. This structure realizes cubic interconnection with respect to each of the pixel electrodes 208, 209, and 210 and the common electrode 211 arranged in the vertical direction, and makes the connection/interruption of the TFT devices 221, 222, and 223 control voltages between the pixel electrodes 208 and 209, between the pixel electrodes 209 and 210, and between the pixel electrode 210 and the common electrode 211, so as to achieve a full-color display.

The connection structure inside the contact holes 212 and 213, which is the main feature of the present invention will be detailed as follows.

Concerning the contact hole 212, the bottom surface of the resin film 202 is projected from the internal surface of the contact hole 212 towards the center of the diameter, and the bottom surfaces of the resin films 203 and 204 arranged above the resin film 202 form a single plane with the internal surface of the contact hole 212. The part of the resin film 202 that is projected inside the contact hole 212 has the pixel electrode 209 thereon, which is exposed inside the contact hole 212. In order to obtain the pixel electrode 209 thus exposed, the pixel electrode 209 is made of an inorganic material (ITO) resistant to dry etching using oxygen plasma or the like, and when dry etching is conducted to form the contact hole 212, the difference in etching rate between the pixel electrode and the resin films made of an easily etched material is used.

The exposure of the pixel electrode 209 inside the contact hole 212 makes the conductive member 214 and the pixel electrode 209 be in contact with each other with their surfaces so as to secure the connection therebetween. Consequently, the reliability of the connection between the pixel electrode 209 and the connection terminal 222a of the TFT device 222 is improved.

Concerning the contact hole 213, in the same manner as the contact hole 212, the resin film 203 and the pixel electrode 210 formed thereon are projected inside the contact hole 213, so that the pixel electrode 210 is exposed inside the contact hole 213 and in contact with the conductive member 215. This structure secures the connection between the pixel electrode 210 and the conductive material 215, thereby improving the reliability of the connection between the pixel electrode 210 and the connection terminal 223a.

The wrinkle reduction layers 218, 219, and 220, which are another feature of the present embodiment will be described. These wrinkle reduction layers 218–220 are 0.2 $\mu$m-thick films made from a material resistant to spattering such as an acrylic resin. In forming the electrodes, the wrinkle reduction layers made of the acrylic resin are provided onto the resin films and then ITO is spattered onto the wrinkle reduction layers to form inorganic material layers.

Figure 23:
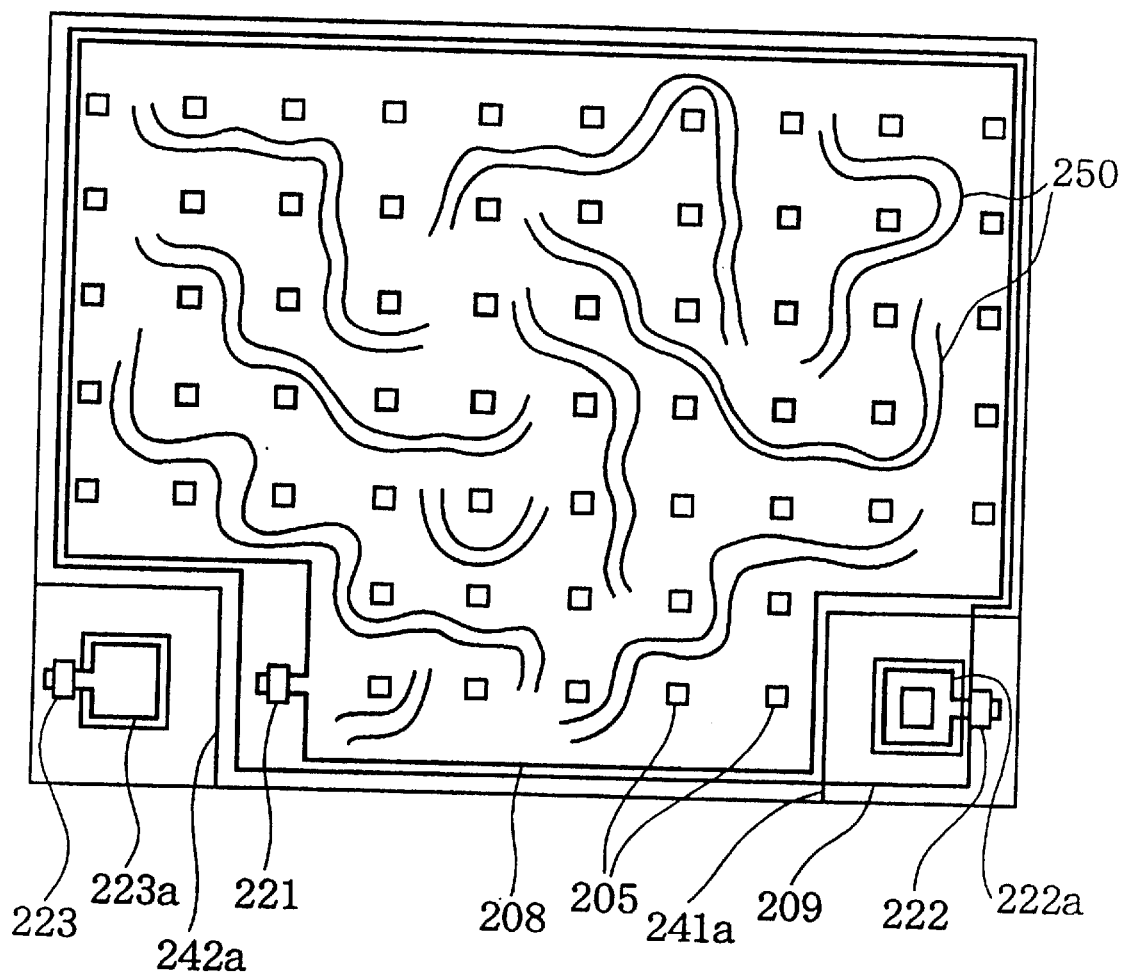
FIG. 23 is an illustration showing the state of wrinkles generated on the resin film.

The reason of the provision of the wrinkle reduction layers is as follows. The inventors of the present invention have found a problem that when an inorganic material such as ITO is directly spattered onto a resin film with a thickness of 10 $\mu$m or less, the resin film wrinkles as shown in FIG. 23 by the impact of the spattering. FIG. 23 is a plane view of one pixel when the processes up to the formation of the pixel electrode 209 onto the substrate 201 are conducted in the fabrication of the liquid crystal display device shown in FIG. 21. FIG. 23 roughly corresponds to FIG. 22, while omitting gate lines, source lines, and other components. As shown in FIG. 23 the resin film 202 on the whole pixel part has wrinkles 250 through the columnar supporting members 205 arranged with a 50 $\mu$m pitch, which causes the light to be diffused on the surface of the resin film 202. In order to reduce or prevent wrinkles, the wrinkle reduction layers 218, 219, and 220 are provided. As a result, the resin film is formed in a smooth condition as shown in FIGS. 22 and 24(b). Although the wrinkle reduction layers in the present embodiment are made of an acrylic resin, they may be made of an organic resin containing silica particles to obtain the same effects.

In the present embodiment, an ITO film as the transparent electrode is formed on each resin film. Even when another inorganic material (such as indium oxide zinc) is formed on each resin film, the wrinkling of the resin films can be reduced or prevented by providing the wrinkle reduction layers.

The problem of the wrinkling of the resin films is not limited to the case where gaps are formed between the substrate and the resin film and between adjacent resin films and supported by the spacers as in the present embodiment. The same problem is caused in the case where the resin film having a thickness of about 10 $\mu$m or below is tightly arranged onto the substrate and an inorganic material is directly applied onto the resin film. In that case, the wrinkling can be reduced or prevented by providing the wrinkle reduction layer.

The fabrication processes of the liquid crystal display device having the above-mentioned structure will be described with reference to FIGS. 24–27 which simplify the fabrication processes seen from the same cross section as in FIG. 21.

First of all, the alignment film 228 is formed onto the substrate 201 provided with the TFT devices 221, 222, and 223 thereon. Then, cubic interconnection pads 241a and 242a made of a positive type resist and comprising the supporting members 205 and holes 212a and 213a (corresponding to parts of the contact holes 212 and 213) are formed onto the alignment film 228. The resin film 202 is applied onto the supporting members 205 and the pad 241a and 242a by using a laminator, so as to make the structure shown in FIG. 24(a). The resin film 202 is bonded to the supporting members 205 and the cubic interconnection pads 241a and 242a via a very thin adhesive layer of a positive type resist. In FIG. 24(a) the adhesive layer is included in the supporting members 205 and the pads 241a and 242a.

As shown in FIG. 24(b) an acrylic resin is applied as thick as 0.2 $\mu$m onto the resin film 202 by spin coating and hardened to form the wrinkle reduction layer 218. An ITO film is formed as thick as 0.13 $\mu$m onto the wrinkle reduction layer 218 by spattering. Thus, the provision of the wrinkle reduction layer prevents the resin film from being wrinkled by the formation of an ITO film. The ITO film is patterned into the form of a pixel by photolithography and etching with hydroiodic acid, so as to form the pixel electrode 209. The patterning is conducted so as to remove the ITO film from the area corresponding to the hole 212b having a smaller size than the hole 212a as shown in FIGS. 24(b) and 22 and to leave the vicinity of the hole 212b. The pixel electrode 209 in the vicinity of the hole 213a is removed.

Figure 25A:
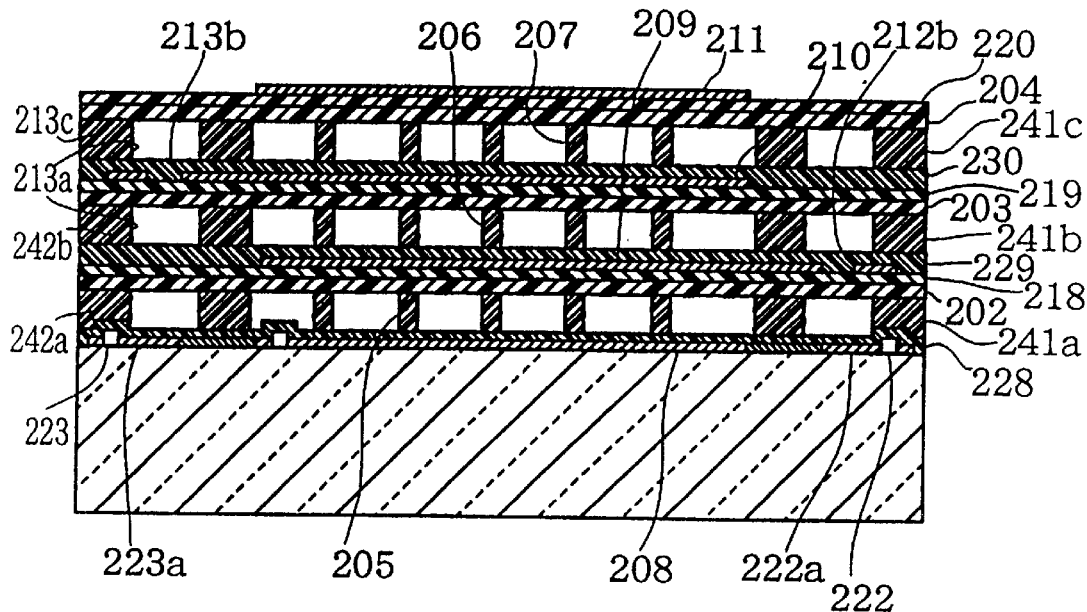
FIGS. 25(a) and 25(b) are illustrations showing fabrication processes of the liquid crystal display device of Embodiment 2-1.

After these processes are conducted once more to form the alignment film 229, the supporting members 206, and the cubic interconnection pads 241a and 242b, the resin film 203 is applied thereonto, and the wrinkle reduction layer 219 and the pixel electrode 210 are formed. The patterning is conducted so as to remove the ITO film from the area of the pixel electrode 210 corresponding to the hole 213b having a smaller size than the hole 213a as shown in FIGS. 25(a) and to leave the vicinity of the hole 213b. In the vicinity of the contact hole 212, the ITO is removed. By conducting the same processes one more time, the structure shown in FIG. 25(a) comprising three resin film layers stacked on the substrate is formed. The common electrode 211 is made by spattering ITO in the same manner as the pixel electrode 209, and a patterning is conducted so as to remove the electrodes in the vicinity of the contact holes 212 and 213.

Figure 25B:
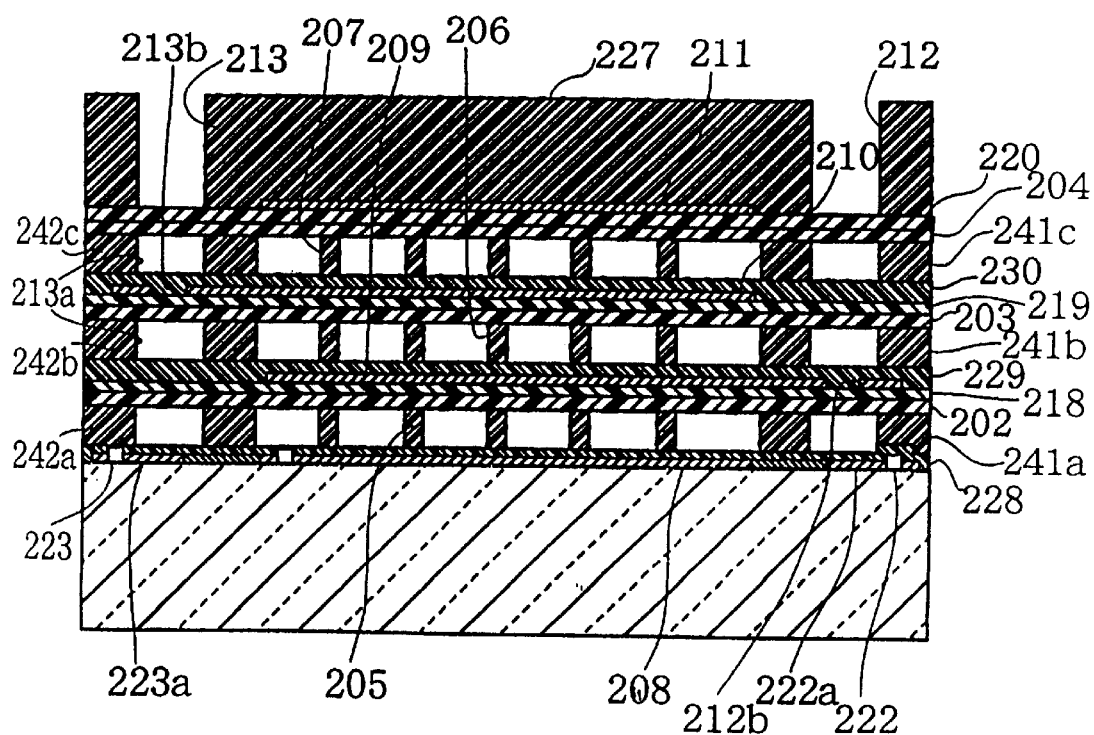

As shown in FIG. 25(b) a positive type resist 227 is applied as thick as 6 $\mu$m, and a mask exposure and developing are conducted so as to remove the resist only from the area of the contact holes 212 and 213.

Then, the contact holes 212 and 213 are formed by the RIE with oxygen plasma which is a kind of dry etching. The resin films, the positive type resist, the alignment film, and the acrylic resin composing the wrinkle reduction layers are etched by the RIE, whereas the pixel electrode made from ITO is hardly etched. In the present embodiment, the resin films and the positive type resist are etched at the rate of 1 $\mu$m-depth per minute with an oxygen flow rate of 15 SCCM and an electric power of 150 W. When the etching is started from the positive type resist 227 side of FIG. 25(b), the etching proceeds exclusively on the surface of the positive type resist 227 and in the contact holes 212 and 213. In the contact holes 212 and 213 the wrinkle reduction layer 220 and the resin film 204 are removed, which is followed by the removal of the alignment film 230, the wrinkle reduction layer 219, and the resin film 203. At this moment, in the contact hole 213 after the alignment film 230 is removed, the wrinkle reduction layer and the resin film are removed exclusively from the internal portion of the hole 213b formed by removing the pixel electrode 210 by a patterning. Since the part of the pixel electrode 210 which is projected inside the contact hole 213 is not etched and left together with the underlying resin film 203, the part of the pixel electrode 210 can be exposed inside the contact hole 213. Then, the alignment film 229, the wrinkle reduction layer 218, and the resin film 202 are removed. The alignment film 229, the wrinkle reduction layer 218, and the resin film 202 are removed only from the areas right under the internal area having the same size as the hole 213b.

In the contact hole 212, on the other hand, after the removal of the alignment film 229, the resin film 202 is removed exclusively from the internal part of the hole 212b which is formed by removing the pixel electrode 209 by patterning. The resin film 202 is left without being etched at the part of the pixel electrode 209 which is projected inside the contact hole 212, so that the pixel electrode 209 is exposed inside the contact hole 212. Furthermore, the alignment film 228 over the connection terminals 222a and 223a of the TFT devices is removed, so that these connection terminals 222a and 223a are exposed inside the contact holes 212 and 213.

Figure 26A:
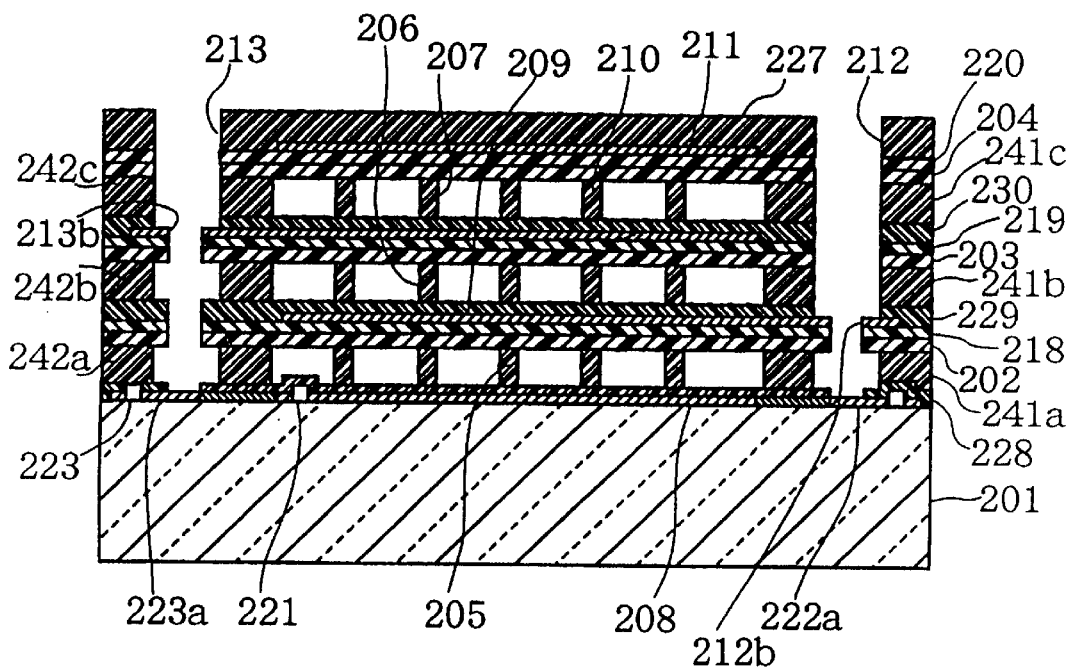
FIGS. 26(a) and 26(b) are illustrations showing fabrication processes of the liquid crystal display device of Embodiment 2-1.

By conducting the RIE for 5 minutes, the pixel electrodes 209 and 210 and the connection terminals 222a and 223a are exposed inside the contact holes 212 and 213 as shown in FIG. 26(a), and the remaining portions are protected by the positive type resist 227.

Figure 26B:
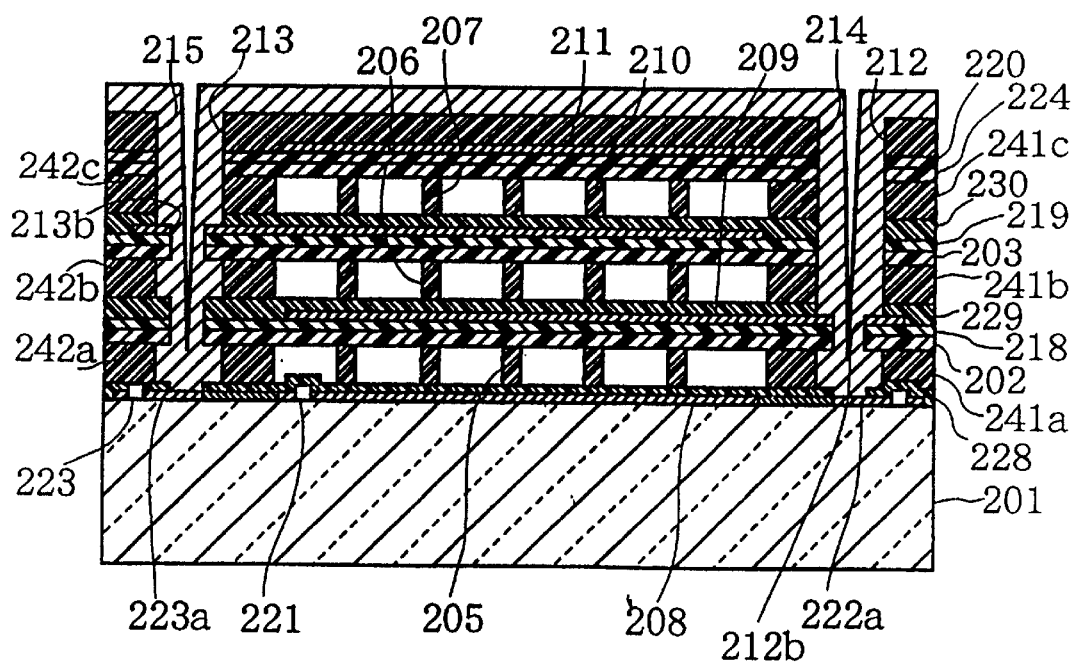
Figure 27:
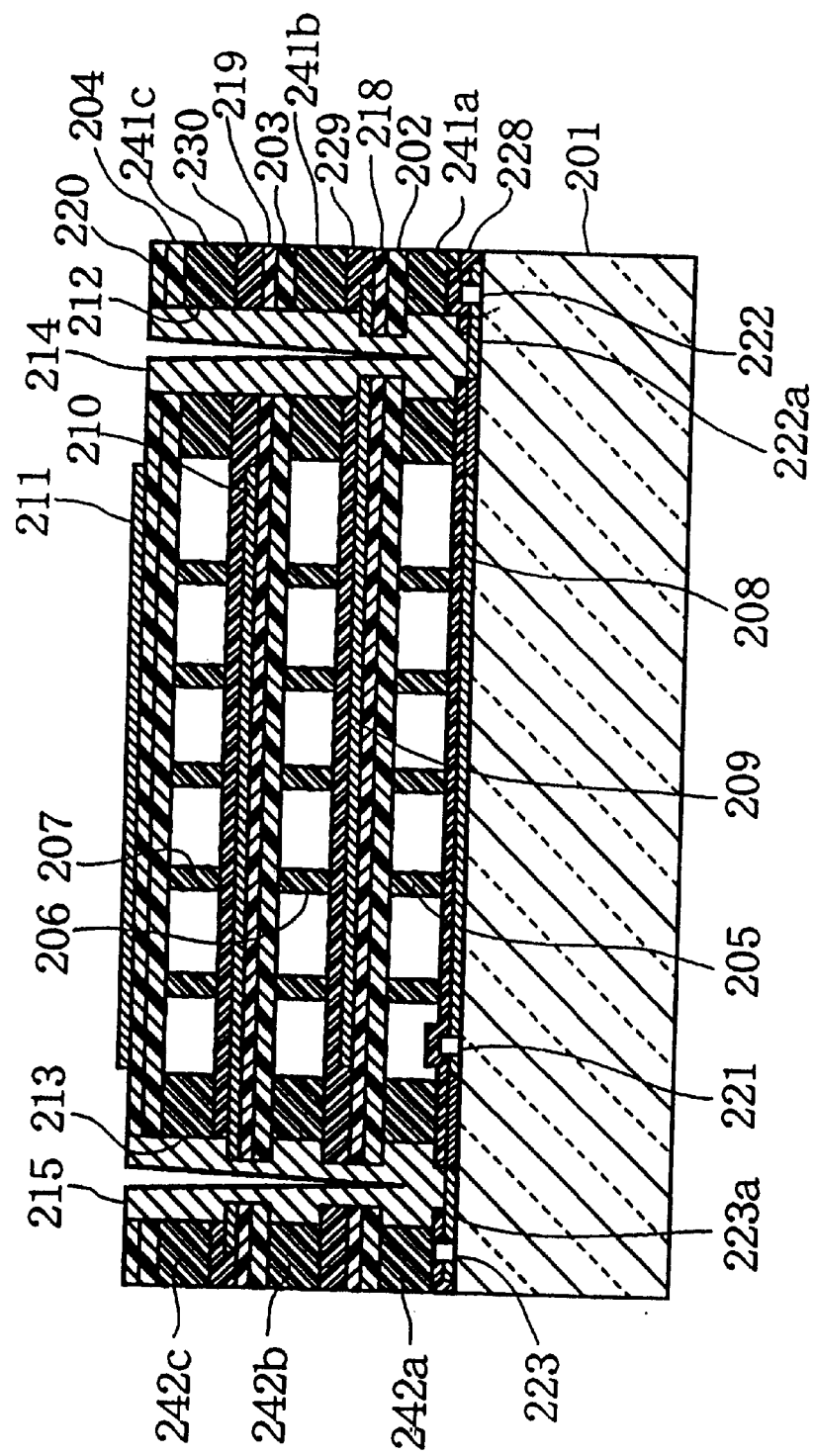
FIG. 27 is an illustration showing a fabrication process of the liquid crystal display device of Embodiment 2-1.

The conductive members 214 and 215 made of a water-soluble carbon resin are applied by spin coating as shown in FIG. 26(b). Consequently, the contact holes 212 and 213 are filled with the conductive members 214 and 215. After that, the positive type resist 227 is removed with a removal solution to make the conductive members applied other than in the contact holes 212 and 213 are separated together with the positive type resist 227. As a result, the structure shown in FIG. 27 is formed where the conductive members 214 and 215 are sealed exclusively into the contact holes 212 and 213. Thus, in the contact holes 212 and 213 the pixel electrodes 209 and 210 exposed inside these contact holes are in contact with the conductive members 214 and 215, securing their connection with the connection terminals 222a and 223a. Consequently, it is secured to control the supply of a voltage onto the pixel electrodes 209 and 210 by the TFT devices 222 and 223 on the substrate.

As a result of these processes, the contact holes can be formed by conducting the formation process only one time while the electric connection being secured in the contact holes. Thus, the contact holes formation process can be simplified.

It may be easily understood that the contact holes can be formed in a single formation process if the process is conducted after all the resin films are stacked, thereby simplifying the production processes. However, when the alignment film for aligning liquid crystal is formed onto the substrate, if the resin films provided with electrodes thereon are merely stacked and then the contact holes are formed after that, the pixel electrodes on the resin films are exposed only on the cross section of the contact holes. When the electrodes are made from ITO, the thickness of the electrodes is often set to be about 0.1 to 0.2 $\mu$m from the optical characteristics. Therefore, when the contact holes are formed and then provided with conductive members in order to be connected with electrodes, the electrodes are in contact with the conductive members only at the cross section whose thickness is 0.1 to 0.2 $\mu$m, which is not sufficient to expect secure connection. In contrast, the structure of the present embodiment where the pixel electrodes are projected and exposed inside the contact holes provides a large area for the pixel electrodes and the conductive members to contact each other, thereby securing their connection.

Although the pixel electrodes are covered with the alignment film in the present embodiment, the pixel electrodes not covered with a resin film like the alignment film can be exposed inside the contact holes, providing the same effects.

Embodiment 2-2

Figure 28:
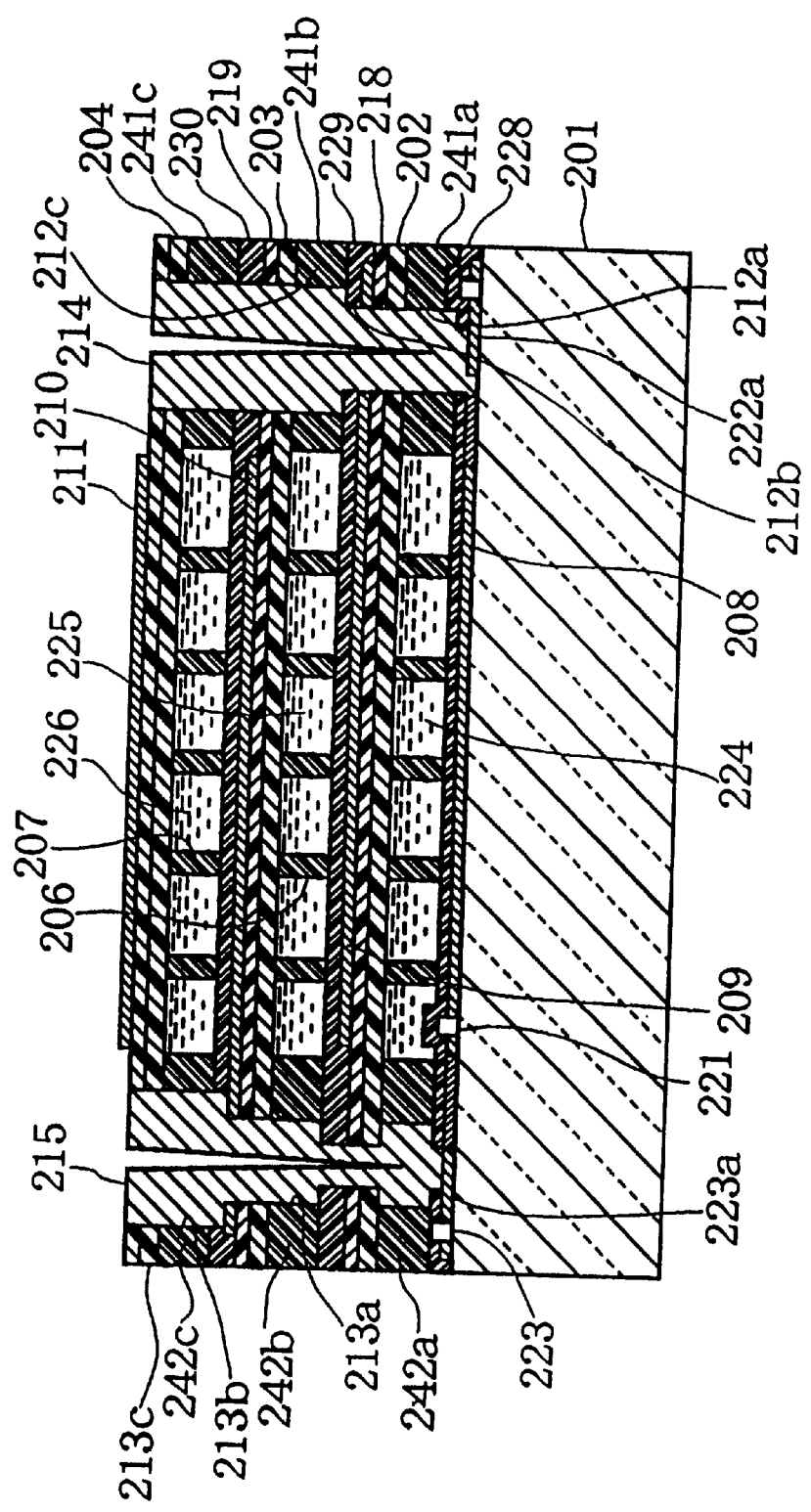
FIG. 28 is a cross sectional view of the main part of the liquid crystal display device of Embodiment 2-2 of the present invention.

FIG. 28 is a cross sectional view of the main part of the liquid crystal display device of Embodiment 2-2. The feature of the present embodiment is that the internal surfaces of the contact holes 212 and 213 have steps so as to expose the pixel electrodes 209 and 210 inside the contact holes 212 and 213, respectively. To be more specific, the contact holes 212 and 213 with steps are formed by making the size of the holes 212b and 212c of the cubic interconnection pads 241b and 241c larger than that of the hole 212a of the cubic interconnection pad 241a, and the size of the hole 213c of the cubic interconnection pad 242c larger than that of the holes 213a and 213b of the cubic interconnection pads 242a and 242b. This structure enables the pixel electrodes to be exposed, without being projected together with the resin films like eaves as in Embodiment 2-1. As a result, it becomes possible to form the contact holes by a single formation process as in Embodiment 2-1 and also to increase the area for the pixel electrodes and the conductive members to be in contact with each other, so as to provide secure connection.

Embodiment 2-3

In Embodiment 2-1, contact holes are formed by patterning a positive type resist and conducting the RIE dry etching. In contrast, in the present embodiment the contact holes are formed by using a laser to remove the resin films in the form of spots. The method of forming contact holes according to the present embodiment will be described with reference to FIG. 29.

Figure 29A:
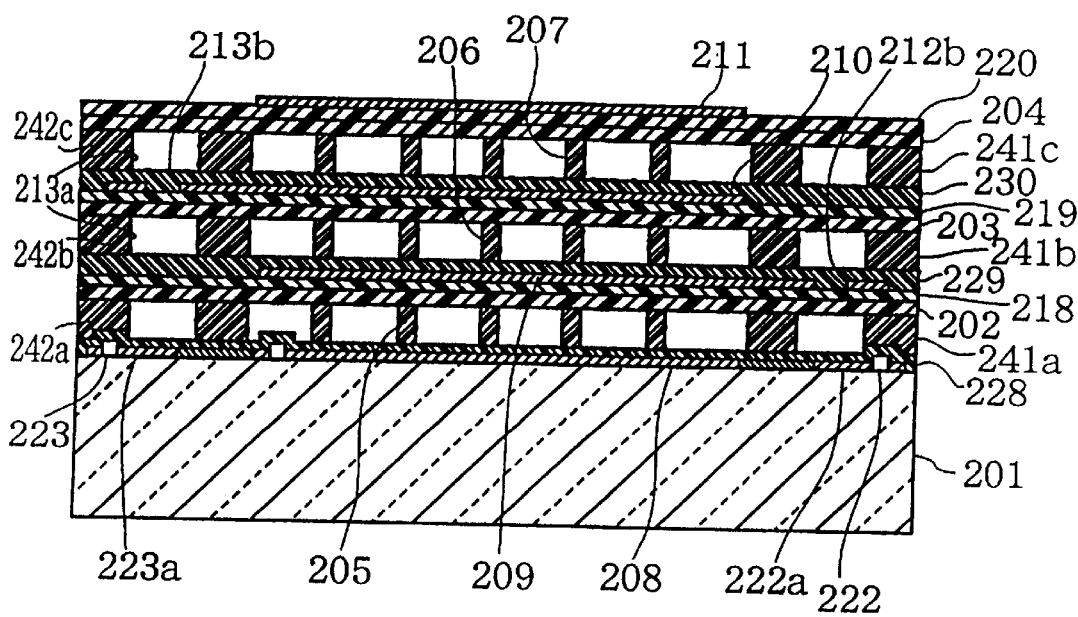
FIGS. 29(a) and 29(b) are illustrations showing fabrication processes of the liquid crystal display device of Embodiment 2-3.
Figure 29B:
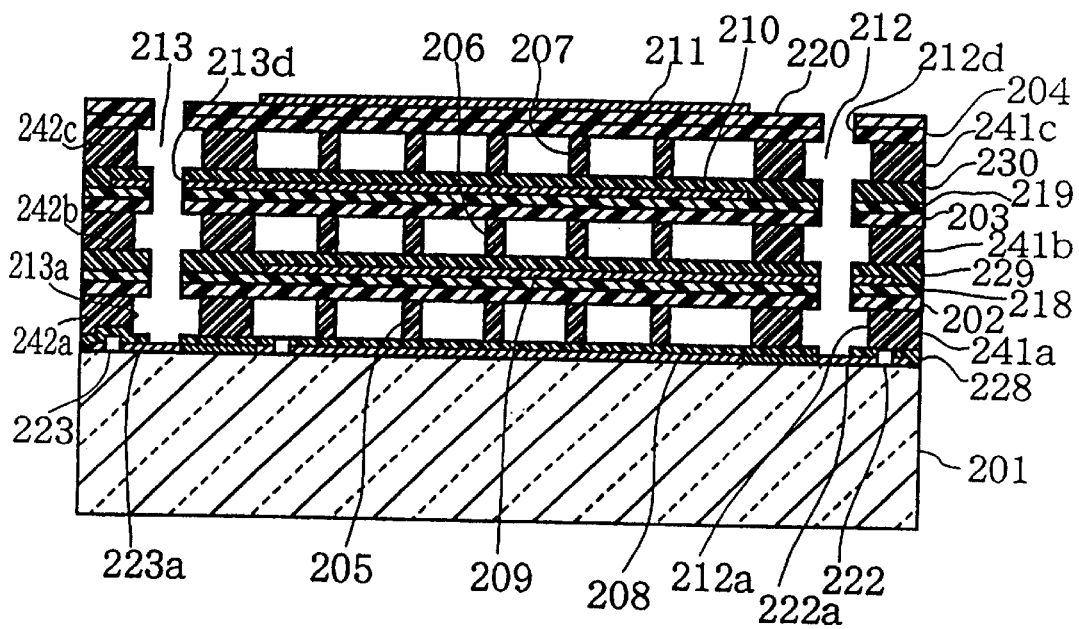
Figure 30A:
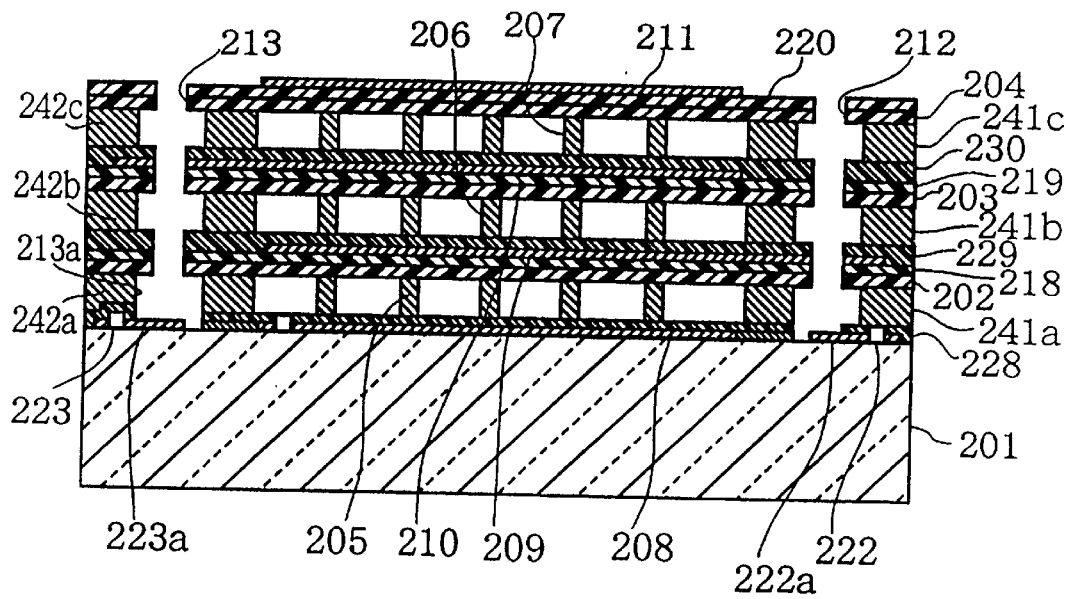
FIGS. 30(a) and 30(b) are illustrations showing fabrication processes of the liquid crystal display device of Embodiment 2-3.
Figure 30B:
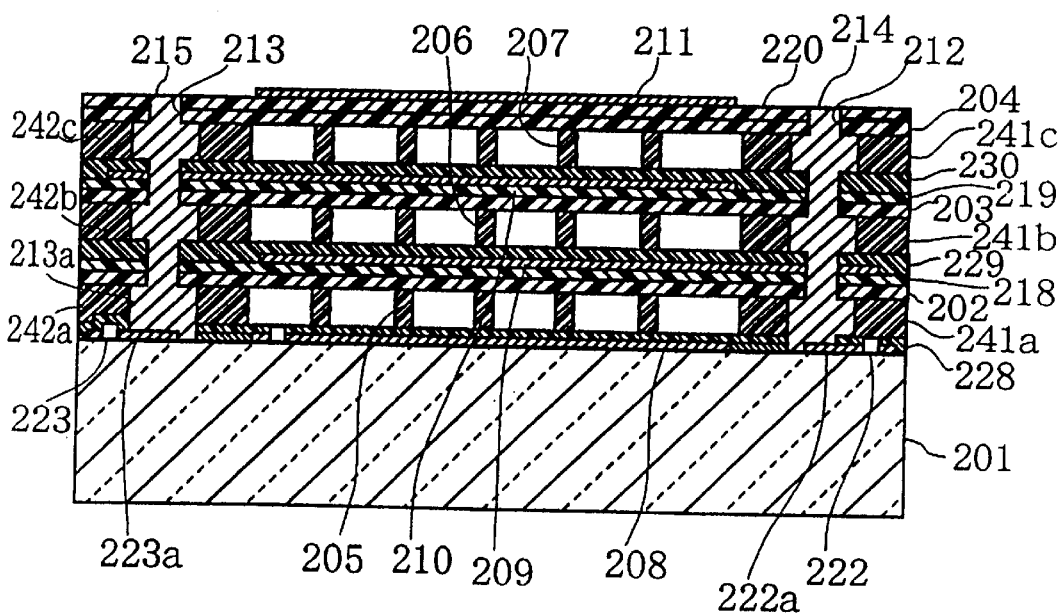

As shown in FIG. 29(a) in the same manner as Embodiment 2-1, three resin films 202, 203, and 204, the pixel electrodes 208, 209, and 210, and the common electrode 211 are stacked on the substrate 201 with spacers and the cubic interconnection pads 241a–241c and 242a–242c therebetween. Then, as shown in FIG. 29(b) a laser is irradiated upon the spots where the contact holes 212 and 213 are formed. The size of the holes 212d and 213d formed by removing the resin films with the laser is made smaller than that of the holes 212a and 213a of the cubic interconnection pads. As a result, like in Embodiment 2-1, the resin films 202 and 203 and the pixel electrodes 209 and 210 can be projected inside the contact holes. However, the pixel electrodes 209 and 210 are not exposed because they are still covered with the alignment films 229 and 230. Therefore, after the formation of the contact holes, before filling the conductive members 214 and 215, the contact holes 212 and 213 are cleaned with a solution which can dissolve the alignment films 229 and 230, so as to expose the electrodes 209 and 210 as shown in FIG. 30(a). Then, as shown in FIG. 30(b) the contact holes 212 and 213 are filled with the conductive members 214 and 215, respectively, so as to connect the electrodes on the resin films and the conductive members. Since this method enables the contact holes to be formed in the electrodes on the resin films and in the resin films at the same time, it is unnecessary to remove the electrodes from the spots where the contact holes are formed, when the electrodes on the resin films are patterned.

Embodiment 2-4

In Embodiment 2-1 spacers are provided between the substrate and the resin films and between adjacent resin films, and liquid crystal is sealed into the gaps. However, in the case where the resin films are merely stacked without providing such gaps, the cubic interconnection of the vertically arranged pixel electrodes can be produced by conducting the contact holes formation process only once. Although the resin films are previously formed into films in Embodiment 2-1, a resin material can be applied onto the substrate so as to make a film. One such example is shown in the present embodiment.

Figure 31A:
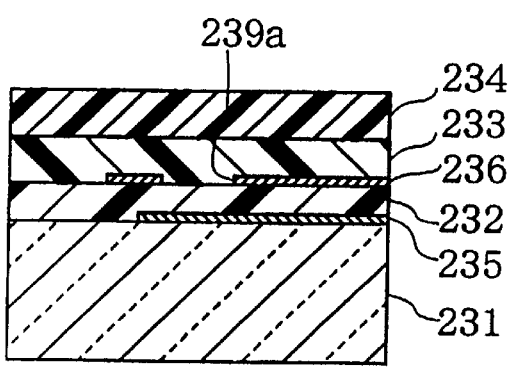
FIGS. 31(a)–31(d) are illustrations showing fabrication processes of the resin film structure of Embodiment 2-4 of the present invention.
Figure 31B:
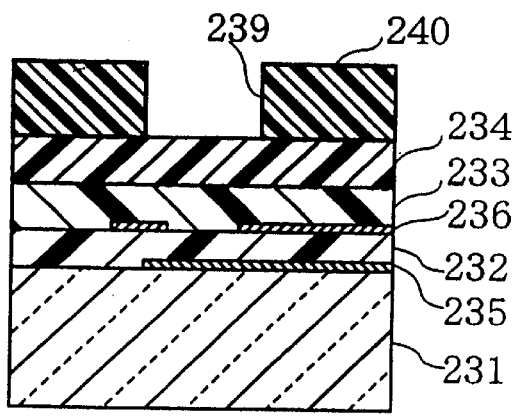
Figure 31C:
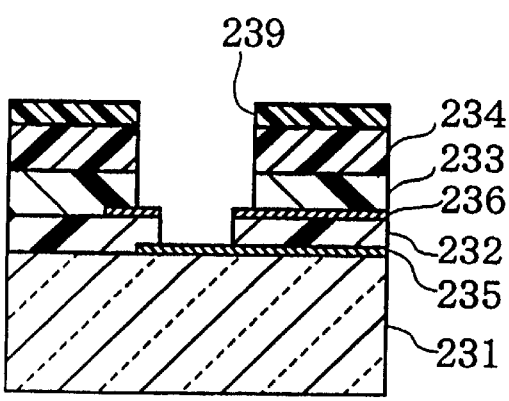
Figure 31D:
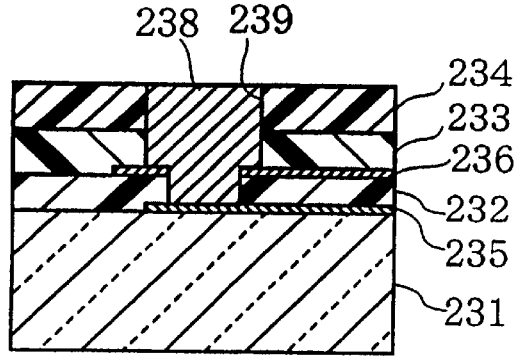

FIGS. 31(a)–31(d) show production processes of the resin film structure according to the present embodiment. The resin film structure can be made of a multi-layer circuit substrate. First, a resin film 232 is applied by spin coating onto a substrate 231 provided with an electrode 235 thereon. The resin film 232 is made of the same acrylic resin as the wrinkle reduction layers used in Embodiment 2-1. An electrode 236 made of ITO is formed onto the resin film 232 and patterning is conducted in such a manner as to remove the portion 239a which is to be the contact hole 239. The resin films 233 and 234 are further applied by spin coating so as to form the structure shown in FIG. 31(a). After these resin films are stacked, a positive type resist 240 is applied as shown in FIG. 31(b), and a portion 239 where the contact hole is formed is removed by mask exposure and developing. Then, the resin films 232, 233, and 234 in the portion 239 for the contact hole are removed by dry etching, so as to expose the electrodes 235 and 236 inside the contact hole, as shown in FIG. 31(c). By filling the contact hole 239 with a conductive member 238 in the same manner as in Embodiment 2-1, the electrodes 235 and 236 are connected with each other via the conductive member 238, thereby realizing cubic interconnection.

Embodiment 2-5

Figure 32A:
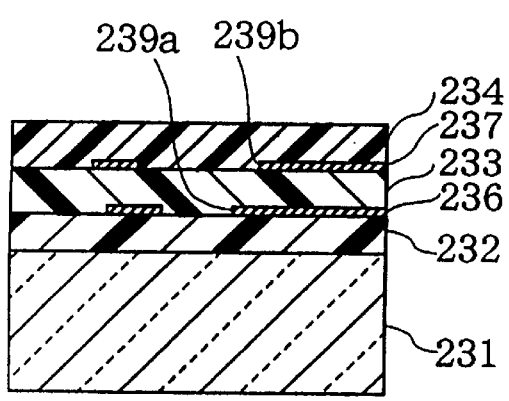
FIGS. 32(a)–32(d) are illustrations showing fabrication processes of the resin film structure of Embodiment 2-5 of the present invention.
Figure 32B:
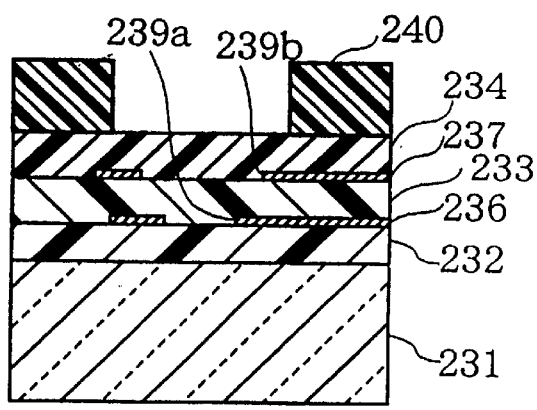
Figure 32C:
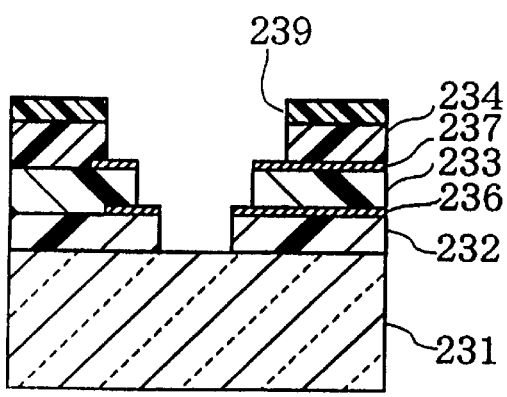
Figure 32D:
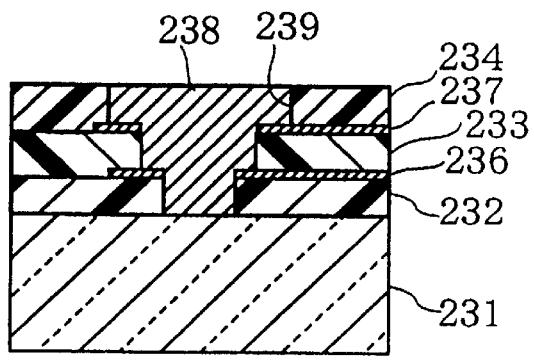

FIGS. 32(a)–32(d) show production processes of the resin film structure of Embodiment 2-5. The present embodiment has a feature of connecting electrodes on different resin films. In other words, the present embodiment basically has the same structure as Embodiment 2-4, but differs in that the electrodes 236 and 237 formed on the resin films 232 and 233, respectively, are connected to each other via the conductive member 238. When the electrodes on the different resin films are connected to each other, as shown in FIG. 32(a) a portion 239a on the electrode 236 which is to be removed to form a contact hole is made smaller than a portion 239b on the electrode 237. Thus, larger areas are removed in upper layers. As a result of the positive type resist 240 being formed as shown in FIG. 32(b) and the contact hole being formed by dry etching as shown in FIG. 32(c), the electrodes 236 and 237 are exposed in the contact hole 239. When the contact hole 239 is filled with the conductive member 238 as shown in FIG. 32(d) the electrodes 236 and 237 are connected each other via the conductive member 238. Thus, both the electrodes 236 and 237 are exposed inside the contact hole, thereby securing the connection between the electrodes.

Embodiment 2-6

Figure 33:
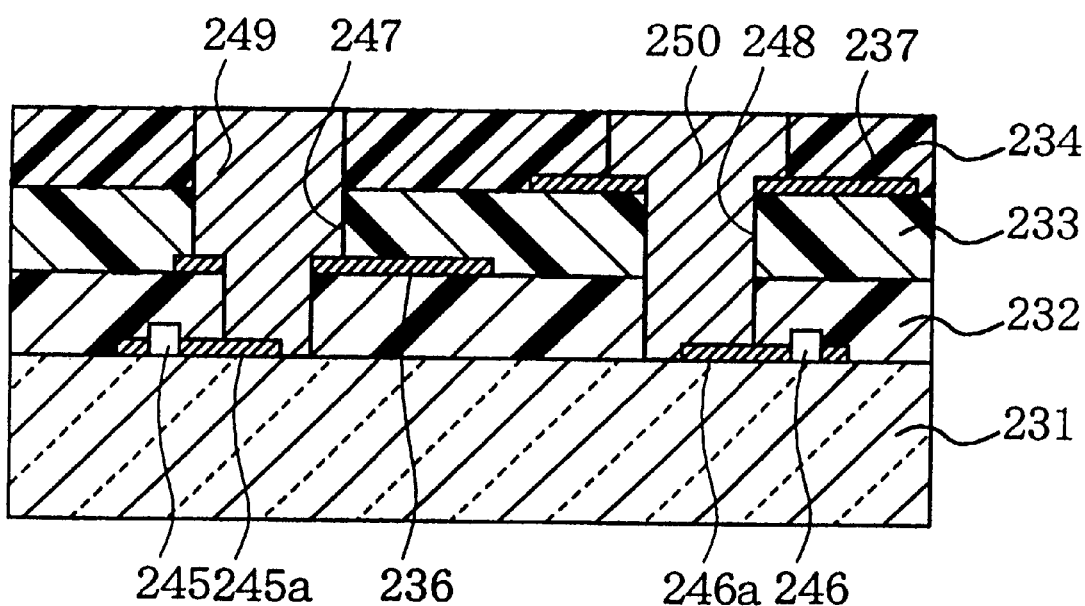
FIG. 33 is a cross sectional view of the resin film structure of Embodiment 2-6 of the present invention.

FIG. 33 shows a cross sectional view of the resin film structure of Embodiment 2-6. While Embodiments 2-4 and 2-5 connect the electrodes each other, the present embodiment has a feature of electrically connecting driving elements 245 and 246 formed on the substrate 231 with the electrodes 236 and 237. The resin film structure is produced as follows. Two contact holes 247 and 248 are formed basically in the same manner as in Embodiments 2-4 and 2-5. Then, parts of the electrodes 236 and 237 are exposed inside the contact holes 247 and 248 so as to be electrically connected with the connection terminals 245a and 246a of the driving elements 245 and 246, respectively, via the conductive members 249 and 250.

Others

Although the conductive members used for the connection in the contact holes are a carbon paint in Embodiments 2-1 through 2-6, other conductive materials can be used as well. For example, a metallic film such as electrodeless plating can be applied onto the surface of the contact holes. In that case, after the formation of the metallic film onto the contact holes, the positive type resist for protecting the resin film is eliminated so as to remove the metallic film formed other than on the contact holes, which brings about the same effects as in Embodiment 2-1.

Embodiments 2-1 through 2-3 show liquid crystal display devices. By disposing a luminophor such as electroluminescence which emits light when there is a voltage supply between the substrate and the resin film or between adjacent resin films, a display device having multi-layer structure with improved reliability concerning electric connection can be obtained.

As shown in Embodiments 2-4 through 2-6, the present invention can be used as something other than display devices. For example, the invention is used for the construction of cubic interconnection of stacked layers in a circuit substrate with resin films.

As described hereinbefore, Embodiments 2-4 through 2-6 achieve the connection between the electrodes formed on different resin films in the resin film structure with stacked resin films by conducting the contact holes formation process one time, which secures the connection in the contact holes.

Furthermore, when a transparent electrode made of an inorganic material such as ITO is formed on the resin films, the resin films are prevented from wrinkling, keeping the surfaces in a smooth state. As a result, the characteristics of the display devices are not lost.

Embodiment 3

Embodiment 3-1

Figure 34:
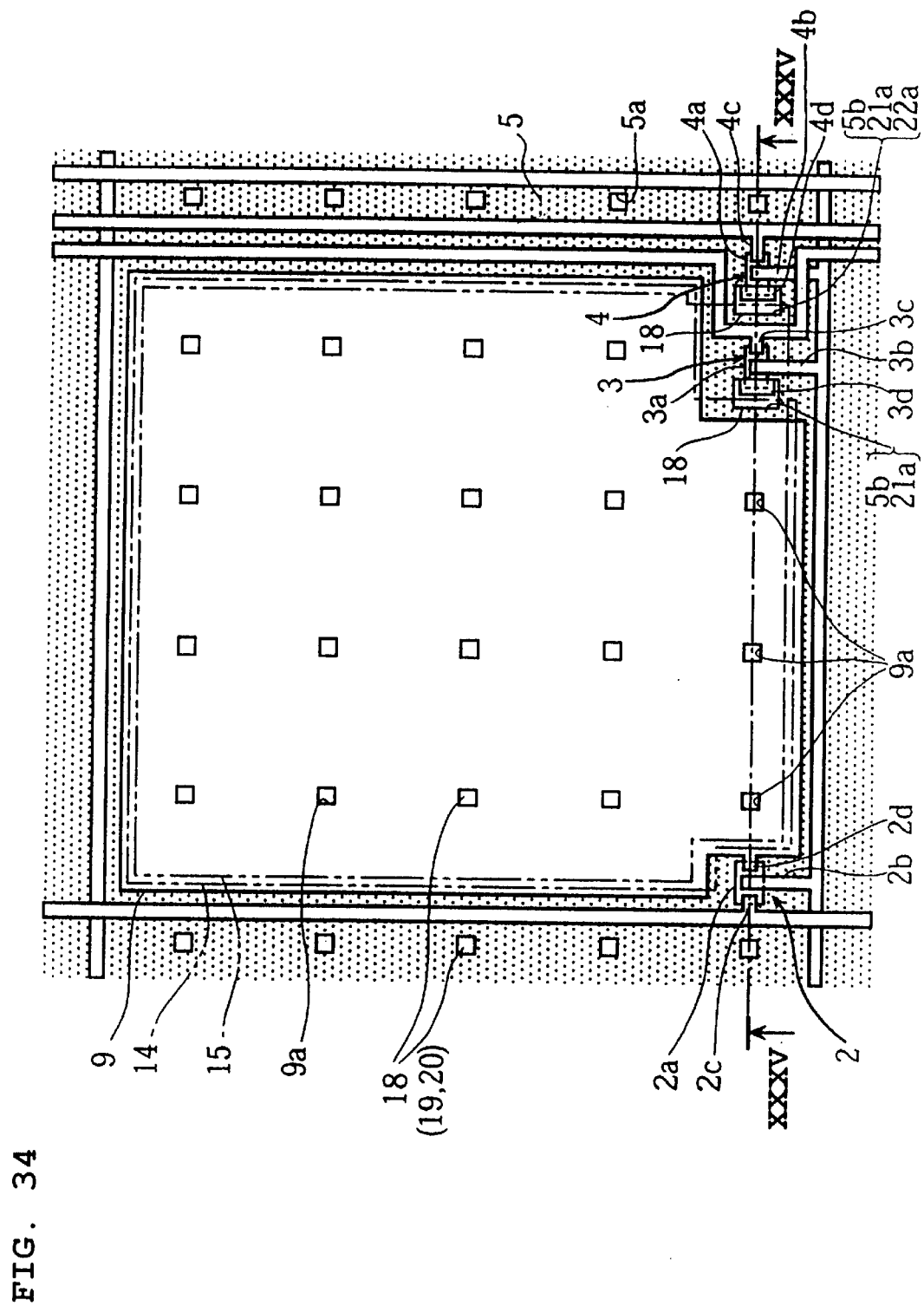
FIG. 34 is a partial plane view showing the structure of one pixel of the liquid crystal display device of Embodiment 3-1 of the present invention.

The liquid crystal display device of Embodiment 3-1 of the present invention will be described as follows based on FIGS. 34 through 43. FIG. 34 is a partial plane view showing the structure of one pixel of the liquid crystal display device, FIG. 35 is a cross sectional view taken along the line indicated with arrows XXXV—XXXV of FIG. 34, and FIGS. 36–43 show the fabrication processes of the liquid crystal display device.

These figures are illustrated in a simplified form with modified scales. The size of each component may be magnified or reduced, and those units which might disturb the understanding of the structure are not illustrated.

First, the structure of the liquid crystal display device will be described based on FIGS. 34 and 35.

Figure 35:
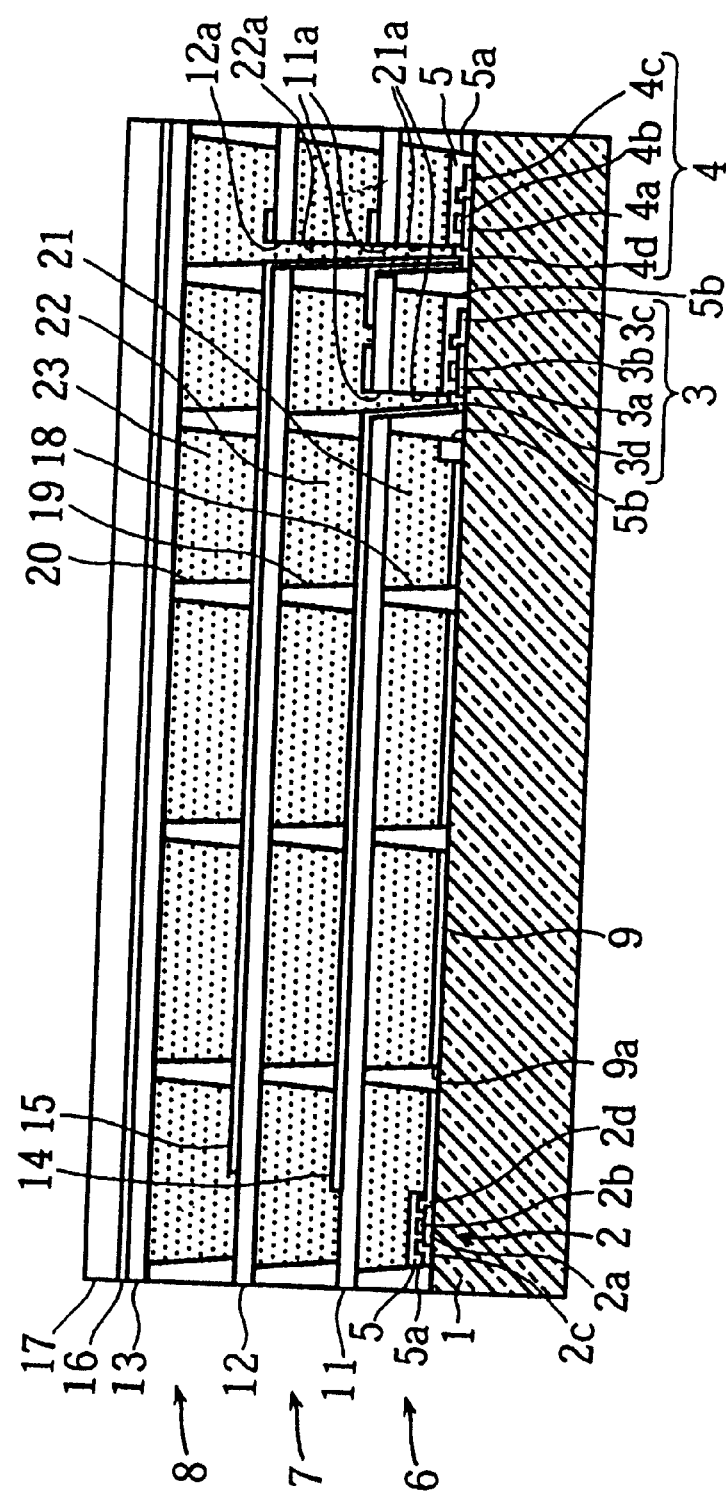
FIG. 35 is a cross sectional view taken along the line indicated with the arrows A—A of FIG. 34.

As shown in FIGS. 34 and 35 TFT devices 2–4 are formed on a substrate 1 made of borosilicate glass. The TFT devices 2–4 comprise semiconductor layers 2a–4a made of amorphous silicon, gate electrodes 2b–4b, source electrodes 2c–4c, and drain electrodes 2d–4d, respectively. The drain electrode 2d of the TFT device 2 is composed of a part of a first pixel electrode 9 formed in the region corresponding to the pixels in the substrate 1.

The first pixel electrode 9 is made of aluminum and serves as a reflective film. A black matrix 5 is provided around the first pixel electrode 9. The black matrix 5, which is made of a resist containing black carbon particles absorbs light incident upon the region other than the first pixel electrode 9 so as to increase the contrast ratio. The first pixel electrode 9 and the black matrix 5 have a number of 7 $\mu$m×7 $\mu$m opening portions 5a and 9a each arranged with a 30 $\mu$m pitch. The black matrix 5 is further provided with opening portions 5b in the drain electrodes 3d and 4d of the TFT devices and in their vicinity (In FIG. 34 the region of the black matrix 5 is illustrated with dots).

Figure 79:
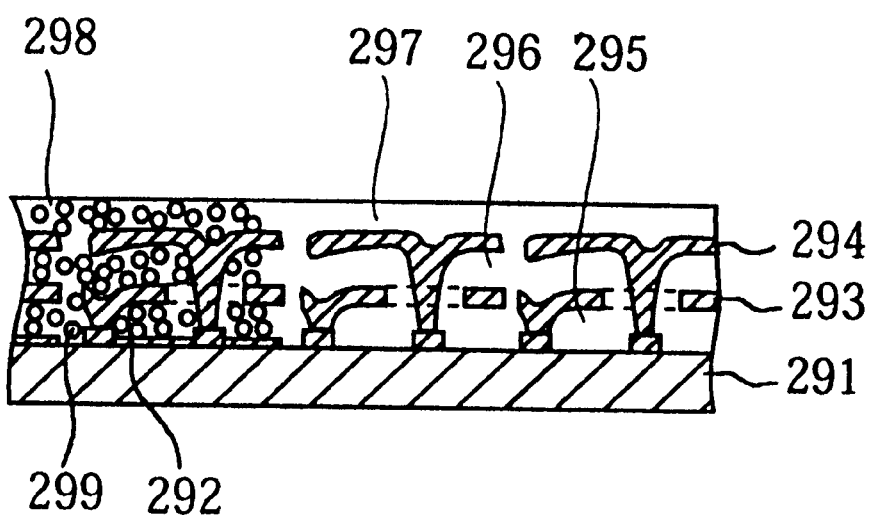
FIG. 79 is a cross sectional view showing the structure of a conventional liquid crystal display device.
Figure 80:
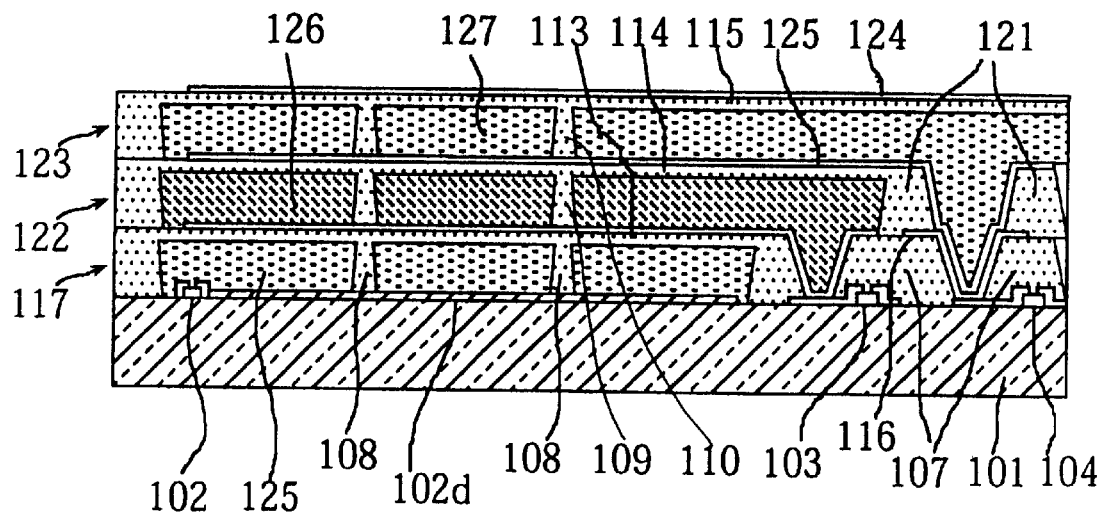
FIG. 80 is a cross sectional view showing the structure of another conventional liquid crystal display device.

At the positions of the opening portions 9a, 5a, and 5b of the first pixel electrode 9 and the black matrix 5, supporting members 18 are arranged as spacers. The supporting members are made of a negative type resist hardened by the exposure via these opening portions 9a, 5a, and 5b and have a height of 4 $\mu$m and a cross section of 7 $\mu$m×7 $\mu$m. A sealing plate 11 is provided on the supporting members 18 while being supported by the supporting members 18 so as to have a distance of 4 $\mu$m from the substrate. A liquid crystal layer 21 is provided between the substrate 1 and the sealing plate 11. The liquid crystal layer 21 is so-called polymer diffusion type liquid crystal wherein guest host liquid crystal containing fluoric nematic liquid crystal and cyan dichroic dye dissolved therein is held in acrylic polymer network. Since the liquid crystal layer 21 is sealed with the sealing plate 11, the amount of the network polymer in the liquid crystal layer 21 does not have to be larger than fixing the sealing plate 11. Therefore, as compared with the liquid crystal display device shown in FIG. 79, the liquid crystal makes up a larger proportion of the liquid crystal layer, thereby making the substantial open area ratio larger, so that a high contrast ratio can be obtained. The sealing plate 11 and the liquid crystal layer 21 are respectively provided with opening portions 11a and 21a for cubic interconnection above the drain electrodes 3d and 4d of the TFT devices 3 and 4.

The first pixel electrode 9, the liquid crystal layer 21, the supporting members 18, and the sealing plate 11 compose a first display layer 6, above which a second display layer 7 and a third display layer 8 are stacked. Similar to the first display layer 6, the second display layer 7 is composed of a second pixel electrode 14, a liquid crystal layer 22, supporting members 19, and a sealing plate 12, and the third display layer 8 is composed of a third pixel electrode 15, a liquid crystal layer 23, supporting members 20, and a sealing plate 13.

In the second display layer 7 the guest host liquid crystal for the liquid crystal layer 22 has a dichroic dye of magenta. The second pixel electrode 14 formed in the region corresponding to the pixels on the sealing plate 11 is composed of a transparent conductive film made of ITO in place of aluminum. The second pixel electrode 14 is connected with the drain electrode 3d of the TFT device 3 via the opening portions 11a and 21a of the sealing plate 11 and the liquid crystal layer 21. Furthermore, the sealing plate 12 and the liquid crystal layer 22 are provided with opening portions 12a and 22a for cubic interconnection only on the position above the drain electrode 4d of the TFT device 4.

On the other hand, the third display layer 8 comprises a yellow dichroic dye contained in the liquid crystal layer 23, and the third pixel electrode 15 is made of the same transparent conductive film as the second pixel electrode 14, and is connected with the drain electrode 4d of the TFT device 4 via the opening portions 12a, 22a, 11a, and 21a of the sealing plate 12, the liquid crystal layer 22, the sealing plate 11, and the liquid crystal layer 21, respectively. The sealing plate 13 and the liquid crystal layer 23 have no opening portions.

Similar to the supporting members 18 of the first display layer 6, the supporting members 19 and 20 of the second display layer 7 and the third display layer 8, respectively, are made of a negative type resist hardened by the exposure via the opening portions 9a, 5a, and 5b of the first pixel electrode 9 and the black matrix 5. As a result, the supporting members 19 and 20 are arranged in the exact same position as the supporting members 18. In the guest host liquid crystal contained in the liquid crystal layers 21–23 of the display layers 6–8, the concentration of the dichroic dye of cyan, magenta, and yellow is controlled to make an appropriate color balance.

A common electrode 16, which is made of a transparent conductive film and common to all the pixels is provided on the sealing plate 13 of the third display layer 8. Also, a protection film 17 made of a transparent resin is formed on the common electrode 16 so as to protect the liquid crystal display device from external pressure or the like.

In the liquid crystal display device thus structured, the voltages to be supplied to the first to third pixel electrodes 9, 14 and 15 are controlled via the TFT devices 2–4, so as to change the voltages between the first pixel electrode 9 and the second pixel electrode 14, between the second pixel electrode 14 and the third pixel electrode 15, and between the third pixel electrode 15 and the common electrode 16, that is, the voltages to be supplied to the liquid crystal layers 21–23. According to the changes, the amount of light of each color absorbed in each of the display layers 6–8 also changes. The light (external light) incident from the protection film 17 side penetrates the third, second, and first display layers 8, 7, and 6 in that order, and is reflected by the first pixel electrode 9. Then, while it goes back through the first, second, and third display layers 6, 7, and 8 in that order, each color light is absorbed in accordance with the supplied voltage, so as to conduct color display by the subtractive process.

The following is a description on the size, pitch, and open area ratio of the supporting members 18–20 in the above-mentioned liquid crystal display device.

The open area ratio of the liquid crystal display device is the product of the ratio of the area for the pixels to the area for the display screen (the open area ratio of the pixels in the display screen) and the ratio of the area for the region excluding the supporting members 18–20 to the area for the pixels (the open area ratio in the pixels). Since the open area ratio of the pixels in the display screen is determined by the area occupied by the TFT devices 2–4, and their source and gate lines, to increase the entire open area ratio requires increasing the open area ratio in the pixels. In other words, as the pitch of each of the supporting members 18–20 becomes larger and as the size of the supporting members 18–20 become smaller, the open area ratio can be larger and the contrast ratio can be higher.

Figure 82:
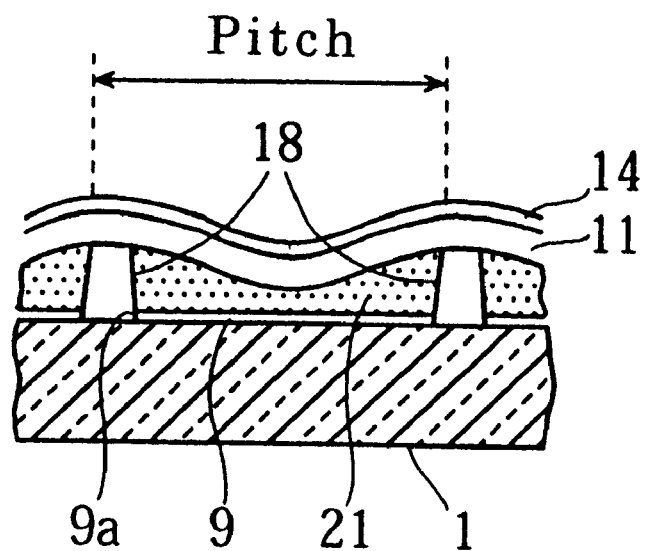
FIG. 82 is an illustration showing the pitch conditions of the supporting members.
Figure 83:
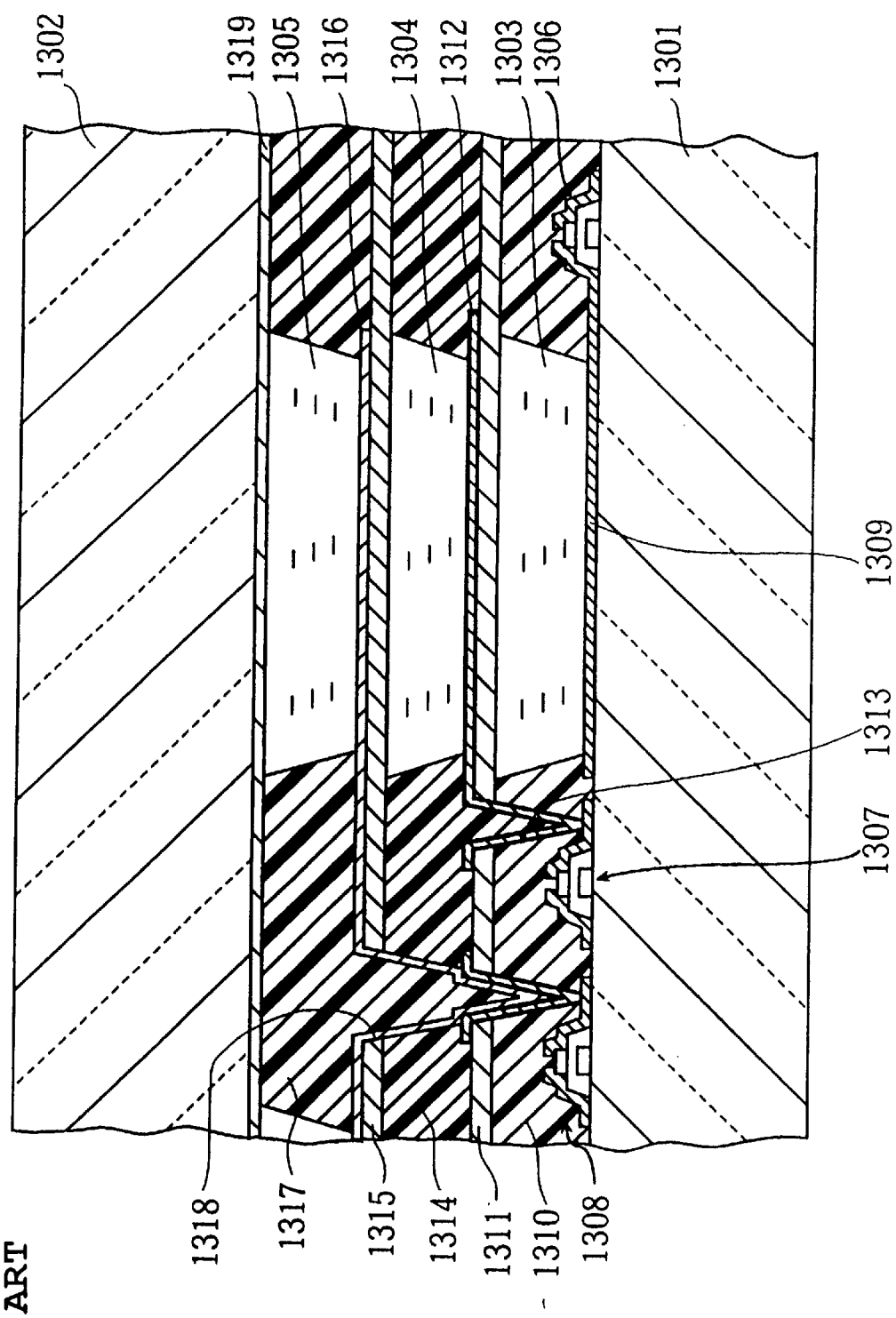
FIG. 83 is a cross sectional view showing the rough structure of a conventional liquid crystal display device.

However, when the pitch of each of the supporting members 18–20 is 50 µm or larger, the sealing plate 11 bends down between adjacent supporting members 18 as shown in FIG. 82, making it difficult to keep the liquid crystal layer 21 at a fixed thickness. Therefore, in order to keep the liquid crystal layer 21 at a fixed thickness, it is preferable to form the supporting members 18 at a high density. For example, setting the pitch of the supporting members 18 at 30 µm enables the liquid crystal layer 21 to have a fixed thickness, so as to obtain a high open area ratio.

Figure 81A:
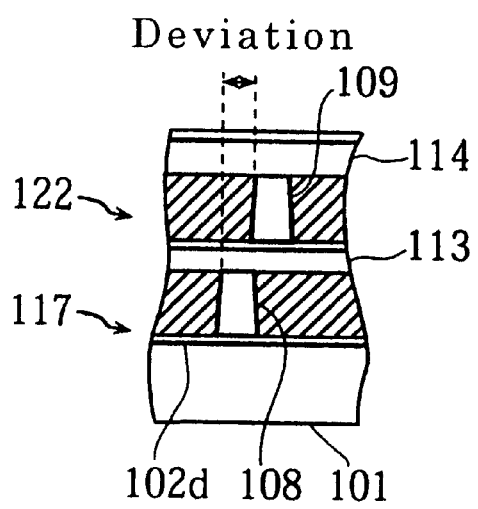
FIGS. 81(*a*)–81(*c*) are illustrations showing examples of inconvenient conditions caused by positional deviation of the supporting members.
Figure 81B:
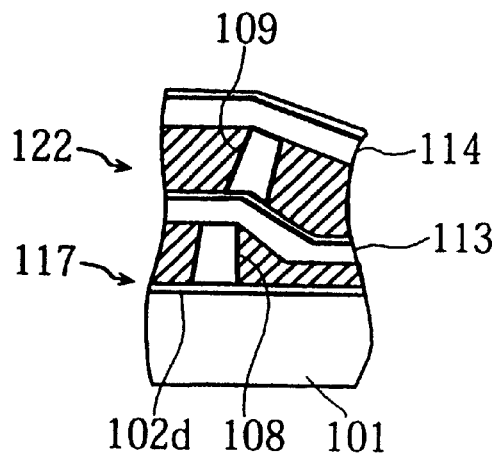
Figure 81C:
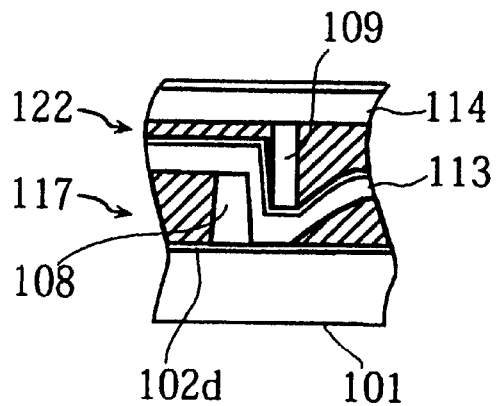

In the case where the alignment precision of the supporting members 18–20 is low, the size of the supporting members 18–20 must be increased in order to prevent the inconvenience shown in FIGS. 81(a)–81(c). When the supporting members 18 have a square cross section of 10 µm×10 µm, their area accounts for 10% or more of the pixel area, so that the open area ratio in the pixels is reduced and the contrast ratio is decreased. In contrast, in the present embodiment the supporting members 18–20 of the display layers 6–8 are made of a negative type resist hardened by the exposure through the opening portions 9a, 5a, and 5b of the first pixel electrode 9 and the black matrix 5, so that the supporting members 18–20 are arranged in the exact same positions, not causing the above-mentioned inconvenience. This makes it possible to reduce the cross section of the supporting members 18–20 to a square of 7 µm×7 µm or so, thereby obtaining a 95% or higher open area ratio in the pixels. Since the liquid crystal layers 21–23 contain polymer network, the substantial open area ratio becomes slightly smaller than this.

The method for fabricating the above-mentioned liquid crystal display device will be described as follows based on FIGS. 36 through 43.

The following fabrication processes are mainly conducted in a yellow room irradiated by light having a long wavelength which does not expose a photosensitive material such as a negative type resist in order to prevent unnecessary exposure.

(1) As shown in FIG. 36(a) the TFT devices 2–4 made of amorphous silicon are formed onto the substrate 1 made of borosilicate glass. Then, an aluminum reflective film is formed by vacuum deposition and patterned into the form of pixel by photolithography and etching, so as to produce the first pixel electrode 9 which serves both as the reflective film and the drain electrode 2d of the TFT device 2. In the patterning, the opening portions 9a are also formed.

(2) As shown in FIG. 36(b) after a carbon-contained positive type resist is applied as thick as 1 µm, mask exposure and developing are conducted to the region for the first pixel electrode 9 and to the region for the opening portions 5a and 5b so as to form a black matrix 5 having the opening portions 5a and 5b.

Then, the supporting members 18 are formed by the following processes (3)–(5).

Figure 37C:
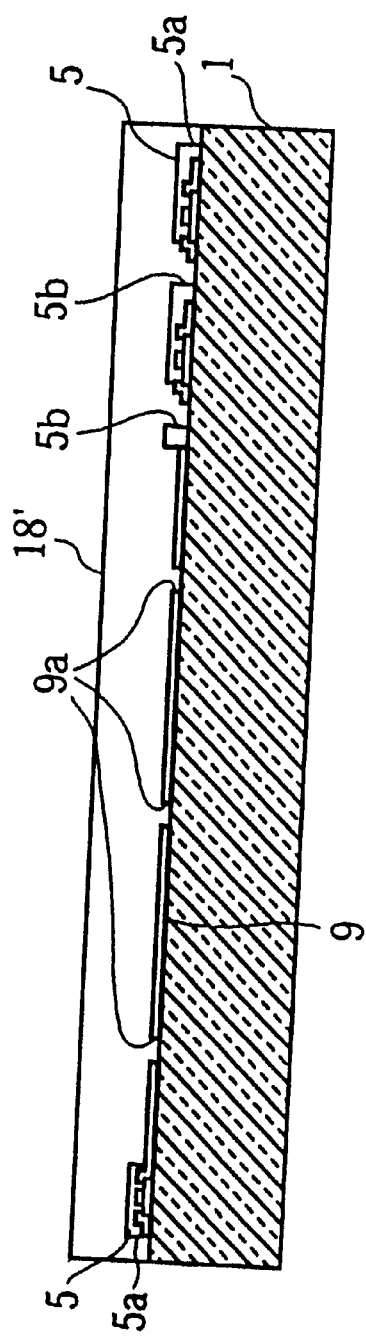
FIGS. 37(c) and 37(d) are illustrations showing fabrication processes of the liquid crystal display device of Embodiment 3-1.

(3) As shown in FIG. 37(c) after a negative-type resist 18' for forming the supporting members 18 is applied by a spin coat (for 30 seconds at the rate of 600 rpm) onto the substrate 1 provided with the first pixel electrode 9 and the black matrix 5 thereon, a pre-baking is conducted (for 3 minutes at 80° C. on a hot plate).

Figure 37D:
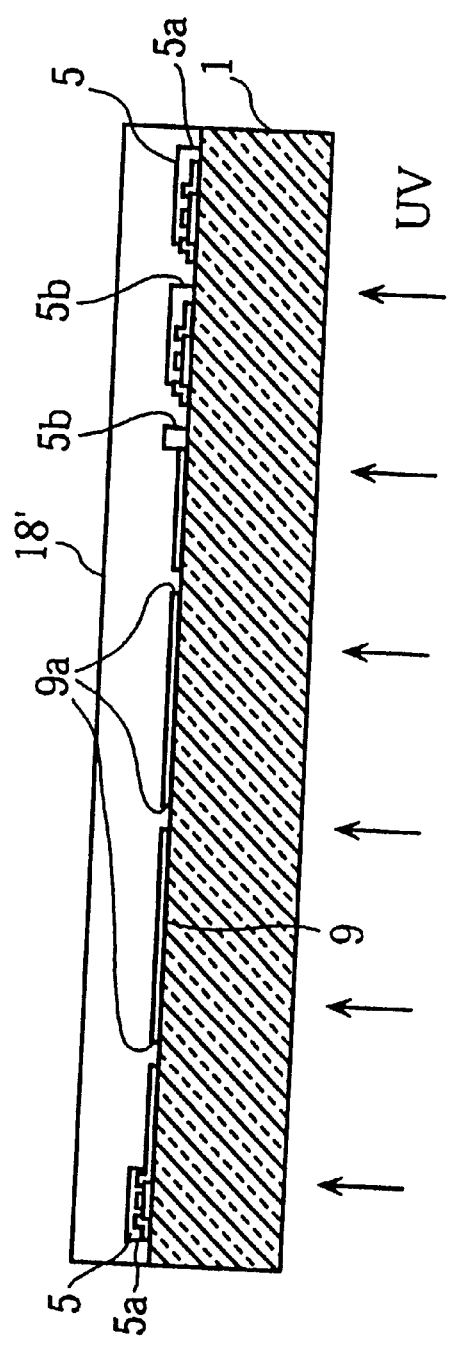

(4) As shown in FIG. 37(d) an ultraviolet (UV) ray of 100 mJ/cm² is irradiated from the substrate 1 side. As a result, with the first pixel electrode 9 and the black matrix 5 as a mask, the negative type resist 18' on the opening portions 9a, 5a, and 5b is exclusively exposed. To be more specific, a back side exposure (self alignment) is conducted to exclusively expose the region where the supporting members 18 are formed, so as to harden the negative type resist 18' as a result of polymerization.

(5) The negative type resist 18' is developed with a developing solution and then baked (for 1 hour at 120° C.). As a result, the supporting members 18 are formed as high as 4 µm in the regions for the opening portions 9a, 5a, and 5b as shown in FIG. 38(e).

(6) As shown in FIG. 38(f) after a separate layer 26 is formed on the surface of the transfer member 27 made of an ultraviolet-permeable glass having a fixed mask pattern 27a, the sealing plate 11 is formed (In FIG. 38(f) the surface having the sealing plate 11 is drawn downward).

The mask pattern 27a is formed in positions corresponding to the drain electrodes 3d and 4d of the TFT devices 3 and 4 so as to shield the light. To be more specific, the formation of the separate layer 26 can be conducted by applying a 10 wt % aqueous solution of polyvinyl alcohol (hereinafter referred to as PVA) by spin coat (for 30 seconds at the rate of 2000 rpm) and drying it for 2 minutes on a hot plate of 110° C. The sealing plate 11 is formed by applying a negative type resist onto the separate layer 26 by a spin coat (for 30 minutes at the rate of 2000 rpm) and conducting a pre-baking.

Figures 39G, 39H:
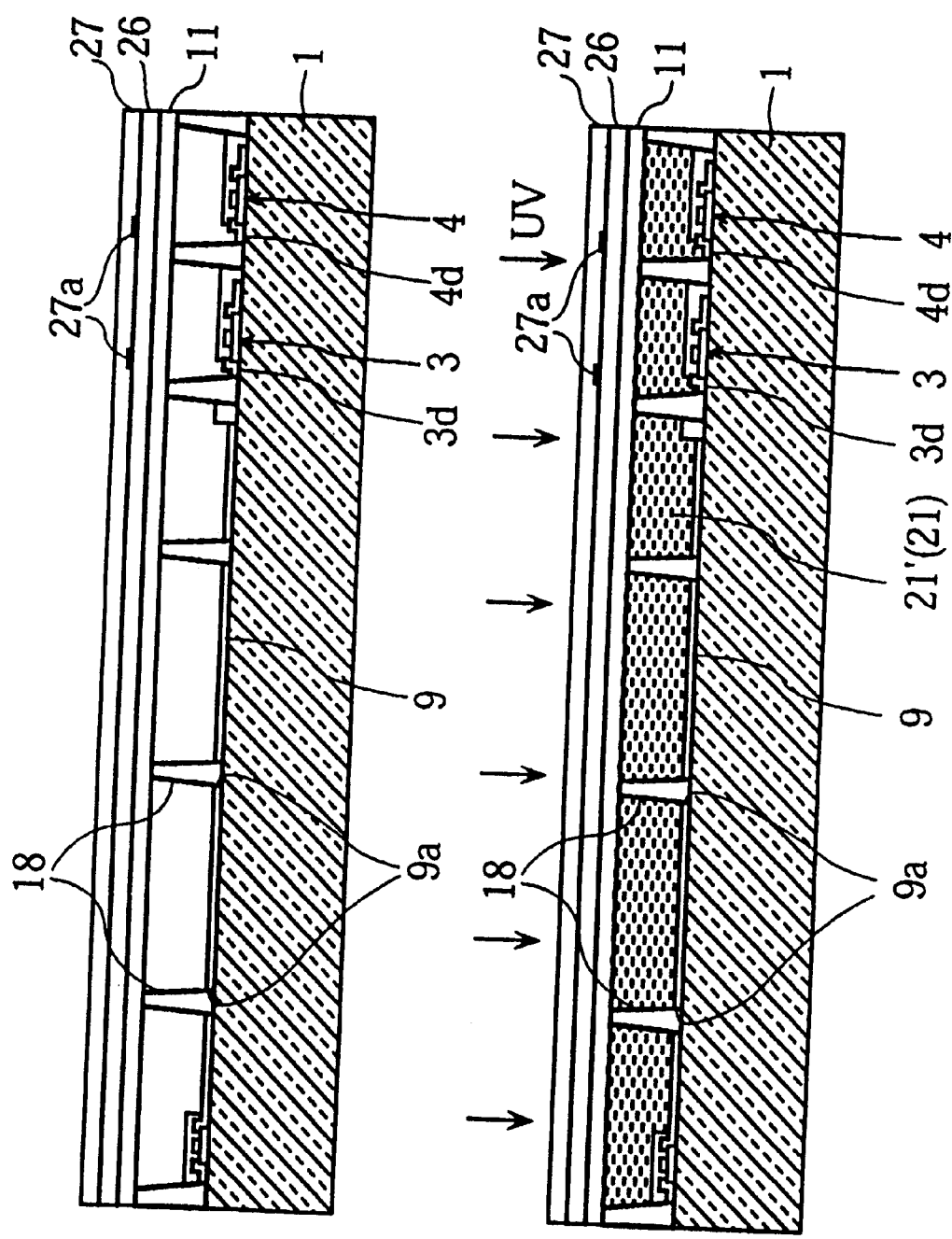
FIGS. 39(g) and 39(h) are illustrations showing fabrication processes of the liquid crystal display device of Embodiment 3-1.

(7) As shown in FIG. 39(g) the transfer member 27 is combined with the substrate 1 so as to bond the sealing plate 11 to the supporting materials 18. In the combination, mask alignment is so conducted that the mask pattern 27a of the transfer member 27 corresponds to the drain electrodes 3d and 4d of the TFT devices 3 and 4, so as to form a 4 µm gap between the substrate 1 and the sealing plate 11.

(8) A mixture solution 21' is prepared by mixing guest host liquid crystal and a polymer precursor in a ratio of 80 wt %:20 wt %. The guest host liquid crystal comprises fluoric nematic liquid crystal and a dichroic dye of cyan dissolved therein and the polymer precursor contains a 3 wt % photopolymerization initiator. The mixture solution 21' is implanted into the gap between the substrate 1 and the sealing plate 11, and a UV ray of 500 mJ/cm² is irradiated from the transfer member 27 side as shown in FIG. 39(h).

As a result of the irradiation of the UV ray, the negative type resist of the sealing plate 11 is polymerized in the region except the drain electrodes 3d and 4d of the TFT devices 3 and 4 shielded by the mask pattern 27a of the transfer member 27, and the polymer precursor in the mixture solution 21' implanted into the gap is also polymerized, so as to form the liquid crystal layer 21, which is a polymer diffusion type liquid crystal where the guest host liquid crystal is diffused and retained in polymer network. The sealing plate 11 is fixed on the substrate 1 by the polymer network composing the liquid crystal layer 21.

(9) As shown in FIG. 40(i) when the substrate 1 is soaked in hot water, the separate layer 26 is dissolved so as to separate the sealing plate 11 from the transfer member 27. As a result, the first display layer 6 comprising the liquid crystal layer 21 sealed between the substrate 1 and the transferred sealing plate 11 is formed.

(10) By developing the sealing plate 11 with a developing solution of a negative type resist, the part of the sealing plate 11 corresponding to the region above the drain electrodes 3d and 4d of the TFT devices 3 and 4 which is not exposed due to the mask pattern 27a during the irradiation of the UV ray in the process (8) is eliminated so as to form the opening portions 11a as shown in FIG. 40(j). Furthermore, the part of the liquid crystal layer 21 above the drain electrodes 3d and 4d of the TFT devices 3 and 4 is not exposed to the UV ray, so that the polymer precursor is prevented from being polymerized, which fails to form a polymer diffusion type liquid crystal. As a result, the part of the liquid crystal layer 21 is easily washed out with the developing solution of the sealing plate 11 and the opening portions 21a are formed.

Figure 41K:
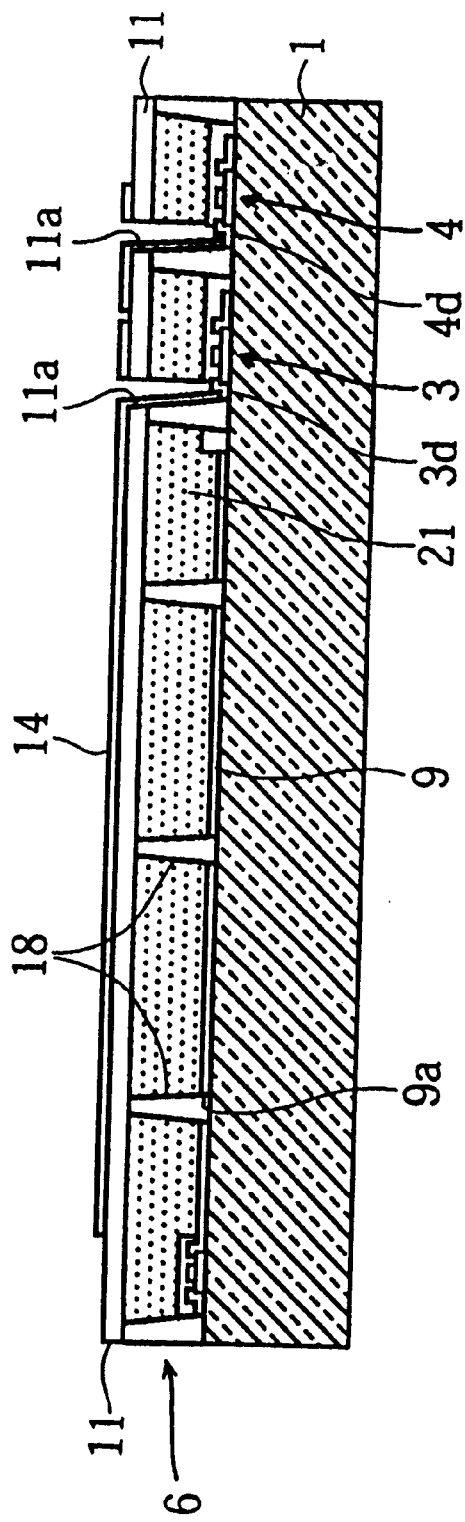
FIG. 41(k) is an illustration showing a fabrication process of the liquid crystal display device of Embodiment 3-1.

(11) As shown in FIG. 41(k) an ITO transparent conductive film is formed by spattering onto the sealing plate 11 and patterned into the form of pixel by photolithography and etching so as to form the second pixel electrode 14. The second pixel electrode 14 is connected with the drain electrode 3d of the TFT device 3 via the transparent conductive film formed in the opening portions 11a of the sealing plate 11 and on the side walls of the supporting members 18, so that the voltage of the second pixel electrode 14 is controlled by the TFT device 3. In order to facilitate the formation of the transparent conductive film onto the side walls of the supporting members 18, so-called heat drips may be slightly caused in the supporting members 18 by a post-baking so as to make the supporting members 18 tapered.

Figure 42L:
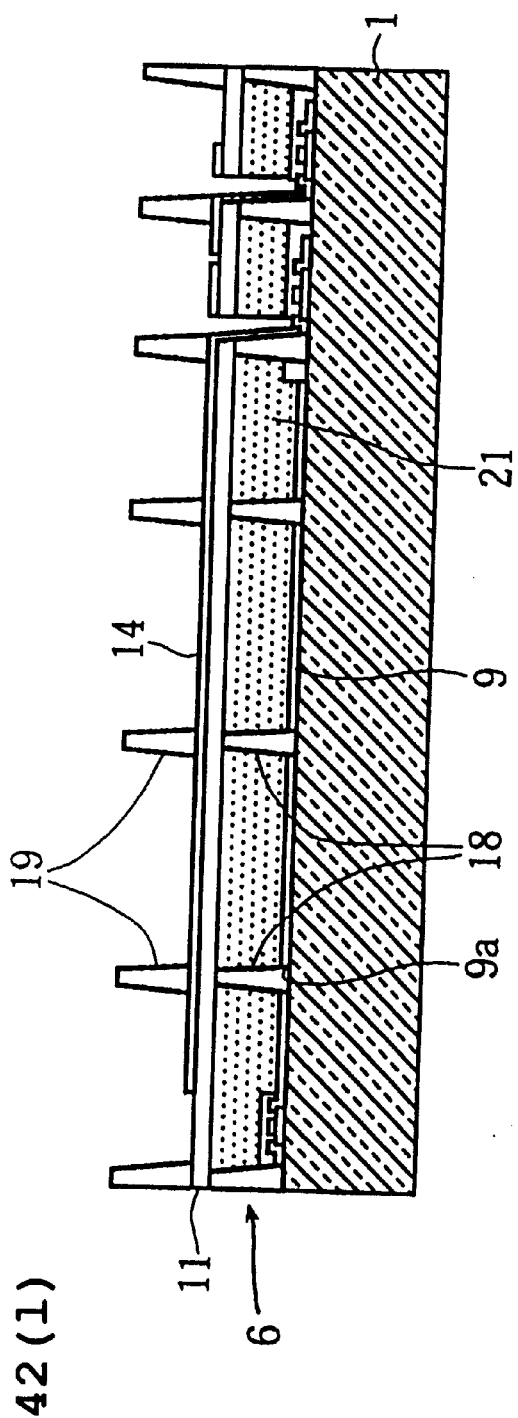
FIGS. 42(l) and 42(m) are illustrations showing fabrication processes of the liquid crystal display device of Embodiment 3-1.
Figure 42M:
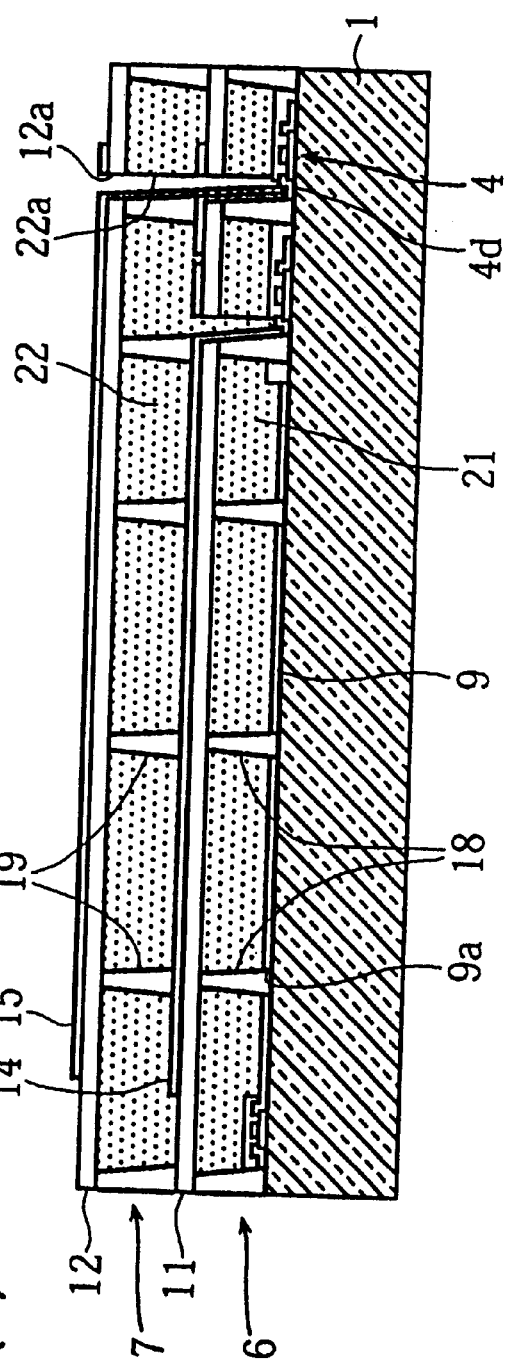

(12) The second display layer 7 is formed basically in the same manner as the processes (3)–(11). To be more specific, after the supporting members 19 are formed as shown in FIG. 42(l), the liquid crystal layer 22, the sealing plate 12, and the third pixel electrode 15 are formed as shown in FIG. 42(m). The formation process of the second display layer 7 differs from that of the first display layer 6 only in the following aspects. The guest host liquid crystal contained in the liquid crystal layer 22 has a dichroic dye of magenta in place of cyan. Furthermore, the mask pattern of the transfer member to form the sealing plate 12 masks only the region above the drain electrode 4d of the TFT device 4 so as to form only the opening portions 12a and 22a in the supporting members 19 and the liquid crystal layer 22.

The formation of the supporting members 19 is conducted by irradiating a UV ray from the substrate 1 side, using the first pixel electrode 9 and the black matrix 5 as a mask in the same manner as the process (4) of forming the supporting members 18 in the first display layer 6. The supporting members 19 are arranged in the exact same position as the supporting members 18. Since no separate mask is used, mask alignment is unnecessary and the inconvenience shown in FIG. 81 is never caused.

When the above-mentioned UV exposure is conducted, the UV ray is irradiated via the supporting members 18. If the supporting members 18 absorb too much UV ray, the negative type resist which form the supporting members 19 does not have enough irradiation to be fully polymerized. This causes some of the supporting members 19 to be shorter in height, which makes the liquid crystal layer 22 uneven in thickness, and as a result, the color balance of the liquid crystal display device is lost. In such a case, the height of the supporting members 19 can be fixed by using a negative type resist having different UV-absorption (exposure) wavelength characteristics from the supporting members 18 as the negative type resist which composes the supporting members 19, and also using a UV ray having a wavelength which penetrates the supporting members 18 but is heavily absorbed in the negative type resist which composes the supporting members 19. It is also possible to use a negative type resist whose UV-absorption wavelength characteristics change before and after polymerization, and to irradiate a UV ray having a wavelength having a high permittivity of the supporting members 18 polymerized and having a low permittivity of the negative type resist which composes the supporting members 19 not polymerized yet.

Figure 43N:
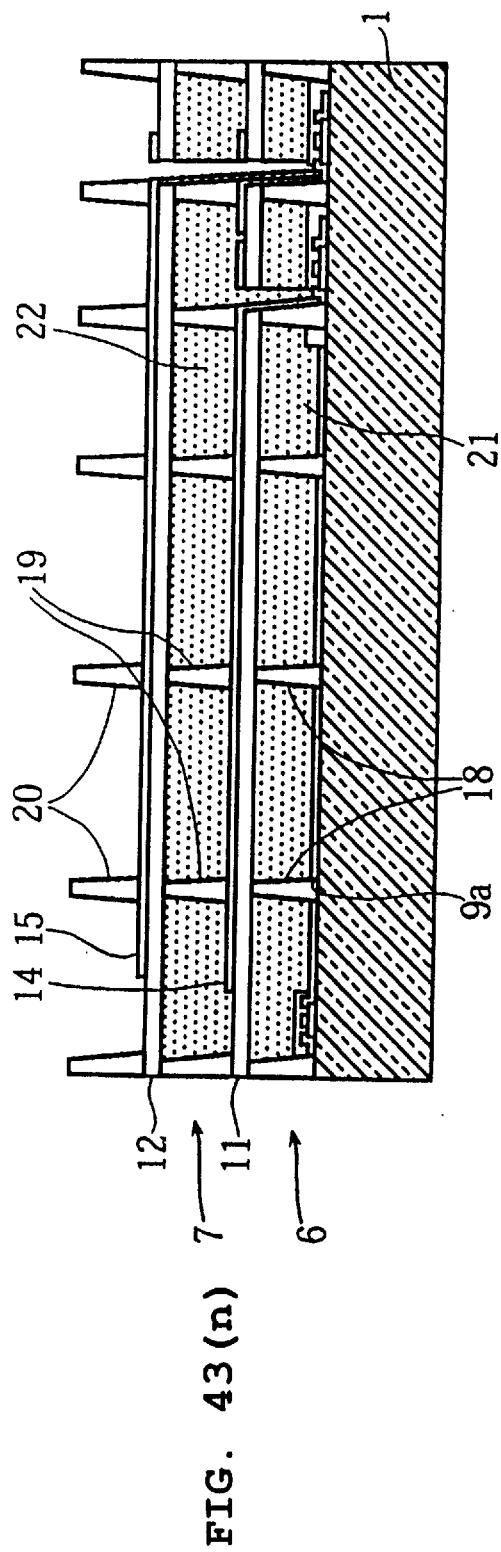
FIGS. 43(n) and 43(o) are illustrations showing fabrication processes of the liquid crystal display device of Embodiment 3-1.
Figure 43O:
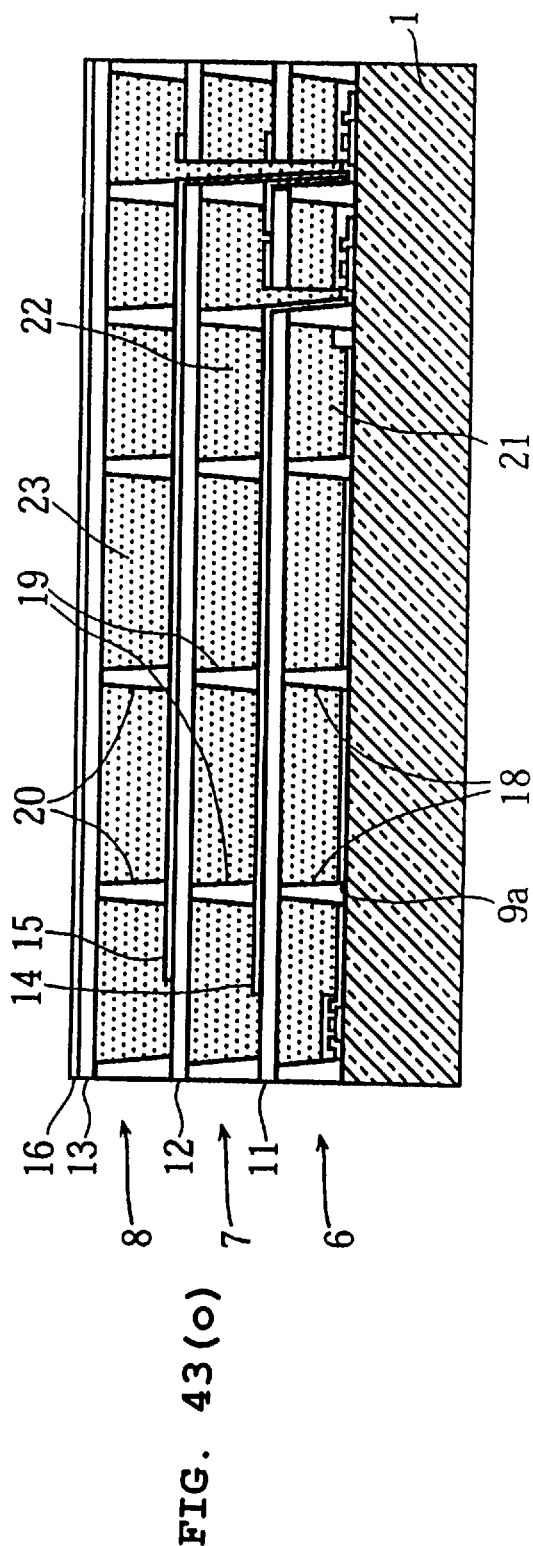

(13) As shown in FIGS. 43(n) and 43(o) the third display layer 8 is formed by forming the supporting members 20, the liquid crystal layer 23, and the sealing plate 13. The common electrode 16 is formed onto the sealing plate 13. The guest host liquid crystal containing a dichroic dye of yellow is used for the liquid crystal layer 23. Without forming a mask pattern on the transfer member for the sealing plate 12, a UV ray is irradiated upon the entire surface of the sealing plate 13, and no opening portion is formed in the sealing plate 13 or the liquid crystal layer 23.

In the third display layer 8, similar to the supporting members 19 of the second display layer 7, the supporting members 20 are arranged in the exact same position as the supporting members 18 and 19 by the irradiation of a UV ray from the substrate 1 side with the first pixel electrode 9 and the black matrix 5 as a mask. It is preferable to use a negative type resist having different UV absorption (exposure) wavelength characteristics from the supporting members 18 and 19 as the negative type resist which composes the supporting members 20, and to irradiate a UV ray whose wavelength has high permittivity of the supporting members 18 and 19.

(14) The protection film 17 made of a transparent acrylic resin is formed onto the common electrode 16 so as to obtain the liquid crystal display device shown in FIGS. 34 and 35.

As mentioned before, the supporting members 18–20 of the display layers 6–8 are formed by the rear surface exposure via the opening portions 9a, 5a, and 5b of the first pixel electrode 9 and the black matrix 5. This prevents the supporting members 18–20 from being arranged in different positions which might lead to the breakage of the first display layer 6 and other components, so that the cross section of the supporting members 18–20 can be reduced to 7 μm×7 μm, and the contrast ratio can be increased with a larger open area ratio. In addition, no mask alignment is necessary because no mask is used.

Although the supporting members 18–20 each have a square cross section and are arranged at regular intervals in these embodiments, the same effects can be obtained when the members have other shapes and arrangement. It is also possible that instead of making all the supporting members 18 have the same shape of cross section, the supporting members 18 arranged in the region of the first pixel electrode 9 may have smaller cross section than those in the other region.

Although the liquid crystal layers 21–23 are a so-called polymer diffusion type, liquid crystal containing no polymer network can be used instead. This is because liquid crystal can be sealed with the sealing plates 11–13, so that it is not always necessary to use liquid crystal containing polymer network. In that case, the liquid crystal makes up a larger proportion of the display layers 6–8, so that the contrast ratio is further increased.

However, the sealing plates 11–13 have no polymer network which serves to fix them on the substrate 1, so that it is necessary to use an adhesive agent or the like.

For this, an adhesive agent can be applied onto either the sealing plates 11–13 or the supporting members 18–20 so as to combine them. To be more specific, a thermosetting epoxy resin is applied as the adhesive agent onto the top of each of the supporting members 18–20, and the members 18–20 are combined with the sealing plates 11–13. Later, they are heated in an oven to harden the epoxy resin so as to be bonded. As the adhesive agent, a two-part reactive adhesive or other agents may be used.

It is possible to make either the supporting members 18–20 or the sealing plates 11–13 from a plastic material, and to heat or press together so as to plasticize either the supporting members 18–20 or the sealing plates 11–13, thereby depositing one onto the other. For example, the sealing plates 11–13 composed of a thermoplastic resist are combined with the supporting members 18–20 and heated in an oven while being pressed, so that the plasticized sealing plates 11–13 are deposited to the supporting members 18–20.

In the above-mentioned embodiments each of the liquid crystal layers 21–23 is formed every time each of the display layers 6–8 is formed; however, when liquid crystal containing no polymer network is used, the liquid crystal layers 21–23 may be formed in the corresponding gaps after the formation of the supporting members 18–20 and the sealing plates 11–13. The liquid crystal layers can be formed in the same manner even when liquid crystal contains polymer network; however, in order to facilitate the formation of the polymer network, it is preferable to use polymer precursors having different photosensitive wavelength characteristics as described about the supporting members 18–20.

In place of forming the sealing plates 11–13 onto the transfer member 27 before transferring them, it is possible to apply a material having sublimation like camphor as high as the supporting members 18–20 after the formation of the supporting members 18–20 so as to form the sealing plates 11–13 thereon. The application of camphor enables the sealing plates 11–13 in the form of thin film to be easily formed thereonto. Also, camphor with sublimation can be removed by being sublimated after the formation of the sealing plates 11–13, so that gaps can be easily formed between the substrate 1 and the sealing plate 11 and between the sealing plates 11–13. It is possible to replace the material having sublimation by a material vaporized by the irradiation of a UV ray or heating such as a positive type resist made by adding a 1 wt % triphenyl sulphonium hexafluoroantimony (Ph3 S+–SbF6) which is onium salt to polyphtalaldehyde (PPA) and dissolving them in cyclohexanone.

Embodiment 3-2

The liquid crystal display device of Embodiment 3-2 will be described as follows based on FIGS. 44–50.

Figure 44:
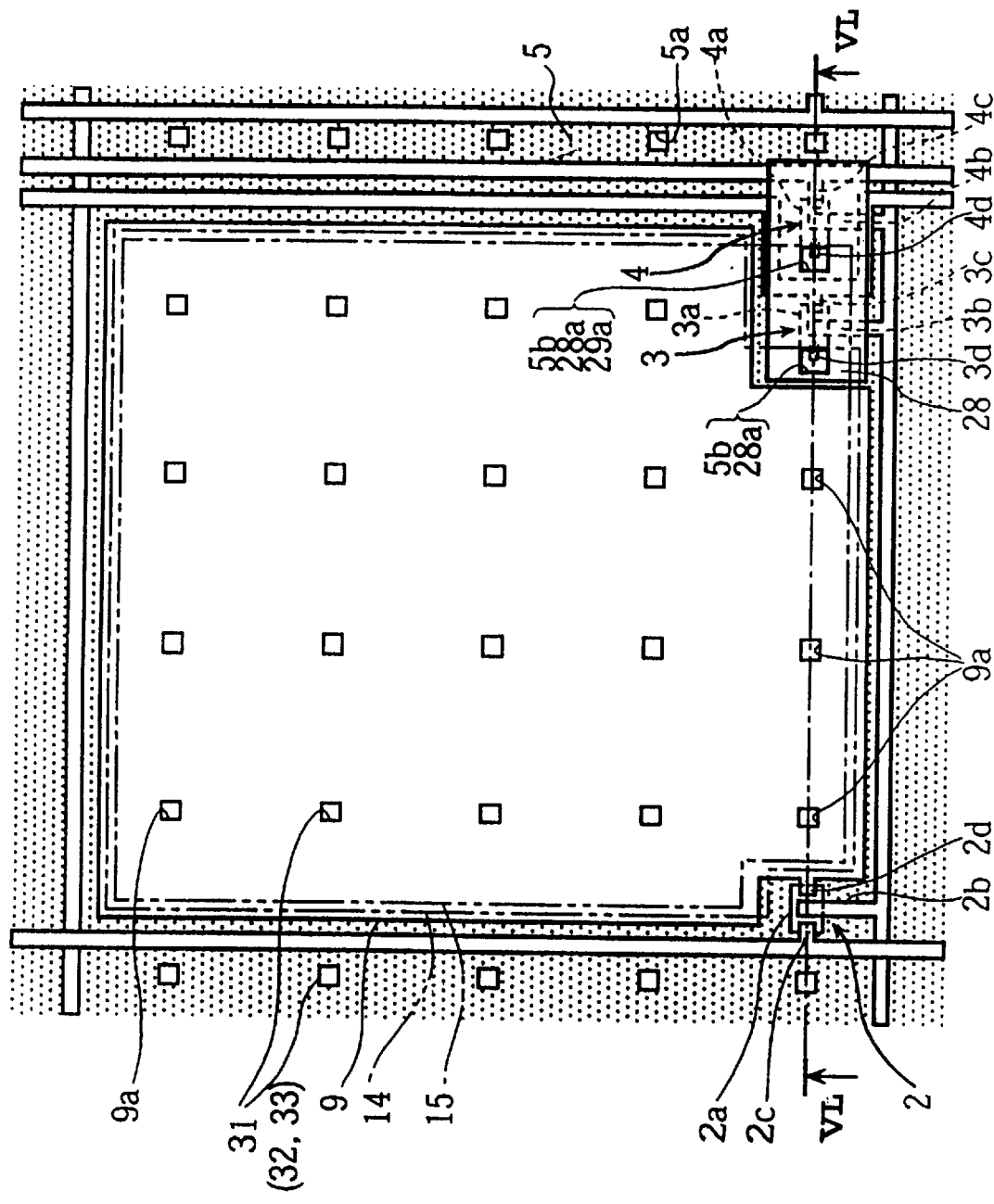
FIG. 44 is a partial plane view showing the structure of one pixel of the liquid crystal display device of Embodiment 3-2 of the present invention.
Figure 45:
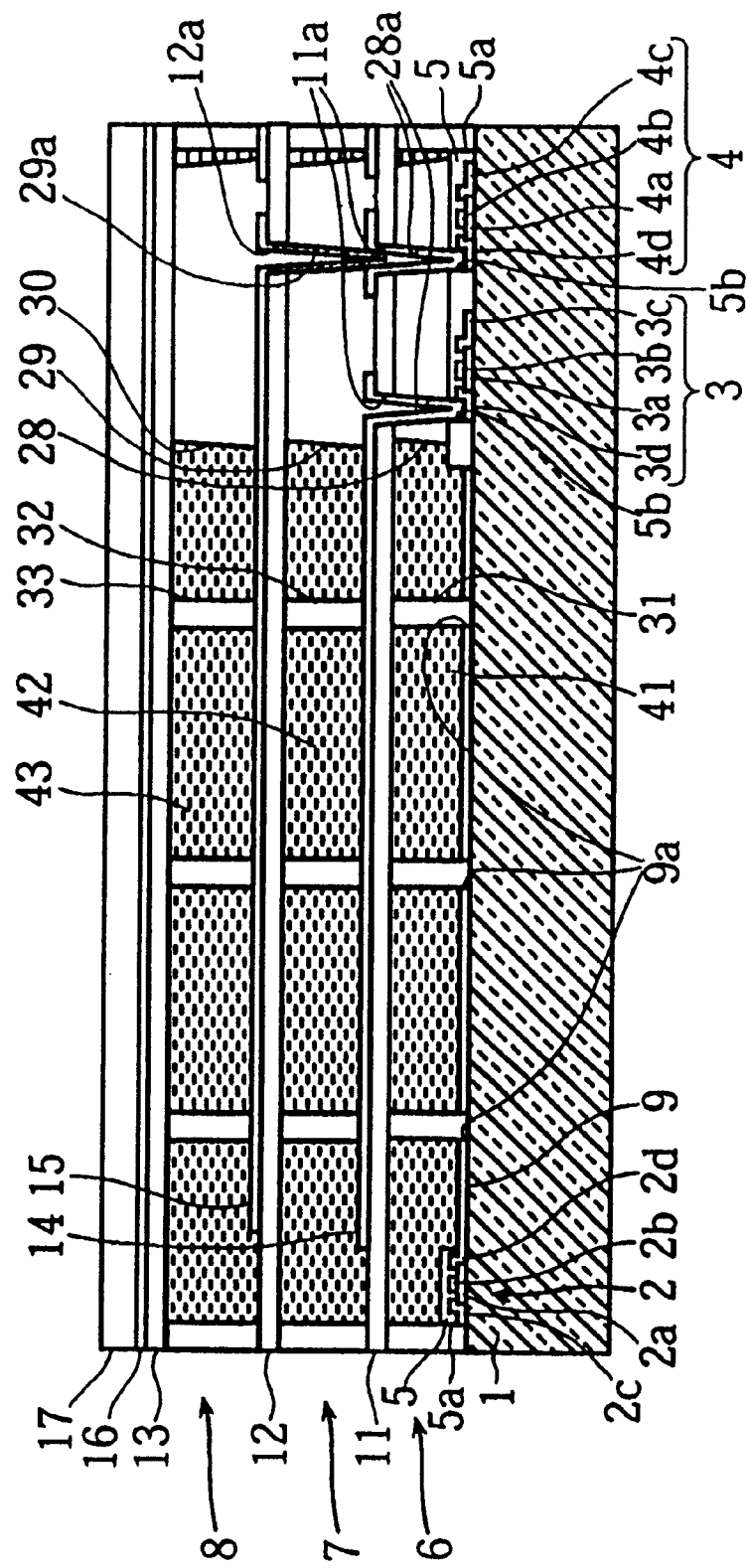
FIG. 45 is a cross sectional view taken along the line indicated with the arrows B—B of FIG. 44.

FIG. 44 is a partial plane view showing the structure of one pixel in the liquid crystal display device, FIG. 45 is a cross sectional view taken along the line indicated with arrows VL—VL of FIG. 44, and FIGS. 46–50 are illustrations showing the fabrication processes of the liquid crystal display device.

In the present embodiment, components having the same structure as those of Embodiment 3-1 are referred to with the same reference numbers and their description will be omitted.

The liquid crystal display device of the present embodiment resembles to that of Embodiment 3-1 in that a first pixel electrode provided with opening portions is formed, and the supporting members are formed by the irradiation of a UV ray via the opening portions. The liquid crystal display devices are different in the following aspects. In Embodiment 3-1, the liquid crystal layers 21–23 are formed by forming the supporting members 18–20 onto the substrate 1 by the irradiation of a UV ray before bonding the sealing plates 11–13 to the supporting members 18–20. In the present embodiment, on the other hand, the mixture solutions 41'–43' containing the liquid crystal and the polymer precursor are sealed after the sealing plates 11–13 are applied. Then, a UV ray is irradiated upon the mixture solutions 41'–43' so as to precipitate and harden the polymer precursor (photopolymerizable polymer) in the mixture solution 41'–43' for the formation of supporting members 31–33 and liquid crystal layers 41–43. Unlike the liquid crystal layers 21–23 in Embodiment 3-1, the liquid crystal layers 41–43 are composed of guest host liquid crystal containing no polymer network.

The structure of the liquid crystal display device will be described as follows based on FIGS. 44 and 45.

In the region of the opening portions 9a and 5a of the first pixel electrode 9 and the black matrix 5 of the liquid crystal display device, 4 μm-high supporting members 31–33 are formed as a result of the polymer precursor mixed with the liquid crystal being polymerized and hardened, instead of the supporting members 18–20 of Embodiment 3-1. On the TFT devices 3 and 4 and the black matrix 5 close to them, cubic interconnection pads 28–30 made of the same negative type resist as the supporting members 18–20 of Embodiment 3-1 are formed as 4 μm-high supplementary supporting members (the outline of the cubic interconnection pad 28 is drawn in bold lines in FIG. 44).

The cubic interconnection pad 28 in the first display layer 6 is provided with opening portions 28a for cubic interconnection above the drain electrodes 3d and 4d of the TFT devices 3 and 4. The cubic interconnection pad 29 in the second display layer 7 is provided with opening portions 29a for cubic interconnection only above the drain electrodes 4d of the TFT device 4. The cubic interconnection pad 30 in the third display layer 8 is provided with no opening portion.

Guest host liquid crystals each containing a dichroic dye of cyan, magenta, and yellow are sealed between the substrate 1 and the sealing plate 11 and between each of the sealing plates 11–13, thereby forming the liquid crystal layers 41–43. This structure makes the ratio of the liquid crystal to each of the display layers 6–8 larger than in the case where the polymer diffusion type liquid crystal layers 21–23 are used as in Embodiment 3-1, so that a higher contrast ratio can be obtained.

The method for fabricating the above-mentioned liquid crystal display device will be described as follows based on FIGS. 46–50.

(1) In the same manner as the process (1) of Embodiment 3-1, the TFT devices 2–4 and the first pixel electrode 9 having the opening portions 9a are formed onto the substrate 1 made of borosilicate glass as shown in FIG. 46(*a*).

(2) In the same manner as the process (2) of Embodiment 3-1, the black matrix 5 provided with the opening portions 5a and 5b are formed as shown in FIG. 46(*b*).

Then, the cubic interconnection pad 28 is formed onto the black matrix 5 by the following processes (3) and (4).

Figures 47C, 47D:
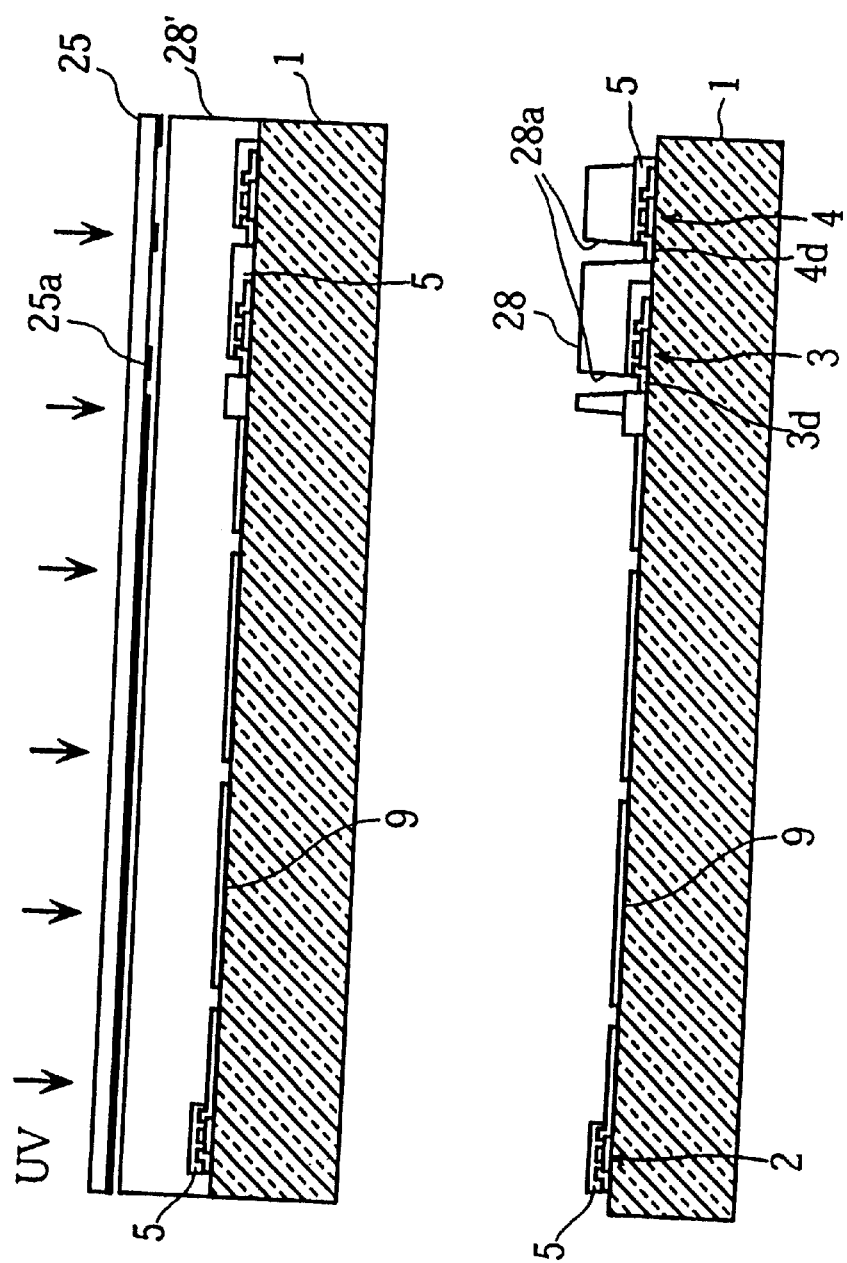
FIGS. 47(c) and 47(d) are illustrations showing fabrication processes of the liquid crystal display device of Embodiment 3-2.

(3) As shown in FIG. 47(*c*) the negative type resist 28' for forming the cubic interconnection pad 28 is applied by a spin coat (for 30 seconds at the rate of 600 rpm) onto the substrate 1 provided with the first pixel electrode 9 and the black matrix 5 thereon, and the substrate 1 is pre-baked (for 3 minutes at 80° C. on a hot plate). After this, a mask substrate 25 with a mask pattern 25a is covered and a UV ray is irradiated for exposure. The mask pattern 25a shields the regions of the opening portions 28a and the regions where the cubic interconnection pad 28 is not formed.

(4) The negative type resist 28' thus exposed is developed with a developing solution and baked in an oven (for 1 hour at 150° C.) so as to form the cubic interconnection pad 28 onto the TFT devices 3 and 4 as shown in FIG. 47(*d*). The cubic interconnection pad 28 is formed to have a height of 4 μm and a surface of 20 μm×30 μm. Furthermore, opening portions 28a of 10 μm×10 μm are formed above the drain electrodes 3d and 4d of the TFT devices 3 and 4.

Figure 48E:
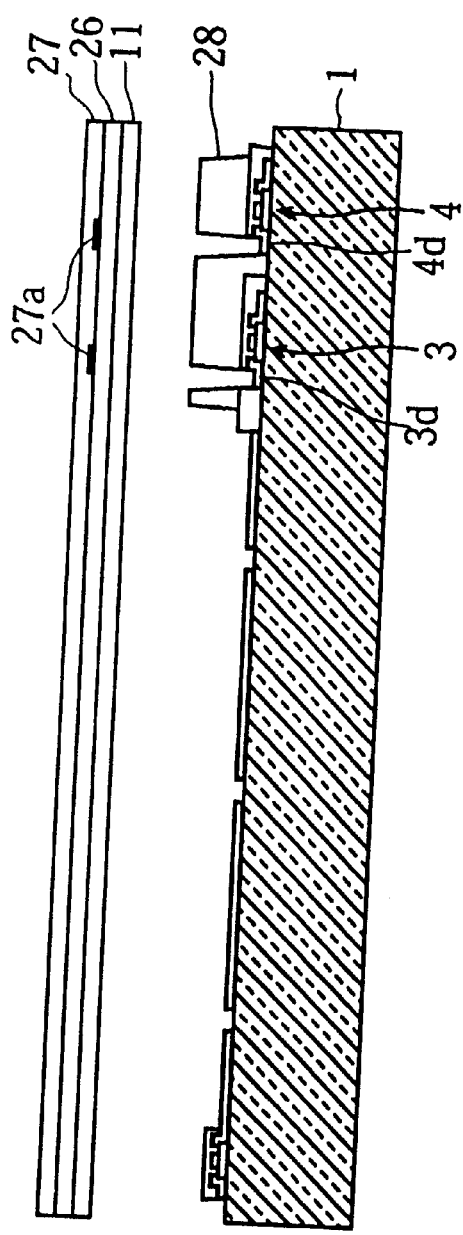
FIGS. 48(e) and 48(f) are illustrations showing fabrication processes of the liquid crystal display device of Embodiment 3-2.

(5) In the same manner as the process (6) of Embodiment 3-1, the separate layer 26 and the sealing plate 11 are formed on the surface of the transfer member 27 provided with a mask pattern 27a which masks the positions corresponding to the drain electrodes 3d and 4d of the TFT devices 3 and 4 as shown in FIG. 48(*e*).

Figure 48F:
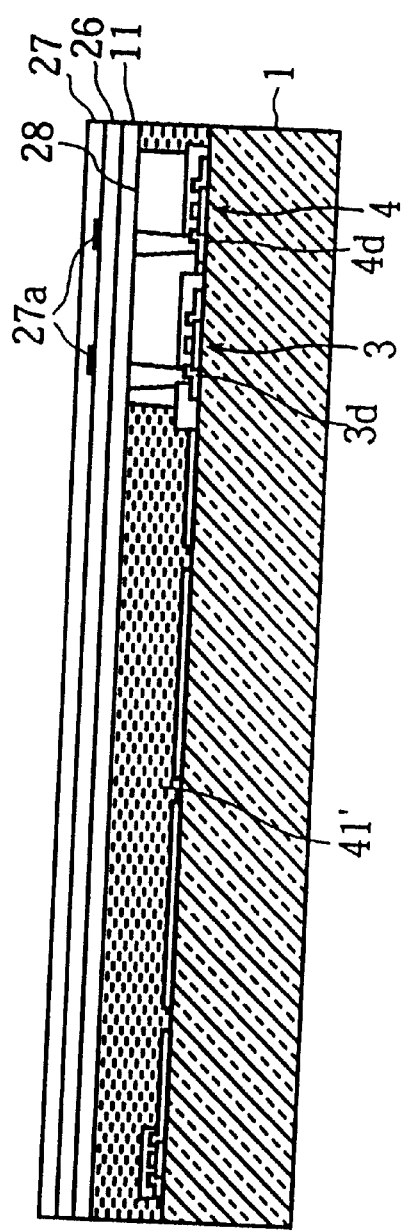

(6) As shown in FIG. 48(f), the transfer member 27 and the substrate 1 are positioned in such a manner that the mask alignment of the mask pattern 27a of the transfer member 27 correspond to the drain electrodes 3d and 4d of the TFT devices 3 and 4, and the sealing plate 11 is bonded to the cubic interconnection pad 28. As a result, a 4 μm gap is formed between the substrate 1 and the sealing plate 11. The mixture solution 41' is prepared by mixing guest host liquid crystal and a polymer precursor in a ratio of 95:5 in weight so as to fill the gap therewith. The guest host liquid crystal contains a dichroic dye of cyan.

(7) As shown in FIG. 49(g) a UV ray of 500 mJ/cm$^2$ is irradiated from the substrate 1 side. As a result, the mixture solution 41' applied on the opening portions 9a and 5a are exclusively exposed with the first pixel electrode 9 and the black matrix 5 as a mask. In other words, a rear surface exposure (self alignment) for exclusively exposing the region where the supporting members 31 are formed is conducted. As a result of the irradiation of the UV ray, the polymer precursor in the mixture solution 41' sealed into between the substrate 1 and the sealing plate 11 starts to polymerize and decreases its concentration. Then, the polymer precursor is condensed by the diffusion due to the unevenness of the concentration, and hardened as a polymer above the openings 9a and 5a so as to form the supporting members 31. At the same time, the guest host liquid crystal left after the polymer precursor is used for the formation of the supporting members 31 is exclusively sealed into between the substrate 1 and the sealing plate 11, so as to form the liquid crystal layer 41.

When the ratio of the area for the supporting members 31 to the area of the region filled with the mixture solution 41' is 5%, the polymer precursor in the mixture solution 41' is all used to form the supporting members 31 by setting the ratio of the guest host liquid crystal to the mixture solution 41' at 95%, so that only the guest host liquid crystal is sealed into between the substrate 1 and the sealing plate 11.

Figure 50I:
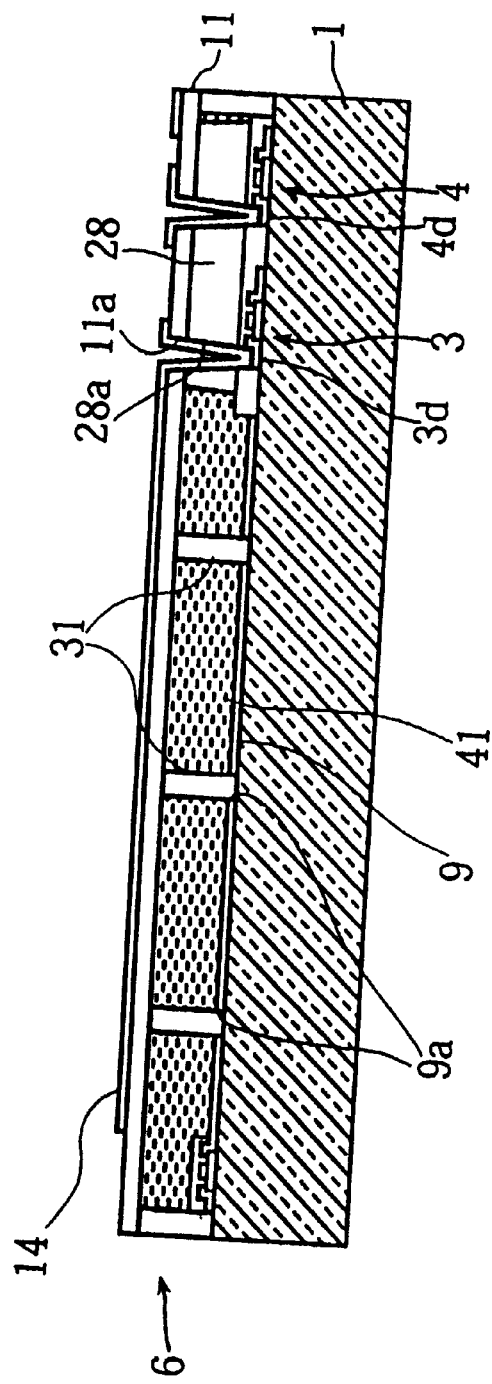
FIG. 50(i) is an illustration showing a fabrication process of the liquid crystal display device of Embodiment 3-2.

(8) After irradiating a UV ray of 100 mJ/cm$^2$ from the transfer member 27 side, the substrate 1 is soaked in hot water to separate the sealing plate 11 from the transfer member 27 in the same manner as the process (9) of Embodiment 3-1, and then the sealing plate 11 is developed with the developing solution of a negative type resist. Consequently, as shown in FIG. 49(h) while the UV ray is being irradiated, the region above the drain electrodes 3d and 4d which are not exposed because of the mask pattern 27a of the transfer member 27 are eliminated so as to form the opening portions 11a for cubic interconnection. (9) In the same manner as the process (11) of Embodiment 3-1, an ITO transparent conductive film is formed by spattering onto the sealing plate 11 as shown in FIG. 50(i), and patterned into the form of pixel by photolithography and etching so as to form the second pixel electrode 14. The second pixel electrode 14 is connected to the drain electrode 3d of the TFT device 3 via the transparent conductive film formed on the side walls of the opening portions 11a and 28a of the sealing plate 11 and the cubic interconnection pad 28, so that the voltage of the second pixel electrode 14 is controlled by the TFT device 3.

(10) The processes (3)–(9) are conducted twice so as to form the second display layer 7 comprising the second pixel electrode 14, the cubic interconnection pad 29, the supporting members 32, the liquid crystal layer 42, and the sealing plate 12, and the third display layer 8 comprising the third pixel electrode 15, the cubic interconnection pad 30, the supporting members 33, the liquid crystal layer 43, and the sealing plate 13. Furthermore, the common electrode 16 is formed on the sealing plate 13, and the protection film 17 made of a transparent acrylic resin is formed on the common electrode 16. As a result, the liquid crystal display device shown in FIGS. 44 and 45 is obtained. The liquid crystal layers 42 and 43 are composed of a guest host liquid crystal containing a dichroic dye of magenta and yellow, respectively. The sealing plate 12 and the cubic interconnection pad 29 are provided with the opening portions 12a and 29a exclusively above the drain electrode 4d of the TFT device 4, and the sealing plate 13 and the cubic interconnection pad 30 are provided with no opening portions.

As described hereinbefore, similar to Embodiment 3-1, by the rear surface exposure via the opening portions 5a and 9a of the first pixel electrode 9 and the black matrix 5, the supporting members 31–33 of the display layers 6–8 can have a cross section as small as 7 μm×7μm, thereby increasing the open area ratio.

While the weight ratio of the liquid crystal contained in the polymer diffusion type liquid crystal layers 21–23 is 80% in Embodiment 3-1, the polymer precursor in the mixture solution 41' composed of the guest host liquid crystal and the polymer precursor is consumed for the formation of the supporting members 31–33 and only the guest host liquid crystal is sealed into between the substrate 1 and the sealing plate 11 and between the sealing plates 11–13. As a result, the contrast ratio can be further increased.

The formation of the supporting members 31–33 requires no mask alignment unlike the case where a mask is used, whereas the formation of the cubic interconnection pads 28–30 needs the alignment of the mask substrate 25. However,the alignment does not need to be very precise because these cubic interconnection pads 28–30 which are as large as 20 μm×30 μm in the pixel surface do not suffer from the inconvenience shown in FIG. 8 by a minor positional deviation.

In the same manner as described in Embodiment 3-1, in the present embodiment, polymerization of the polymer precursors may be stimulated by using photopolymerization initiators which have different UV absorption (exposure) wavelength characteristics in the polymer precursors for forming the supporting members 31–33.

Instead of transferring the sealing plates 11–13 formed onto the transfer member 27, the sealing plates may be formed by applying a solid or highly viscous mixture solution containing guest host liquid crystal and a polymer precursor onto the substrate and polymerizing only the surface and its vicinity of the mixture solution as follows. The surface of the substrate is made to be in contact with a material which accelerates the polymerization of the polymer precursor contained in the mixture solution or to be exposed to a UV ray. The material can be a mixture solvent of pure water and isopropyl alcohol in a volume ratio of 10:1 where a 5 wt % amine-base activating agent of an acrylic resin is dissolved.

Embodiment 3-3

The liquid crystal display device of the present embodiment will be described as follows based on FIGS. 51 through 57.

Figure 51:
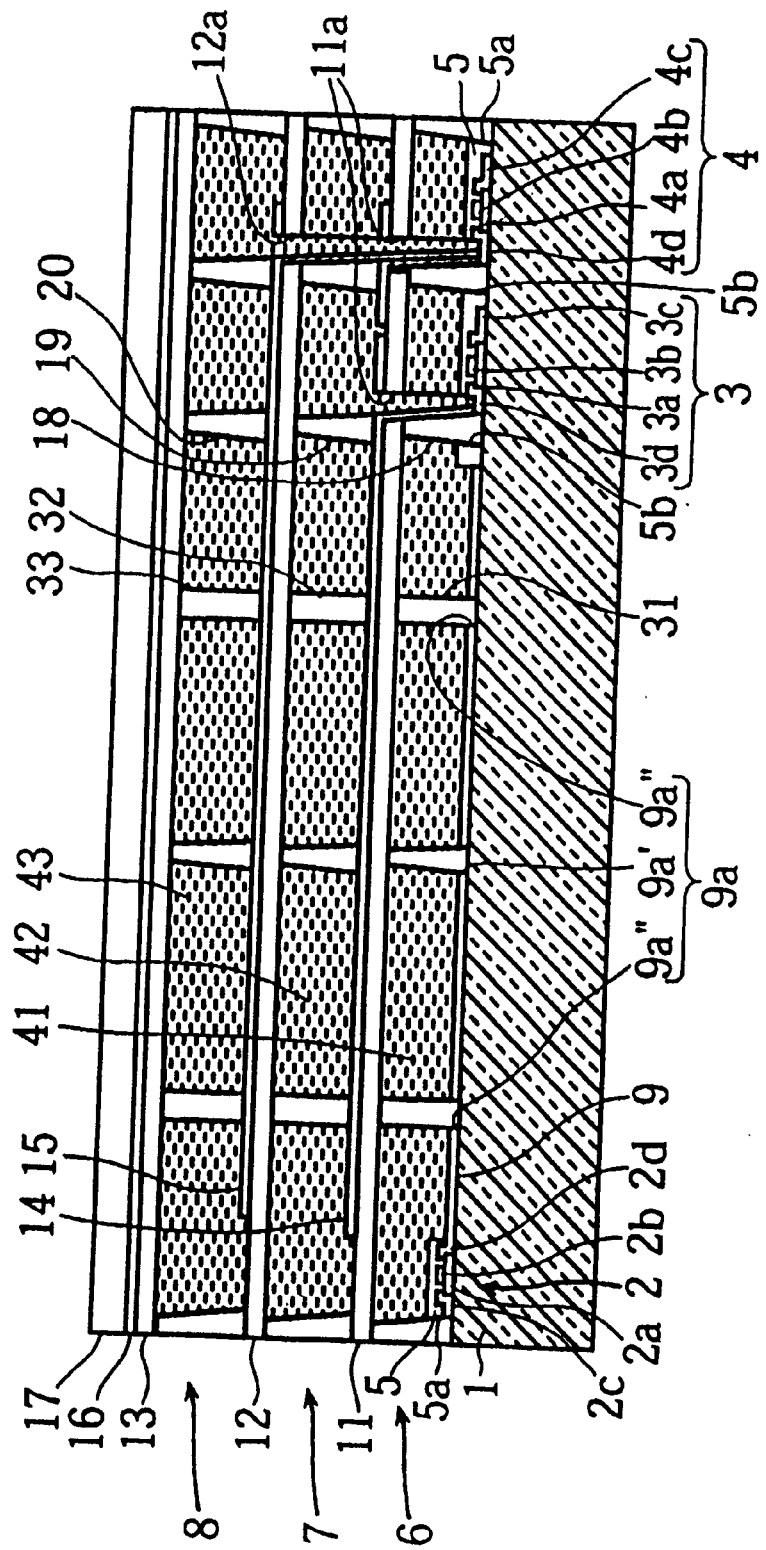
FIG. 51 is a partial plane view showing the structure of one pixel of the liquid crystal display device of Embodiment 3-3 of the present invention.

FIG. 51 is a partial sectional view showing the structure of one pixel in the liquid crystal display device.

FIGS. 52 through 57 are illustrations showing the fabrication processes of the liquid crystal display device.

In the present embodiment, components having the same structure as those of Embodiments 3-1 and 3-2 are referred to with the same reference numbers and their description will be omitted.

The liquid crystal display device of the present embodiment comprises the supporting members 18–20 formed by polymerizing and hardening a negative type resist as in Embodiment 3-1, and the supporting members 31–33 formed by polymerizing and hardening the polymer precursor mixed with liquid crystal in the same manner as in Embodiment 3-2. As shown in FIG. 51, the supporting members 18 alternate with the supporting members 31, the supporting members 19 alternate with the supporting members 32, and the supporting members 20 alternate with the supporting members 33. It is the same feature as in Embodiments 3-1 and 3-2 that the supporting members 18–20 and 31–33 are formed by the exposure of a UV ray via the opening portions 9a, 5a, and 5b of the first pixel electrode 9 and the black matrix 5. The liquid crystal layers 41–43 are exclusively composed of the guest host liquid crystal left unconsumed after the polymer precursor is used for the formation of the supporting members 31–33. The structure of the liquid crystal display device of the present embodiment is equal to that of Embodiment 3-1 except the supporting members 31–33 and the liquid crystal layers 41–43.

The method for fabricating the liquid crystal display device will be described as follows based on FIGS. 52 through 57.

Figure 52A:
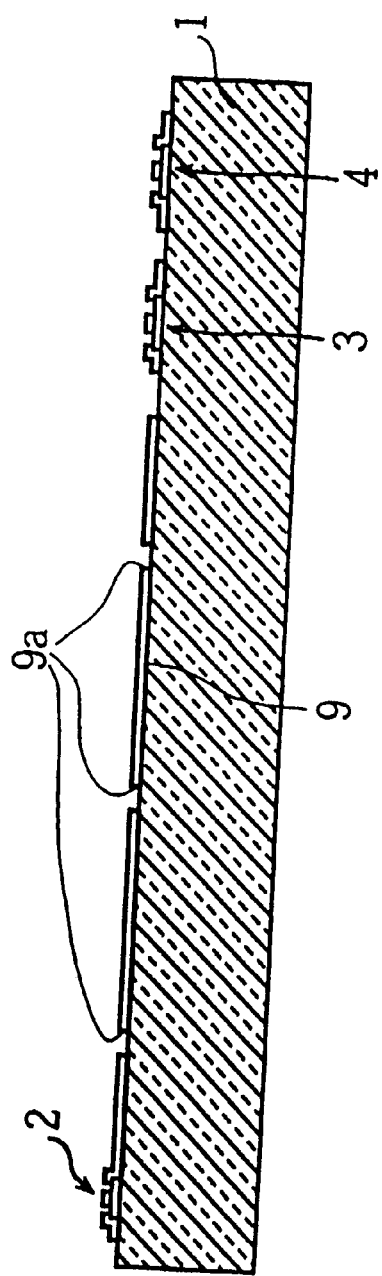
FIGS. 52(a) and 52(b) are illustrations showing fabrication processes of the liquid crystal display device of Embodiment 3-3.

(1) As shown in FIG. 52(a) the TFT devices 2–4 and the first pixel electrode 9 provided with the opening portions 9a are formed onto the substrate 1 made of borosilicate glass in the same manner as the process (1) of Embodiment 3-1.

Figure 52B:
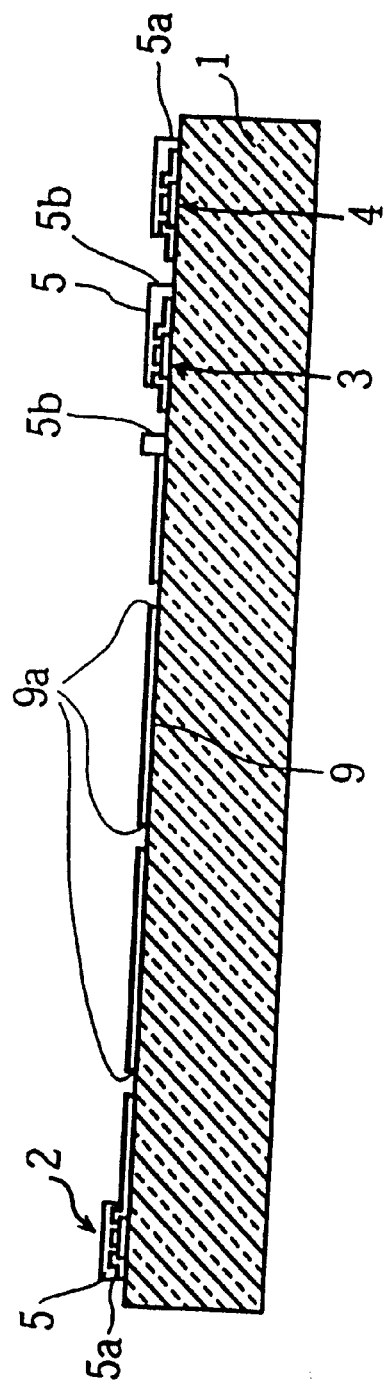

(2) As shown in FIG. 52(b) the black matrix 5 provided with the opening portions 5a and 5b is formed in the same manner as the process (2) of Embodiment 3-1.

Through the following processes (3)–(5), the supporting members 18 half as many as those of Embodiment 3-1 are formed.

(3) As shown in FIG. 53(c) the negative type resist 18' for forming the supporting members 18 is applied onto the substrate 1 and pre-baked in the same manner as the process (3) in Embodiment 3-1.

(4) As shown in FIG. 53(d) a mask substrate 34 provided with a mask pattern 34a which shields the opening portions 9a" and 5a" of the opening portions 9a and 5a in the first pixel electrode 9 and the black matrix 5 is arranged outside the substrate 1, and a UV ray is irradiated from the substrate 1 side so as to polymerize and harden the negative type resist 18' in the region for the opening portions 9a', 5a', and 5b.

(5) The negative type resist 18' is developed with a developing solution and baked in the same manner as the process (5) of Embodiment 3-1, so as to form the supporting members 18 on the opening portions 9a', 5a', and 5b as shown in FIG. 54(e).

(6) As shown in FIG. 54(f) the separate layer 26 and the sealing plate 11 are formed on the surface of the transfer member 27 provided with the mask pattern 27a for mask alignment corresponding to the drain electrodes 3d and 4d of the TFT devices 3 and 4 in the same manner as the process (6) of Embodiment 3-1.

Figure 55G:
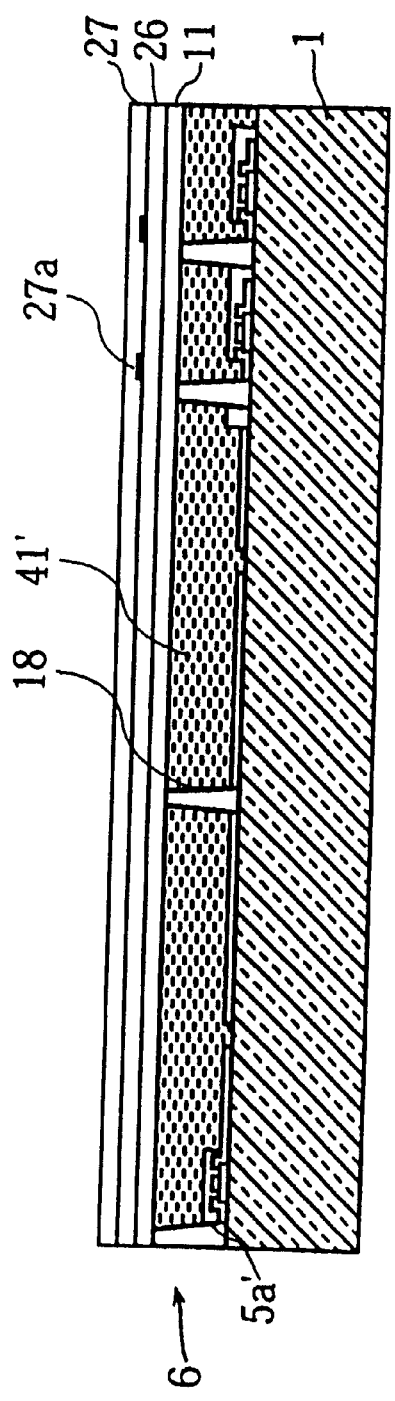
FIGS. 55(g) and 55(h) are illustrations showing fabrication processes of the liquid crystal display device of Embodiment 3-3.

(7) As shown in FIG. 55(g) the transfer member 27 and the substrate 1 are combined in such a manner that the sealing plate 11 is bonded to the supporting members 18, and the mixture solution 41' composed of a polymer precursor and guest host liquid crystal containing a dichroic dye of cyan is implanted in a gap between the substrate 1 and the sealing plate 11 in the same manner as the process (6) of Embodiment 3-2.

Figure 55H:
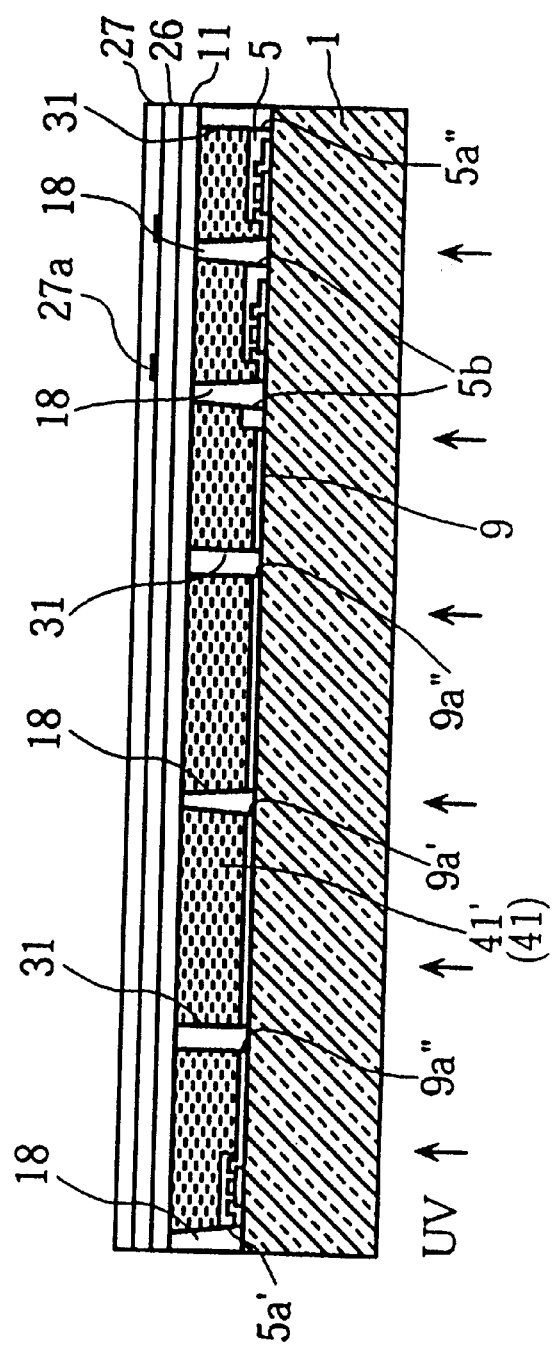

(8) As shown in FIG. 55(h) a UV ray of 500 mJ/cm² is irradiated from the substrate 1 side, and the polymer precursor contained in the mixture solution 41' is polymerized in the opening portions 9a" and 5a" where the supporting members 18 are not formed in the processes (4) and(5). As a result, the supporting members 31 and the liquid crystal layer 41 are formed.

The ratio of the polymer precursor to the remaining components in the mixture solution 41' is made equal to the ratio of the area for the supporting members 31 to the area of the region where the mixture solution 41' (except for the region where the supporting members 18 of the negative type resist are previously formed) is sealed into. This makes all the polymer precursor be used for the formation of the supporting members 31 so that only the guest host liquid crystal is sealed into between the substrate 1 and the sealing plate 11. As a result, the substantial open area ratio can be increased in the same manner as in Embodiment 3-2.

Figure 56I:
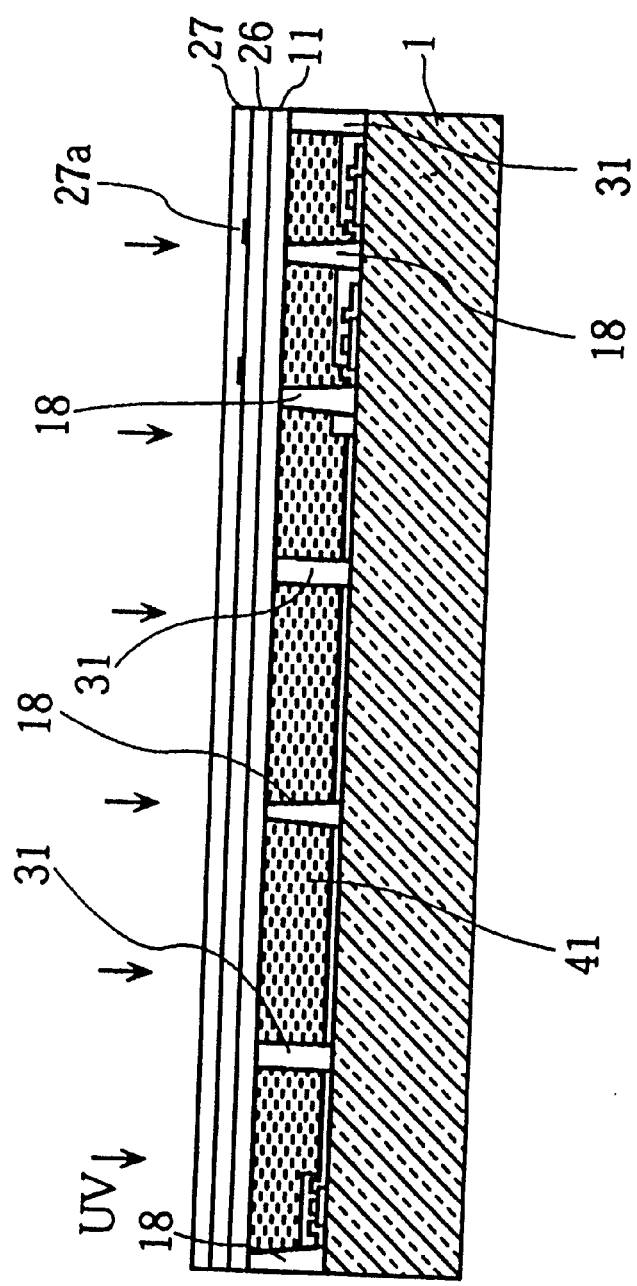
FIG. 56(i) is an illustration showing a fabrication process of the liquid crystal display device of Embodiment 3-3.
Figure 57J:
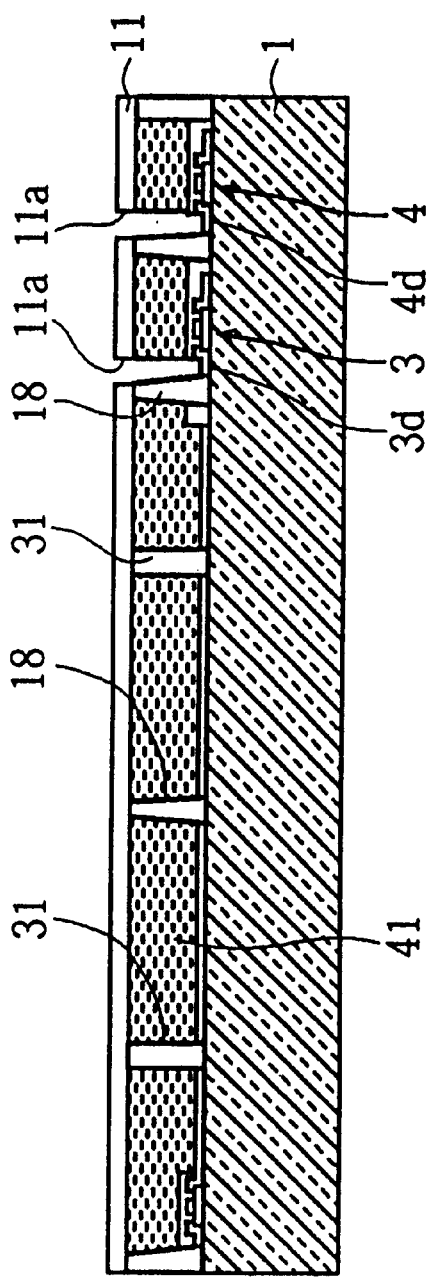
FIGS. 57(j) and 57(k) are illustrations showing fabrication processes of the liquid crystal display device of Embodiment 3-3.

(9) As shown in FIG. 56(i) after a UV ray is irradiated from the transfer member 27 side, the substrate 1 is soaked in hot water in order to separate the sealing plate 11 from the transfer substrate 27. After this, the sealing plate 11 is developed with a developing solution of a negative type resist, and the opening portions 11a for cubic interconnection are formed as shown in FIG. 57(j) in the same manner as the process (8) of Embodiment 3-2.

Figure 57K:
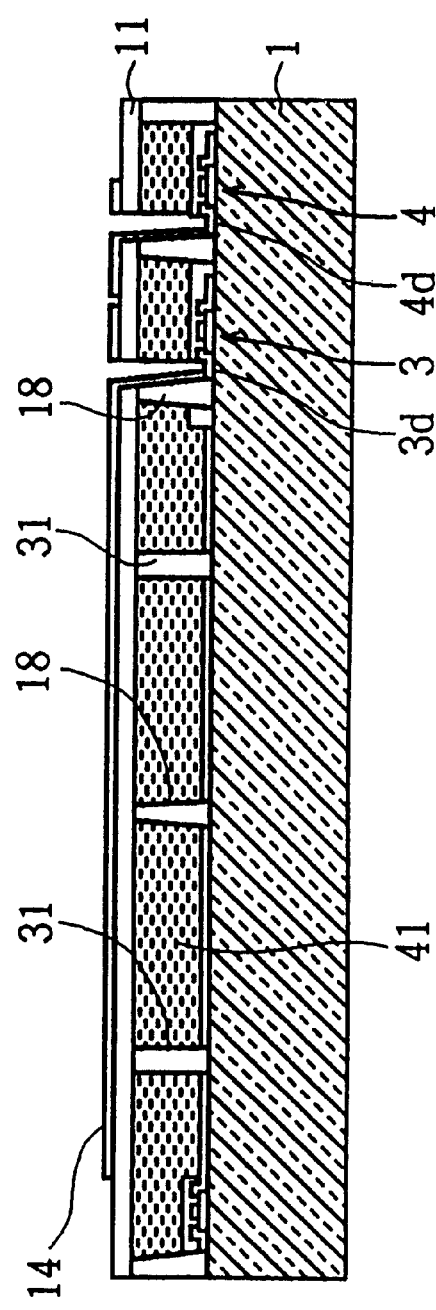

(10) As shown in FIG. 57(k), an ITO transparent conductive film is formed by spattering onto the sealing plate 11 and patterned into the form of pixel by photolithography and etching so as to form the second pixel electrode 14 in the same manner as the process (11) of Embodiment 3-1.

(11) The processes of (3)–(10) are conducted twice so as to form the second display layer 7 comprising the second pixel electrode 14, the supporting members 19 and 32, the liquid crystal layer 42, and the sealing plate 12, and the third display layer 8 comprising the third pixel electrode 15, the supporting members 20 and 33, the liquid crystal layer 43, and the sealing plate 13. Furthermore, the common electrode 16 is formed on the sealing plate 13, and the protection film 17 made of a transparent acrylic resin is formed on the common electrode 16. As a result, the liquid crystal display device shown in FIG. 51 is obtained.

As described hereinbefore, the gap between the substrate 1 and the sealing plate 11 and the gaps between each of the sealing plates 11–13 are kept at a fixed thickness by the supporting members 18–20 so that the display colors of the liquid crystal display device are well balanced in the same manner as in Embodiment 3-1. Furthermore, the substantial open area ratio is increased so as to further increase the contrast ratio in the same manner as Embodiment 3-2.

The alternate arrangement of the supporting members 18–20 made of the negative type resist and the supporting members 31–33 made of a polymer can make each of the gaps between the substrate 1 and the sealing plate 11 and between the sealing plates 11–13 have a fixed thickness and the polymer precursor be condensed more efficiently; however, the ratio in their numbers and the arrangement are not limited to these.

Embodiment 3-4

Figure 58:
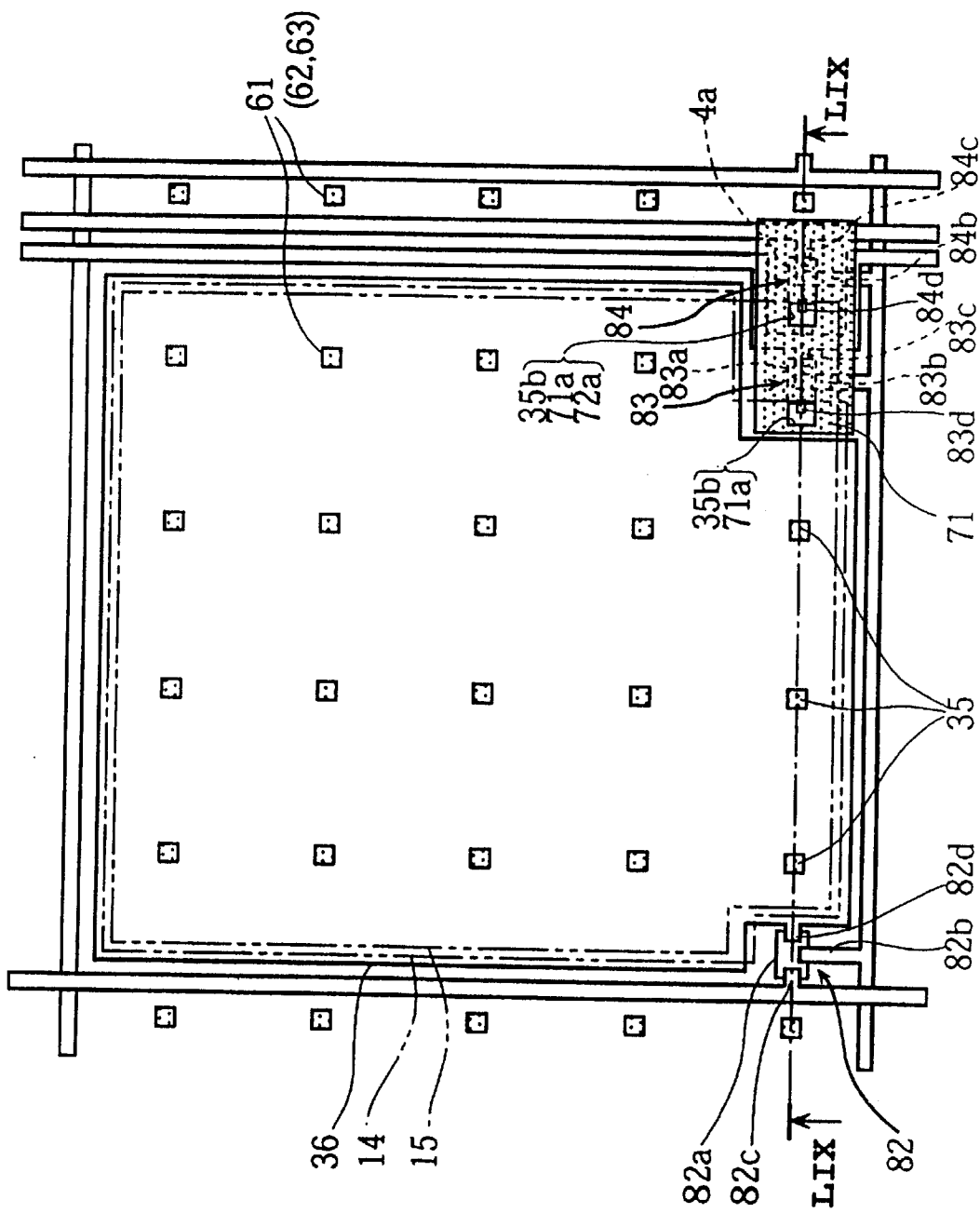
FIG. 58 is a partial plane view showing the structure of one pixel of the liquid crystal display device of Embodiment 3-4 of the present invention.
Figure 59:
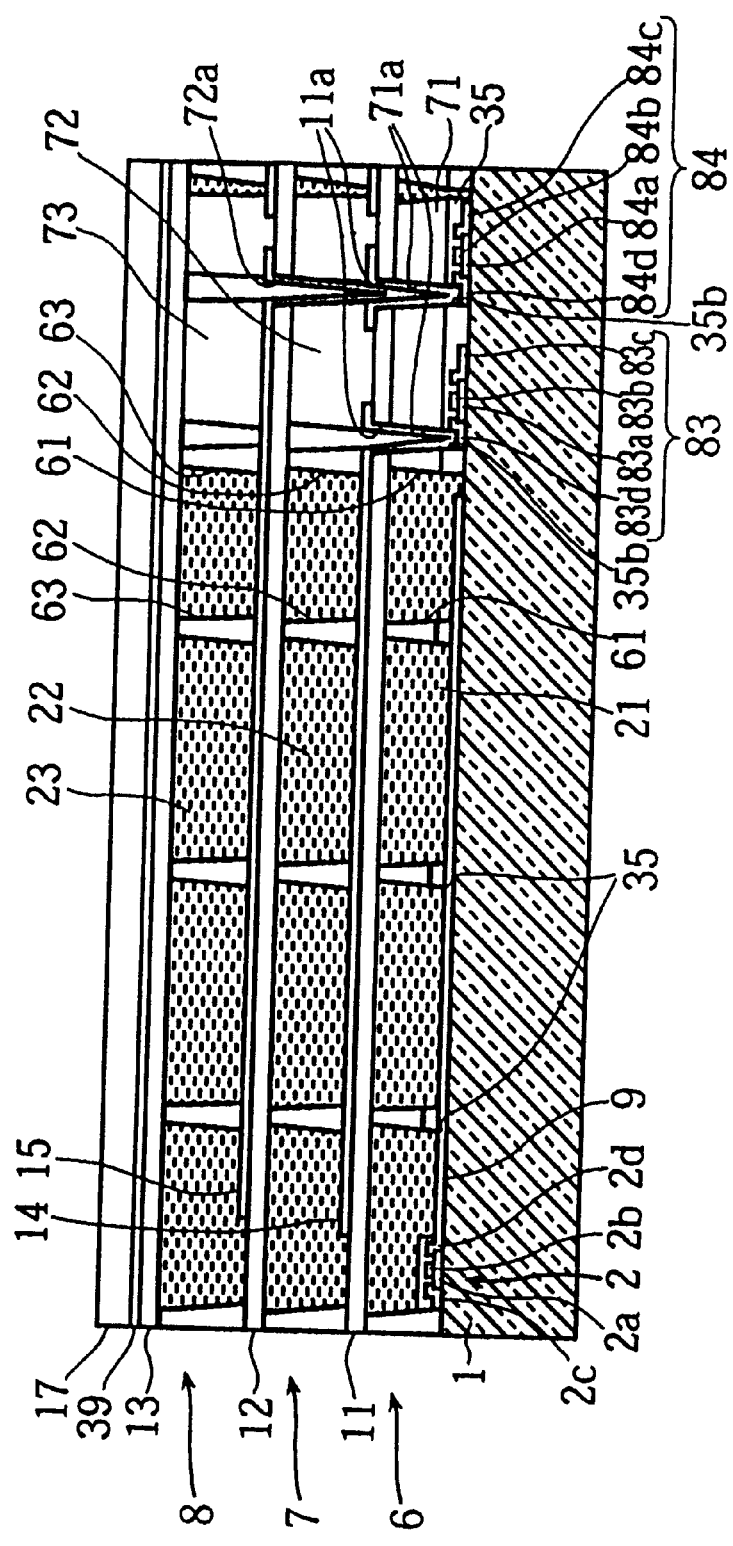
FIG. 59 is a cross sectional view taken along the line indicated with the arrows C—C of FIG. 58.

The liquid crystal display device of the present embodiment will be described as follows based on FIGS. 58 through 64. FIG. 58 is a partial plane view showing the structure of one pixel in the liquid crystal display device, FIG. 59 is a cross sectional view taken along the line indicated with arrows LIX—LIX of FIG. 58, and FIGS. 60–64 are illustrations showing the fabrication processes of the liquid crystal display device.

In the present embodiment, components having the same structure as those in Embodiments 3-1, 3-2, and 3-3 are referred to with the same reference numbers and their description will be omitted.

The liquid crystal display device of the present embodiment differs from those in Embodiments 3-1, 3-2, and 3-3 mainly in that the supporting members 61–63 are formed by polymerizing and hardening a positive type resist instead of a negative type resist. Therefore, the substrate 1 is provided with a light shielding film 35 in the positions where the supporting members 61–63 are formed. Instead of the TFT devices 2–4, the TFT devices 82–84 having drain electrodes 82d–84d made of a transparent conductive film are provided.

The structure of the liquid crystal display device will be described as follows based on FIGS. 58 and 59.

The first pixel electrode 36 and the drain electrodes 82d–84d of the TFT devices 82–84 are ITO transparent conductive films. The other electrodes including the gate electrode 82b in the TFT devices 82–84 are equal to those of the TFT device 2–4. The light shielding film 35 is provided in the positions corresponding to the opening portions 9a and 5a of the first pixel electrode 9 and the black matrix 5 of Embodiment 3-1 in the first pixel electrode 36 and its vicinity and on the TFT devices 83 and 84 and their vicinities. The light shielding film 35 has opening portions 35b in the regions of the drain electrodes 83d and 84d of the TFT devices 83 and 84 (In FIG. 58 the regions where the light shielding film 35 is formed are shown with dots).

The light shielding film 35 is made of a black resist containing carbon particles, which is the same material as the black matrix 5 used in Embodiment 3-1. Instead, the film 35 may be a metallic thin film made of aluminum or the like by conducting photolithography and etching.

The light shielding film 35 is provided with supporting members 61–63 made by hardening a positive type resist and the cubic interconnection pads 71–73 thereon. The cubic interconnection pad 71 is provided with opening portions 71a for cubic interconnection above the drain electrodes 83d and 84d of the TFT devices 83 and 84. The cubic interconnection pad 72 is provided with opening portions 72a only above the drain electrode 84d of the TFT device 84.

In place of the common electrode 16 made of a transparent conductive film used in Embodiments 3-1, 3-2, and 3-3, a common electrode 39 made of a reflective film is provided on the sealing plate 13 of the third display layer 8. Furthermore, a protection film 17 the same as those of Embodiments 3-1, 3-2, and 3-3 is formed on the common electrode 39. The protection film 17 does not have to be transparent.

In the liquid crystal display device thus structured, the light (external light) incident from the substrate 1 side penetrates the substrate 1, the first-third display layers 6, 7, and 8 in that order, is reflected by the common electrode 39, and goes back through the third-first display layers 8, 7, and 6, and the substrate 1 in that order, so as to conduct display. The display screen is seen from the substrate 1 side.

The method for fabricating the liquid crystal display device will be described as follows based on FIGS. 60–63.

(1) As shown in FIG. 60(a) after the region other than the drain electrodes 82d–84d of the TFT devices 82–84 are formed onto the substrate 1, an ITO transparent conductive film is formed by spattering and patterned by photolithography and etching so as to form the first pixel electrode 36 and the drain electrodes 83d and 84d. The first pixel electrode 36 differs from that used in Embodiment 3-1 in that it is a transparent conductive film and have no opening portions, and is equal in that it also serves as the drain electrode 82d of the TFT device 82.

(2) A black resist containing carbon particles is applied as thick as 0.5 μm onto the substrate 1, and then mask exposure and development are conducted in a manner that the resist is left only on the spots where the supporting members 61–63 and the cubic interconnection pads 71–73 are provided in a later process. As a result, the light shielding film 35 is formed as shown in FIG. 60(b).

Through the following processes (3)–(5), the supporting members 61 and the cubic interconnection pad 71 are formed.

Figure 61C:
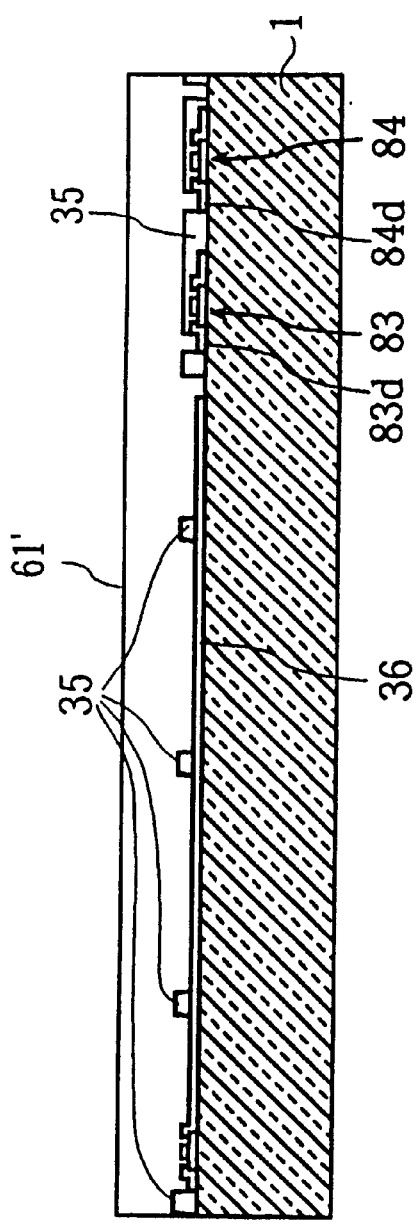
FIGS. 61(c) and 61(d) are illustrations showing fabrication processes of the liquid crystal display device of Embodiment 3-4.

(3) As shown in FIG. 61(c), the positive type resist 61' for forming the supporting members 61 and the cubic interconnection pad 71 is applied by a spin coat (for 30 seconds at the rate of 600 rpm) onto the substrate 1 provided with the first pixel electrode 36 and the light shielding film 35 thereon. After that, the substrate 1 is pre-baked (for 3 minutes at 80° C. on a hot plate).

Figure 61D:
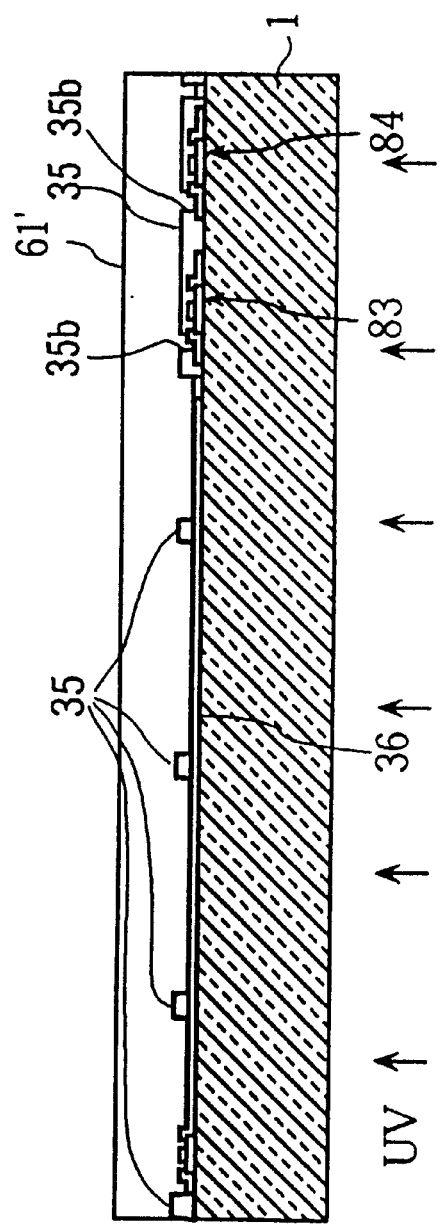

(4) As shown in FIG. 61(d) a UV ray of 100 mJ/cm$^2$ is irradiated from the substrate 1 side. Thus, the positive type resist 61' on the region where the light shielding film 35 is not formed is exclusively exposed with the light shielding film 35 as a mask.

(5) After being developed with a developing solution, the positive type resist 61' is baked (for 1 hour at 120° C.), so as to form the supporting members 61 and the cubic interconnection pad 71 onto the light shielding film 35 as shown in FIG. 62(e). Since the drain electrodes 83d and 84d of the TFT devices 83 and 84 are transparent conductive films, the opening portions 71a are formed above the drain electrodes 83d and 84d in the cubic interconnection pad 71. The cubic interconnection pad 71, which has the same shape as the cubic interconnection pad 28 used in Embodiment 3-2 is formed in the same process as the supporting members 61 by rear surface exposure.

The first display layer 6 is formed in the same manner as in Embodiment 3-1 as follows.

(6) As shown in FIG. 62(f) the separate layer 26 and the sealing plate 11 are formed on the surface of the transfer member 27 in the same manner as the process (6) of Embodiment 3-1.

Figure 63G:
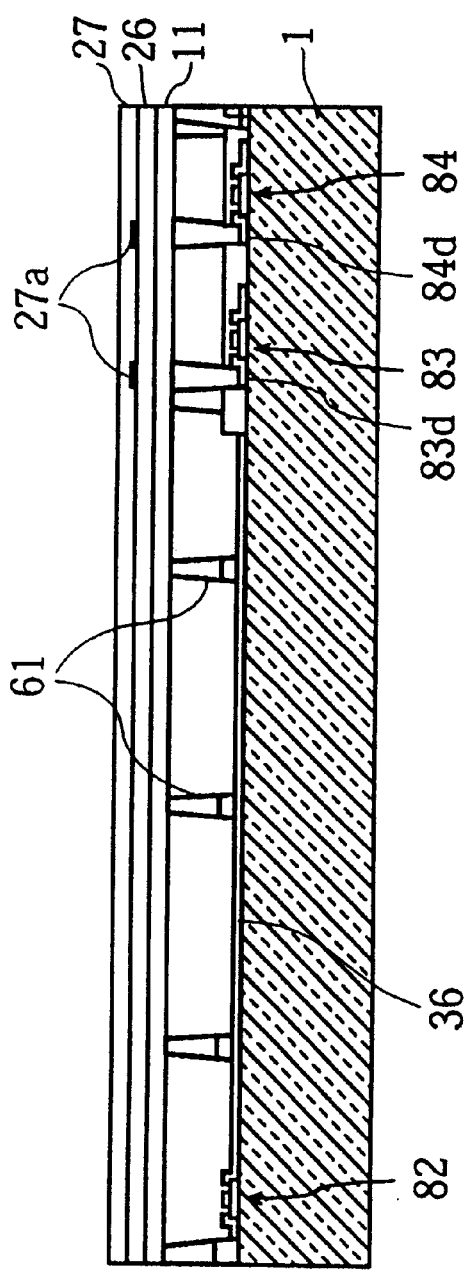
FIGS. 63(g) and 63(h) are illustrations showing fabrication processes of the liquid crystal display device of Embodiment 3-4.

(7) As shown in FIG. 63(g) the transfer member 27 and the substrate 1 are combined in the same manner as the process (7) of Embodiment 3-1.

Figure 63H:
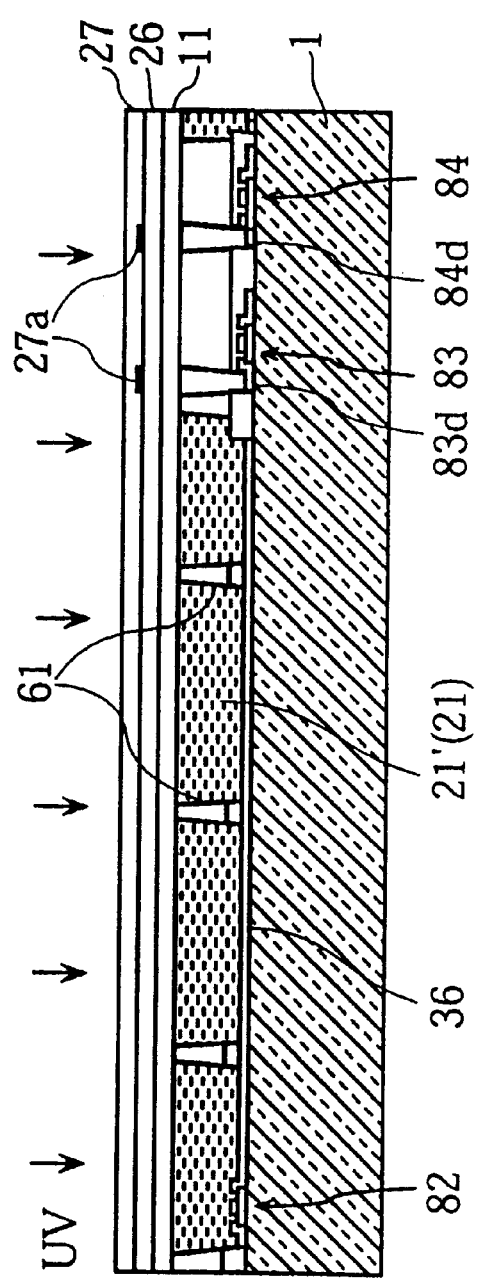

(8) As shown in FIG. 63(h) the mixture solution 21' composed of the guest host liquid crystal and the polymer precursor is implanted into the gap between the substrate 1 and the sealing plate 11, and a UV ray of 500 mJ/cm$^2$ is irradiated from the transfer member 27 side. As a result, the liquid crystal layer 21 of a polymer diffusion type liquid crystal is formed in the same manner as the process (8) of Embodiment 3-1.

(9) After the substrate 1 is soaked in hot water in order to separate the sealing plate 11 from the transfer member 27, the sealing plate 11 is developed with a developing solution of a negative type resist so as to form the opening portions 11a as shown in FIG. 64(i) in the same manner as the process (9) of Embodiment 3-1.

(10) As shown in FIG. 64(j) the ITO transparent conductive film is formed by spattering onto the sealing plate 11 and patterned into the form of pixel by photolithography and etching so as to form the second pixel electrode 14 in the same manner as the process (11) of Embodiment 3-1.

(11) The processes of (3)–(10) are conducted twice so as to form the second display layer 7 comprising the second pixel electrode 14, the cubic interconnection pad 72, the supporting members 62, the liquid crystal layer 22, and the sealing plate 12, and the third display layer 8 comprising the third pixel electrode 15, the cubic interconnection pad 73, the supporting members 63, the liquid crystal layer 23, and the sealing plate 13. Furthermore, the common electrode 36 which also serves as a reflective film is formed on the sealing plate 13 of the third display layer 8 by depositing aluminum as thick as 2000 Å. Also, the protection film 17 for protecting the liquid crystal display device from external pressure and the like is formed onto the common electrode 39, so as to obtain the liquid crystal display device shown in FIGS. 58 and 59.

As a result of the supporting members 61–63 of the first display layers 6–8 being formed by the rear surface exposure with the light shielding film 35 using a positive type resist as described above, no positional deviation is caused among the supporting members 61–63 which might damage the first display layer 6 and the other components. Consequently, mask alignment becomes unnecessary and the size of the supporting members 61–63 is reduced so as to increase the open area ratio, thereby increasing the contrast ratio.

Although the liquid crystal display device in the present embodiment is reflective type, a permeable type liquid crystal display device can be constructed by making the common electrode 39 of a transparent conductive film.

Although the liquid crystal display device comprises polymer diffusion type liquid crystal layers 21–23, liquid crystal containing no polymer network may be used as explained in Embodiment 3-1.

The method of forming the sealing plates 11–13 onto the transfer member 27 and transferring them can be replaced by the following method. After the supporting members 18–20 are formed, the sealing plates 11–13 may be formed on a material which is applied as thick as the supporting members 18–20 by being vaporized by the irradiation of a UV ray or heating such as a positive type resist made by adding a 1 wt % triphenyl sulphonium hexafluoroantimony (Ph3 S+–SbF6) which is onium salt to polyphtalaldehyde (PPA) and dissolving them in cyclohexanone. Since the material enables the sealing plates 11–13 in the form of thin film to be easily formed thereon and can be vaporized by the irradiation of a UV ray or heating, the material can be removed by evaporation after the sealing plates 11–13 are formed, which facilitates the formation of the gap between the substrate 1 and the sealing plate 11.

Fourth Embodiment

Embodiment 4-1

The present embodiment will be described as follows based on FIGS. 65 through 74. In order to simplify the description, components unrelated to the description are omitted and some components are drawn in magnified or reduced sizes.

Figure 65:
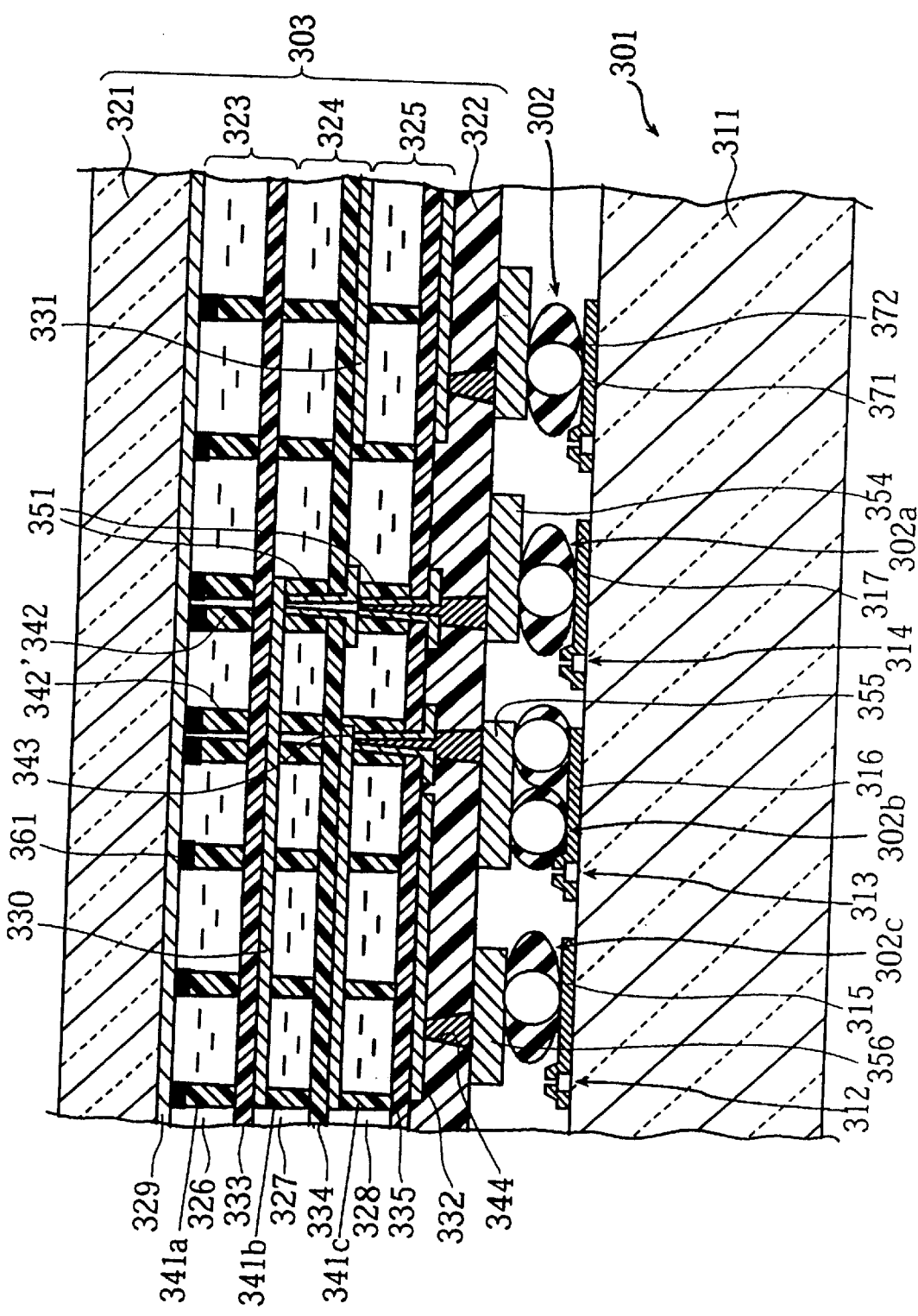
FIG. 65 is a cross sectional view showing the rough structure of the liquid crystal display device of Embodiment 4-1 of the present invention.

FIG. 65 is a cross sectional view showing the rough structure of the liquid crystal display device of the present embodiment.

As shown in FIG. 65 the liquid crystal display device comprises an array substrate 301, a display unit 303, and anisotropic conductive adhesive materials (first to third connection means) 302a–302c which electrically connect the array substrate 301 and the display unit 303.

The array substrate 301 comprises a glass substrate 311, TFT devices (first to third nonlinear elements) 312–314, and driving electrodes (first to third driving electrodes) 315–317.

Figure 66:
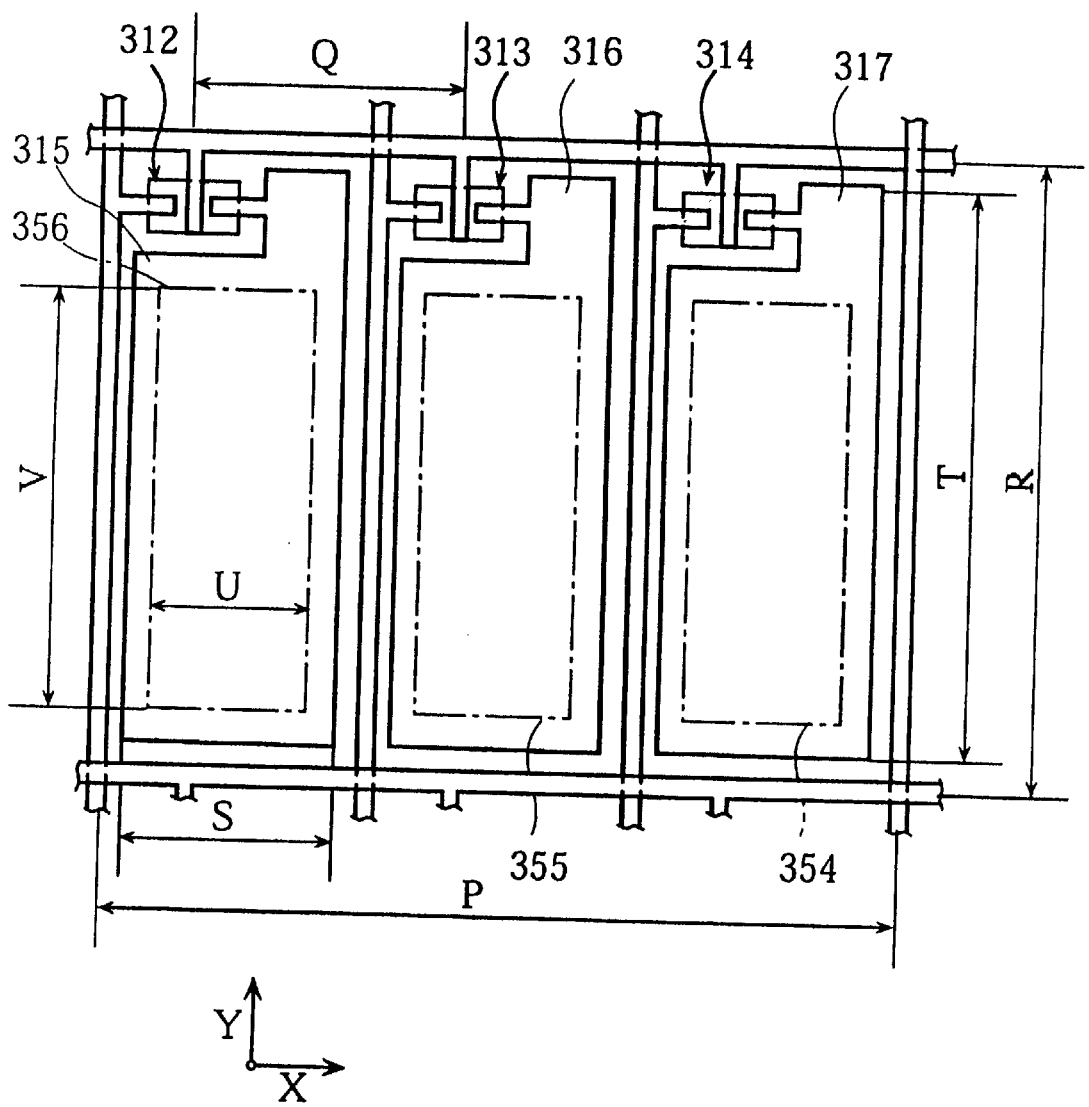
FIG. 66 is a plane view showing the rough structure of TFT devices in the liquid crystal display device of Embodiment 4-1.

As shown in FIG. 66 the TFT devices 312–314 are electrically connected with the driving electrodes 315–317, respectively, which are connected with the drain side terminals of the TFT devices 312–314, respectively. The pitch Q of the TFT devices 312–314 in X direction is about 100 μm when the pixel pitch P=300 μm, and the pitch R in Y direction is about 300 μm. The driving electrodes 315–317, which have a maximum width S of 80 μm and a length T of 250 μm are made of ITO and arranged in one pixel in the form of stripe like the stripe arrangement of an RGB pixel in a color filter.

Figure 67:
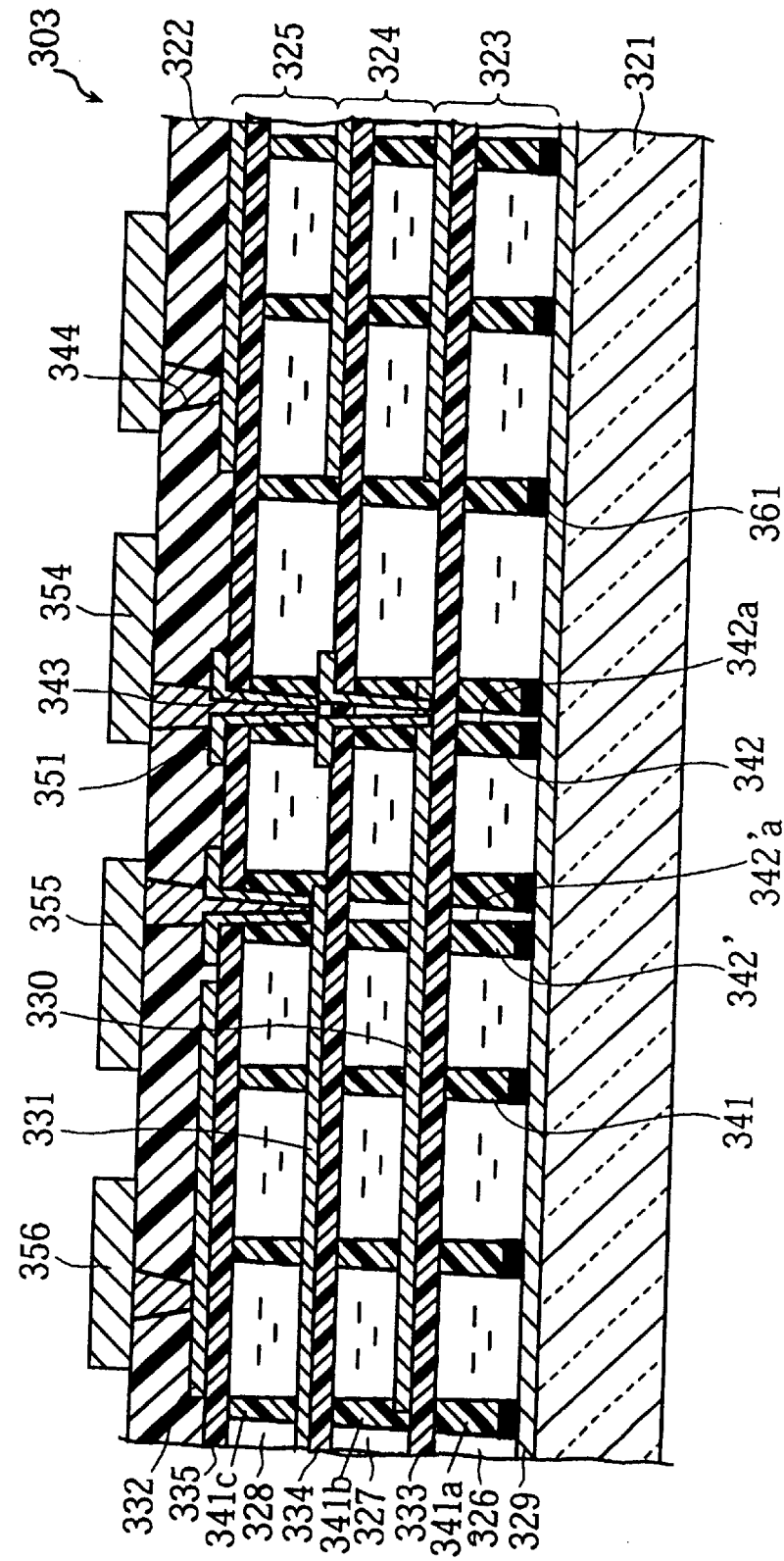
FIG. 67 is a cross sectional view showing the rough structure of the display unit in the liquid crystal display device of Embodiment 4-1.
Figure 68:
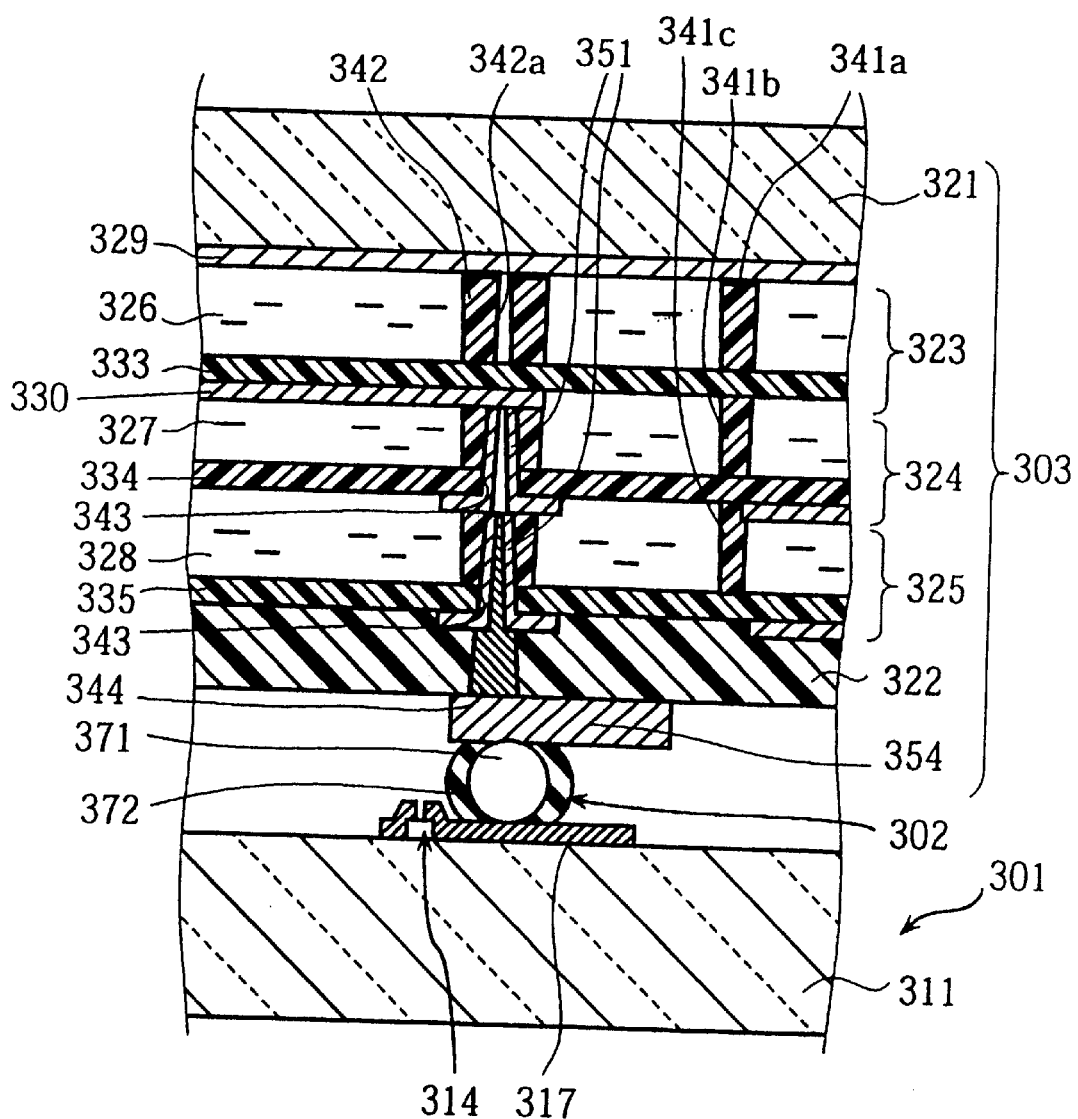
FIG. 68 is a cross sectional view showing the rough structure of the main part of the liquid crystal display device of Embodiment 4-1.

As shown in FIG. 67 the display unit 303 comprises a substrate 321, a polymer resin layer 322, and the first-third display layers 323–325 having three liquid crystal layers filled with guest host liquid crystals of different colors arranged between the substrate 321 and the polymer resin layer 322.

The substrate 321 is made of glass and provided with a common electrode 329 thereon. The substrate 321 can be made of a polymer resin such as plastic instead of glass. The common electrode 329 is an ITO electrode and connected with a ground of the array substrate 301 with a conductive paste (not shown) made of a resin containing carbon power applied in the vicinity of the display region.

The first display layer 323 comprises a first liquid crystal layer 326, a first pixel electrode 330, a first sealing plate 333, and spacers (first supporting members) 341a. To be more specific, spacers 341a are arranged at regular intervals on the common electrode 329 and a first sealing plate 333 is provided on the spacers 341a. Furthermore, a first pixel electrode 330 patterned in a fixed form is provided on the first sealing plate 333.

As shown in FIG. 67 a second display layer 324 and a third display layer 325 which have almost the same structure as the first display layer 323 are formed in that order onto the first display layer 323. To be more specific, the second display layer 324 comprises a second liquid crystal layer 327, a second pixel electrode 331, a second sealing plate 334, and spacers (second supporting members) 341b, whereas the third display layer 325 comprises a third liquid crystal layer 328, a third pixel electrode 332, a third sealing plate 335, and spacers (third supporting members) 341c.

The first-third display layers 323–325 are each provided with cubic interconnection pads 342 and 342' (refer to FIG. 67) which are provided with opening portions 342a and 342'a, respectively. Furthermore, the second and third sealing plates 334 and 335 are provided with contact holes 343, and the polymer resin layer 322 is provided with contact holes 344. Consequently, the first pixel electrode 330 is electrically connected with a connection terminal 354 via the opening portion 342a of the cubic interconnection pad 342 and a relay electrode 351 provided in the contact holes 343 and 344. The second pixel electrode 331 is electrically connected with a connection terminal 355 via the opening portion 342'a of the cubic interconnection pad 342' and the relay electrode 351. The third pixel electrode 332 is electrically connected with a connection terminal 356 via the contact holes 344.

The first-third liquid crystal layers 326–328 are filled with guest host liquid crystals. To be more specific, the guest host liquid crystals are chiral nematic liquid crystal made of a mixture in which a dichroic dye of cyan, magenta, or yellow as a guest and a chiral agent for making a 7 μm helical pitch are added to a positive type nematic liquid crystal as a host.

Figure 69:
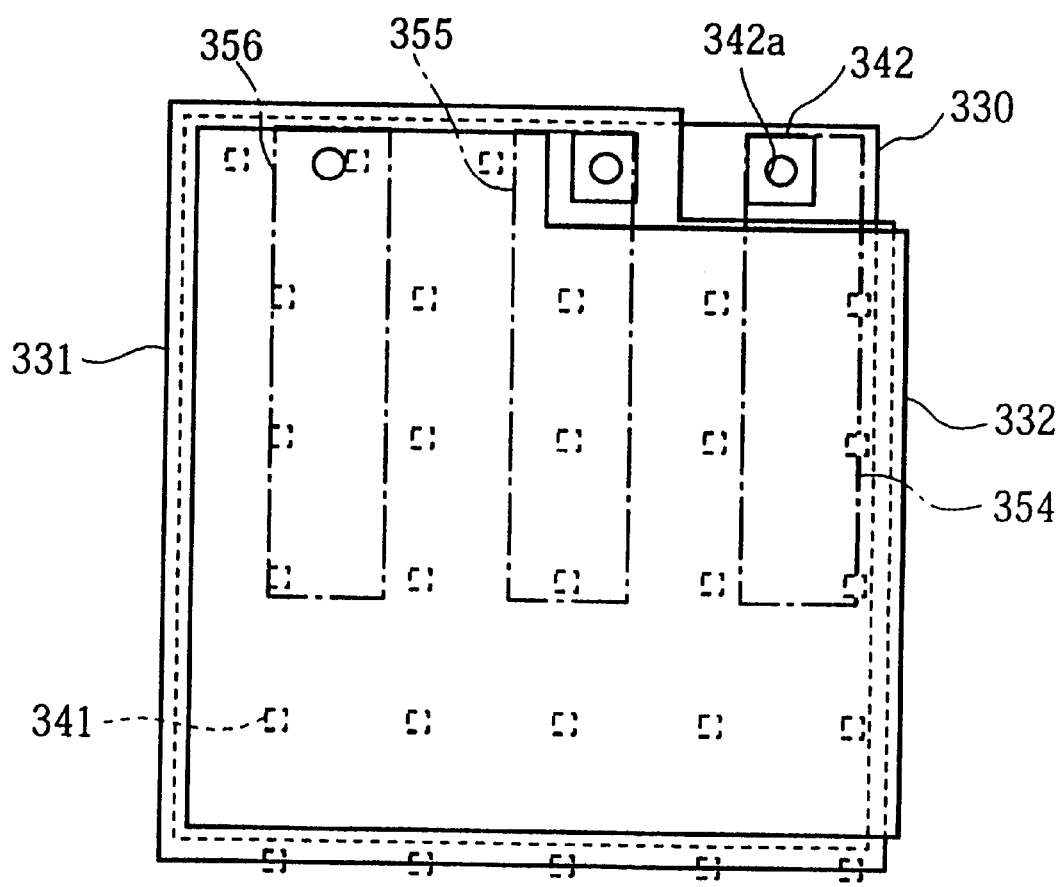
FIG. 69 is a cross sectional plane view showing the rough structure of the display unit in the liquid crystal display device of Embodiment 4-1.

As shown in FIG. 69 the first and second pixel electrodes 330 and 331 are made of a transparent ITO film. The first pixel electrode 330 is connected with the TFT device 314 via the relay electrode 351 and the connection terminal 354 so as to be used for both the first and second liquid crystal layers 326 and 327. To be more specific, the first pixel electrode 330 is used as a pixel electrode for the first liquid crystal layer 326 and as a counter electrode for the second liqliquid crystal layer 327. Similarly, the second pixel electrode 331 is used as a pixel electrode for the second liquid crystal layer 327 and as a counter electrode for the third liquid crystal layer 328. The third pixel electrode 332, which is made of aluminum with a thickness of 500 nm has a function as a reflective film.

The first-third sealing plates 333–335 are made of a polymer compound film, and their thickness is set at 1.0 μm in the present embodiment.

The spacers 341a–341c are 4 μm-high square pillars whose cross section is about 10 μm×10 μm and are arranged regularly with a 50 μm pitch on the first-third display layers 323–325, respectively. The shape and arrangement not only prevent each of the first-third liquid crystal layers 326–328 from becoming uneven in thickness due to the bending of the first-third sealing plates 333–335, but also secure a 95% or higher effective open area ratio. Also, the structure has excellent mechanical strength. The area density (size and arrangement pitch) of the spacers 341a–341c is not limited to the one mentioned above, but can be set in accordance with the material and thickness of the first-third sealing plates 333–335 so as to secure the stacking of the first-third liquid crystal layers 326–328 and the effective open area ratio.

The cubic interconnection pads 342 and 342' are 4 μm-high square pillars whose cross section is about 30 μm×30 μm and are provided with opening portions 342a and 342'a (diameter: 10 μm) for cubic interconnection, respectively.

As shown in FIG. 66 the connection terminals 354–356 are made of aluminum in the form of rectangle with a width U of 50 μm and a length V of 150 μm. The pitch between these connection terminals is 100 μm.

Figure 70A:
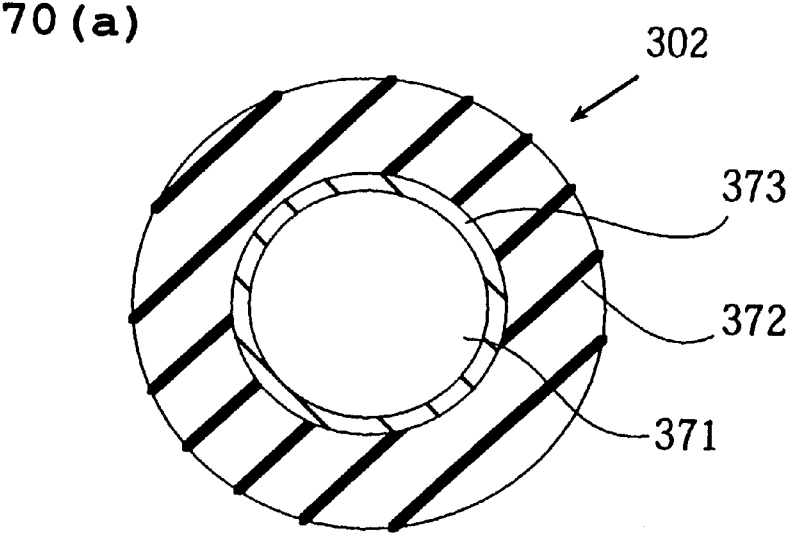
FIGS. 70(a) and 70(b) are cross sectional views showing the rough structure of the anisotropic conductive adhesive in the liquid crystal display device of Embodiment 4-1.
Figure 70B:
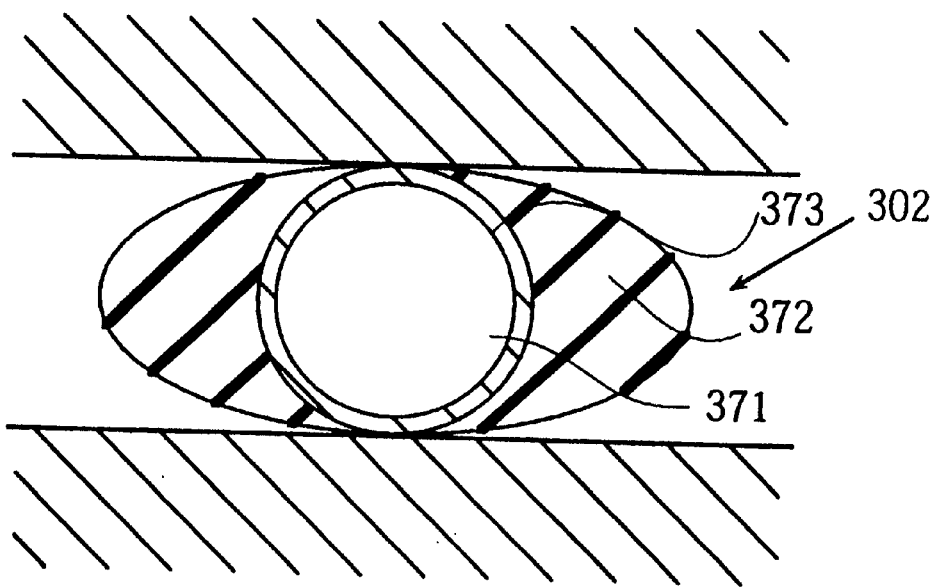

As shown in FIG. 70 the anisotropic conductive adhesive materials 302 are adhesive beads made by coating 5 μm-diameter beads 71 (made of an acrylic resin) plated with gold 373 with an epoxy resin 372. The anisotropic conductive adhesive materials 302 are diffused so as to make a dispersion density at least as high as to connect the array substrate 301 and the display unit 303 electrically on the array substrate 301. To be more specific, the anisotropic conductive adhesive materials 302a–302c are pressed so that the driving electrodes 315–317 are connected with the connection terminals 354–356, respectively, via a bead 371. As a result, as shown in FIG. 70(b) the epoxy resin 372 becomes an oval, which prevents the short circuit with an adjacent one of the anisotropic conductive adhesive materials 302.

The method for fabricating the liquid crystal display device of the present embodiment will be described as follows.

As shown in FIG. 71(a) the transparent common electrode 329 made of ITO is formed onto the substrate 321. After forming a light shielding film 361 made of chrome onto the regions corresponding to the spacers 341a and the cubic interconnection pads 342 and 342', a positive type resist (OFPR800 produced by Tokyo Ohka Kogyo Co., Ltd.) is applied as thick as 4.0 μm by using a spinner or the like. Furthermore, by the exposure from the substrate 321 side and the following development, the spacers 341a and the cubic interconnection pads 342 and 342' are formed as shown in FIG. 71(b).

Figure 72A:
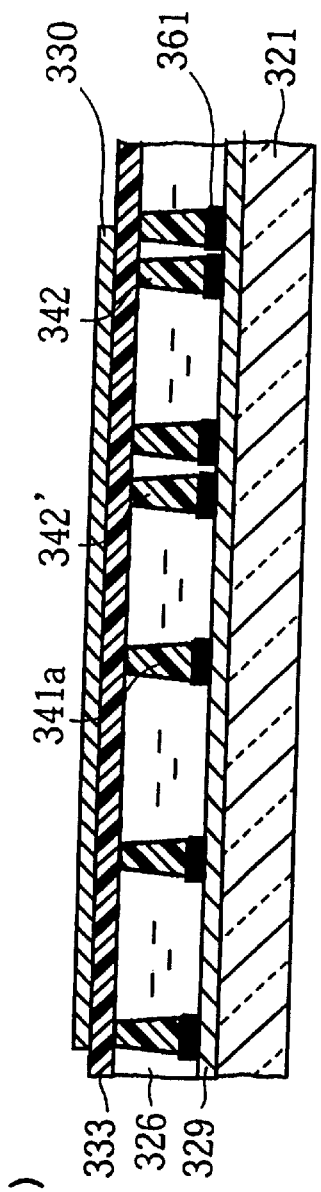
FIGS. 72(*a*) and 72(*b*) are illustrations showing fabrication processes of the liquid crystal display device of by Embodiment 4-1.

Then, a 1.0 μm-thick negative type resist film on which a 0.2 μm-thick adhesive layer made of an urethane resin is applied is laminated onto the spacers 341a and the cubic interconnection pads 342 and 342'. The negative type resist is bonded onto the spacers 341a, and a UV ray is irradiated from the negative type resist side. As a result, the negative type resist is polymerized and hardened so as to form the first sealing plate 333 as shown in FIG. 72(a). Although the first sealing plate 333 is bonded onto the substrate 321 in the vicinity of the display region having no spacers 341a, that is, in the non-display region, spacers are provided in part of the non-display region so as to provide the inlets of the liquid crystal.

An ITO film is formed onto the first sealing plate 333 by spattering, and patterned to form the first pixel electrode 330 by photolithography and etching.

The guest host liquid crystal prepared by dissolving a cyan dichroic dye in a positive type chiral nematic liquid crystal is implanted through the inlets and the inlets are closed, so as to form the first liquid crystal layer 326 as shown in FIG. 72(a).

The second liquid crystal layer 327 is produced in the same manner as the first liquid crystal layer 326. The positive type resist is applied onto the first pixel electrode 330, exposed from the substrate 321 side, so as to form the spacers 341b and the cubic interconnection pads 342 and 342' on the same positions as those of the first liquid crystal layer 326 in a self-aligned manner.

Figure 72B:
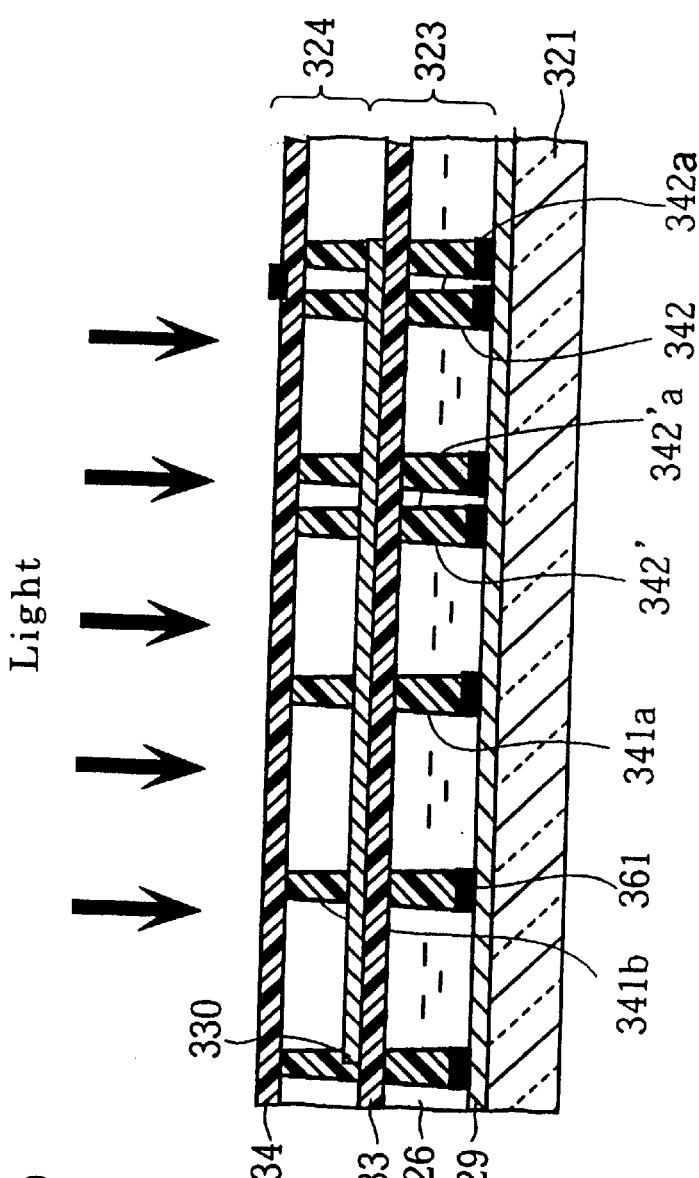

A negative type resist film on which an adhesive layer is applied is laminated onto the spacers 341b and the cubic interconnection pads 342 and 342'. As shown in FIG. 72(b) a UV ray is irradiated in accordance with a normal mask exposure while shielding the spot in the center of the cubic interconnection pad 342 where the 10 micron-diameter opening portion 342a is to be formed. The opening portion 342a is formed in the resist film, and the other region is hardened by development so as to form the second sealing plate 334. Although the second sealing plate 334 is bonded onto the substrate 321 in the vicinity of the display region having no spacers 341b, spacers are provided in part of the non-display region so as to provide the inlets of the liquid crystal.

An ITO film is formed on the second sealing plate 334 by spattering, and the second pixel electrode 331 and the relay electrode 351 are formed by photolithography and etching. A guest host liquid crystal comprising a positive type chiral nematic liquid crystal and a dichroic dye of magenta dissolved therein is implanted through the inlets so as to form the second liquid crystal layer 327 as shown in FIG. 73(a).

The third liquid crystal layer 328 is formed in the same manner as the second liquid crystal layer 327 as follows. The spacers 341c and the cubic interconnection pads 342 and 342' are formed in a self-aligned manner onto the second pixel electrode 331. A negative type resist film with an adhesive layer applied thereon is laminated onto the spacers 341c and the cubic interconnection pads 342 and 342'.

A UV ray is irradiated in accordance with a normal mask exposure while shielding the spots where the opening portions 342a and 342'a of the cubic interconnection pads 342 and 342' are to be formed. The opening portions 342a and 342'a are formed in the negative type resist film and the other region is hardened so as to form the third sealing plate 335. Although the third sealing plate 335 is bonded onto the substrate 321 in the vicinity of the display region having no spacers 341, spacers are provided in part of the non-display region so as to provide the inlets of the liquid crystal.

An aluminum film is formed as thick as 500 nm onto the third sealing plate 335 by spattering, and the third pixel electrode 332 and the relay electrode 351 are formed by photolithography and etching. A guest host liquid crystal comprising a positive type chiral nematic liquid crystal and a dichroic dye of yellow dissolved therein is implanted through the inlets so as to form the third liquid crystal layer 328 as shown in FIG. 73(b).

Furthermore, a 5 μm-thick negative type resist (FVR produced by Fuji Yakuhin) is applied onto the third sealing plate 335. Then, the positions where the contact holes 344 are formed are covered with a mask, and light is irradiated upon the negative type resist to be hardened. As a result, as shown in FIG. 74(a) the polymer resin layer 322 having contact holes 344 is formed. The polymer resin layer 322 has hardness corresponding to 4H of pencil hardness by JIS examination. The hardness prevents the anisotropic conductive adhesive materials 302 from sinking into the third sealing plate 335 and making its surface uneven when the array substrate 301 and the display unit 303 are bonded to each other via the anisotropic conductive adhesive materials 302.

Then, a 500 nm-thick aluminum film is formed onto the polymer resin layer by spattering, and patterned to have a fixed shape. Consequently, the connection terminals 354–356 are formed as shown in FIG. 74(b).

The inspection process for inspecting the display conditions of the display unit 3 is conducted as follows. With an inspector, the connection terminals 354–356 are supplied with voltage to drive the first-third liquid crystal layers 326–328. While no voltage is being applied, the first-third liquid crystal layers 326–328 exhibit lights of cyan, magenta, and yellow, respectively, and while a voltage is being applied, these layers become transparent, making it possible to inspect their operational conditions. When an error such as point defect or line defect is detected in the display unit 303, only the display unit 303 is abandoned. Since the inspection process is conducted before the array substrate 301 and the display unit 303 are combined, it becomes unnecessary to abandon the array substrate 301 together with the display unit 303 when the display unit 303 is detected to be defective. As a result, the fabrication cost is decreased and the yield is increased.

The anisotropic conductive adhesive materials 302 are diffused onto the glass substrate 311 previously provided with the TFT devices 312–314 and the driving electrodes 315–317 which are the drain ends of these TFT devices. It is preferable that the amount of diffusing the anisotropic conductive adhesive materials 302 is so adjusted as to be distributed at least one for each of the connection terminals 354–356.

After the connection terminals 354–356 and the driving electrodes 315–317 are aligned, the array substrate 301 and the display unit 303 are combined. The alignment does not need higher accuracy than arranging the array substrate 301 and the display unit 303 with certain precision on a plane. They are combined by being pressed with 0.2 atmospheric pressure while being heated at 120° C. The application of 0.2 atmospheric pressure changes the epoxy resin 372 in the anisotropic conductive adhesive materials 302 to an oval form. As a result, the gold plating 373 is in contact with the driving electrode 315 and the connection terminal 356 so as to connect them. The epoxy resin 372, which becomes an oval has an insulation function in the direction orthogonal to the film thickness direction.

Since the epoxy resin 372 can be hardened by being heated at 120° C., the array substrate 301 and the display unit 303 can be combined while the connection between the driving electrodes 315–317 and the connection terminals 354–356 is maintained.

It has been confirmed that when the reflective type liquid crystal display device of the present embodiment thus fabricated is driven by entering image signals and the like to the array substrate 301, bright color images are displayed. Since the array substrate 301 and the display unit provided with the first-third liquid crystal layers 326–328 are independent of each other, even when a display defect is detected in the liquid crystal layers, the array substrate 301 having TFT devices 312–314 does not have to be abandoned. Consequently, the fabrication cost is decreased and the yield is increased.

In the present embodiment, gold-plated acrylic resin beads 371 are coated with the epoxy resin 372 to make the anisotropic conductive adhesive materials 302; however, the adhesive materials may be conductive only in the thickness direction of the liquid crystal display device. Even conductive adhesive materials having no anisotropy in the thickness direction can be used by controlling its dispersion density so as not to cause short circuit between an adjacent pixel and the conductive adhesive materials connected to each other.

Although TFT devices are used as non-linear elements in the present embodiment, two-terminal elements such as diodes can be used instead. Also a resin substrate provided with a driver IC thereon such as a multi-layered circuit substrate may be used for the array substrate. In that case, a further cost reduction can be realized when the liquid crystal display device has high fabrication cost.

Although the third pixel electrode 332 is used as a reflective film in the present embodiment, it is possible that the electrode 332 is a transparent electrode and the common electrode made of aluminum or the like is a reflective film. Also the third pixel electrode 332 can be formed on the surface of the glass substrate 311 or the substrate 321.

The thickness of the first-third sealing plates 333–335 is 1.0 $\mu$m in the present embodiment; however, it can be in the range of 0.5 to 10 $\mu$m.

To be more specific, the thinner the first sealing plate 333 is, the smaller the voltage to be supplied to the liquid crystal layer 326 can be, so that the driving voltage of the TFT devices 312–314 can be reduced. However, when the first sealing plate 333 is too thin, it is deformed during the formation of the first pixel electrode 330, causing wrinkles or cracks. Consequently, the first sealing plate 333 is preferably 0.5 $\mu$m or thicker. On the other hand, when the first sealing plate 333 is too thick, the dispersion density of the spacers 341 can be reduced, but there is a problem that the voltage to be supplied to the first liquid crystal layer 326 is decreased. Consequently, it is preferable that the first sealing plate 333 is 10 $\mu$m or thinner.

Embodiment 4-2

The present embodiment will be described as follows based on FIGS. 75 and 76. In the present embodiment, components having the same structure as those of Embodiment 4-1 are referred to with the same reference numbers and their description will be omitted.

Embodiment 4-1 shows a reflective type liquid crystal display device having three liquid crystal layers sequentially stacked. In contrast, the present embodiment shows a liquid crystal display device having a single liquid crystal layer.

Figure 75:
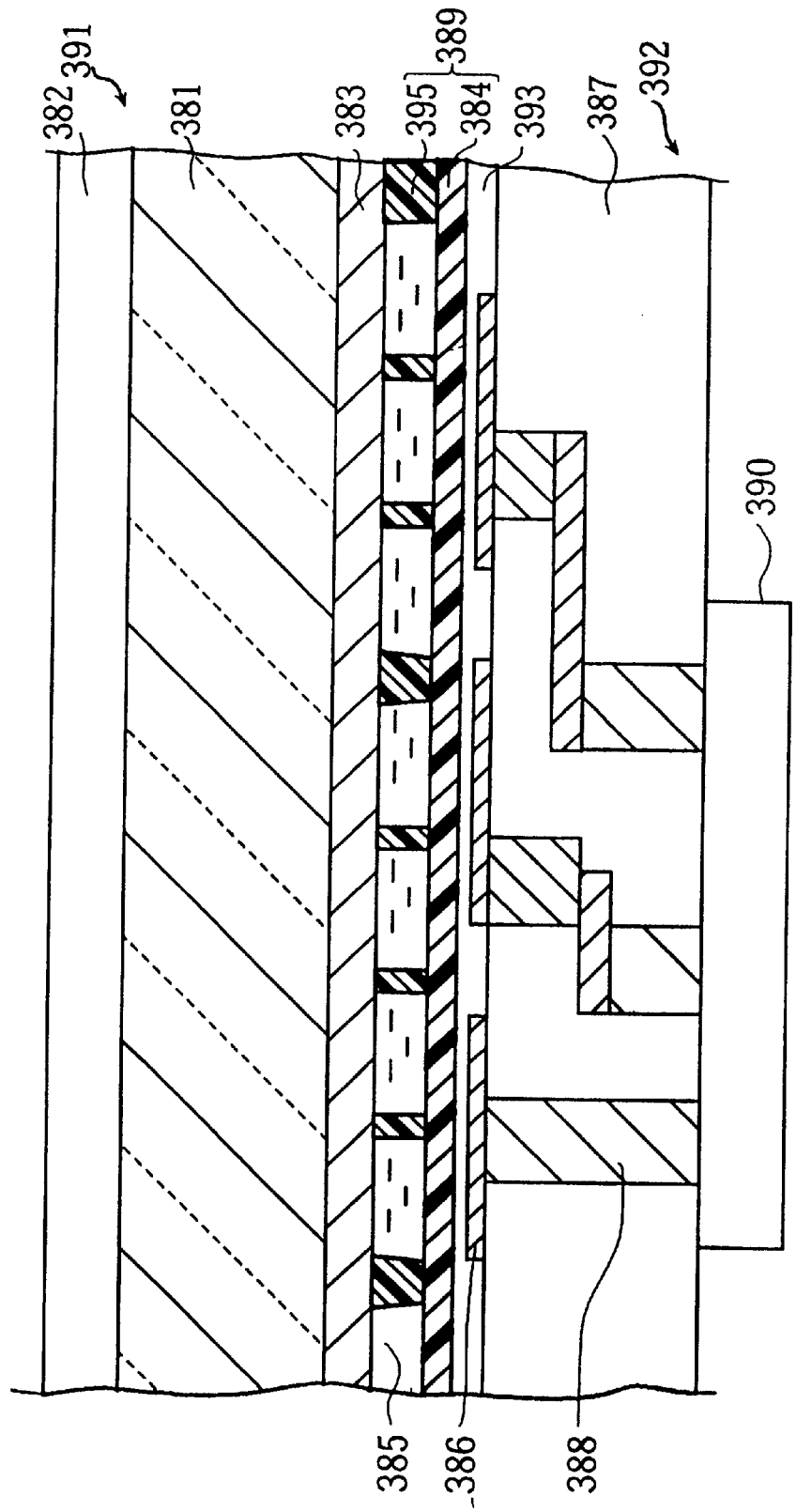
FIG. 75 is a cross sectional view showing the rough structure of the liquid crystal display device of Embodiment 4-2 of the present invention.
Figure 76:
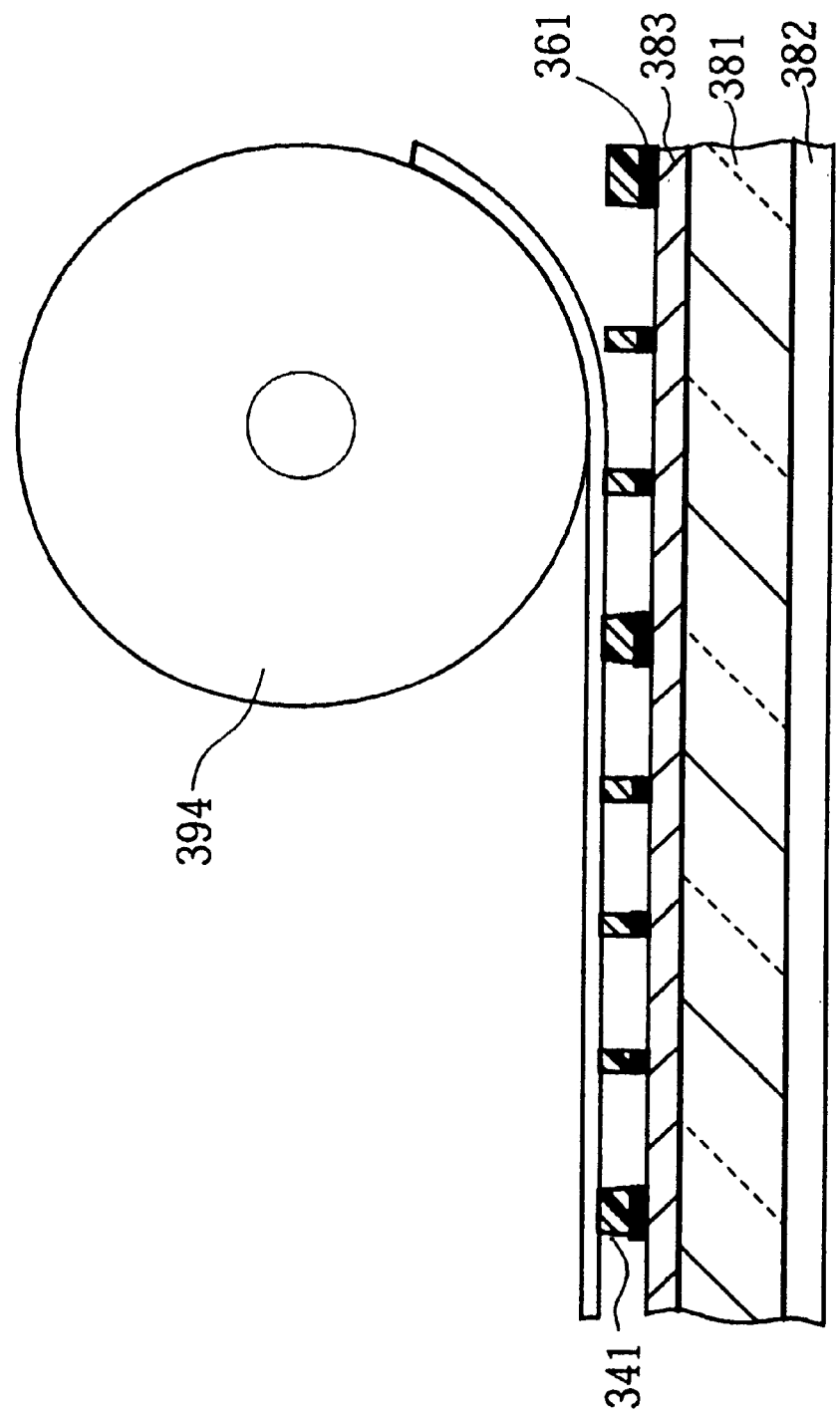
FIG. 76 is an illustration showing a fabrication process of the liquid crystal display device of Embodiment 4-2.

FIG. 75 is a cross sectional view showing the structure of the liquid crystal display device of the present embodiment.

The liquid crystal display device comprises a display unit 391, a driving substrate 392, and an adhesive material 393 which bonds the display unit 391 and the driving substrate 392.

The drive substrate 392 is provided with the pixel electrodes 386 made of aluminum or the like arranged with a fixed pitch on the surface of a resin interconnection substrate 387 which faces the display unit 391, and further provided with a peripheral circuit composed of various LSIs or a driver circuit 390 on the outside. The resin interconnection substrate 387 is made of a glass epoxy resin and has a through hole 388 to connect the pixel electrodes 386 and the driver circuit 390 electrically.

The display unit 391 is composed of a plastic substrate 381 and a display layer 389 formed thereon. A transparent electrode 383 made of an ITO film is formed on the entire surface of the plastic film substrate 381. A 100 $\mu$m-thick polarizing plate 382 made of polyethylene vinyl alcohol is provided outside the plastic substrate 381.

The display layer 389 is composed of spacers 395, a sealing plate 384, and a liquid crystal layer 385. The sealing plate 384 is 1 μm-thick PET (Polyethilene Telephthalate) film. The PET film is stretched to be a thin film and has birefringence of about 0.05 μm. The liquid crystal layer 385 consists of a chiral nematic liquid crystal containing a chiral agent so as to make a 32 μm helical pitch. Consequently, the liquid crystal molecules in the vicinity of the sealing plate 384 are homogeneously aligned which is the direction of stretching the film, and the liquid crystal layer 385 has twist nematic alignment with a twist of 45 degrees. The liquid crystal layer 385 has a gap of 4 μm.

The adhesive material 393 is a 1 μm-thick urethane resin. Besides urethane resin, it can be made of any of various well-known adhesive agents.

The method for fabricating the liquid crystal display device of the present embodiment will be described as follows.

First, the transparent electrode 383 made of an ITO film is formed by spattering onto the entire surface of the plastic film substrate 381 provided with a polarizing plate 382 made of polyethylene vinyl alcohol. After forming a light shielding film 361 made of chrome on the spots corresponding to the spacers 395 in the same manner as Embodiment 4-1, a resist film is applied as thick as 4.0 μm. Exposure is conduced from the plastic film substrate 381 side followed by development so as to form the spacers 395.

Then, a 1.0 μm-thick PET film is prepared by stretching a polymer resin material made of PET. A 0.2 μm-thick adhesive layer made of an urethane resin is applied onto the PET film and laminated onto the spacers 395 by heat press with a roll 394 shown in FIG. 76. As a result, the PET film is bonded onto the spacers 395 so as to form the sealing plate 384. In the vicinity of the display region not provided with the spacers 395, that is, in the non-display region, the sealing plate 384 is bonded onto the plastic film substrate 381; however, the spacers 395 are provided in part of the non-display region in order to provide the inlets of the liquid crystal.

The chiral nematic liquid crystal having a helical pitch of 32 μm is implanted through the inlets, so as to form the liquid crystal layer 385.

An adhesive material 352 made of an urethane resin is applied on the surface of the sealing plate 384 where the liquid crystal layer 385 is not formed.

On the other hand, an aluminum film is formed onto the resin interconnection substrate 387 by spattering and patterned to have a fixed shape, so as to form the pixel electrode 386. Furthermore, a driver circuit 390 is mounted outside the resin interconnection substrate 387.

The display unit 391 and the driving substrate 392 are bonded to each other by disposing the adhesive material 393 therebetween and applying heat press using a heated roll. As a result, the reflective type liquid crystal display device of the present embodiment is completed.

As described hereinbefore, unlike Embodiment 4-1, the reflective type liquid crystal display device of the present embodiment has the liquid crystal layer 385 between the common electrode 383 and the sealing plate 384, and the pixel electrode 386 not on the sealing plate 384 but on the resin interconnection substrate 387. Therefore, the reflective type liquid crystal display device does not require to produce the display unit 391 in accordance with the pattern of the pixel electrode 386 on the driving substrate 392, so that the display pattern which is varied depending on the uses can be easily produced only by changing the formation pattern of the pixel electrode 386 on the resin interconnection substrate 387 side.

In other words, the display layer can correspond to various array substrates having different display patterns depending on the uses, which contributes to a cost reduction.

When the display unit 391 and the driving substrate 392 are combined, their relative position on a plane is arbitrary, so that no alignment is required, which facilitates the assembly. Since the display unit 391 is formed in close contact with the resin interconnection substrate 387 made of a glass epoxy resin, it is not very affected by bending, which makes it possible to use a very thin plastic film substrate for the display unit 391. As a result, an extremely thin and light reflective type liquid crystal display device is obtained which comprises plastic liquid crystal using a plastic film substrate and being integrated into the resin interconnection substrate 387. The resin interconnection substrate 387 has various peripheral circuits mounted thereon in order to realize various functions including image display, as described above. Therefore, to mount the pixel electrode 386 or the driver circuit 390 onto the resin interconnection substrate 387 itself does not contribute to a cost increase.

Although the thickness of the sealing plate 384 is 1.0 μm in the present embodiment, it can be in the range of 0.5 to 10 μm. To be more specific, the thinner the sealing plate 384 is, the larger the voltage to be supplied to the liquid crystal layer 385 can be, which can reduce the driving voltage. However, when the sealing plate 384 is too thin, it is deformed during the formation of the pixel electrode 386, causing wrinkles or cracks. Consequently, the sealing plate 384 is preferably 0.5 μm or thicker.

On the other hand, when the sealing plate 384 is too thick, the dispersion density of the spacers 395 can be reduced, but there is a problem that the voltage to be supplied to the liquid crystal layer 385 is decreased. Consequently, the thickness of the sealing plate 384 is preferably 10 μm or below because when the thickness is similar to the gap of the liquid crystal layer 385, the liquid crystal layer 385 can be driven with a comparatively low voltage without providing a pixel electrode on the sealing plate 384.

Embodiment 4-3

Figure 77A:
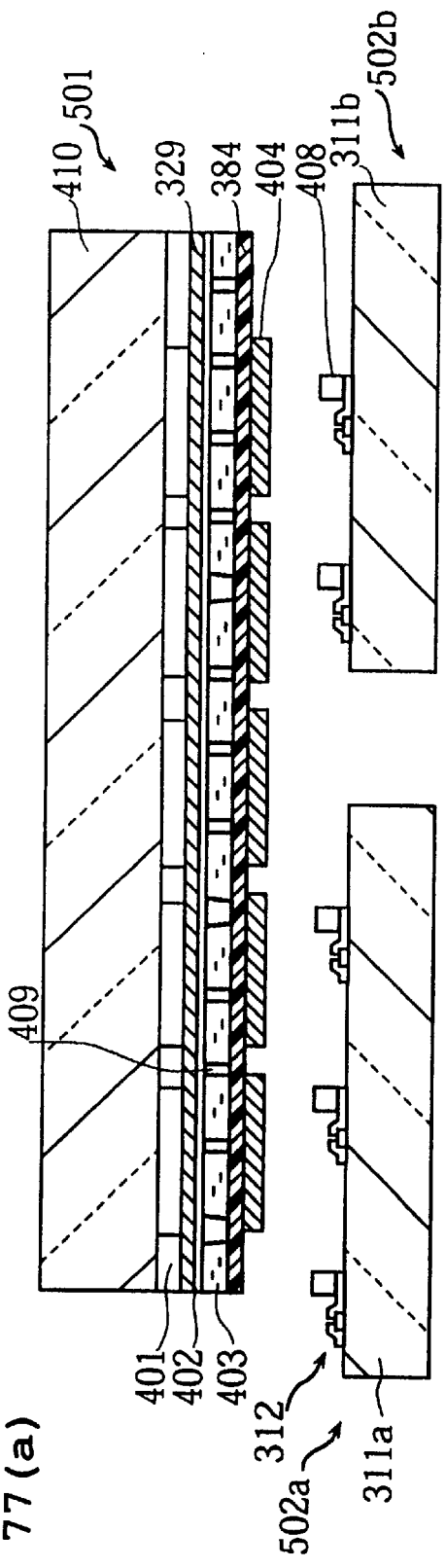
FIGS. 77(*a*) and 77(*b*) are cross sectional views showing the rough structure of the liquid crystal display device of Embodiment 4-3 of the present invention.
Figure 77B:
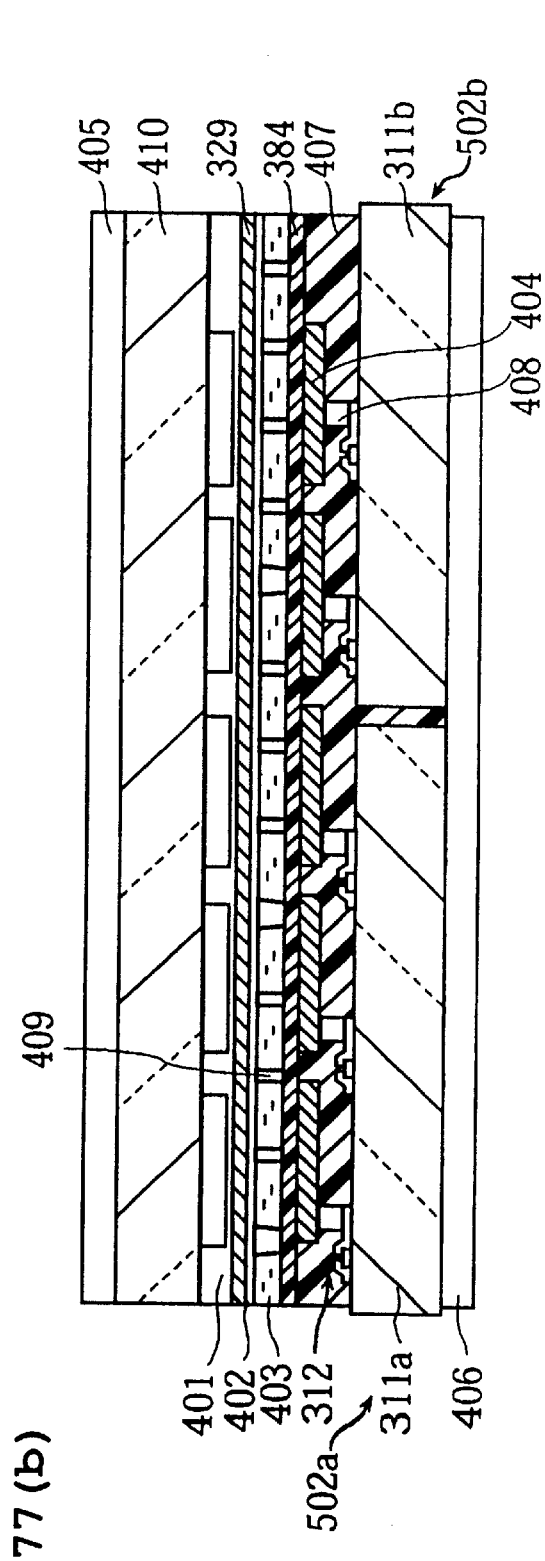
Figure 78:
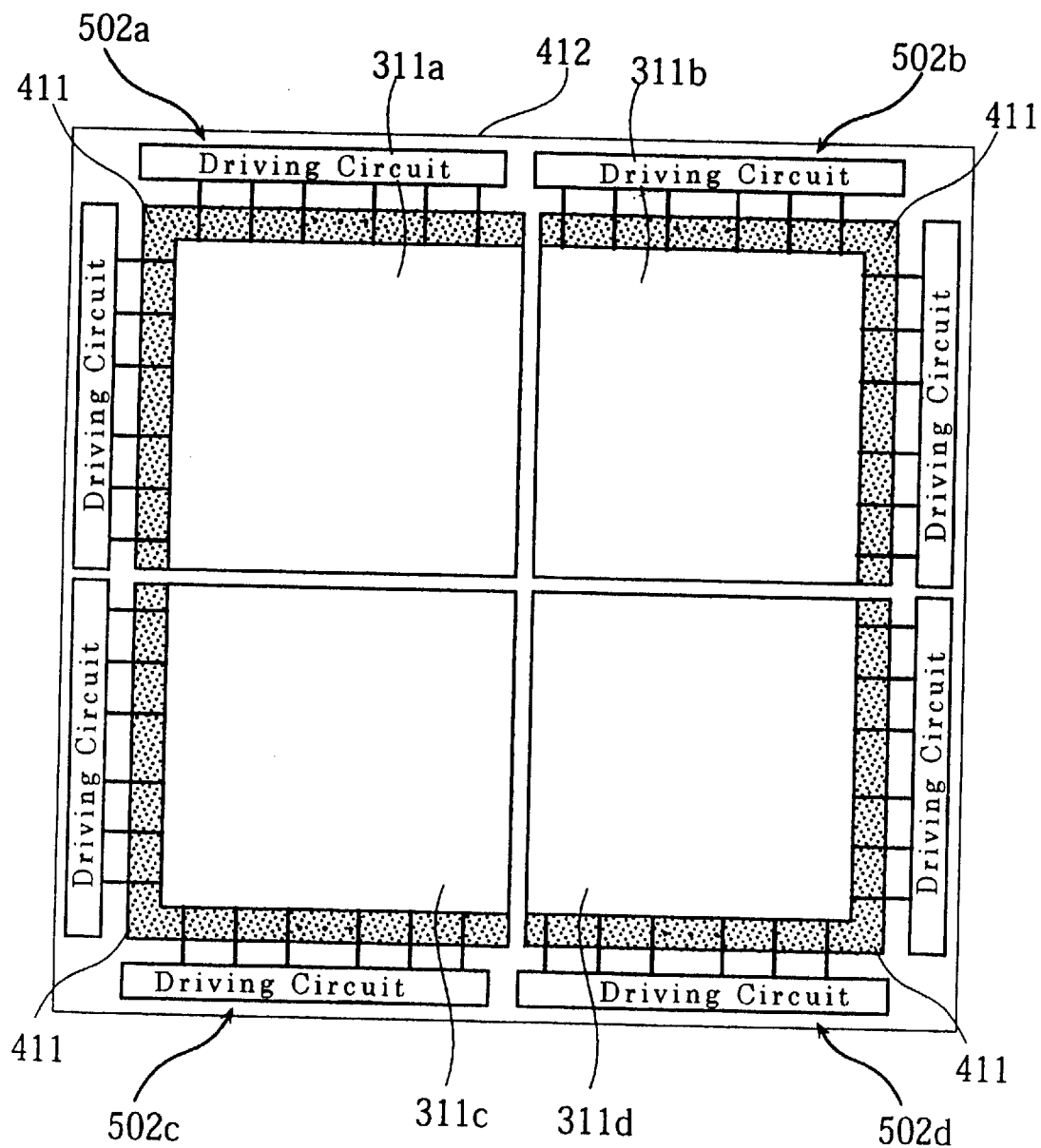
FIG. 78 is a plane view showing the rough structure of the array substrate in the liquid crystal display device of Embodiment 4-3.

The present embodiment will be described as follows based on FIGS. 77 and 78. In the present embodiment, components having the same structure as those of Embodiments 4-1 and 4-2 are referred to with the same reference numbers and their description will be omitted.

The liquid crystal display device of the present embodiment is a multi-screen LCD composing a large screen display where liquid crystal panels having 600×800×trio (×3) pixels with a pitch of 330 μm are arranged. To be more specific, as shown in FIGS. 77(*a*) and 77(*b*) the liquid crystal display device comprises a display unit 501, an array substrate 502, and an adhesive material 407 which bonds the display unit 501 and the array substrate 502.

The adhesive material 407 is a transparent acrylic thermosetting adhesive material containing no solvent. As shown in FIG. 77(*a*) the display unit 501 comprises a liquid crystal layer 403 between the substrate 410 and the sealing plate 384,which is supported by the spacers 409. The substrate 410 is provided with a polarizing plate 405 on its external surface, and with a color filter layer 401 on its internal surface. The color filter layer 401 is provided with a common electrode 329 thereon and an alignment film 402 is formed on the common electrode 329. A total of 120× 1600×3 rectangular pixel electrodes 404 are arranged on the sealing plate 384 in the form of matrix at intervals of 110 μm.

The substrate 410 is made from glass of a rectangle whose diagonal length is 85 cm. The liquid crystal layer 403 has a structure where chiral nematic liquid crystal having a helical pitch of 50 µm is twisted 90 degrees to form a twisted nematic alignment. The alignment film is made of a polyimide resin.

The spacers 409 are 5.0 µm-high square pillars whose cross section is about 10 µm×10 µm and are arranged regularly with a 50 µm pitch on the common electrode 309. The shape and arrangement not only prevent the liquid crystal layer 403 from becoming uneven in thickness due to the hanging down of the sealing plate 384 but also secure an about 95% effective open area ratio. The area density (size and arrangement pitch) of the spacers 409 is not limited to the one mentioned above, but can be set in accordance with the material and thickness of the sealing plate 384 so as to secure the stacking of the liquid crystal layer 403 and the effective open area ratio.

The color filter layer 401 has a structure where the sub pixels of red, green, and blue are arranged in the form of stripe with a 110 82 m pitch.

The array substrate 502 is composed of four array substrates 502a–502d. The array substrate 502a is composed of a glass substrate 311a provided with TFT devices 312 whose semiconductor layers are made of amorphous silicon. The TFT devices 312 are arranged in the form of matrix with a pitch of 330 µm. Aluminum terminals 408 having a height of 500 nm in their thickness direction are provided on the drain electrode (not shown) side of each of the TFT devices 312. A housing unit 411 for forming the driving circuit 413 is provided in the periphery of the right crossing two sides of the array substrate 502a. The array substrates 502b–502d have almost the same structure as the array substrate 502a.

The method for fabricating the liquid crystal display device of the present embodiment will be described as follows.

The common electrode 329 is formed by spattering onto the substrate 410 previously provided with the color filter layer 401. The polyimide resin is applied onto the common electrode 329, and subjected to a rubbing method in a fixed direction so as to form the alignment film 402.

In the same manner as Embodiment 4-2, after the light shielding film made of chrome is formed on the spots corresponding to the spacers 409, a positive type resist is applied as thick as 5.0 µm using a spinner. Then, exposure is conducted from the substrate 410 side followed by development so as to form the spacers 409.

The 1.0 µm-thick PET film on which a 0.2 µm-thick adhesive layer made of an urethane resin is applied is subjected to a lamination treatment so as to form the sealing plate 384. The PET film is thinned by previously being stretched in the direction orthogonal to the rubbing direction when the rubbing method is conducted to form the alignment film 402. As a result, the liquid crystal molecules in the vicinity of the sealing plate 384 are oriented in the direction parallel to the stretching direction, and the liquid crystal molecules in the vicinity of the alignment film 402 are oriented in the direction parallel to the rubbing direction, so as to form a twisted nematic alignment with a twist of 90 degrees.

In the vicinity of the display region not provided with the spacers 409, the sealing plate 384 is bonded onto the substrate 410; however, some spacers 409 are arranged in part of the non-display region in order to provide the inlets of the liquid crystal.

An ITO film is formed on the sealing plate 384, and photolithography and etching are conducted to form the pixel electrodes 404. Furthermore, chiral nematic liquid crystal is implanted through the inlets so as to form the liquid crystal layer 403.

The TFT devices 312 are formed on the glass substrate in a conventional manner. The aluminum terminals 408 are formed on the drain electrode side of each of the TFT devices 312. The glass substrate is divided into the array substrates 502a–502d with a scriber so that the array substrates 502a–502d each have a housing unit 411 for mounting a driving circuit along the right crossing two sides of the array substrate. There is an error of about 30 µm between the measures set before dividing the substrate and the measures obtained after the substrate is actually divided, which makes the array substrate 502a slightly closer to the center than the array substrate 502b. As shown in FIG. 78 the array substrates 502a–502d are arranged so as to place the housing units 411 outward and fixed with an enclosure 412.

An adhesive material 407 is applied on the sealing plate 384 and the pixel electrode 404 in the display unit 501. The display unit 402 and the array substrates 502a–502d fixed within the enclosure 412 are aligned, and heated while a fixed pressure is being applied so as to harden the adhesive material 407. The alignment does not need higher accuracy than arranging the array substrates 502a–502d and the display unit 501 with a fixed precision on a plane.

The polarizing plate 405 is arranged outside the substrate 410 and a polarizing plate 406 is arranged outside the array substrates 311a–311d. Finally, a back light is provided outside the glass substrate 311. As a result, the permeable type liquid crystal display device of the present embodiment is obtained.

As described hereinbefore, the permeable type liquid crystal display device of the present embodiment has an effect of enabling continuous image display in a large screen without showing the joints among the array substrates 502a–502d on the screen, in addition to the same effect as that of Embodiment 4-1.

To be more specific, a conventional multi-screen LCD is composed of a plurality of liquid crystal panels each having a unit for providing a driving circuit at the edges of the display region. Arranging these liquid crystal panels generates spaces between the display regions of adjacent liquid crystal panels, making the pitch of the pixel electrodes uneven at the joints among the liquid crystal panels. As a result, images become intermittent on the display screen, making joints recognizable. In conventional devices, various improvements are tried in order to make the joints unnoticeable. For example, the pixel pitch is made large or the panels are arranged so precisely as to make the difference in precision between the measures set before dividing the liquid crystal panel and the measures obtained after the liquid crystal panel is actually divided. However, it is still difficult to arrange the liquid crystal panels so precisely as to make the joints unnoticeable because the division of the panels is conducted mechanically.

In contrast, in the permeable type liquid crystal display device of the present embodiment, the pixel electrodes 404 are arranged in the display unit 501 with a fixed pixel pitch, and not provided in the array substrates 502a–502d, so that the pitch does not become uneven. As a result, the image displayed on the screen does not become discontinuous. Also precise alignment is unnecessary when the array substrates 502a–502d are arranged on the same plane. Since the pixel pitch does not have to be larger, high precision can be obtained. Thus, unlike the conventional multi-screen LCD, the present embodiment can provide a liquid crystal display device capable of offering continuous images in a large screen without showing the joints among the panels.

Although the present invention has bee fully described by way of examples with reference to the accompanying drawings, it is to be noted that various changes and modifications will be apparent to those skilled in the art. Therefore, unless such changes and modifications depart from the scope of the resent invention, they should be construed as being included therein.

INDUSTRIAL UTILIZATION

As described hereinbefore, the structure of the present invention can achieve all the objects of the present invention.

To be more specific, the liquid crystal display device is structure by forming gaps between a substrate and a resin film and between each adjacent resin films, and then sealing liquid crystal into the gaps. In this structure, the liquid crystal display device does not cause unevenness in color resulting from the parallax due to the stacking of liquid crystal layers, so that bright display and a high contrast ratio are realized. Also the fabrication processes are simplified and the fabrication yield is increased.

The liquid crystal display device comprising stacked resin films makes it possible to connect the electrodes formed on these resin films by conducting a contact hole formation process only one time, securing the connection inside contact holes. The use of an inorganic material such as ITO as the transparent electrodes formed on the resin films prevents the resin films from wrinkling and keeps their surfaces smooth, which makes the liquid crystal display device maintain its characteristics as a display device.

The supporting members are formed by exposing a photosensitive resin layer via the opening portions formed in the reflective film so as to harden the resin layer. This makes it possible to reduce the fabrication cost because a mask alignment process becomes unnecessary in forming the supporting members and to easily increase the contrast ratio by reducing the area for the supporting members.

The use of conductive connection means for connecting the display layer having the liquid crystal layers and the array substrate having non-linear elements makes it possible to provide a full-color liquid crystal display device which is fabricated at a low cost with a higher yield because it does not need to abandon the array substrate when a liquid crystal layer or the like has a display defect. The liquid crystal display device has another effect of lowering the precision level in alignment because the pixel electrodes and the driving electrodes may be relatively positioned in a plane only to be connected each other by the connection means.

The use of an adhesive material for combining the driving substrate having the pixel electrodes and the driving circuits, and the display layer having the liquid crystal layers and the common electrode makes it unnecessary to produce the display layer in accordance with the pattern form of the driving electrodes on the driving substrate. Therefore, the display layer can correspond to various array substrates having different display patterns depending on the uses. Since the display layer and the driving substrate can be combined in an arbitrary relative position on a plane, no alignment is required, which facilitates the assembly. It is also possible to provide a liquid crystal display device which is thin and light in weight and defies bending or other deformation, and a method for fabricating the liquid crystal display device.

The use of an adhesive material to bond the display layer provided with pixel electrodes arranged at regular intervals and a plurality of array substrates provided with non-linear elements prevents the joints among the array substrates from becoming recognizable on the display screen. Thus, it becomes possible to provide a liquid crystal display device having a multi-screen where the joints among the panels are unnoticeable, and a method for fabricating the liquid crystal display device.

What is claimed is:

1. A liquid crystal display device comprising:
   a substrate having a pixel electrode and a driving element connected to the pixel electrode on a surface of said substrate;
   a resin film being disposed above said substrate and having a common electrode on a surface of said resin film;
   a plurality of supporting members each being columnar and standing on said substrate so as to support said resin film;
   an adhesive layer being disposed between said resin film and said plurality of supporting members so as to bond said resin film to said plurality of supporting members, said adhesive layer being made of a thermoplastic material and exerting thermoplastic characteristics so as to bond said resin film to said plurality of supporting members; and
   a liquid crystal layer being composed of liquid crystal and being disposed between said substrate and said resin film.

2. The liquid crystal display device of claim 1, wherein said resin film is made of one of a material having no thermoplasticity and a material having thermoplasticity and exerting thermoplastic characteristics at a higher temperature than said adhesive layer; and
   said plurality of supporting members are made of one of a material having no thermoplasticity, a material having thermoplasticity and exerting thermoplastic characteristics at a higher temperature than said adhesive layer, and a material being hardened before said resin film is bonded to said plurality of supporting members.

3. The liquid crystal display device of claim 1, wherein said substrate is a transparent substrate; and
   said plurality of supporting members and said adhesive layer are a positive type photo resist formed by disposing a light shielding film over spots on said substrate where said plurality of supporting members are arranged and by conducting photolithography using the light shielding film as a photo mask.

4. The liquid crystal display device of claim 1, wherein said substrate is a transparent substrate; and
   said plurality of supporting members and said adhesive layer are a negative type photo resist formed by disposing a light shielding film on said substrate excluding spots where said plurality of supporting members are arranged and by conducting photolithography using the light shielding film as a photo mask.

5. The liquid crystal display device of claim 1, wherein a distance between adjacent ones of said plurality of supporting members arranged in a pixel region, of said plurality of supporting members is in a range of 15 to 100 $\mu$m.

6. The liquid crystal display device of claim 1, wherein thickness of said resin film is in a range of 0.5 to 10 $\mu$m.

7. The liquid crystal display device of claim 1, wherein resistivity of said resin film is $10^{10}$ $\Omega$·cm or below.

8. The liquid crystal display device of claim 1, wherein said resin film has breathability, and
   said common electrode is made of a metallic material having reflection characteristics and also serves as a shading film for preventing oxygen or moisture in open air from permeating through said resin film.

9. The liquid crystal display device of claim 1, wherein said resin film has breathability, and a shading film is provided on said common electrode so as to prevent oxygen or moisture in open air from permeating through said resin film.

10. The liquid crystal display device of claim 9, wherein said common electrode is a transparent electrode, and said shading film is made of a metallic material having reflection characteristics and also serves as a reflective plate.

11. The liquid crystal display device of claim 1, wherein said common electrode is a transparent electrode;

a resin layer is formed on said common electrode, said resin layer being transparent and having a multiplicity of fine convex and concave portions on a surface thereof; and a reflective film having a shape of a multiplicity of fine convex and concave portions is formed correspondingly on said multiplicity of fine convex and concave portions on the surface of said resin layer.

12. A liquid crystal display device comprising:

a substrate being transparent and having a pixel electrode and a driving element connected to the pixel electrode on a surface of said substrate;

a plurality of resin films being stacked above said substrate, an uppermost resin film of said plurality of resin films having a common electrode on a surface thereof, and remaining ones of said plurality of resin films each having a pixel electrode on a surface thereof;

a plurality of liquid crystal layers each being formed by arranging a plurality of supporting members each being columnar in each gap between said substrate and a lowermost resin film of said plurality of resin films and between adjacent ones of said plurality of resin films, and by sealing liquid crystal into said each gap;

said substrate having more driving elements on the surface thereof, said more driving elements being electrically connected to a corresponding one of the pixel electrodes formed on the remaining ones of said plurality of resin films via cubic interconnection provided in relation to each of the pixel electrodes formed on the remaining ones of said plurality of resin films;

a plurality of adhesive layers each being disposed between each of said plurality of supporting members and each of said plurality of resin films, said plurality of adhesive layers being made of a thermoplastic material and exerting thermoplastic characteristics so as to bond each of said plurality of resin films to each of said plurality of supporting members; and the supporting members between adjacent ones of said plurality of resin films being arranged substantially in same positions as the supporting members between said substrate and the lowermost resin film with respect to a plane parallel to said substrate.

13. The liquid crystal display device of claim 12, wherein said plurality of resin films are made of one of a material having no thermoplasticity and a material having thermoplasticity and exerting thermoplastic characteristics at a higher temperature than said plurality of adhesive layers; and said plurality of supporting members are made of one of a material having no thermoplasticity, a material having thermoplasticity and exerting thermoplastic characteristics at a higher temperature than said plurality of adhesive layers, and a material being hardened before said plurality of resin films are bonded to said plurality of supporting members.

14. The liquid crystal display device of claim 12, wherein three liquid crystal layers and three resin films are stacked, and the liquid crystals composing the three liquid crystal layers are guest host liquid crystals each containing a dichroic dye, each dichroic dye having a different color from remaining dichroic dyes.

15. The liquid crystal display device of claim 14, wherein the three resin films have optical anisotropy and are so arranged as to make all slow axes of the three resin films be in a same direction.

16. The liquid crystal display device of claim 12, wherein said substrate is a transparent substrate; and said plurality of supporting members and said plurality of adhesive layers are a positive type photo resist formed by disposing a light shielding film over spots on said substrate where said plurality of supporting members are arranged and by conducting photolithography using the light shielding film as a photo mask.

17. The liquid crystal display device of claim 12, wherein said substrate is a transparent substrate; and said plurality of supporting members and said plurality of adhesive layers are a negative type photo resist formed by disposing a light shielding film on said substrate excluding spots where said plurality of supporting members are arranged and by conducting photolithography using the light shielding film as a photo mask.

18. The liquid crystal display device of claim 12, wherein a distance between adjacent ones of said plurality of supporting members arranged in a pixel region, of said plurality of supporting members is in a range of 15 to 100 $\mu$m.

19. The liquid crystal display device of claim 12, wherein thickness of said plurality of resin films is in a range of 0.5 to 10 $\mu$m.

20. The liquid crystal display device of claim 12, wherein resistivity of said plurality of resin films is $10^{10}$ $\Omega \cdot$cm or below.

21. The liquid crystal display device of claim 12, wherein said plurality of resin films have optical anisotropy and are so arranged as to make all slow axes said plurality of resin films be in a same direction.

22. The liquid crystal display device of claim 12, wherein said plurality of resin films have breathability, and said common electrode is made of a metallic material having reflection characteristics and also serves as a shading film for preventing oxygen or moisture in open air from permeating through the uppermost resin film.

23. The liquid crystal display device of claim 12, wherein said plurality of resin films have breathability, and a shading film is provided on said common electrode so as to prevent oxygen or moisture in open air from permeating through the uppermost resin film.

24. The liquid crystal display device of claim 23, wherein said common electrode is a transparent electrode, and said shading film is made of a metallic material having reflection characteristics and also serves as a reflective plate.

25. The liquid crystal display device of claim 12, wherein said common electrode is a transparent electrode;

a resin layer is formed on said common electrode, said resin layer being transparent and having a multiplicity of fine convex and concave portions on a surface thereof; and a reflective film having a shape of a multiplicity of fine convex and concave portions is formed correspondingly on said multiplicity of fine convex and concave portions on the surface of said resin layer.

26. A method for fabricating a liquid crystal display device comprising the steps of:

arranging a plurality of supporting members each being columnar onto a substrate, said substrate being transparent and having a pixel electrode and a driving element connected with the pixel electrode thereon;

forming an adhesive layer onto said plurality of supporting members;

bonding a resin film to said plurality of supporting members by disposing said resin film onto said adhesive layer formed on said plurality of supporting members and applying heat to said resin film while maintaining a gap between said substrate and said resin film;

forming a common electrode onto a surface of said resin film; and sealing liquid crystal into said gap between said substrate and said resin film.

27. The method for fabricating a liquid crystal display device of claim 26, wherein the step of bonding said resin to said plurality of supporting members comprises the sub step of pressing said resin film with a heated roller.

28. The method for fabricating a liquid crystal display device of claim 27, wherein said adhesive layer is made of a material which exerts thermoplastic characteristics at a lower temperature than said resin film exerting thermoplastic characteristics, and the heated roller heats said resin film to a temperature lower than said resin film exerting thermoplastic characteristics and higher than said adhesive layer exerting thermoplastic characteristics.

29. The method for fabricating a liquid crystal display device of claim 27, wherein at least a surface of the heated roller is made of a rigid material.

30. The method for fabricating a liquid crystal display device of claim 26, wherein the step of arranging said plurality of supporting members onto said substrate comprises:

forming a light shielding film over spots on a surface of said substrate where said plurality of supporting members are arranged;

applying a first positive type resist onto the surface of said substrate;

exposing the first positive type resist from a rear surface of said substrate using the light shielding film as a photo mask; and developing the first positive type resist with a first developing solution and hardening the first positive type resist; and the step of forming said adhesive layer onto said plurality of supporting members comprises:

applying a second positive type resist onto the surface of said substrate having said plurality of supporting members thereon;

exposing the second positive type resist from the rear surface of said substrate using the light shielding film as the photo mask; and developing the second positive type resist with a second developing solution.

31. The method for fabricating a liquid crystal display device of claim 26, wherein the step of forming an adhesive layer and the step of bonding said resin film comprises:

preparing said resin film applied with an adhesive layer; and arranging said resin film onto said plurality of supporting members with heating so that said surface applied with said adhesive layer faces said plurality of supporting members.

32. The method for fabricating a liquid crystal display device of claim 26, wherein in the step of arranging said plurality of supporting members on said substrate, supporting members arranged in a pixel region are formed to have more width than height.

33. The method for fabricating a liquid crystal display device of claim 26, wherein thickness of said resin film is in a range of 0.5 to 10 $\mu$m.

34. The method for fabricating a liquid crystal display device of claim 26, wherein a main component of said resin film is a polyester resin.

35. The method for fabricating a liquid crystal display device of claim 26, wherein in the step of bonding said resin film to said plurality of supporting members, a venthole is formed in order to ventilate said gap between said substrate and said resin film.

36. The method for fabricating a liquid crystal display device of claim 35, wherein said venthole is formed by leaving a part of said substrate without being bonded to said resin film, said part being in a vicinity of a display portion on said substrate.

37. The method for fabricating a liquid crystal display device of claim 36, wherein an internal wall of said venthole is subjected to a treatment for decreasing a surface tension.

38. The method for fabricating a liquid crystal display device of claim 35, wherein said venthole is formed by bonding said resin film to said substrate in a vicinity of a display portion on said substrate so as to once seal said gap, and forming a through hole in a region outside a display portion of said resin film.

39. The method for fabricating a liquid crystal display device of claim 35 further comprising the step of closing said venthole.

40. A method for fabricating a liquid crystal display device comprising the steps of:

arranging a plurality of first supporting members on a substrate, said substrate being transparent and having a pixel electrode and a driving element connected to the pixel electrode thereon;

forming a first adhesive layer onto said plurality first of supporting members;

bonding a first resin film to said plurality of first supporting members by disposing the first resin film onto the first adhesive layer formed on said plurality of first supporting members and applying heat to the first resin film while maintaining a gap between said substrate and the first resin film;

forming a first opening portion in the first resin film;

forming a first pixel electrode on the first resin film and electrically connecting the first pixel electrode to a corresponding driving element on said substrate via the first opening portion;

stacking one other resin film or more resin films by first stacking a second resin film while maintaining a gap between the first resin film and the second resin film by arranging a plurality of second supporting members on the first resin film bonded to said plurality of first supporting members; forming a second adhesive layer onto said plurality of second supporting members; bonding the second resin film to said plurality of second supporting members; forming a second opening portion in the second resin film; and forming a second pixel electrode on the second resin film and electrically connecting the second pixel electrode to a corresponding driving element formed on said substrate via the second opening portion;

forming a plurality of uppermost supporting members on a resin film last stacked in a previous stacking step and disposing an uppermost adhesive layer onto said plurality of uppermost supporting members so as to bond an uppermost resin film to said plurality of uppermost supporting members;

forming a common electrode on a surface of the uppermost resin film; and sealing liquid crystal into said gap between said substrate and the first resin film and said gap between adjacent resin films.

41. The method for fabricating a liquid crystal display device of claim 40, wherein each opening portion is formed by reactive ion etching.

42. The method for fabricating a liquid crystal display device of claim 40, wherein the step of bonding the first resin to said plurality of first supporting members comprises the sub step of pressing said resin film with a heated roller; and the step of stacking one other resin film or more resin films comprises the sub step of pressing each resin film with a heated roller.

43. The method for fabricating a liquid crystal display device of claim 42, wherein each adhesive layer is made of a material which exerts thermoplastic characteristics at a lower temperature than each resin film exerting thermoplastic characteristics, and the heated roller heats said each resin film to a temperature lower than said each resin film exerting thermoplastic characteristics and higher than said each adhesive layer exerting thermoplastic characteristics.

44. The method for fabricating a liquid crystal display device of claim 42, wherein at least a surface of the heated roller is made of a rigid material.

45. The method for fabricating a liquid crystal display device of claim 40, wherein the step of forming an adhesive layer and the step of bonding the first resin film to said plurality of first supporting members comprise:

preparing the first resin film applied with an adhesive layer; and arranging the first resin film onto said plurality of first supporting members with heating so that said surface applied with said adhesive layer faces said plurality of first supporting members; and the step of stacking one other resin film or more resin films comprises:

preparing the second resin film applied with an other adhesive layer; and arranging the second resin film onto said plurality of second supporting members with heating so that said surface applied with said other adhesive layer faces said plurality of second supporting members.

46. The method for fabricating a liquid crystal display device of claim 40, wherein in the step of arranging said plurality of first supporting members on said substrate, first supporting members arranged in a pixel region are formed to have more width than height.

47. The method for fabricating a liquid crystal display device of claim 40, wherein thickness of each resin film is in a range of 0.5 to 10 μm.

48. The method for fabricating a liquid crystal display device of claim 40, wherein a main component of each resin film is a polyester resin.

49. The method for fabricating a liquid crystal display device of claim 40, wherein in the step of bonding the first resin film to said plurality of first supporting members, a first venthole is formed in order to ventilate said gap between said substrate and the first resin film; and in the step of stacking one other resin film or more resin films, a second venthole is formed in order to ventilate said gap between the first resin film and the second resin film.

50. The method for fabricating a liquid crystal display device of claim 49, wherein the second venthole is formed by leaving a part of the first resin film without being bonded to the second resin film, said part being in a vicinity of a display portion on said substrate.

51. The method for fabricating a liquid crystal display device of claim 50, wherein an internal wall of the second venthole is subjected to a treatment for decreasing a surface tension.

52. The method for fabricating a liquid crystal display device of claim 49, wherein the first venthole and the second venthole are formed by bonding the first resin film to said substrate and bonding the second resin film to the first resin film in a vicinity of a display portion on said substrate so as to once seal said gap between said substrate and the first resin film and said gap between the first resin film and the second resin film, and forming a through hole in a region outside a display portion of all resin films stacked.

53. The method for fabricating a liquid crystal display device of claim 49 further comprising the step of closing the first venthole and the second venthole.

54. A liquid crystal display device comprising:

a substrate having a pixel electrode and a driving element connected to the pixel electrode on a surface of said substrate;

a resin film being disposed above said substrate;

a plurality of supporting members each being columnar and standing on said substrate so as to support said resin film;

an adhesive layer being disposed between said resin film and said plurality of supporting members so as to bond said resin film to said plurality of supporting members, said adhesive layer being made of a thermoplastic material and exerting thermoplastic characteristics so as to bond said resin film to said plurality of supporting members;

a liquid crystal layer being composed of liquid crystal and being disposed between said substrate and said resin film;

a resin layer being formed on a surface of said resin film, said resin layer being transparent and having a multiplicity of fine convex and concave portions on a surface thereof; and a reflective film having a shape of a multiplicity of fine convex and concave portions and being formed correspondingly on said multiplicity of fine convex and concave portions on the surface of said resin layer, said reflective film also serving as a common electrode.

55. A liquid crystal display device comprising:

a substrate having a pixel electrode and a driving element connected to the pixel electrode on a surface of said substrate;

a plurality of resin films being stacked above said substrate, said plurality of resin films each having a pixel electrode on a surface thereof except an uppermost resin film of said plurality of resin films;

a plurality of liquid crystal layers each being formed by arranging a plurality of supporting members each being columnar in each gap between said substrate and a lowermost resin film of said plurality of resin films and between adjacent ones of said plurality of resin films, and by sealing liquid crystal into said each gap;

said substrate having more driving elements on the surface thereof, said more driving elements being electrically connected to a corresponding one of the pixel electrodes formed on said plurality of resin films except the uppermost resin film via cubic interconnection provided in relation to each of the pixel electrodes formed on said plurality of resin films except the uppermost resin film;

a plurality of adhesive layers each being disposed between each of said plurality of supporting members and each of said plurality of resin films, said plurality of adhesive layers being made of a thermoplastic material and exerting thermoplastic characteristics so as to bond each of said plurality of resin films to each of said plurality of supporting members;

the supporting members between adjacent ones of said plurality of resin films being arranged substantially in same positions as the supporting members between said substrate and the lowermost resin film with respect to a plane parallel to said substrate;

a resin layer being formed on a surface of the uppermost resin film, said resin layer being transparent and having a multiplicity of fine convex and concave portions on a surface thereof; and a reflective film having a shape of a multiplicity of fine convex and concave portions and being formed correspondingly on said multiplicity of fine convex and concave portions on the surface of said resin layer, said reflective film also serving as a common electrode.

56. A method for fabricating a liquid crystal display device comprising the steps of:

arranging a plurality of supporting members each being columnar onto a substrate, said substrate being transparent and having a pixel electrode and a driving element connected with the pixel electrode thereon;

forming an adhesive layer onto said plurality of supporting members;

bonding a resin film to said plurality of supporting members by disposing said resin film onto said adhesive layer formed on said plurality of supporting members and applying heat to said resin film while maintaining a gap between said substrate and said resin film;

forming a resin layer whose surface has a multiplicity of fine convex and concave portions by applying a photo resist onto a surface of said resin film, subjecting the surface of said resin film to mask exposure, developing, and baking;

forming a reflective film also serving as a common electrode onto the surface of said resin layer; and sealing liquid crystal into said gap between said substrate and said resin film.

57. A method for fabricating a liquid crystal display device comprising the steps of:

arranging a plurality of first supporting members each being columnar on a substrate, said substrate being transparent and having a pixel electrode and a driving element connected to the pixel electrode thereon;

forming a first adhesive layer onto said plurality of first supporting members;

bonding a first resin film to said plurality of first supporting members by disposing the first resin film onto the first adhesive layer formed on said plurality of first supporting members and applying heat to the first resin film while maintaining a gap between said substrate and the first resin film;

forming a first opening portion in the first resin film;

forming a first pixel electrode on the first resin film and electrically connecting the first pixel electrode to a corresponding driving element on said substrate via the first opening portion;

stacking one other resin film or more resin films by first stacking a second resin film while maintaining a gap between the first resin film and the second resin film by arranging a plurality of second supporting members on the first resin film bonded to said plurality of first supporting members; forming a second adhesive layer onto said plurality of second supporting members; bonding the second resin film to said plurality of second supporting members; forming a second opening portion in the second resin film; and forming a second pixel electrode on the second resin film and electrically connecting the second pixel electrode to a corresponding driving element formed on said substrate via the second opening portion;

forming a plurality of uppermost supporting members on a resin film last stacked in a previous stacking step and disposing an uppermost adhesive layer onto said plurality of uppermost supporting members so as to bond an uppermost resin film to said plurality of uppermost supporting members;

forming a resin layer whose surface has a multiplicity of fine convex and concave portions by applying a photo resist onto a surface of the uppermost resin film, subjecting the surface of the uppermost resin film to mask exposure, developing, and baking;

forming a reflective film also serving as a common electrode onto the surface of said resin layer; and sealing liquid crystal into said gap between said substrate and the first resin film and said gap between adjacent resin films.

* * * * *